United States Patent [19]
Oshima

[11] Patent Number: 5,682,360
[45] Date of Patent: Oct. 28, 1997

[54] RECORDING AND REPRODUCING APPARATUS FOR USE WITH A RECORDING MEDIUM HAVING AN OPTICAL RECORDING LAYER AND MAGNETIC RECORDING LAYER

[75] Inventor: Mitsuaki Oshima, Kyoto, Japan

[73] Assignee: Matsushita Electric Industrial Co., Ltd., Osaka, Japan

[21] Appl. No.: 9,709

[22] Filed: Jan. 27, 1993

[30] Foreign Application Priority Data

| Jan. 29, 1992 | [JP] | Japan | 4-013809 |
| Feb. 28, 1992 | [JP] | Japan | 4-042558 |
| Mar. 9, 1992 | [JP] | Japan | 4-050328 |
| Mar. 26, 1992 | [JP] | Japan | 4-068031 |
| Apr. 30, 1992 | [JP] | Japan | 4-111176 |
| Jul. 22, 1992 | [JP] | Japan | 4-194450 |
| Sep. 25, 1992 | [JP] | Japan | 4-280874 |

[51] Int. Cl.⁶ ............... G11B 11/00; G11B 5/127
[52] U.S. Cl. ............... 369/13; 360/59; 360/114
[58] Field of Search ............... 369/14, 13, 32, 369/33, 275.1, 288, 275.3; 360/59, 114; 358/310; 365/122

[56] References Cited

U.S. PATENT DOCUMENTS

| 4,750,159 | 6/1988 | Yoda | 369/13 |
| 5,020,041 | 5/1991 | Nakao et al. | 369/13 |
| 5,153,861 | 10/1992 | Marda et al. | 369/32 |
| 5,168,482 | 12/1992 | Aratani et al. | 369/13 |
| 5,206,844 | 4/1993 | Ishii | 369/13 |

FOREIGN PATENT DOCUMENTS

| 0164131 | 12/1985 | European Pat. Off. |
| 0414557 | 2/1991 | European Pat. Off. |
| 53-117402 | 10/1978 | Japan |
| 56-163536 | 12/1981 | Japan |
| 57-6446 | 1/1982 | Japan |
| 57-172532 | 10/1982 | Japan |
| 57-212642 | 12/1982 | Japan |
| 58-114343 | 7/1983 | Japan |
| 60-057558 | 4/1985 | Japan |
| 60-70543 | 4/1985 | Japan |
| 60-095745 | 5/1985 | Japan |
| 62-173630 | 7/1987 | Japan |
| 2179951 | 7/1990 | Japan |
| 3-080450 | 4/1991 | Japan |
| 85/02933 | 7/1985 | WIPO |

*Primary Examiner*—Ali Neyzari
*Attorney, Agent, or Firm*—Lowe, Price, LeBlanc & Becker

[57] ABSTRACT

A disk-shaped recording medium includes a transparent substrate, and an optical recording layer and a magnetic recording layer formed at one side of the transparent substrate. An optical head applies light to the optical recording layer from a light source via the transparent substrate, and focuses the light on the optical recording layer and reproduces information from the optical recording layer. A magnetic head, located at a side of the recording medium opposite the side thereof where the optical head is located, records information on the magnetic recording layer or reproduces information from the magnetic recording layer. An optical head moving device serves to move the optical head by a movement amount so as to focus the light on an optical track on the optical recording layer which has specified address information. A magnetic head moving device serves to move the magnetic head to a specified magnetic track on the magnetic recording layer by referring to the movement amount of the optical head.

29 Claims, 129 Drawing Sheets

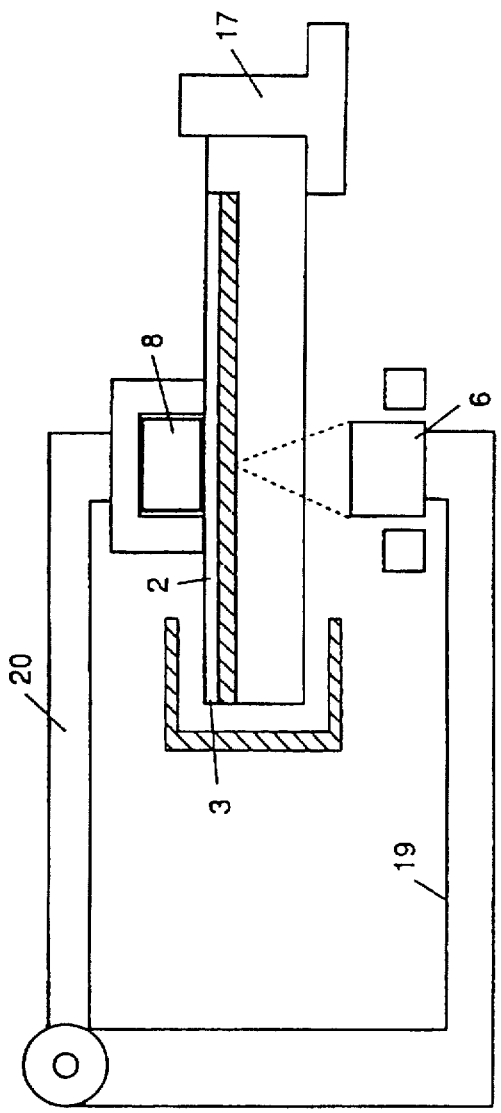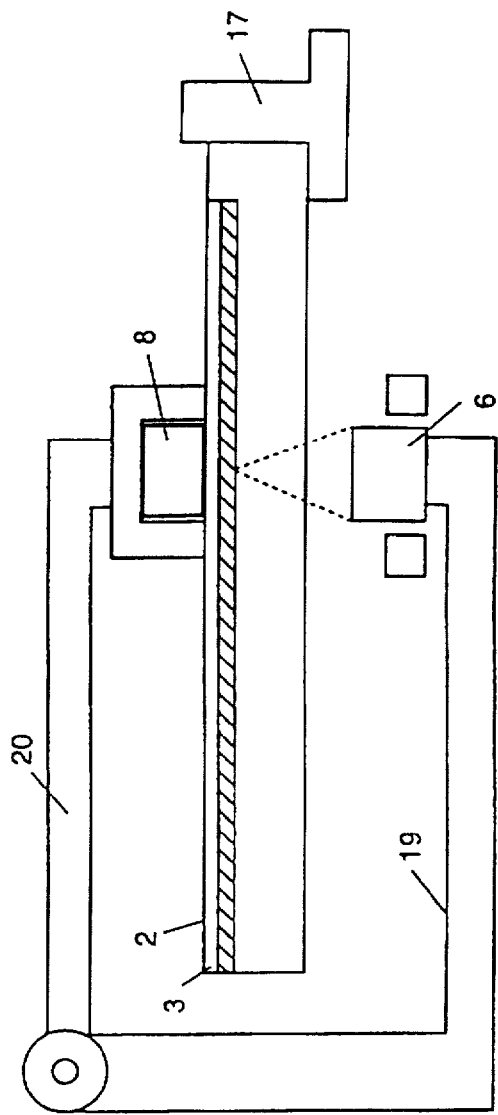

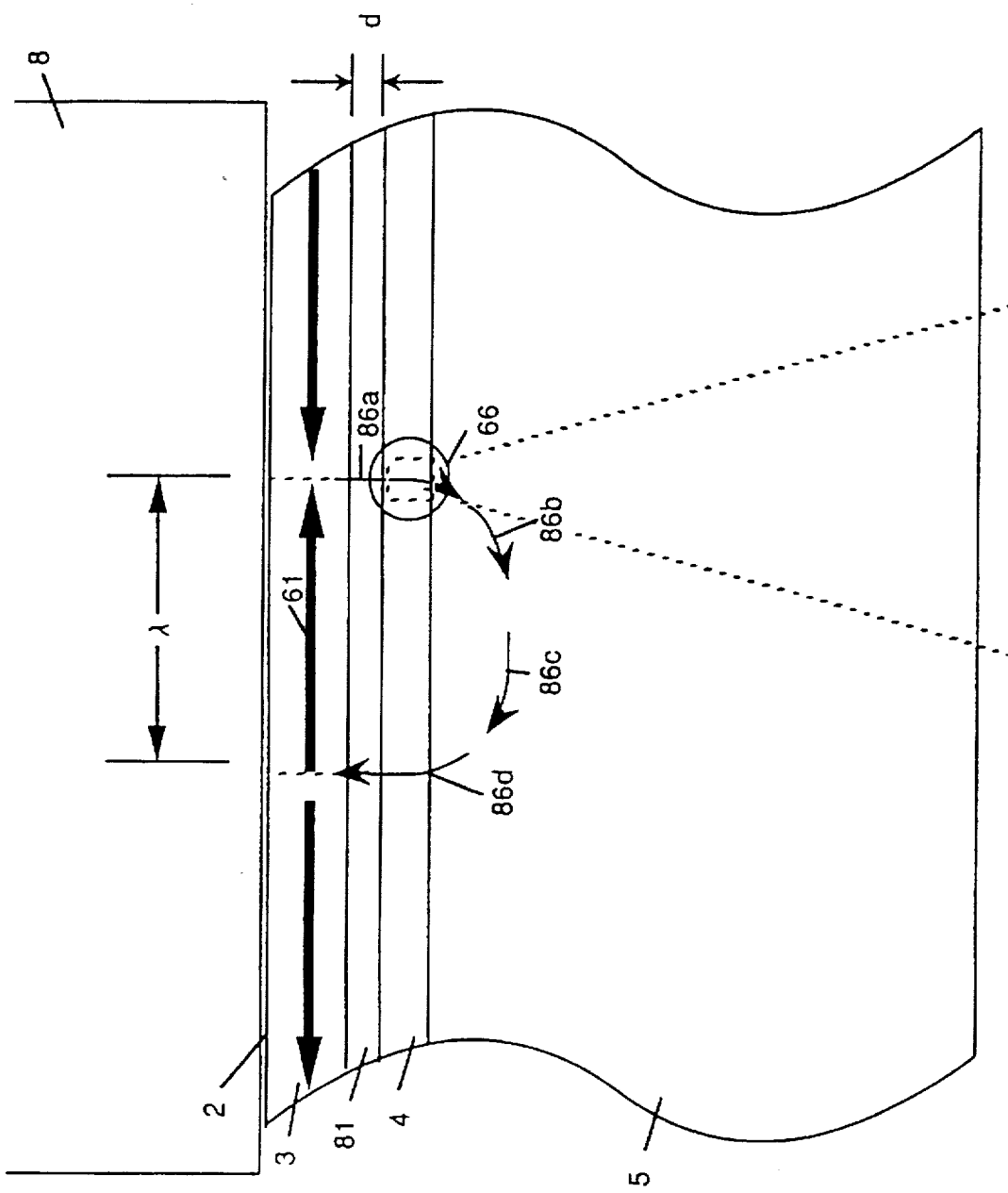

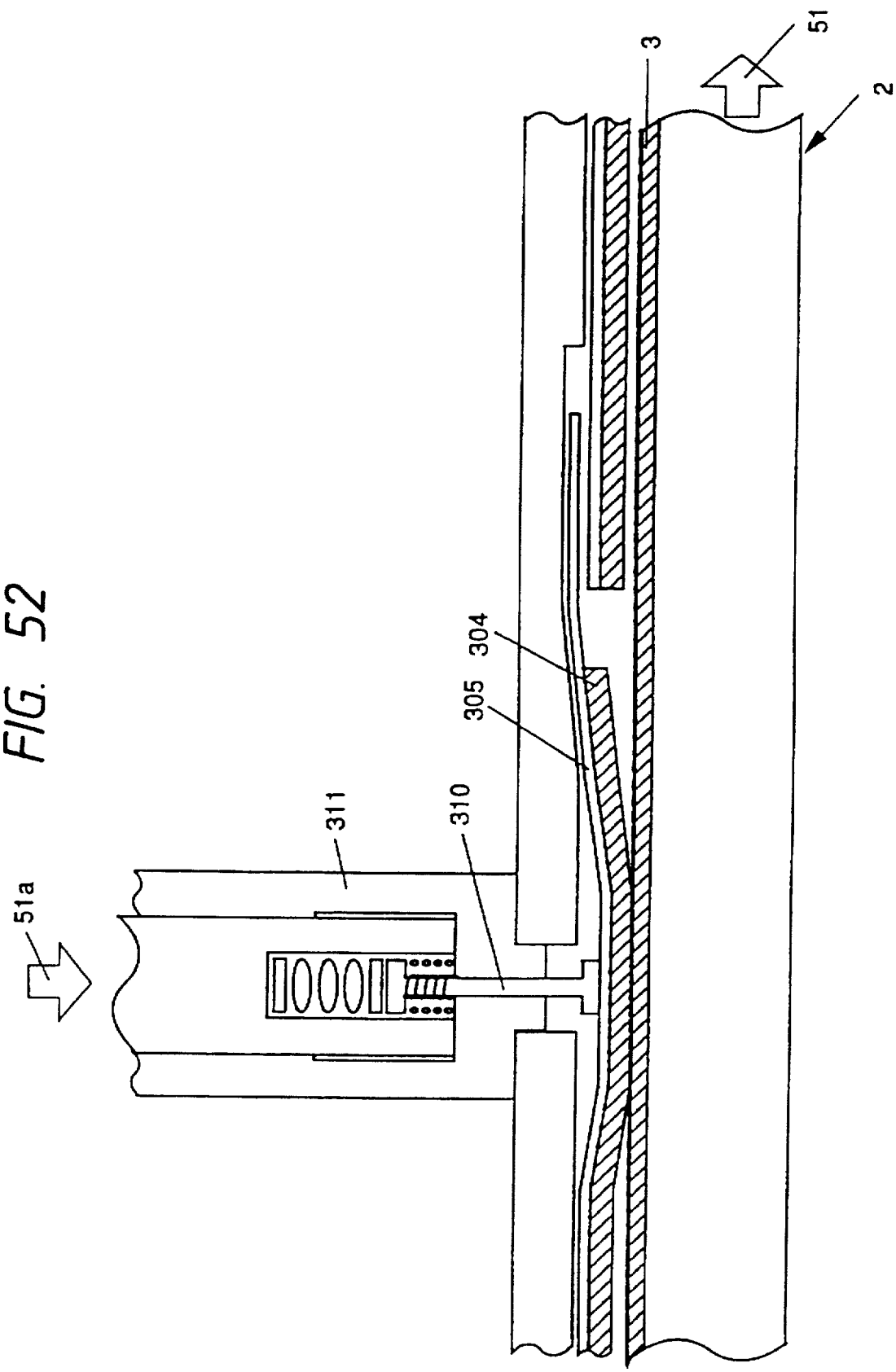

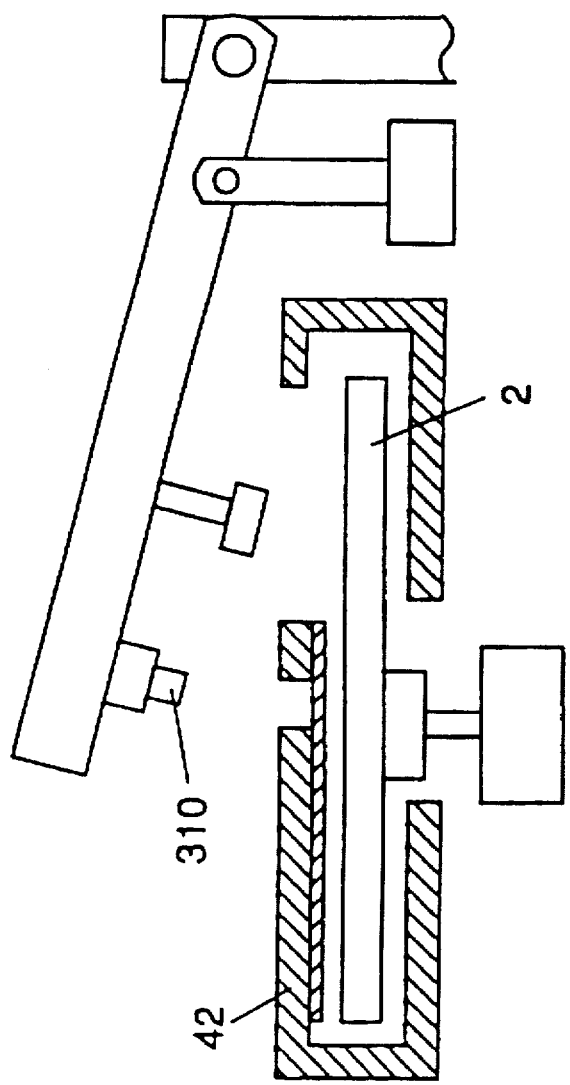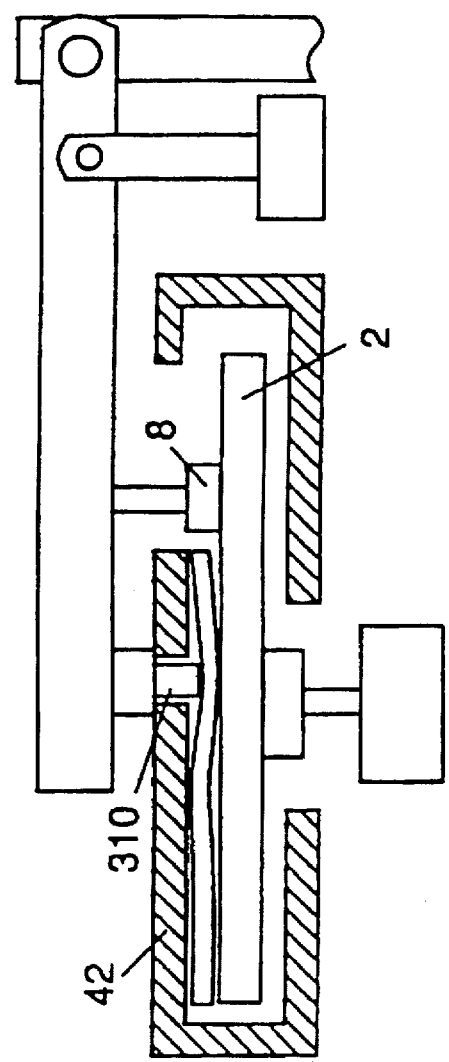

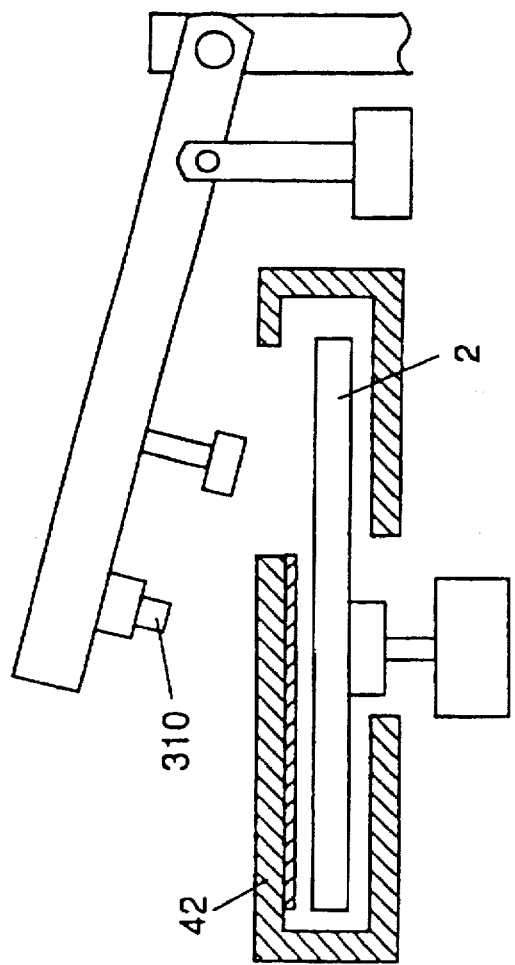
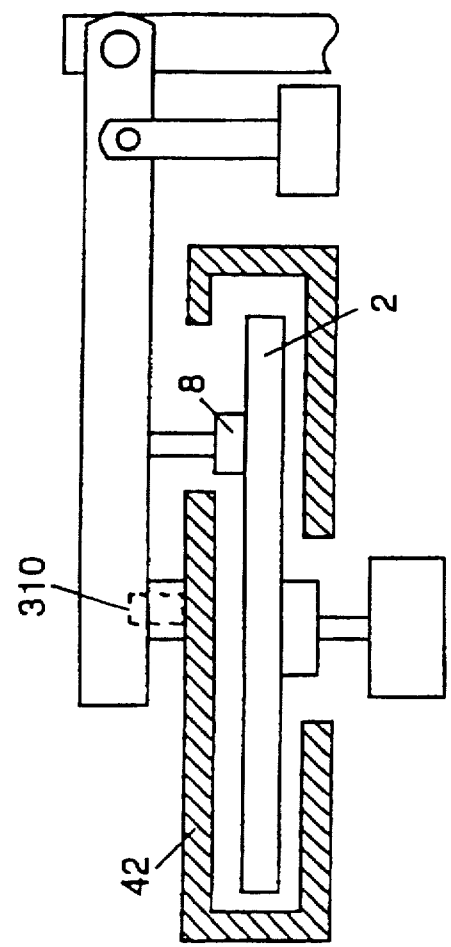
FIG. 55(a)
FIG. 55(b)

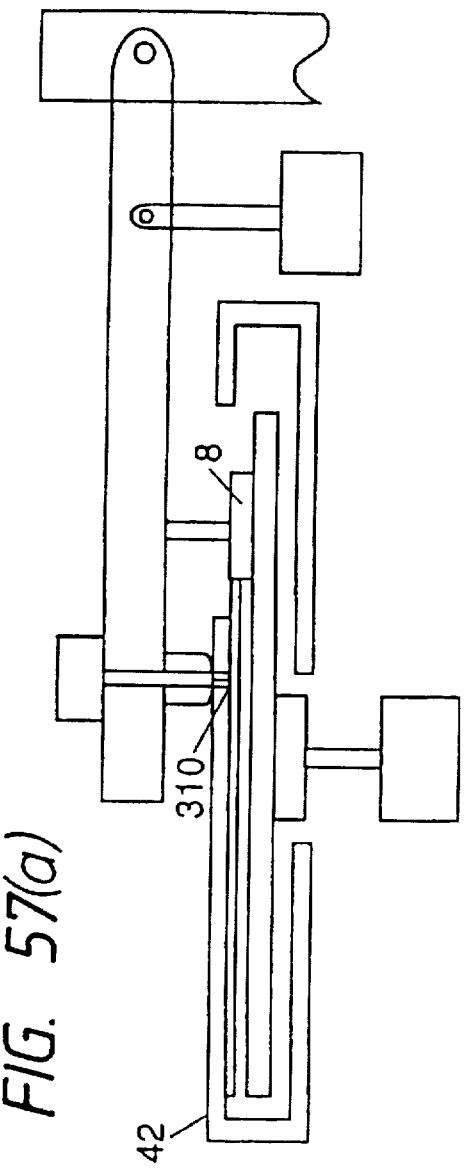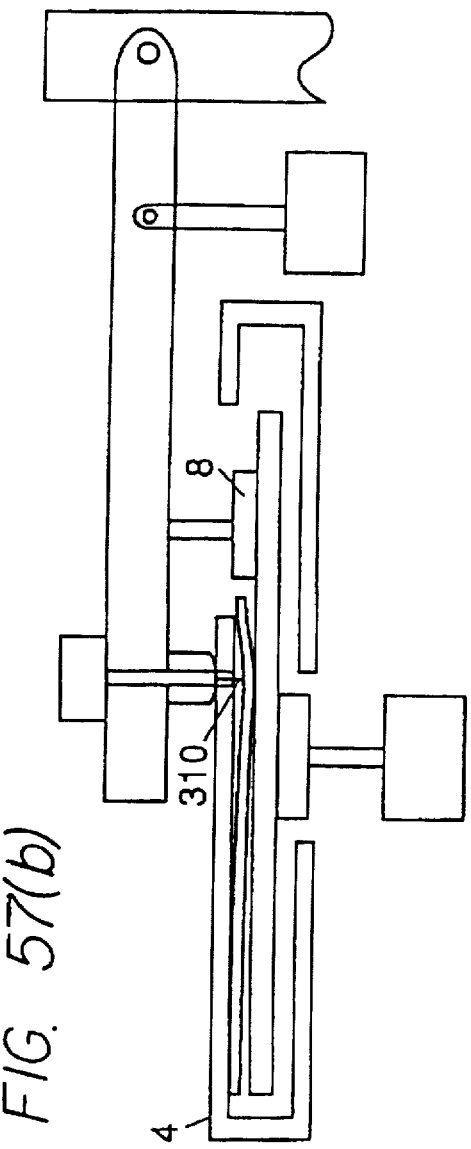
FIG. 57(a)
FIG. 57(b)

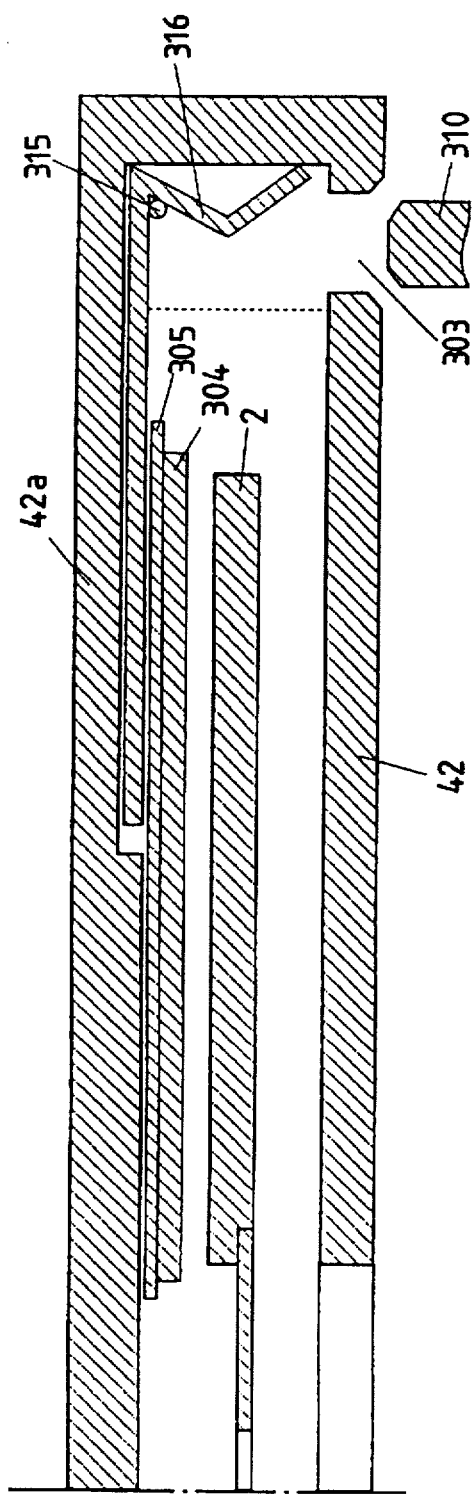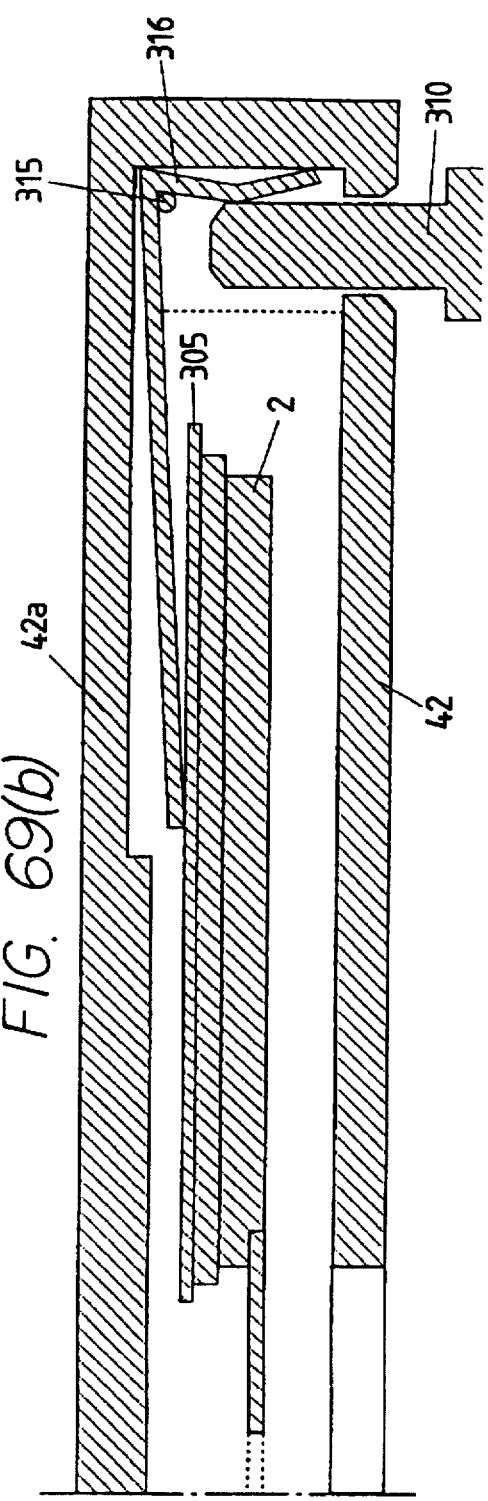

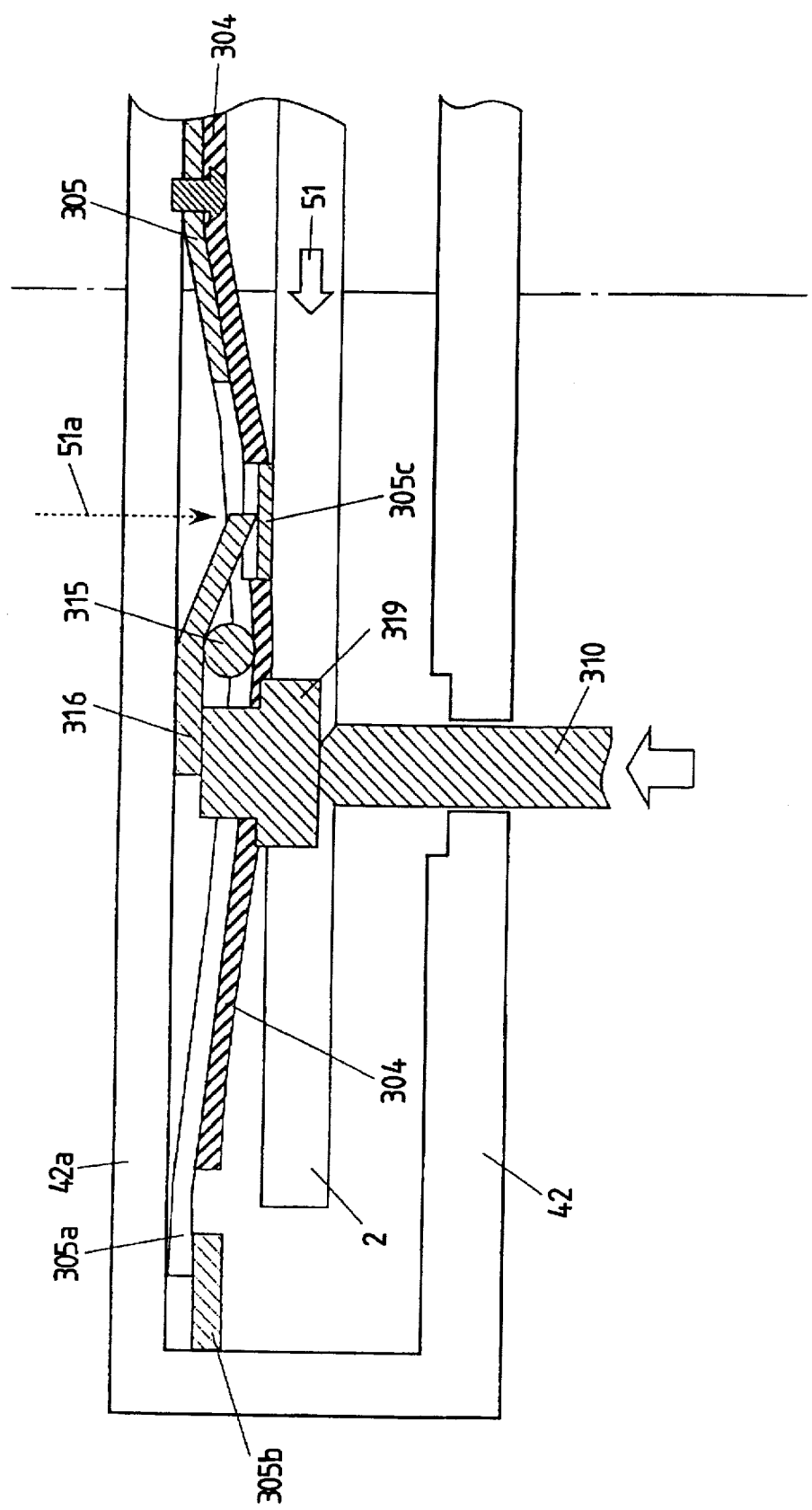

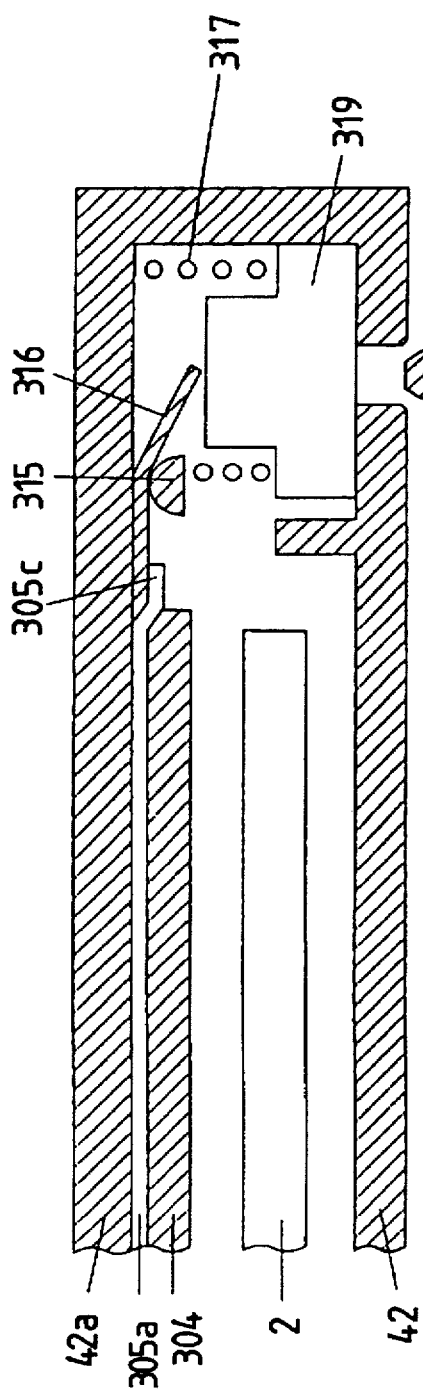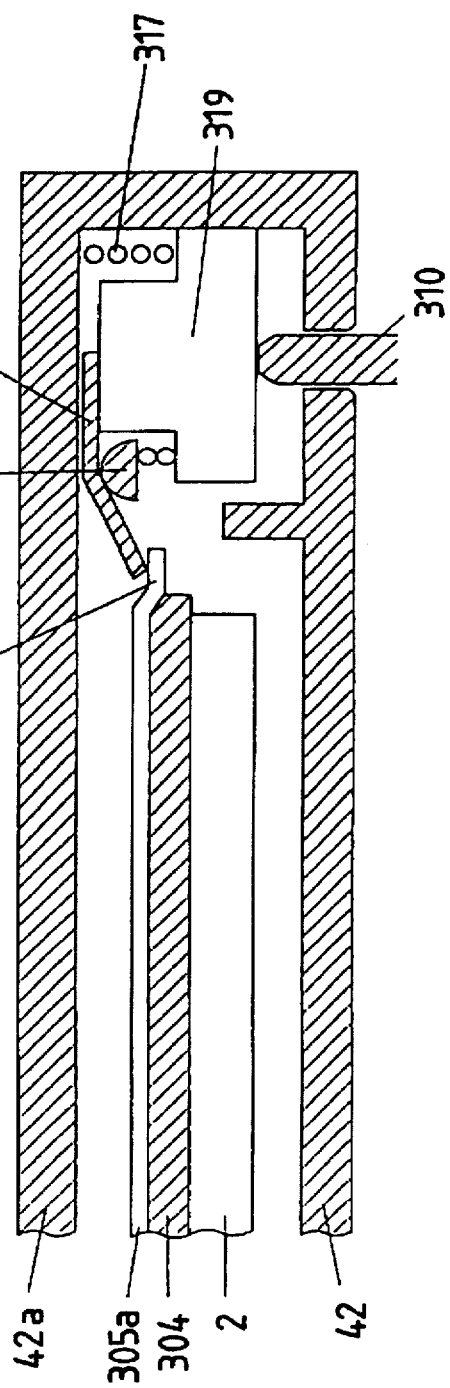
FIG. 78(a)
FIG. 78(b)

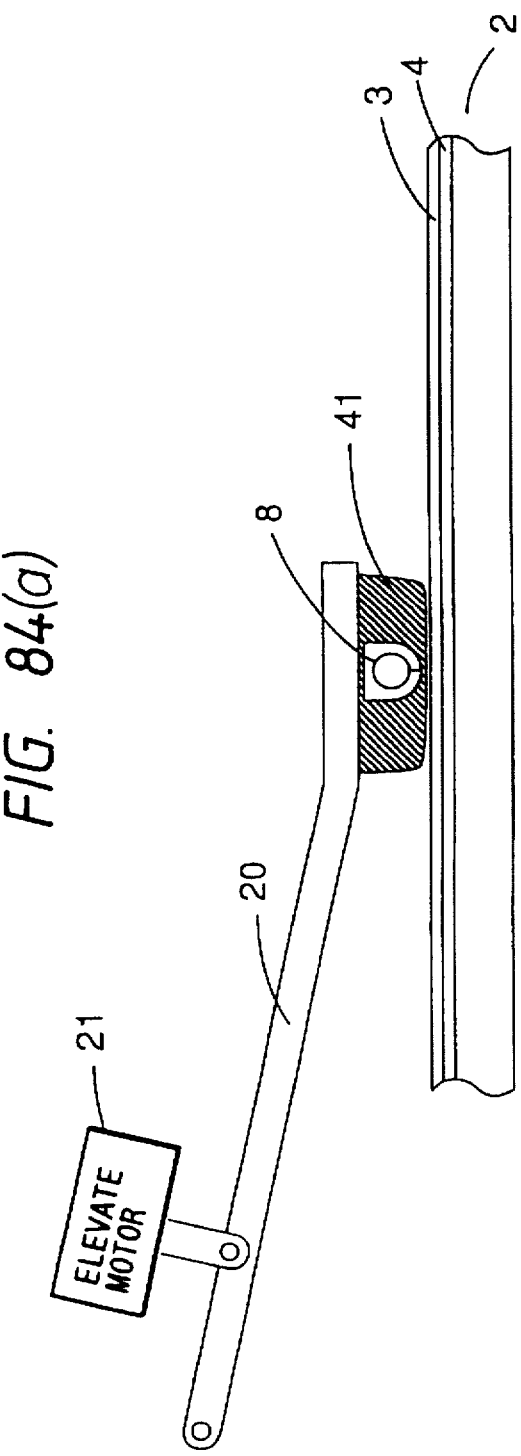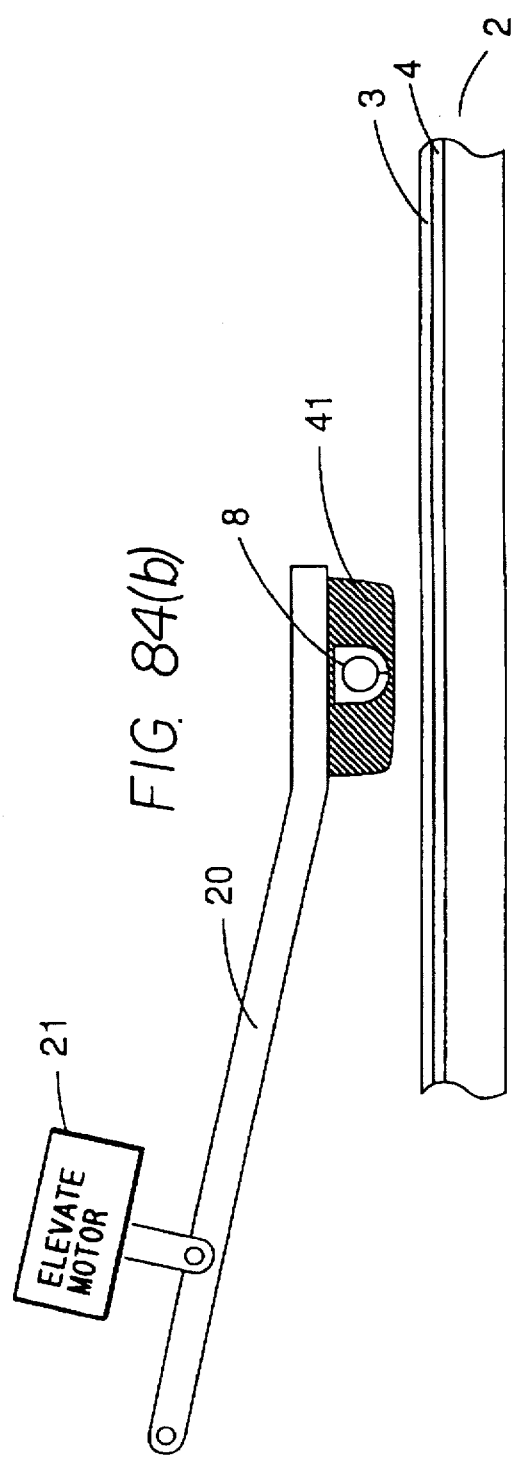

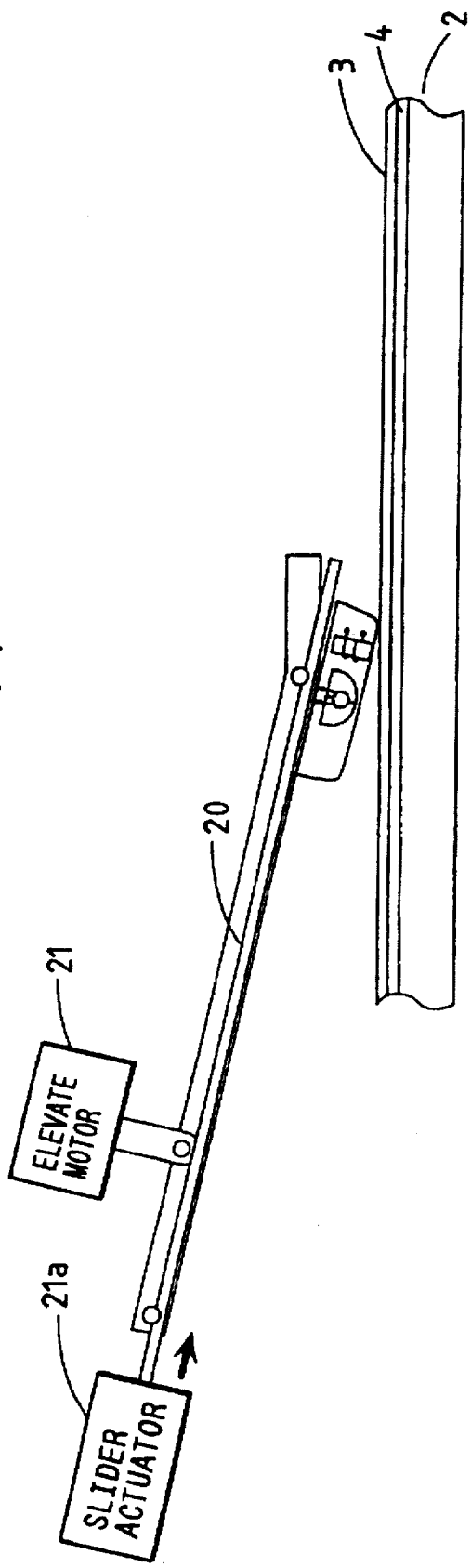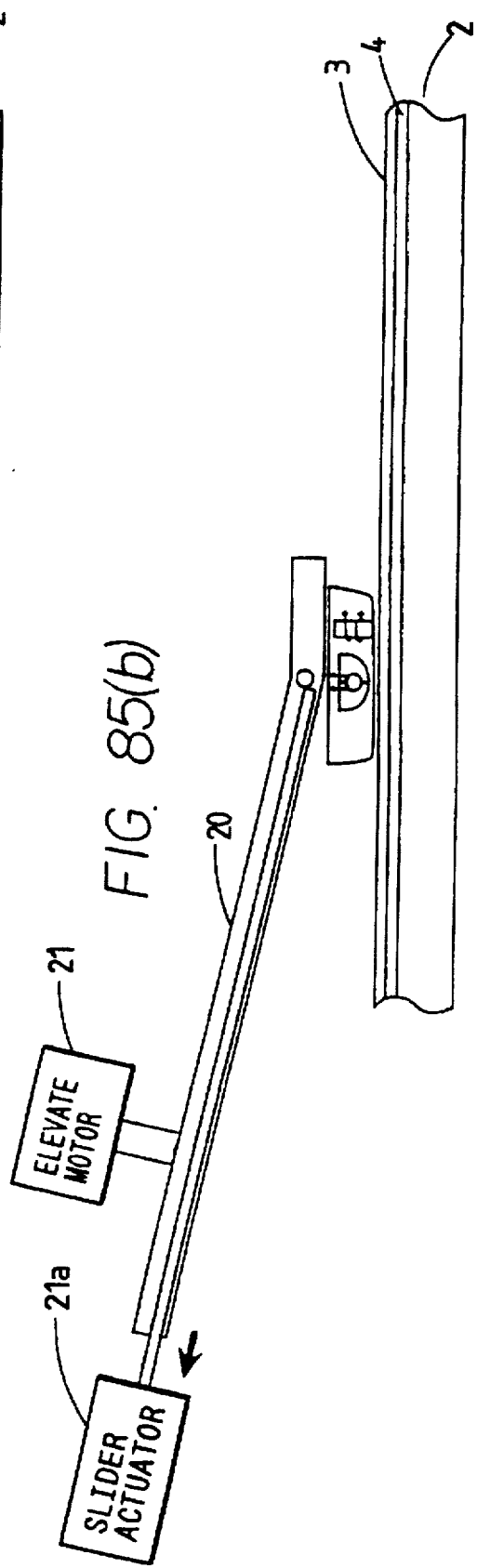

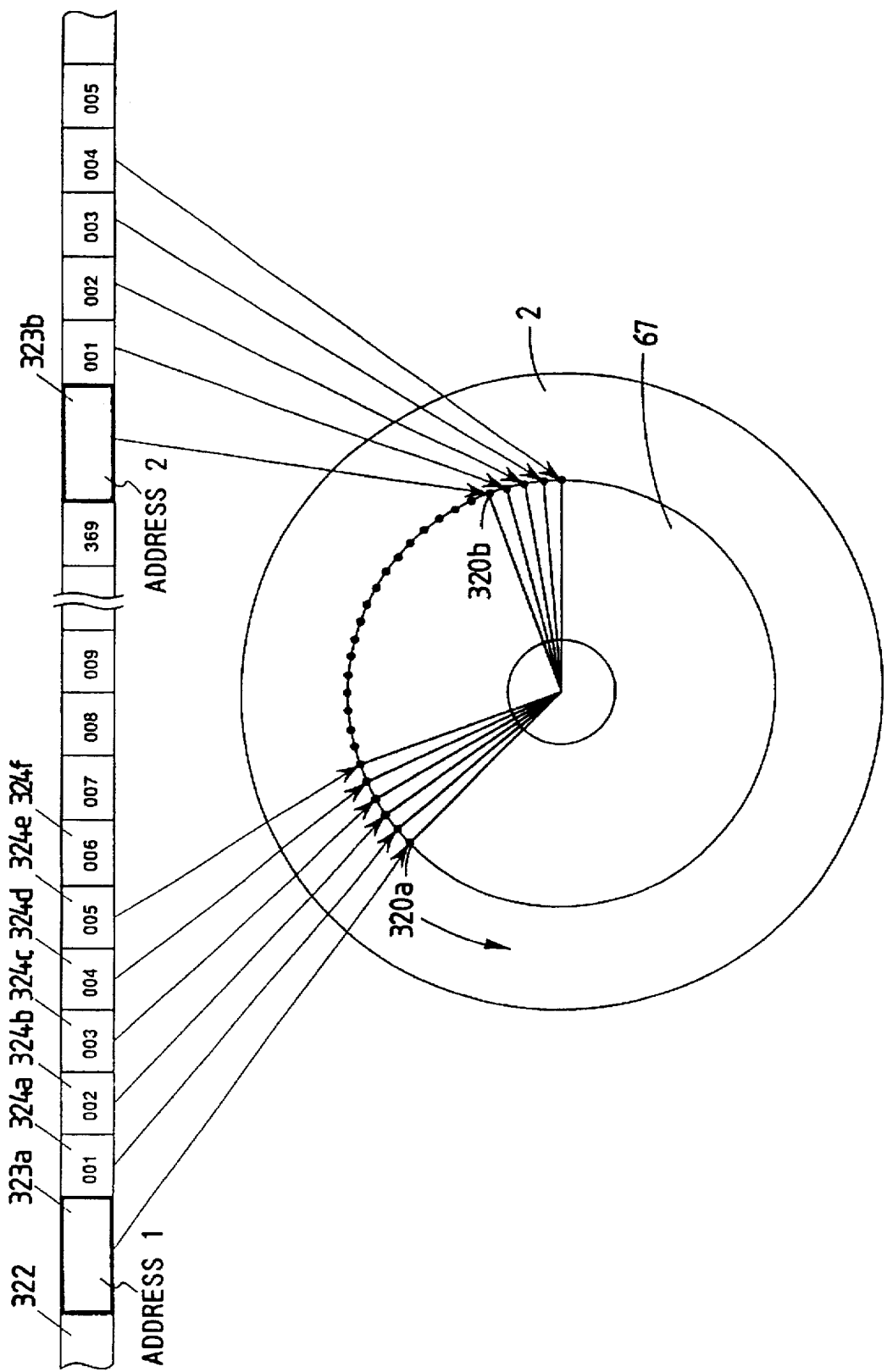

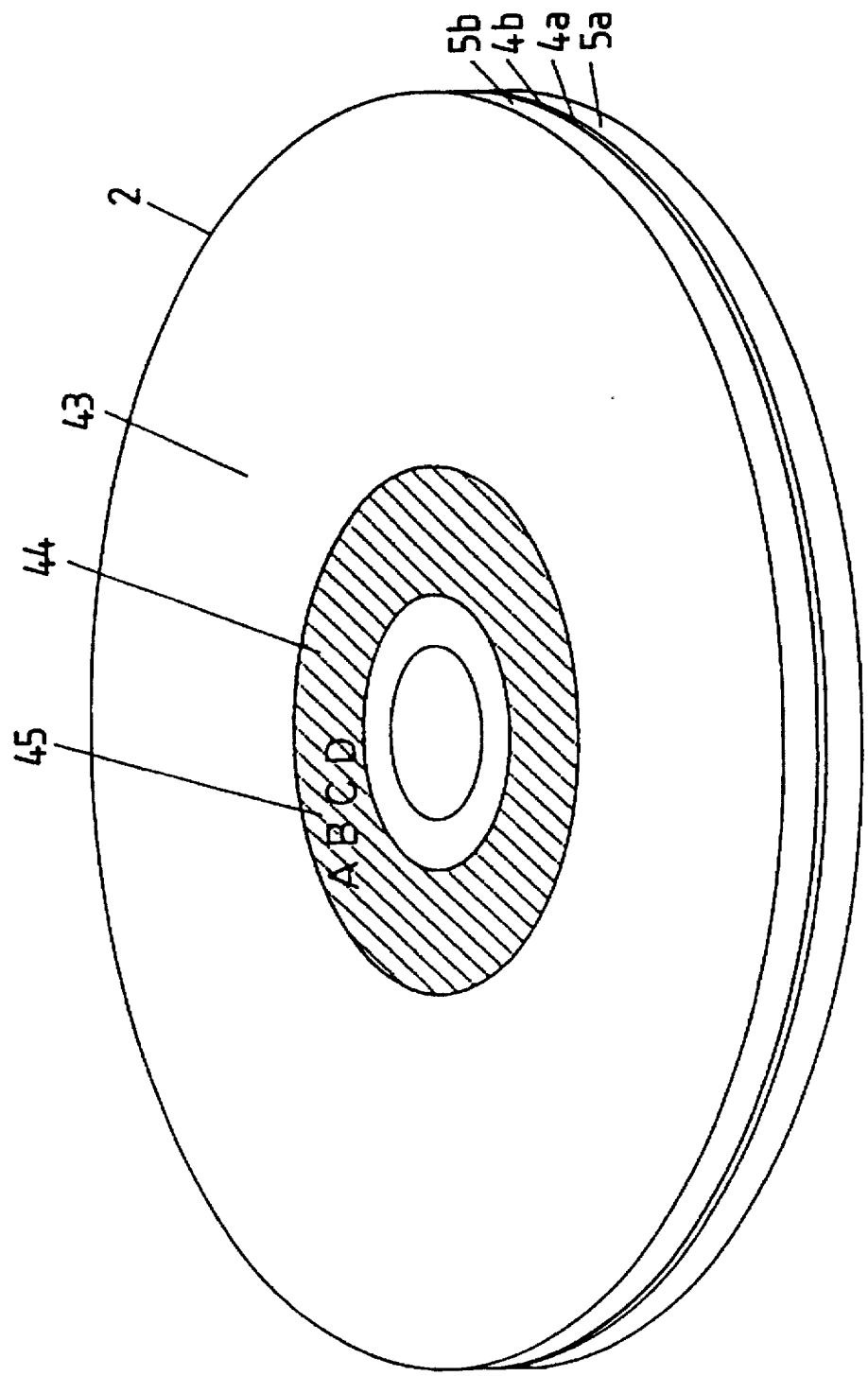

P = 1

P = 2

P = 3

P = 4

P = 5

P = 6

P = 1

P = 2

P = 3

P = 4

P = 5

P = 6

P = 1

P = 2

P = 3

P = 4

P = 5

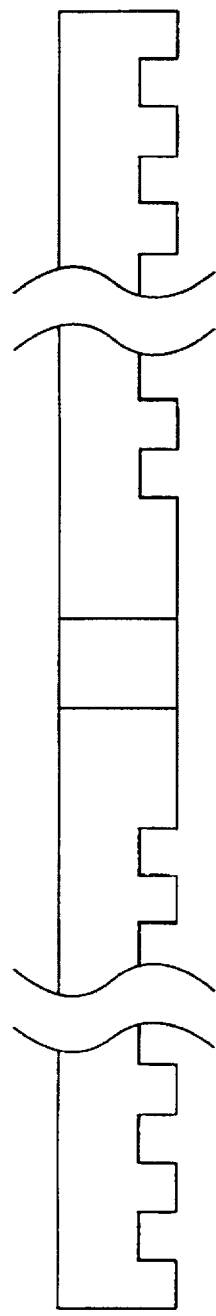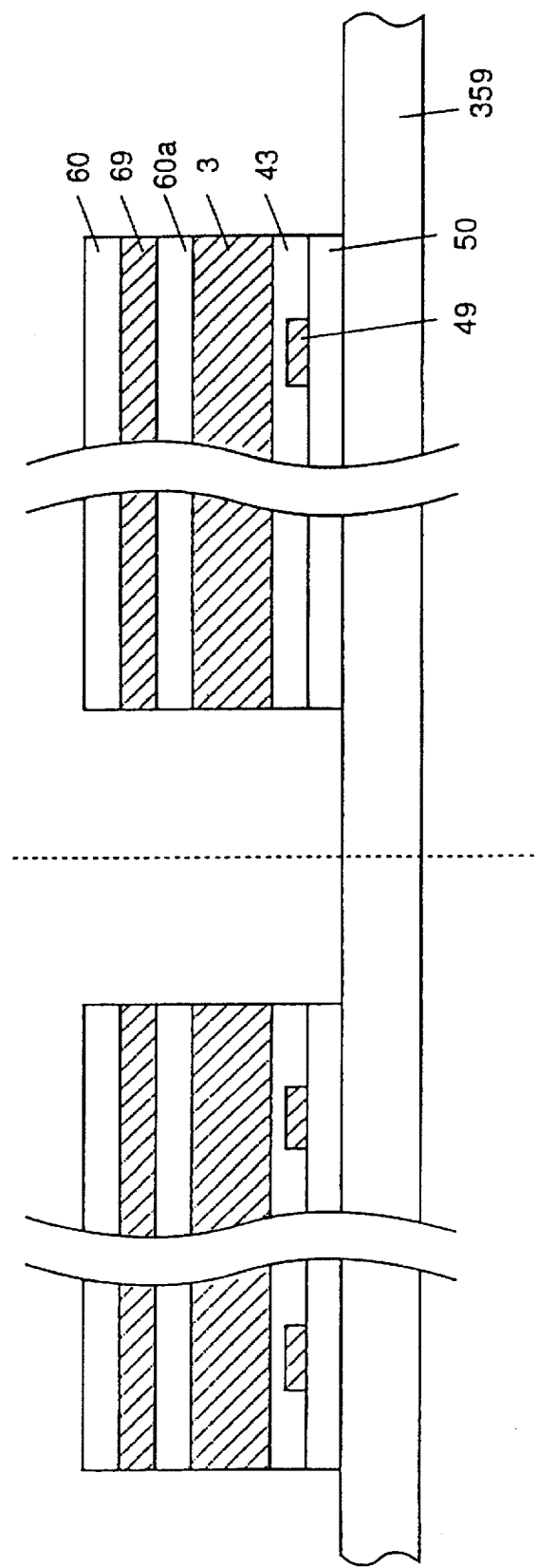
FIG. 108

FIG. 111(a) OFF
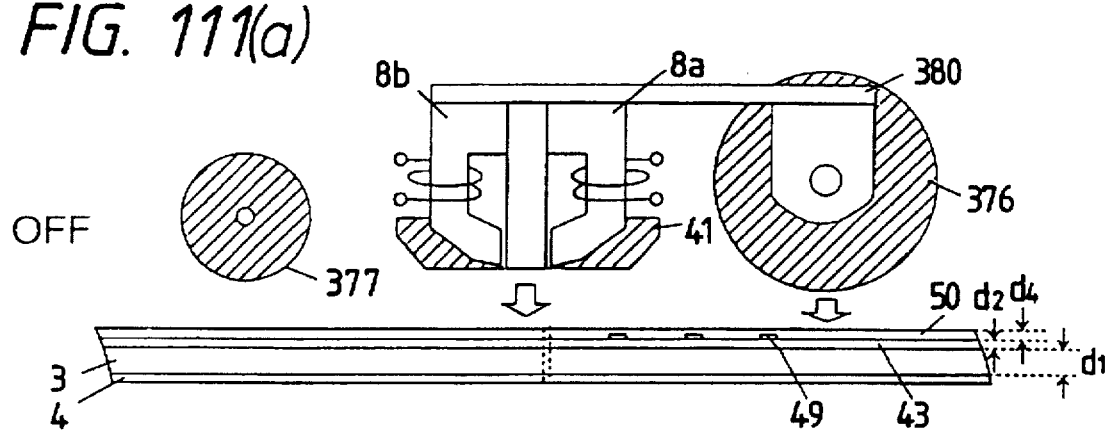
FIG. 111(b) ON-A
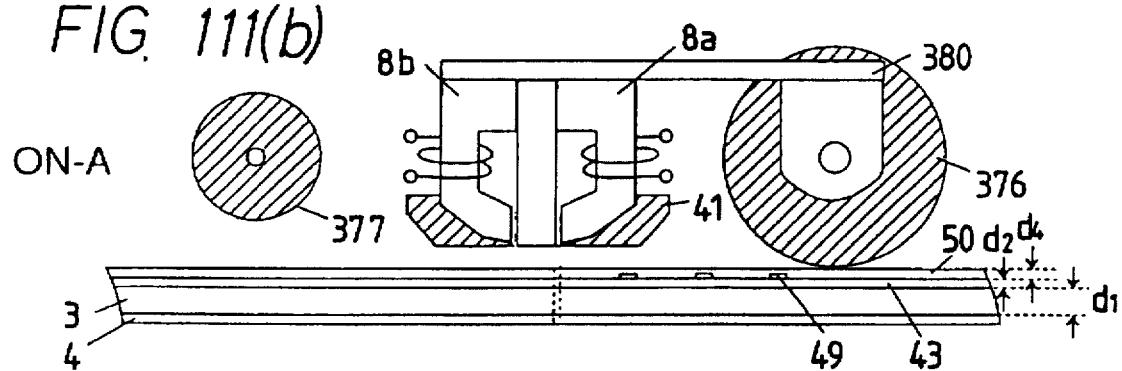
FIG. 111(c) ON-B
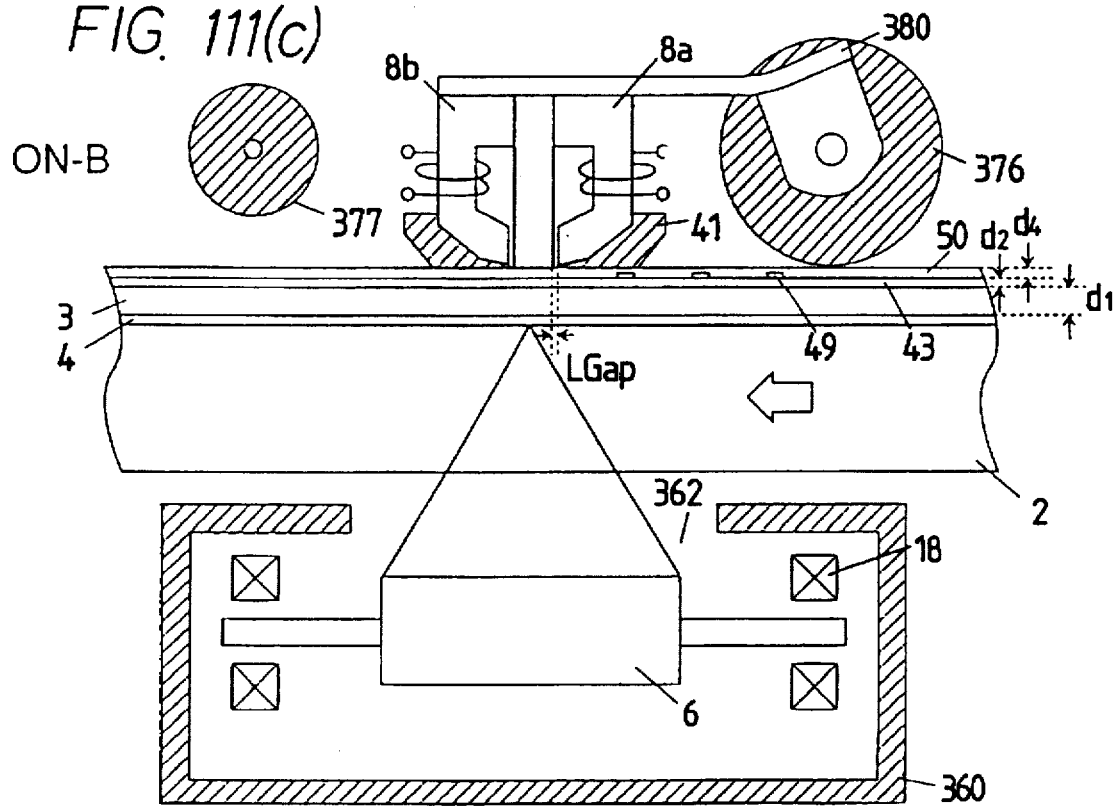

ON

OFF

DIRECTION OF DISK ROTATION

RECORDING AND REPRODUCING APPARATUS FOR USE WITH A RECORDING MEDIUM HAVING AN OPTICAL RECORDING LAYER AND MAGNETIC RECORDING LAYER

BACKGROUND OF THE INVENTION

1. Field of the Invention

This invention relates to an apparatus for recording and reproducing information on and from a recording medium. This invention also relates to a recording medium. This invention further relates to a cartridge for containing a recording medium.

2. Description of the Prior Art

Japanese published unexamined patent applications 56-163536, 57-6446, 57-212642, and 60-70543 disclose a recording medium having both a magnetic recording portion and an optical recording portion.

Japanese published unexamined patent application 2-179951 discloses a recording medium which has an optical recording portion and a magnetic recording portion at opposite sides thereof respectively. Japanese patent application 2-179951 also discloses an apparatus which includes an optical head facing the optical recording portion of the recording medium for reading out information from the optical recording portion, a magnetic head facing the magnetic recording portion of the recording medium for recording and reproducing information into and from the magnetic recording portion, and a mechanism for moving at least one of the optical head and the magnetic head in accordance with rotation of the recording medium. In the apparatus of Japanese patent application 2-179951, during the processing of the information read out from the magnetic recording portion, a decision is made as to whether or not the information recorded on the optical recording portion is necessary, and a step of reading out the information from the optical recording portion is executed when the information on the optical recording portion is decided to be necessary.

SUMMARY OF THE INVENTION

It is an object of this invention to provide an improved recording and reproducing apparatus.

It is another object of this invention to provide an improved recording medium.

It is sill another object of this invention to provide an improved cartridge for containing a recording medium.

A first aspect of this invention provides a recording and reproducing apparatus for use with a disk-shaped recording medium which includes a transparent substrate, and an optical recording layer and a magnetic recording layer formed at one side of the transparent substrate, the apparatus comprising a light source for emitting light; an optical head for applying the light to the optical recording layer from the light source via the transparent substrate, for focusing the light on the optical recording layer, and for reproducing information from the optical recording layer; a magnetic head, located at a side of the recording medium opposite the side thereof where the optical head is located, for recording information on the magnetic recording layer or reproducing information from the magnetic recording layer; an optical head moving means for moving the optical head by a movement amount so as to focus the light on an optical track on the optical recording layer which has specified address information; and a magnetic head moving means for moving the magnetic head to a specified magnetic track on the magnetic recording layer by referring to the movement amount of the optical head.

A second aspect of this invention provides a recording and reproducing apparatus for use with a disk-shaped recording medium which includes a transparent substrate, and an optical recording layer and a magnetic recording layer formed at one side of the transparent substrate, the apparatus comprising a light source for emitting light; an optical head for applying the light to the optical recording layer from the light source via the transparent substrate, for focusing the light on the optical recording layer, and for reproducing information from the optical recording layer; and a magnetic head, located at a side of the recording medium opposite the side thereof where the optical head is located, for recording information on the magnetic recording layer or reproducing information from the magnetic recording layer; wherein the magnetic head has a head gap equal to or greater than 5 μm.

A third aspect of this invention provides a recording and reproducing apparatus for use with a disk-shaped recording medium which includes a transparent substrate, and an optical recording layer and a magnetic recording layer formed at one side of the transparent substrate, the apparatus comprising a light source for emitting light; an optical head for applying the light to the optical recording layer from the light source via the transparent substrate, for focusing the light on the optical recording layer, and for reproducing information from the optical recording layer; a magnetic head, located at a side of the recording medium opposite the side thereof where the optical head is located, for recording information on the magnetic recording layer or reproducing information from the magnetic recording layer; an optical head moving means for moving the optical head so as to focus the light on an optical track on the optical recording layer which has specified address information; and a magnetic head moving means for moving the magnetic head to a magnetic track on the magnetic recording layer in accordance with said moving the optical head by the optical head moving means, the magnetic track being located at substantially a back side of the optical track having the specified address information.

A fourth aspect of this invention provides a recording and reproducing apparatus for use with a disk-shaped recording medium which includes a transparent substrate, and an optical recording layer and a magnetic recording layer formed at one side of the transparent substrate, the apparatus comprising a light source for emitting light; an optical head for applying the light to the optical recording layer from the light source via the transparent substrate, for focusing the light on the optical recording layer, and for reproducing information from the optical recording layer; a magnetic head, located at a side of the recording medium opposite the side thereof where the optical head is located, for recording information on the magnetic recording layer or reproducing information from the magnetic recording layer to generate a magnetic reproduced signal; a detecting means for detecting noise which enters the magnetic reproduced signal from the optical head; a noise canceling means for generating a noise cancel signal which equals an inversion of the noise detected by the detecting means, and for adding the noise cancel signal and the magnetic reproduced signal.

A fifth aspect of this invention provides a recording and reproducing apparatus comprising a disk-shaped recording medium including a transparent substrate, and an optical recording layer and a magnetic recording layer formed at one side of the transparent substrate; a light source for emitting light; an optical head for applying the light to the optical recording layer from the light source via the transparent substrate, for focusing the light on the optical recording layer, and for reproducing information from the optical recording layer; and a magnetic head, located at a side of the recording medium opposite the side thereof where the optical head is located, for recording information on the magnetic recording layer or reproducing information from the magnetic recording layer; wherein the magnetic recording layer has magnetic tracks which are arranged at substantially unequal intervals in a radial direction with respect to the recording medium.

A sixth aspect of this invention provides a recording and reproducing apparatus for use with a disk-shaped recording medium which includes a transparent substrate, and an optical recording layer and a magnetic recording layer formed at one side of the transparent substrate, the apparatus comprising a light source for emitting light; an optical head for applying the light to the optical recording layer from the light source via the transparent substrate, for focusing the light on the optical recording layer, and for reproducing information from the optical recording layer; a magnetic head, located at a side of the recording medium opposite the side thereof where the optical head is located, for recording information on the magnetic recording layer or reproducing information from the magnetic recording layer; and a magnetic shield extending outward of the optical head and having electromagnetic blocking characteristics which are effective in a reproducing frequency band with respect to the magnetic head.

A seventh aspect of this invention provides a recording and reproducing apparatus for use with a disk-shaped recording medium which includes a transparent substrate, and an optical recording layer and a magnetic recording layer formed at one side of the transparent substrate, the apparatus comprising a light source for emitting light; an optical head for applying the light to the optical recording layer from the light source via the transparent substrate, for focusing the light on the optical recording layer, and for reproducing information from the optical recording layer; a magnetic head, located at a side of the recording medium opposite the side thereof where the optical head is located, for recording information on the magnetic recording layer or reproducing information from the magnetic recording layer; and means for interrupting operation of a focusing drive section of the optical head when the magnetic head is active.

An eighth aspect of this invention provides a recording and reproducing apparatus for use with a disk-shaped recording medium which includes a transparent substrate, and an optical recording layer and a magnetic recording layer formed at one side of the transparent substrate, the apparatus comprising a light source for emitting light; an optical head for applying the light to the optical recording layer from the light source via the transparent substrate, for focusing the light on the optical recording layer, and for reproducing information from the optical recording layer; a magnetic head, located at a side of the recording medium opposite the side thereof where the optical head is located, for recording information on the magnetic recording layer or reproducing information from the magnetic recording layer; a first means for activating the magnetic head to reproduce data from a specified magnetic track on the magnetic recording layer after the recording medium is placed in a given operable position; a memory; a second means for storing the reproduced data obtained by the first means into the memory; a third means for reproducing or updating information in the memory when reproducing or updating information on the specified magnetic track is required during a period after said storing the reproduced data into the memory by the second means; and a fourth means for activating the magnetic head to record only a part of information in the memory, which is required for updating, into the magnetic recording layer when saving information in the memory to the recording medium is required during or at an end of an information processing work.

A ninth aspect of this invention provides a recording and reproducing apparatus for use with a disk-shaped recording medium which includes a transparent substrate, and an optical recording layer and a magnetic recording layer formed at one side of the transparent substrate, the apparatus comprising a light source for emitting light; an optical head for applying the light to the optical recording layer from the light source via the transparent substrate, for focusing the light on the optical recording layer, and for reproducing information from the optical recording layer; a magnetic head, located at a side of the recording medium opposite the side thereof where the optical head is located, for recording information on the magnetic recording layer or reproducing information from the magnetic recording layer; and a magnetic head elevator for moving the magnetic head into contact with the recording medium before the magnetic head is activated, and for moving the magnetic head out of contact with the recording medium after the magnetic head is deactivated.

A tenth aspect of this invention provides a recording and reproducing apparatus comprising a disk-shaped recording medium including a transparent substrate, and an optical recording layer and a magnetic recording layer formed at one side of the transparent substrate; a light source for emitting light; an optical head for applying the light to the optical recording layer from the light source via the transparent substrate, for focusing the light on the optical recording layer, and for reproducing information from the optical recording layer; and a magnetic head, located at a side of the recording medium opposite the side thereof where the optical head is located, for recording information on the magnetic recording layer or reproducing information from the magnetic recording layer; wherein data head portions containing sync signals on respective magnetic tracks are present in an unspecified angular region of the recording medium.

An eleventh aspect of this invention provides a recording and reproducing apparatus comprising a disk-shaped recording medium including a transparent substrate, and an optical recording layer and a magnetic recording layer formed at one side of the transparent substrate; a light source for emitting light; an optical head for applying the light to the optical recording layer from the light source via the transparent substrate, for focusing the light on the optical recording layer, and for reproducing information from the optical recording layer; a magnetic head, located at a side of the recording medium opposite the side thereof where the optical head is located, for recording information on the magnetic recording layer or reproducing information from the magnetic recording layer; and a rotating meas for executing rotation control with respect to the recording medium at a constant linear velocity; wherein an amount of data of a recording format on each of concentrically recorded tracks increases as a radius of the track increases.

A twelfth aspect of this invention provides a recording and reproducing apparatus comprising a recording medium first and second surfaces; an optical head located at a side of the first surface of the recording medium and including a pickup for magneto-optical recording and reproduction; a magnetic field modulating head for magneto-optical recording which is located at a side of the second surface of the recording medium; a magnetic recording layer formed at the second surface of the recording medium; and a magnetic head formed together with the magnetic field modulating head for recording and reproducing information on and from the magnetic head recording layer.

A thirteenth aspect of this invention provides a disk-shaped recording medium comprising a transparent layer; pits formed in one side of the transparent layer; a reflecting portion provided near the pits; and a magnetic recording layer provided near the reflecting portion and made of magnetic material having a magnetic coercive force equal to or greater than 1,500 Oe.

A fourteenth aspect of this invention provides a cartridge for containing a recording medium having an optical recording layer and a magnetic recording layer at one side thereof, comprising a shutter portion having a window for an optical head; an interior; a liner made of soft material and located in the interior; an opening provided in the shutter portion for enabling the liner to be pressed against the magnetic recording layer by an externally applied force.

BRIEF DESCRIPTION THE DRAWINGS

FIG. 30(a) is a sectional view of conditions where a magneto-optical disk is placed in an operable position in the fourth embodiment.

FIG. 30(b) is a sectional view of conditions where a CD is placed in an operable position in the fourth embodiment.

FIG. 31 is an enlarged view of a magneto-optical recording portion in the fourth embodiment.

FIG. 52 is a transversely sectional view of conditions where liner pin insertion is on in the seventh embodiment.

FIG. 53(a) is a transversely sectional view of conditions where liner pin insertion is off in the seventh embodiment.

FIG. 53(b) is a transversely sectional view of conditions where liner pin insertion is on in the seventh embodiment.

FIG. 55(a) is a transversely sectional view of conditions where magnetic head mounting is off in the seventh embodiment.

FIG. 55(b) is a transversely sectional view of conditions where magnetic head mounting is on in the seventh embodiment.

FIG. 57(a) is a transversely sectional view of conditions where liner pin insertion is off in the seventh embodiment.

FIG. 57(b) is a transversely sectional view of conditions where liner pin insertion is on in the seventh embodiment.

FIG. 69(a) is a transversely sectional view of a portion around a liner pin in the case where liner pin insertion is off in the eighth embodiment.

FIG. 69(b) is a transversely sectional view of a portion around a liner pin in the case where liner pin insertion is on in the eighth embodiment.

FIG. 77 is a transversely sectional view of a portion around a liner pin in the case where liner pin insertion is on in the ninth embodiment.

FIG. 78(a) is a transversely sectional view of a portion around a liner pin in the case where liner pin insertion is off in the ninth embodiment.

FIG. 78(b) is a transversely sectional view of a portion around a liner pin in the case where liner pin insertion is on in the ninth embodiment.

FIG. 84(a) is a side view of a slider in the case of an ON state in the tenth embodiment.

FIG. 84(b) is a side view of a slider in the case of an OFF state in the tenth embodiment.

FIG. 85(a) is a side view of a slider portion in the case where magnetic recording is OFF in the tenth embodiment.

FIG. 85(b) is a side view of a slider portion in the case where magnetic recording is ON in the tenth embodiment.

FIG. 86 is an illustration of the correspondence relation between an address and a position on a disk in the tenth embodiment.

FIG. 102 is a perspective view of a recording medium in the twelfth embodiment.

FIGS. 103(a)–103(f) are a transversely sectional view of a recording medium which occurs at film formating and printing steps in the twelfth embodiment.

FIGS. 104(a)–104(f) are a transversely sectional view of a recording medium which occurs at film formating and printing steps in the twelfth embodiment.

Figure 105:
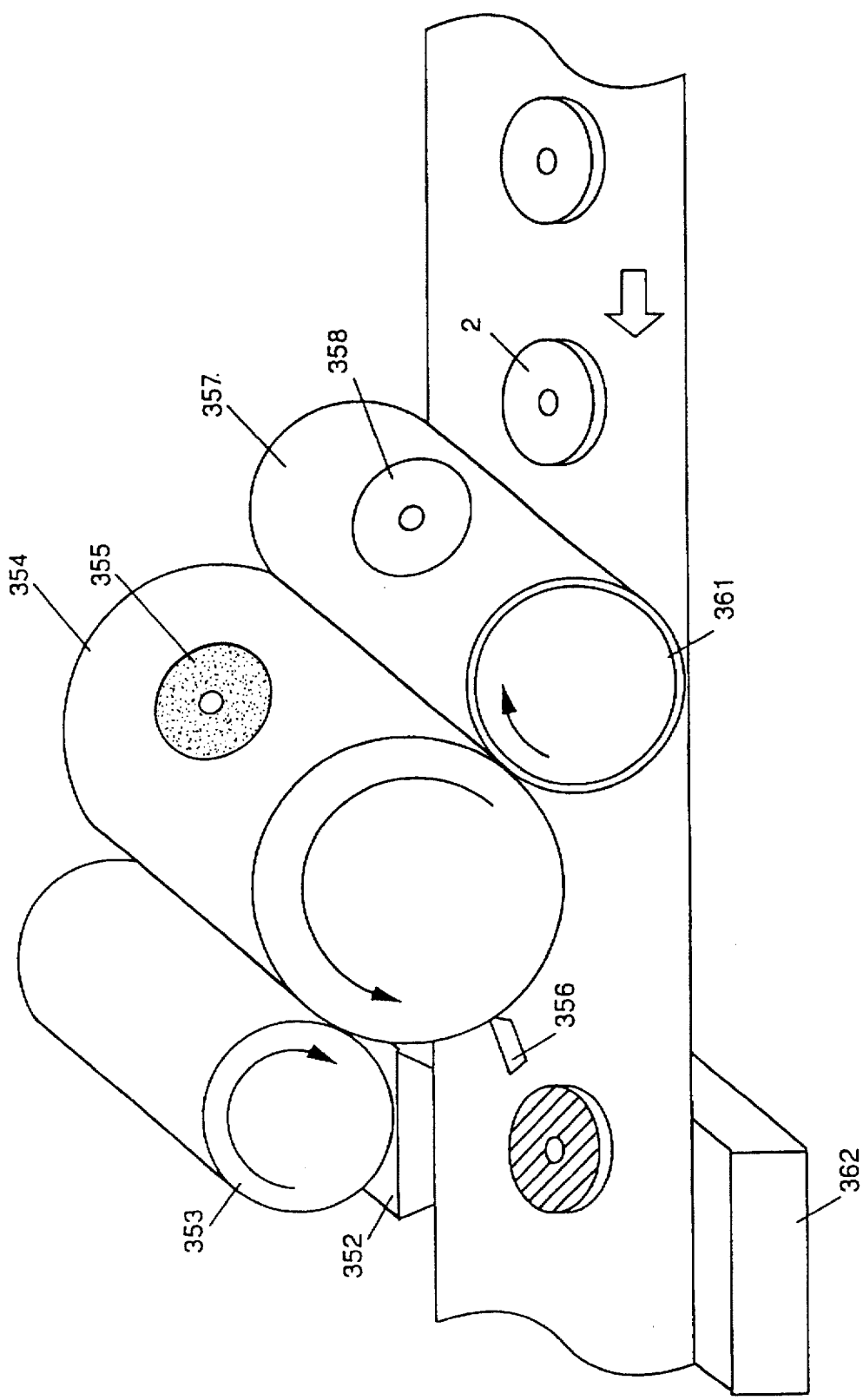

FIG. 105 is a perspective view of a manufacturing system in a state corresponding to an application step in the twelfth embodiment.

Figure 106:
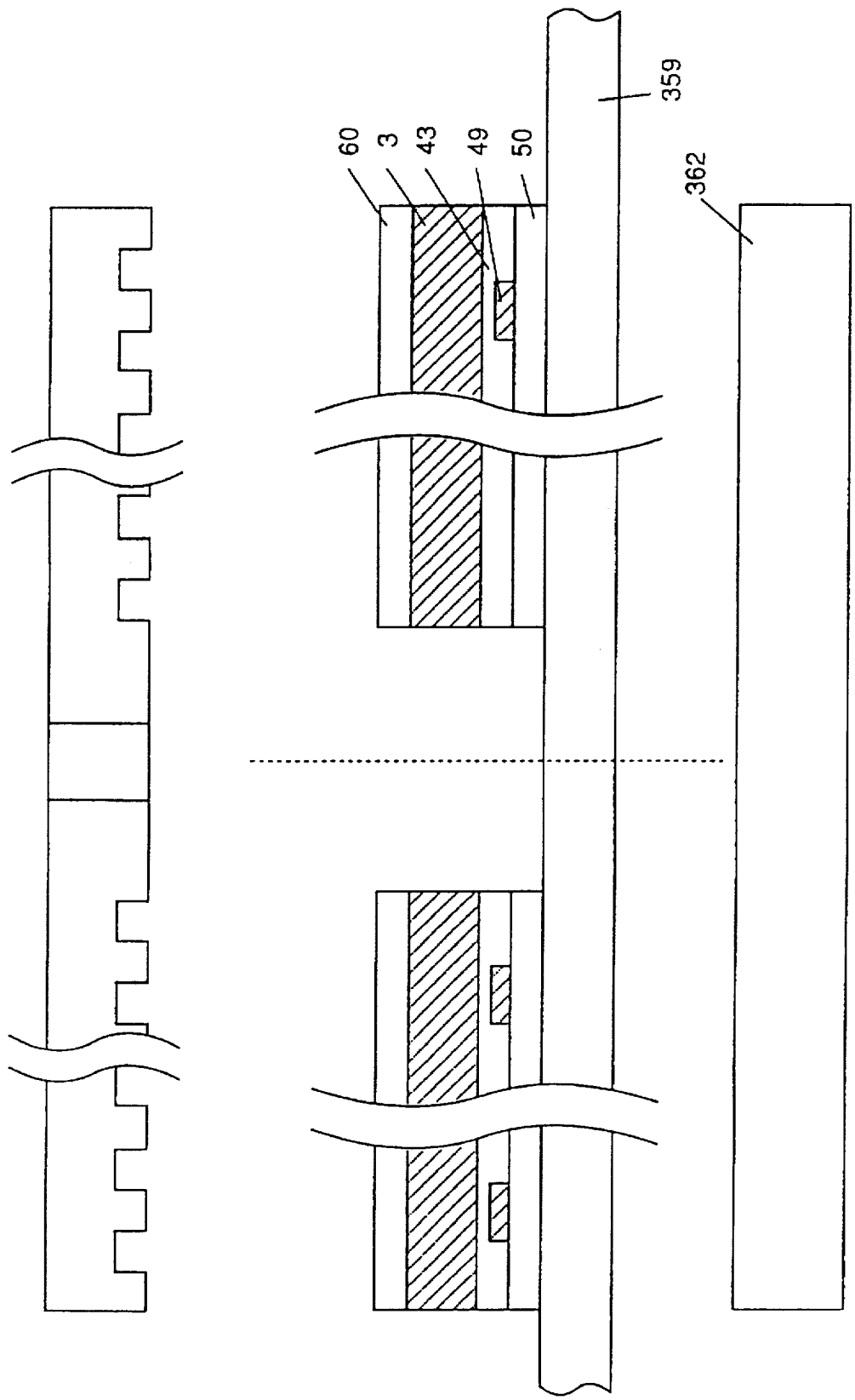
Figure 107A:
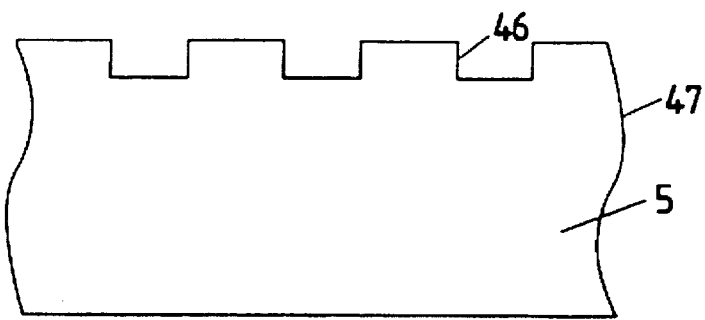
Figure 107B:
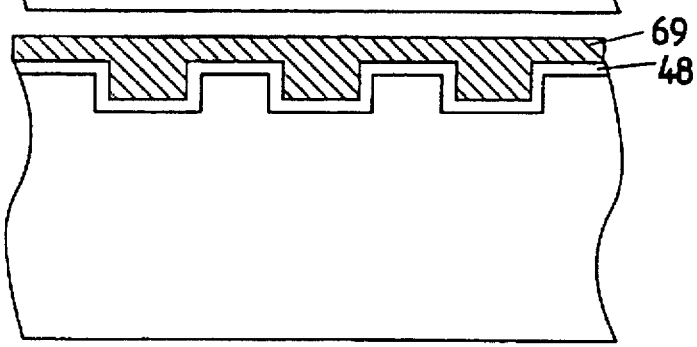
Figure 107C:
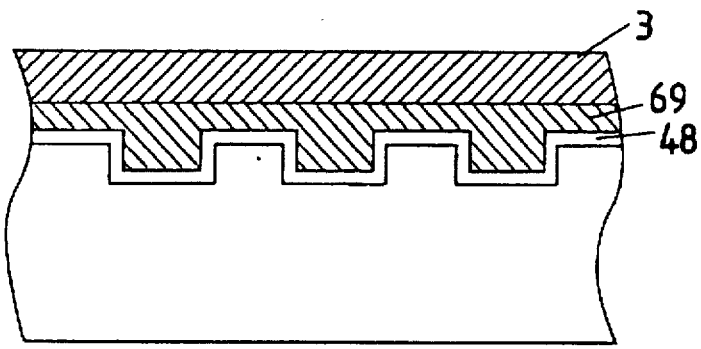
Figure 107D:
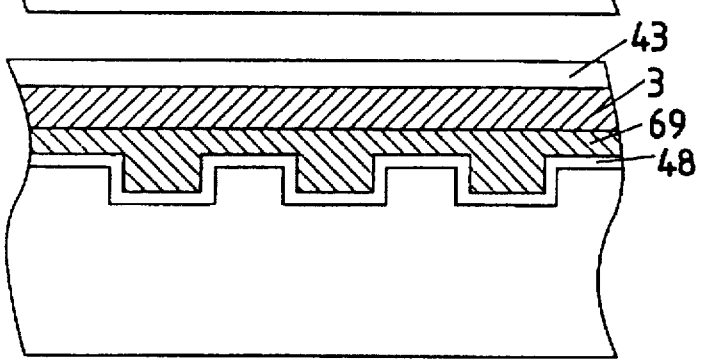
Figure 107E:
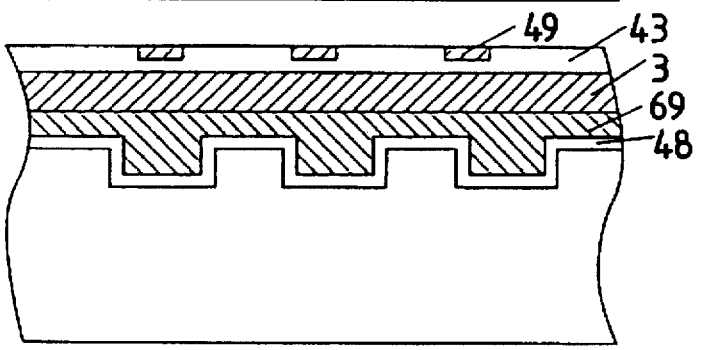

FIG. 106 is a transversely sectional view of a recording medium at application and transfer steps in the twelfth embodiment.

FIGS. 107(a)–107(e) are an illustration of steps of manufacturing a recording medium in the twelfth embodiment.

FIG. 108 is a transversely sectional view of a recording medium at application and transfer steps in the twelfth embodiment.

Figure 109:
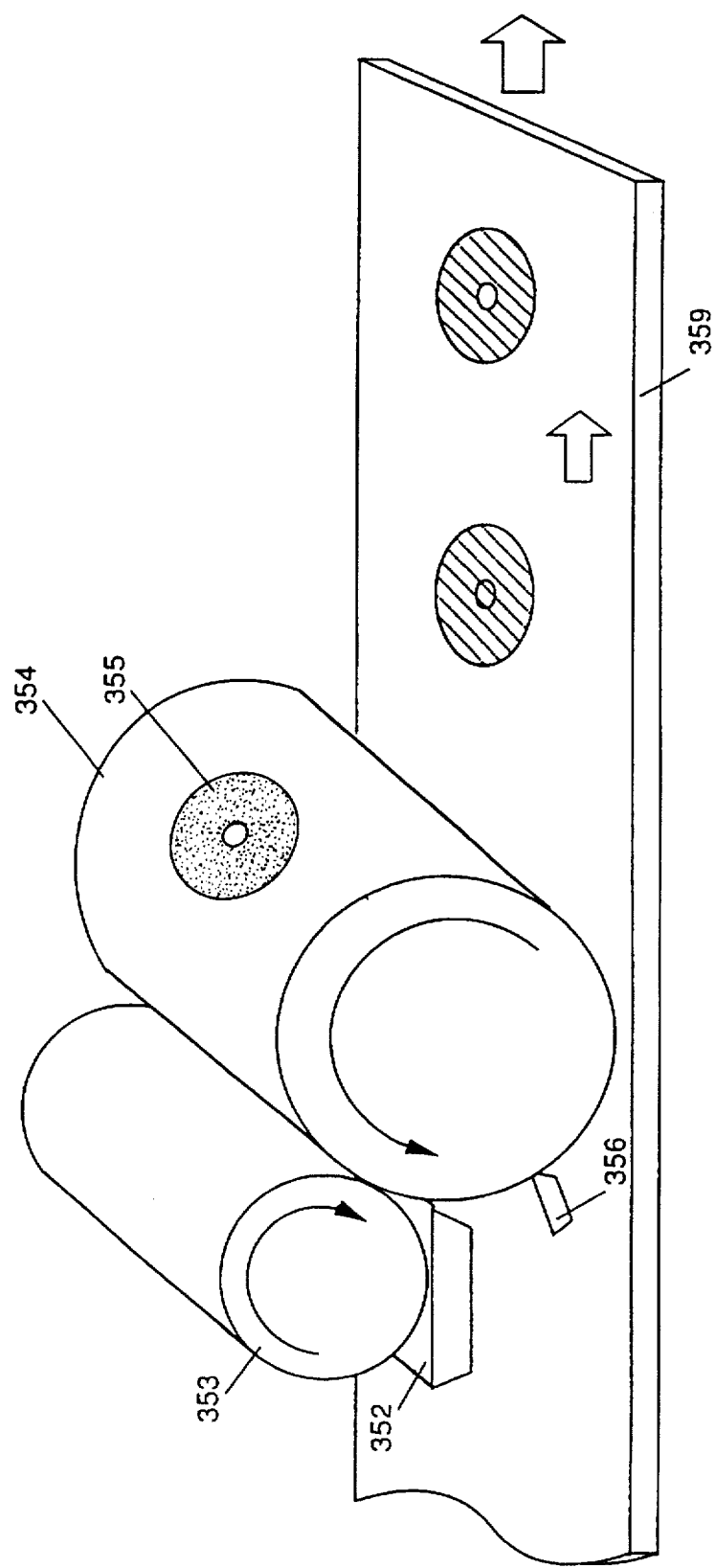

FIG. 109 is a perspective view of a manufacturing system in a state corresponding to an application step in the twelfth embodiment.

Figure 110:
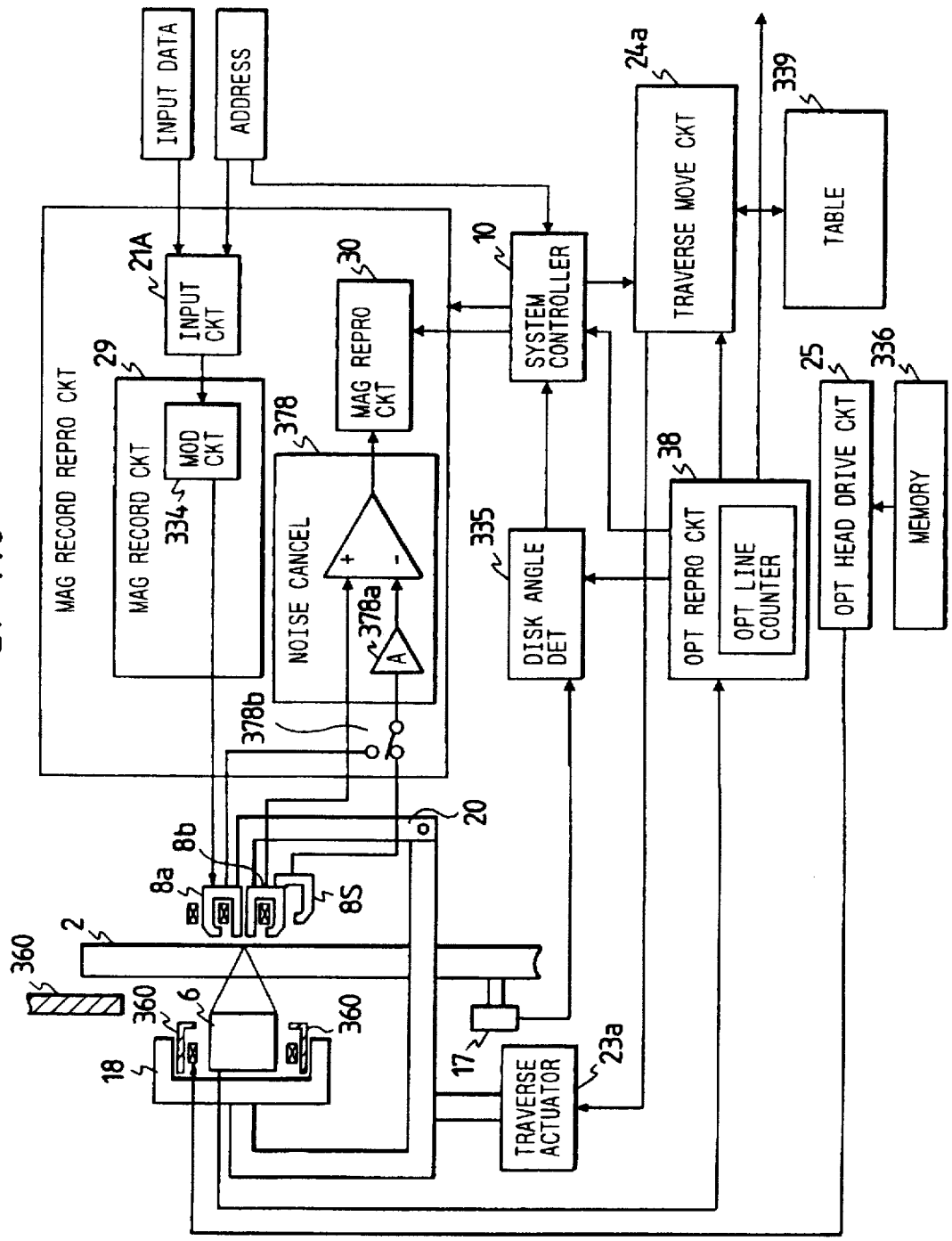

FIG. 110 is a block diagram of a recording and reproducing apparatus according to a thirteenth embodiment of this invention.

FIGS. 111(a)–111(c) are a transversely sectional view of a portion around a magnetic head in the thirteenth embodiment.

Figure 112:
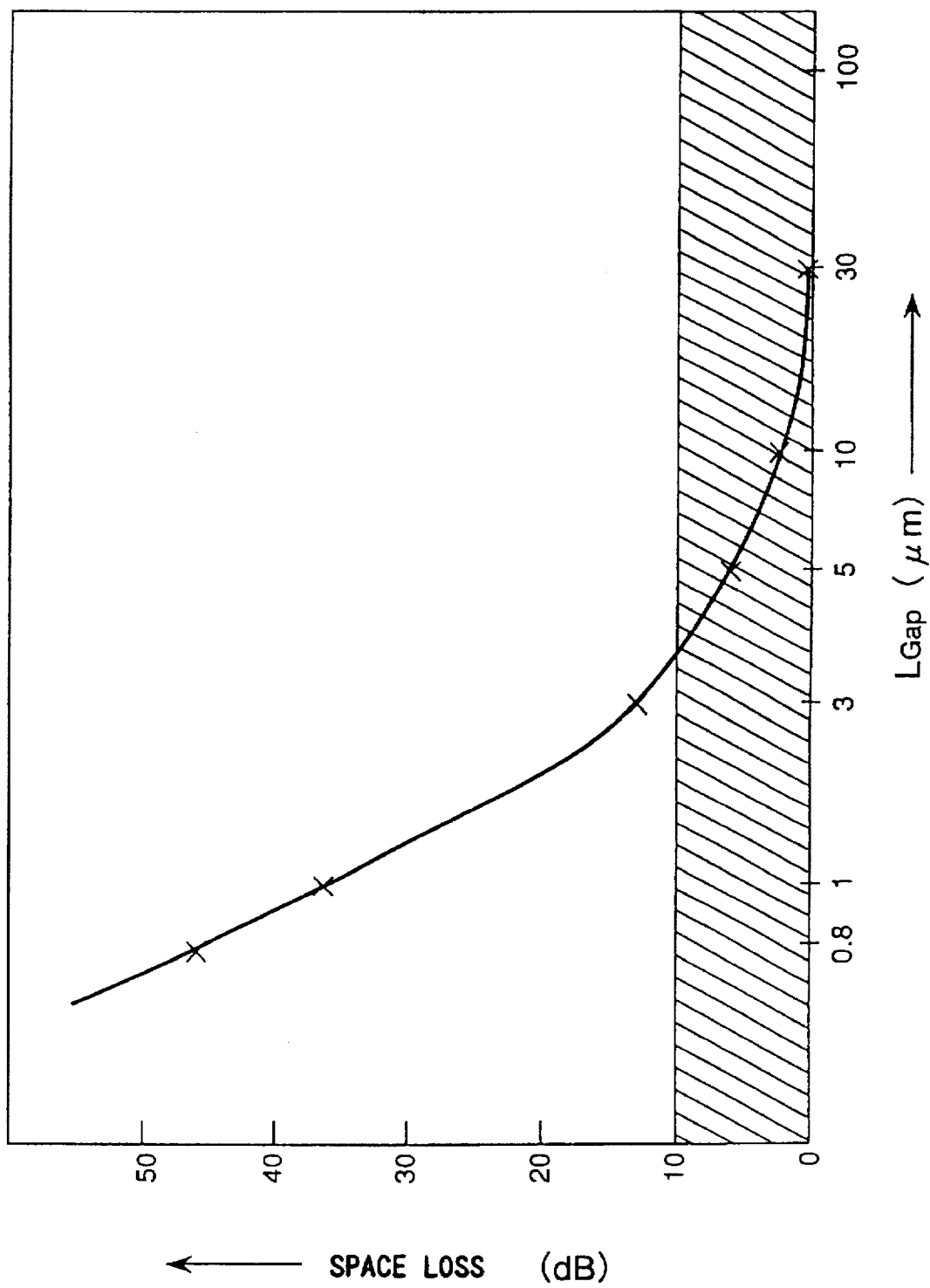

FIG. 112 is an illustration of the relation between a head gap length and an attenuation amount (dB) in the thirteenth embodiment.

Figure 113:
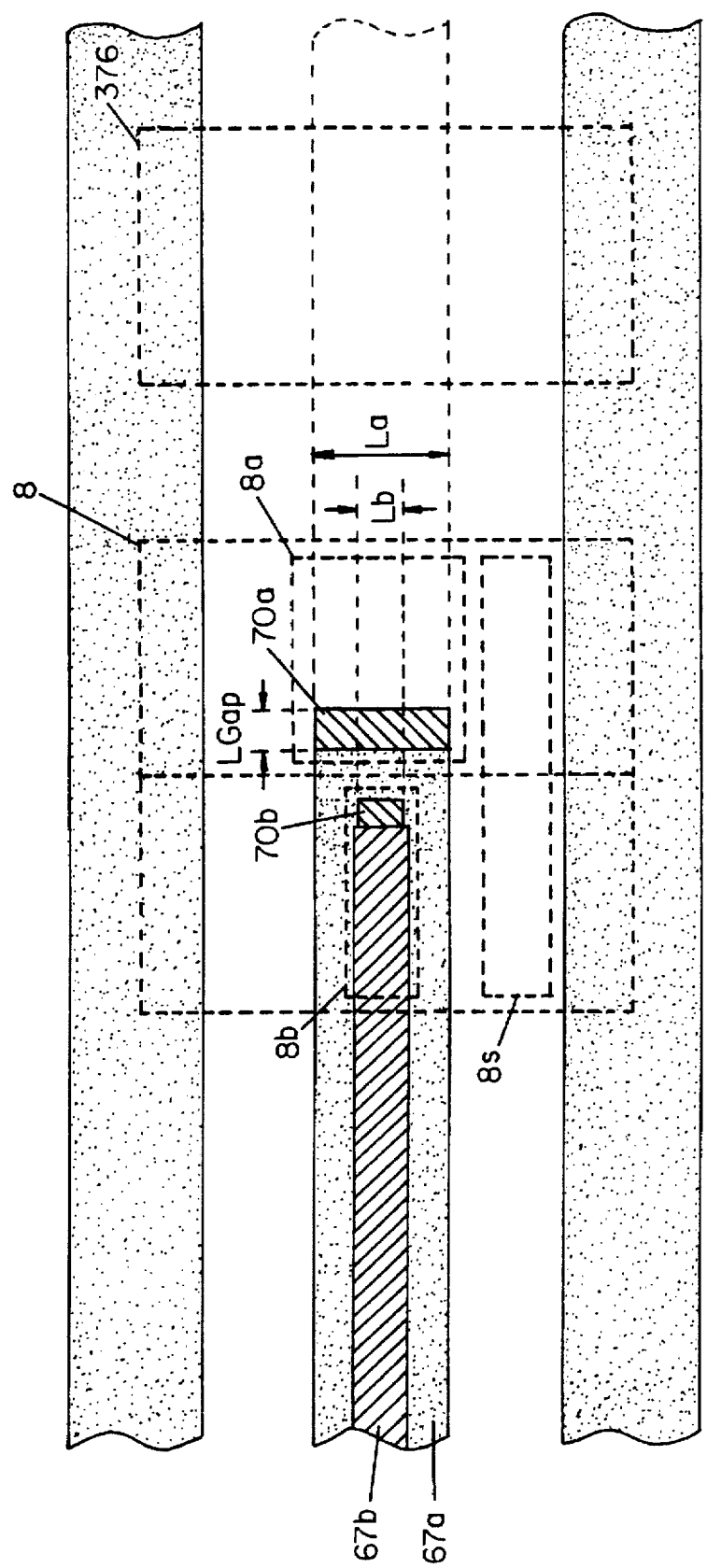

FIG. 113 is a top view of a magnetic track in the thirteenth embodiment.

Figure 114:
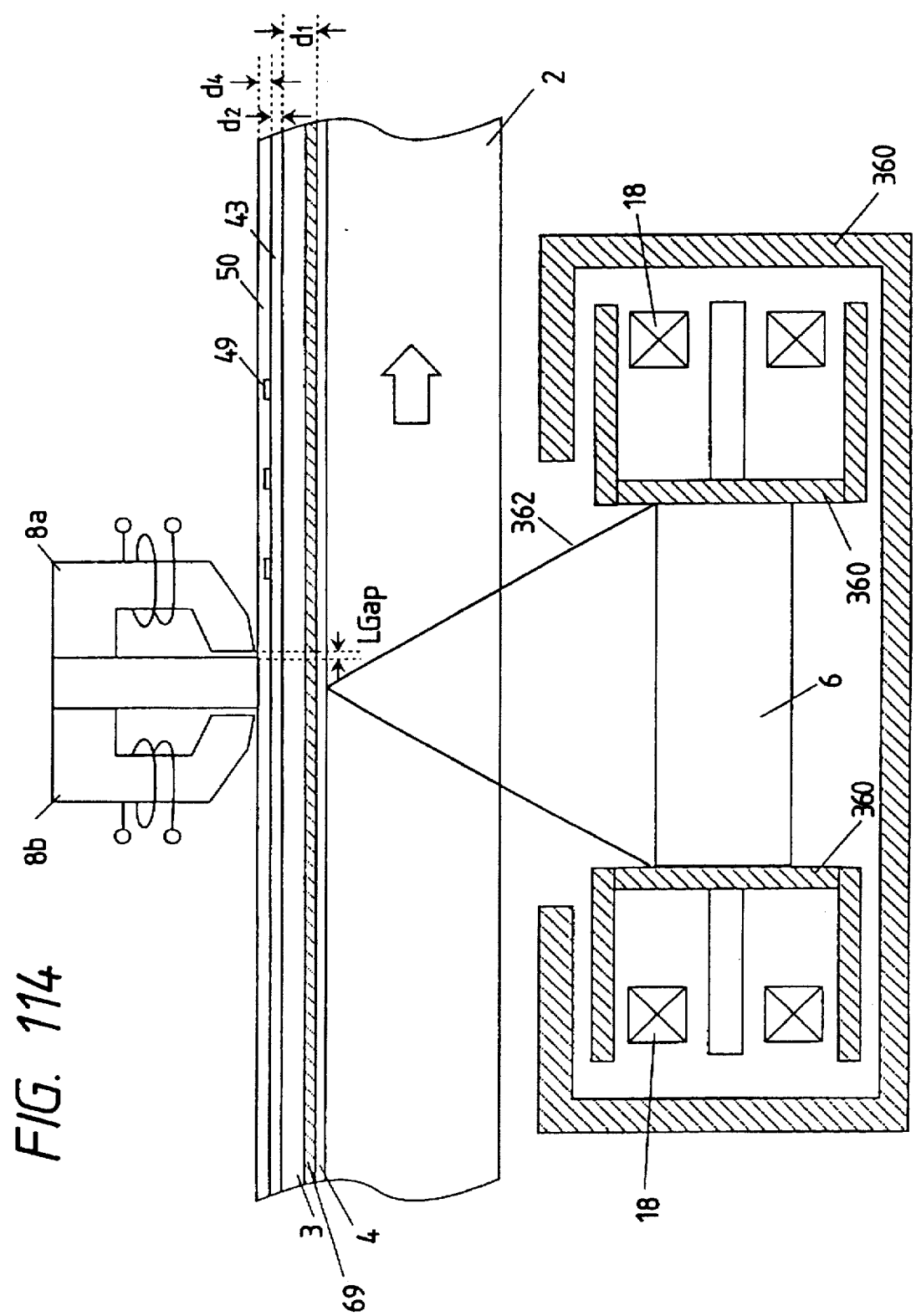

FIG. 114 is a transversely sectional view of a portion around a magnetic head in the thirteenth embodiment.

Figure 115A:
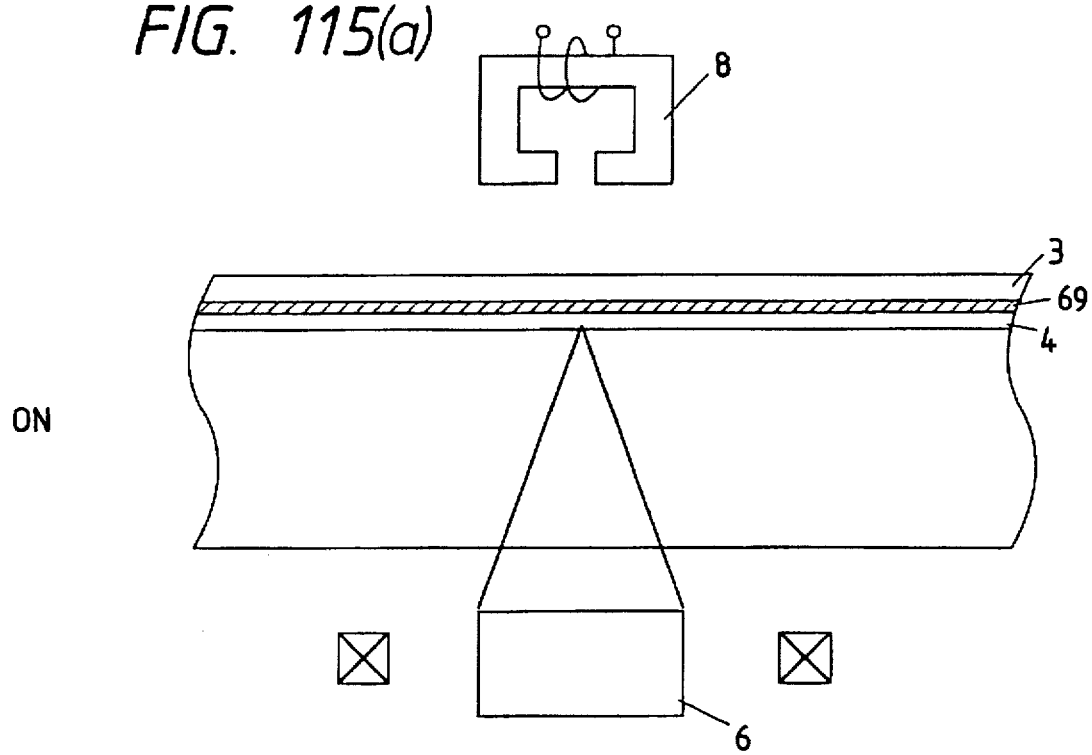
Figure 115B:
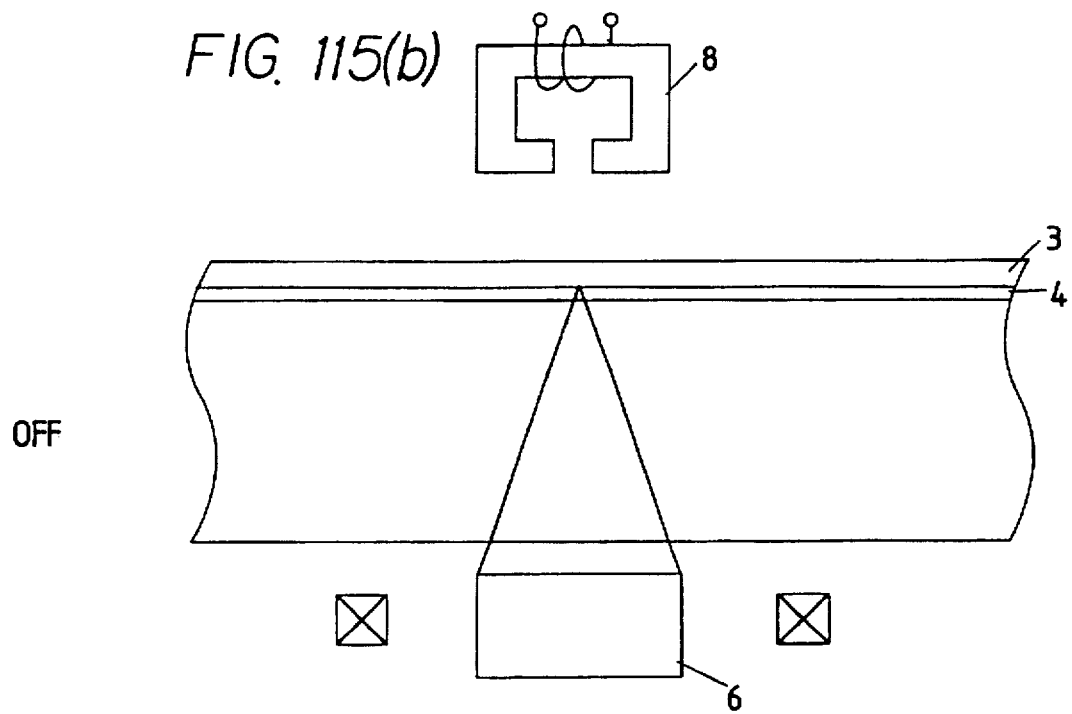

FIGS. 115(a) and 115(b) are a transversely sectional view of conditions where a recording medium is placed in an operable position.

Figure 116:
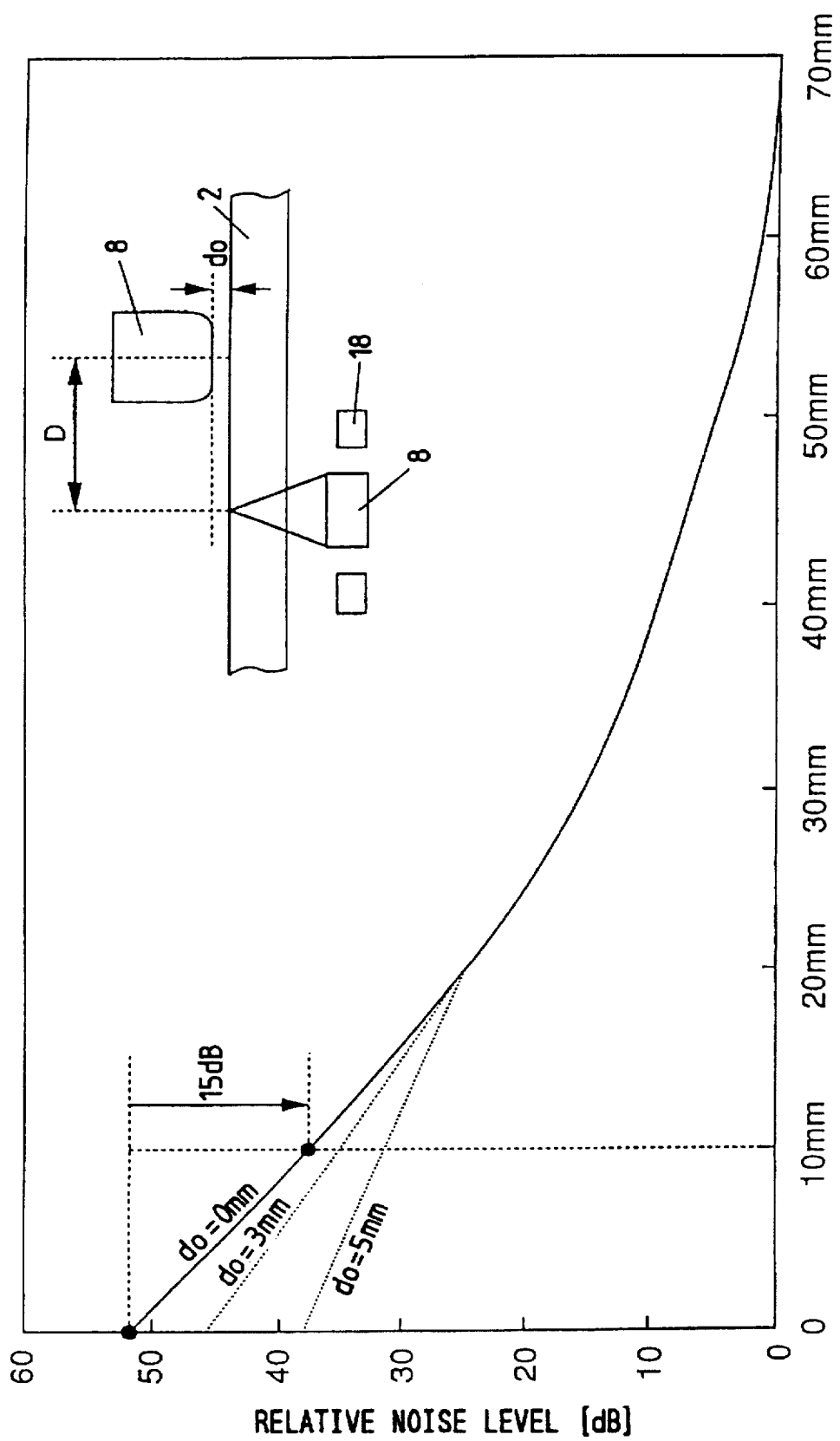

FIG. 116 is an illustration of the relation between a relative noise amount and a distance between an optical head and a magnetic head in the twelfth and thirteenth embodiments.

Figure 117:
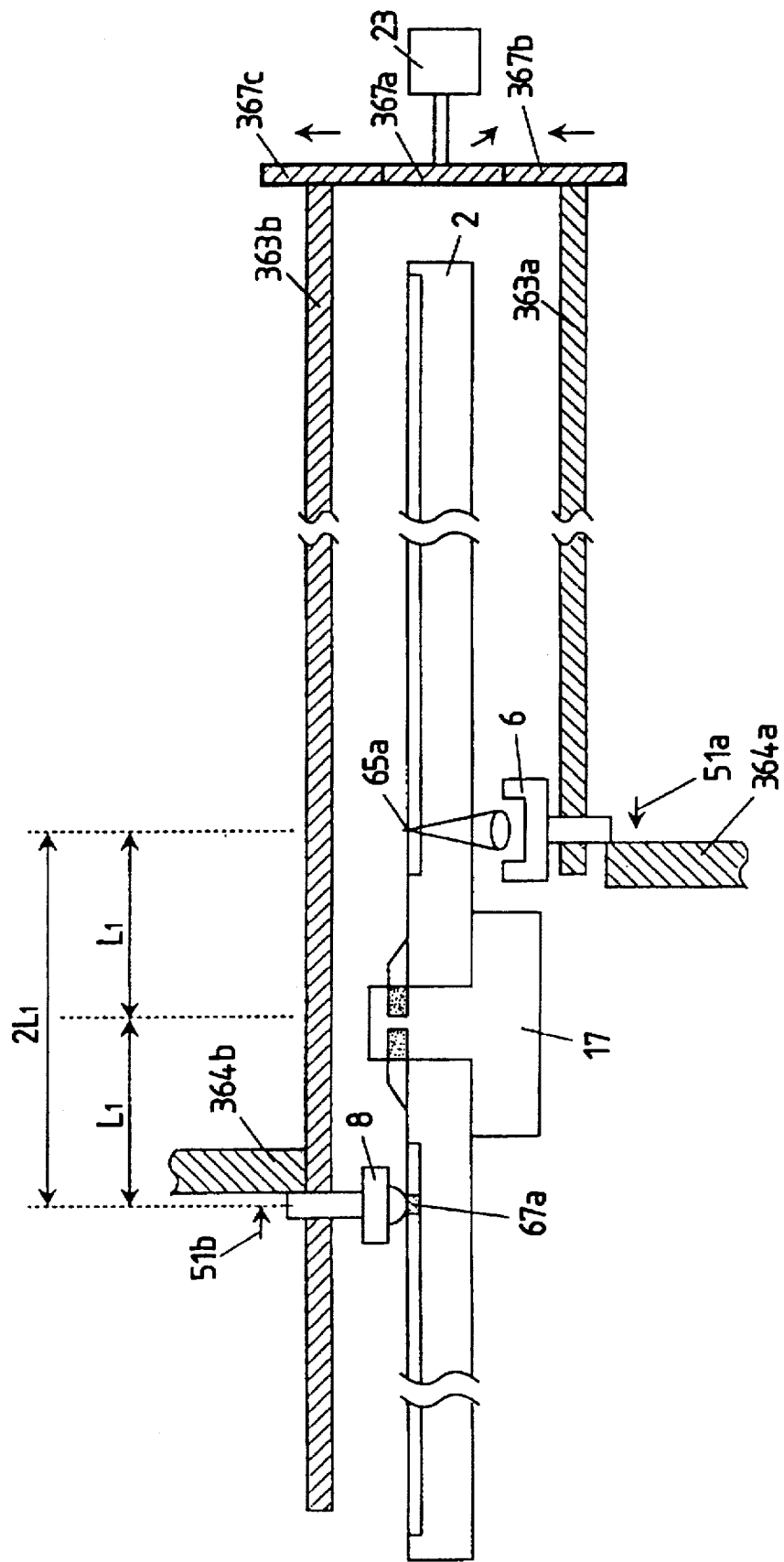

FIG. 117 is a transverse sectional view of a head traverse portion in the thirteenth embodiment.

Figure 118:
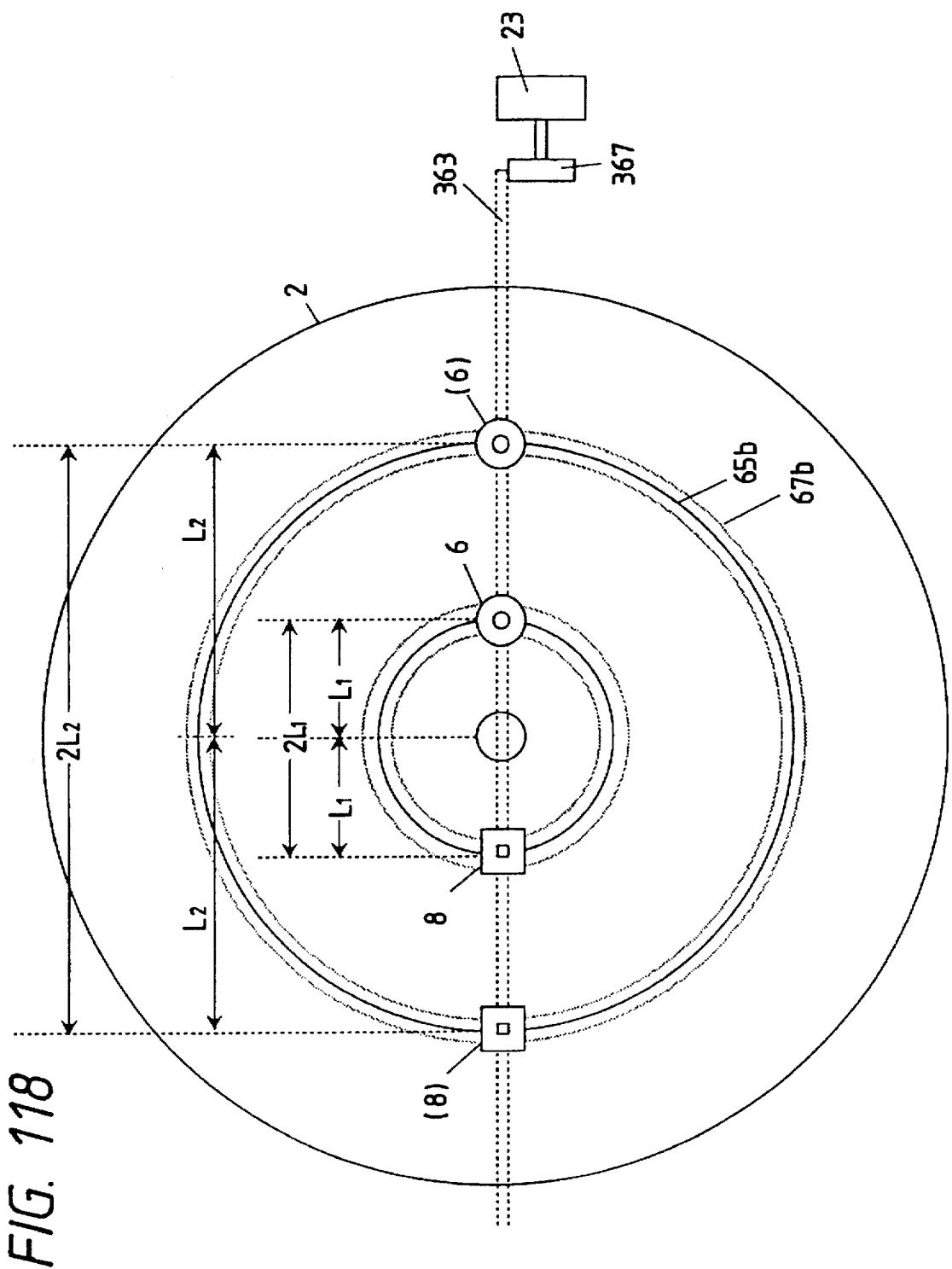

FIG. 118 is a top view of a head traverse portion in the thirteenth embodiment.

Figure 119:
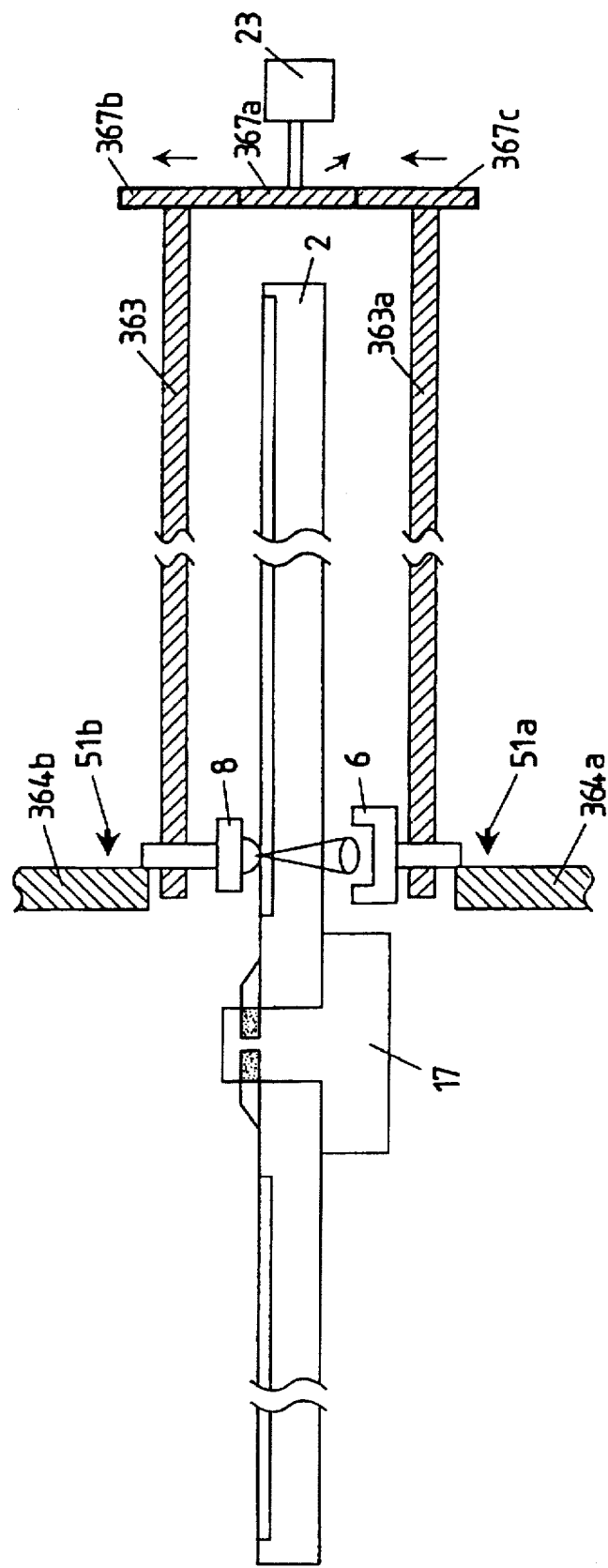

FIG. 119 is a transversely sectional view of another head traverse portion in the thirteenth embodiment.

Figure 120:
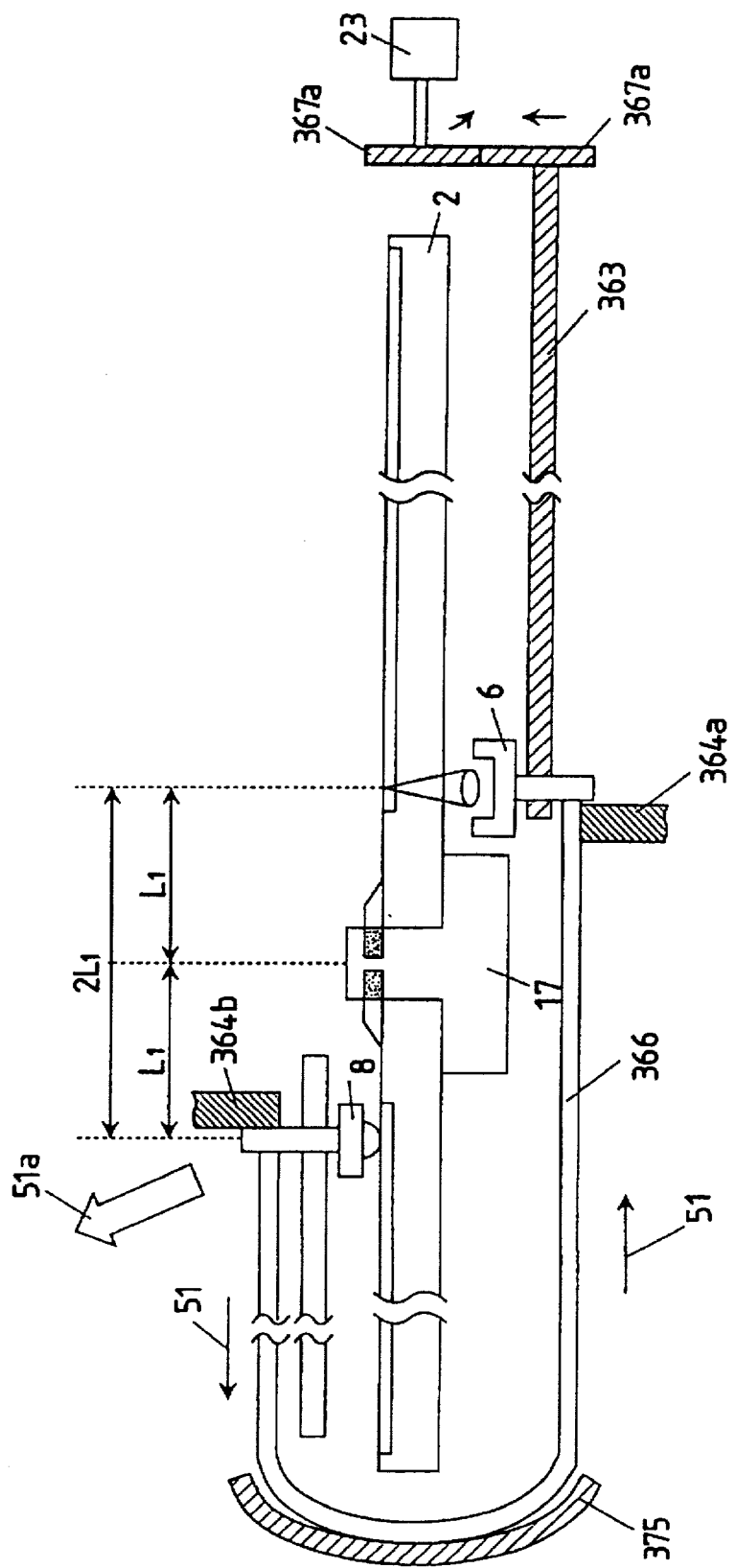

FIG. 120 is a transversely sectional view of another head traverse portion in the thirteenth embodiment.

Figure 121:
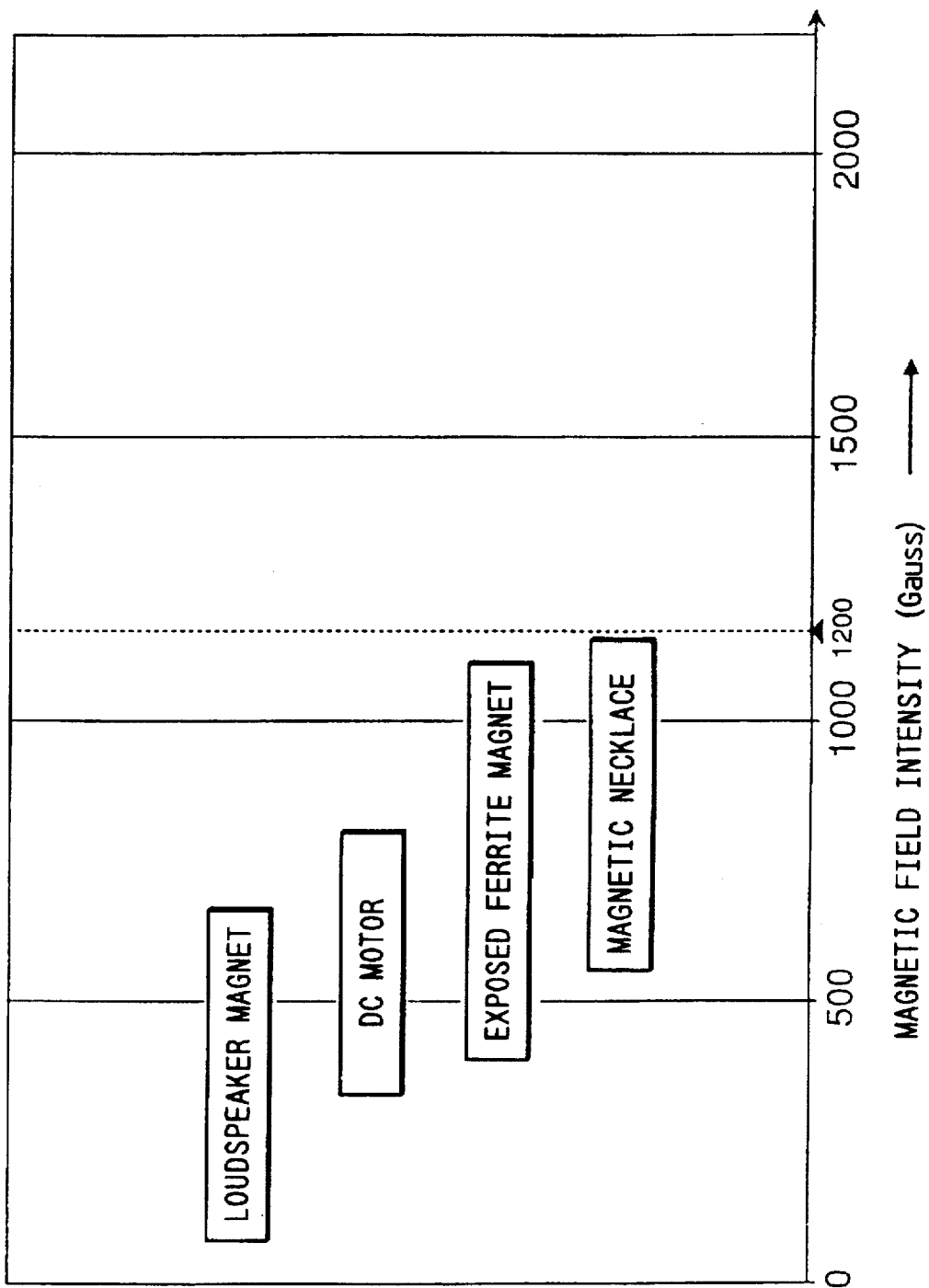

FIG. 121 is an illustration of the intensities of magnetic fields generated by various home-use appliances.

Figure 122:
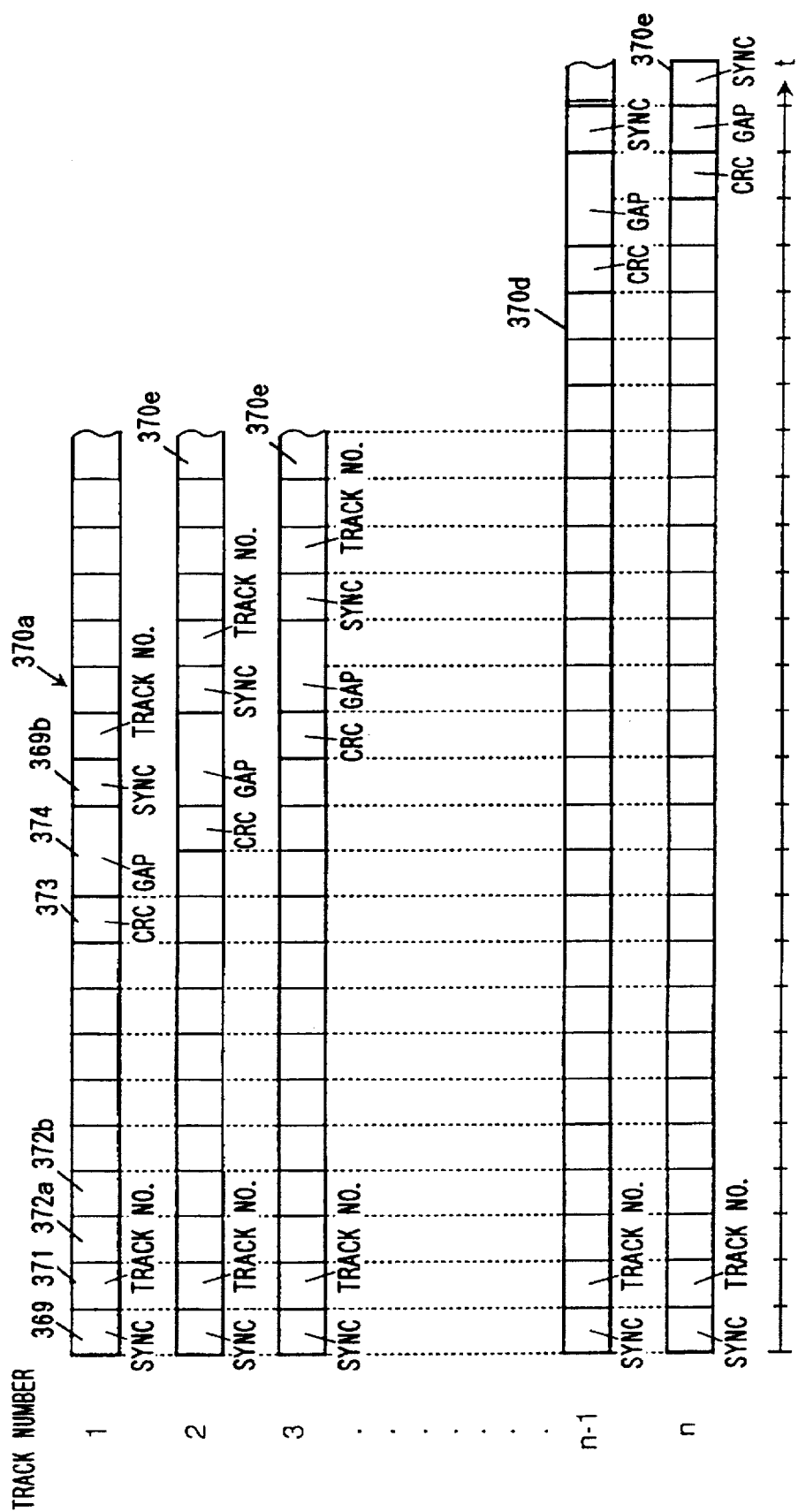

FIG. 122 is an illustration of a recording format on a recording medium in the thirteenth embodiment.

Figure 123:
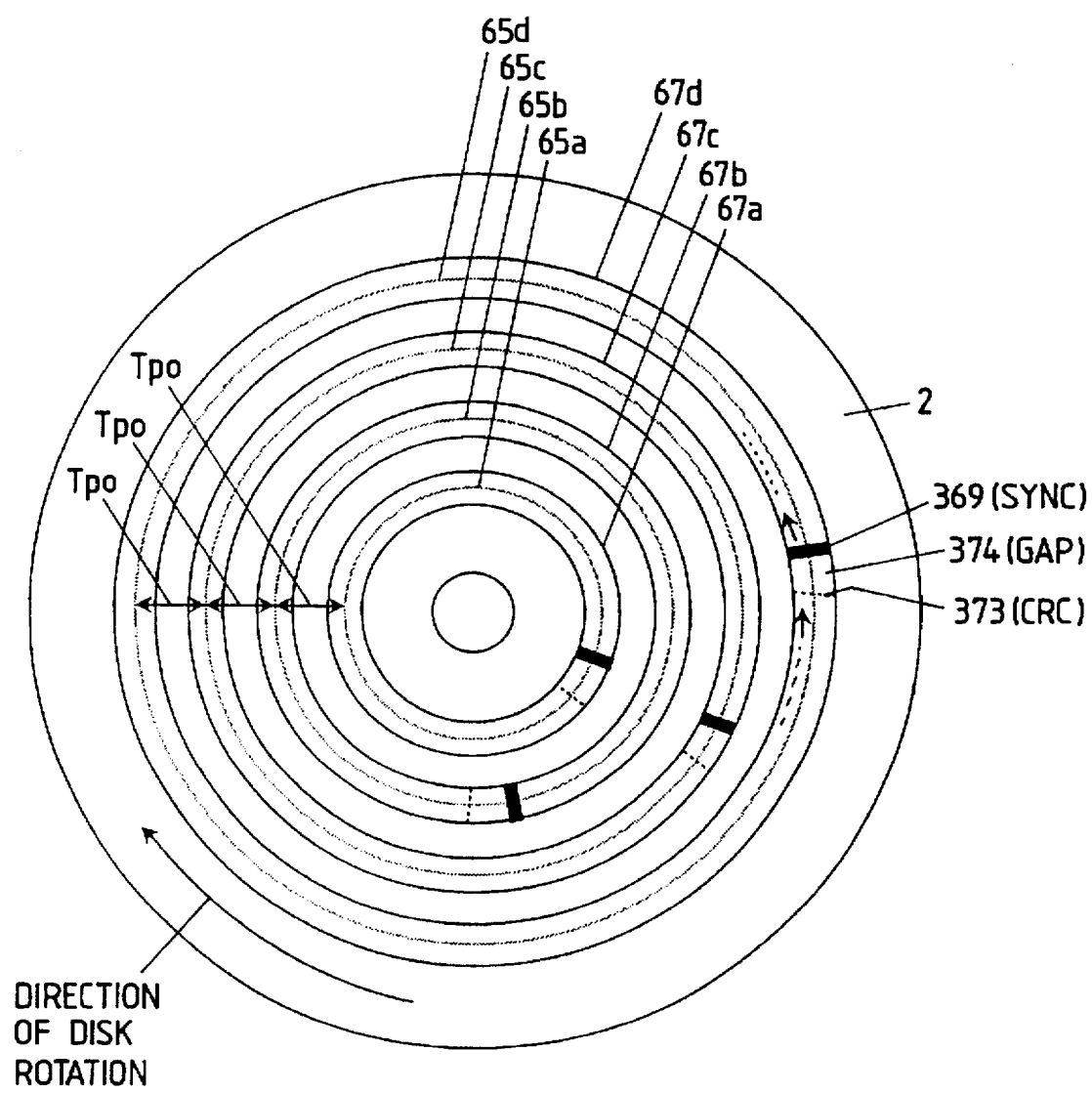

FIG. 123 is an illustration of a recording format on a recording medium in a normal mode in the thirteenth embodiment.

Figure 124:
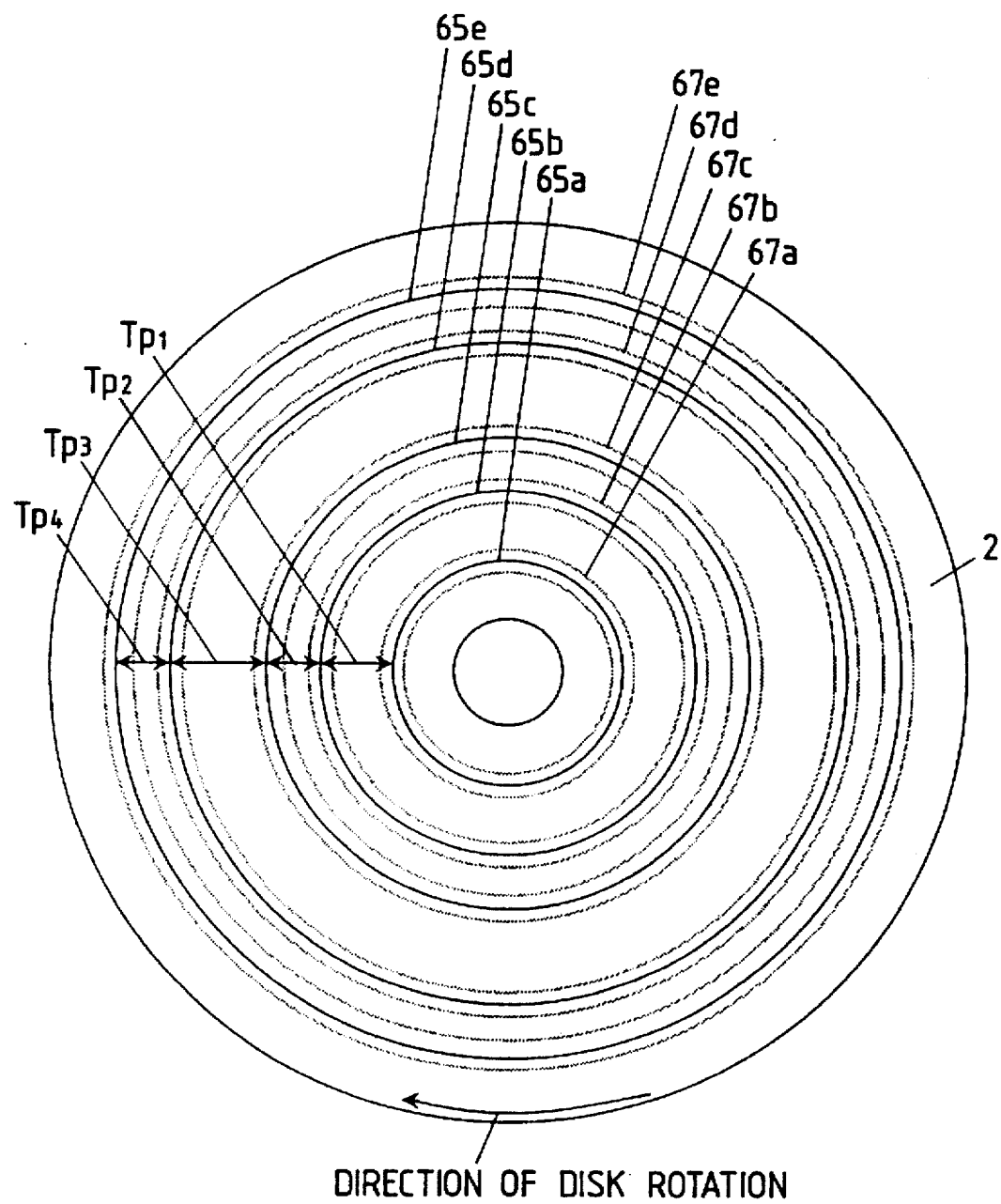

FIG. 124 is an illustration of a recording format on a recording medium in a variable track pitch mode in the thirteenth embodiment.

Figure 125:
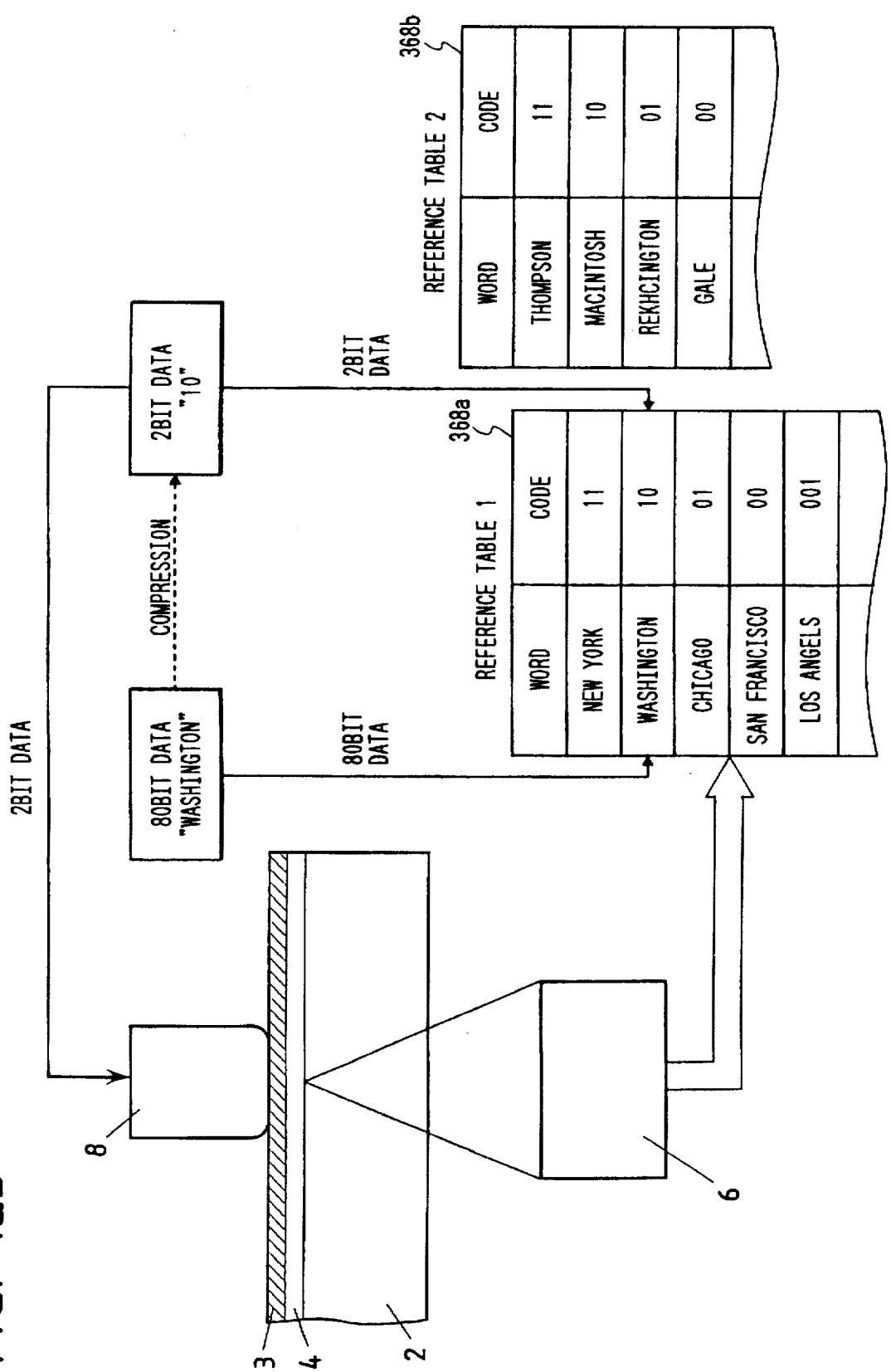

FIG. 125 is an illustration of compressing magnetic recorded information by using a reference table of optical recorded information in the thirteenth embodiment.

Figure 126:
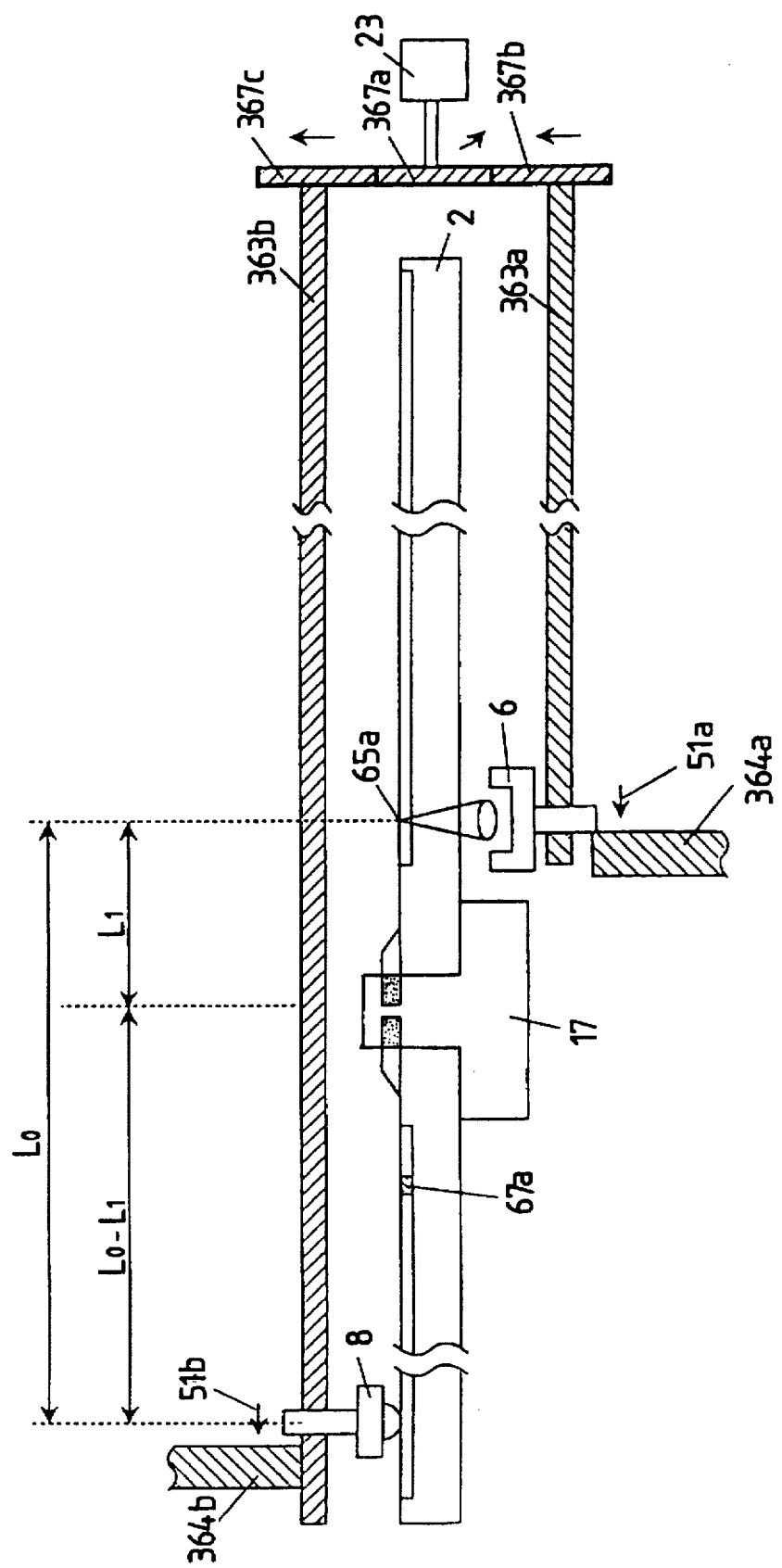

FIG. 126 is a transversely sectional view of a head traverse portion in the thirteenth embodiment.

Figure 127:
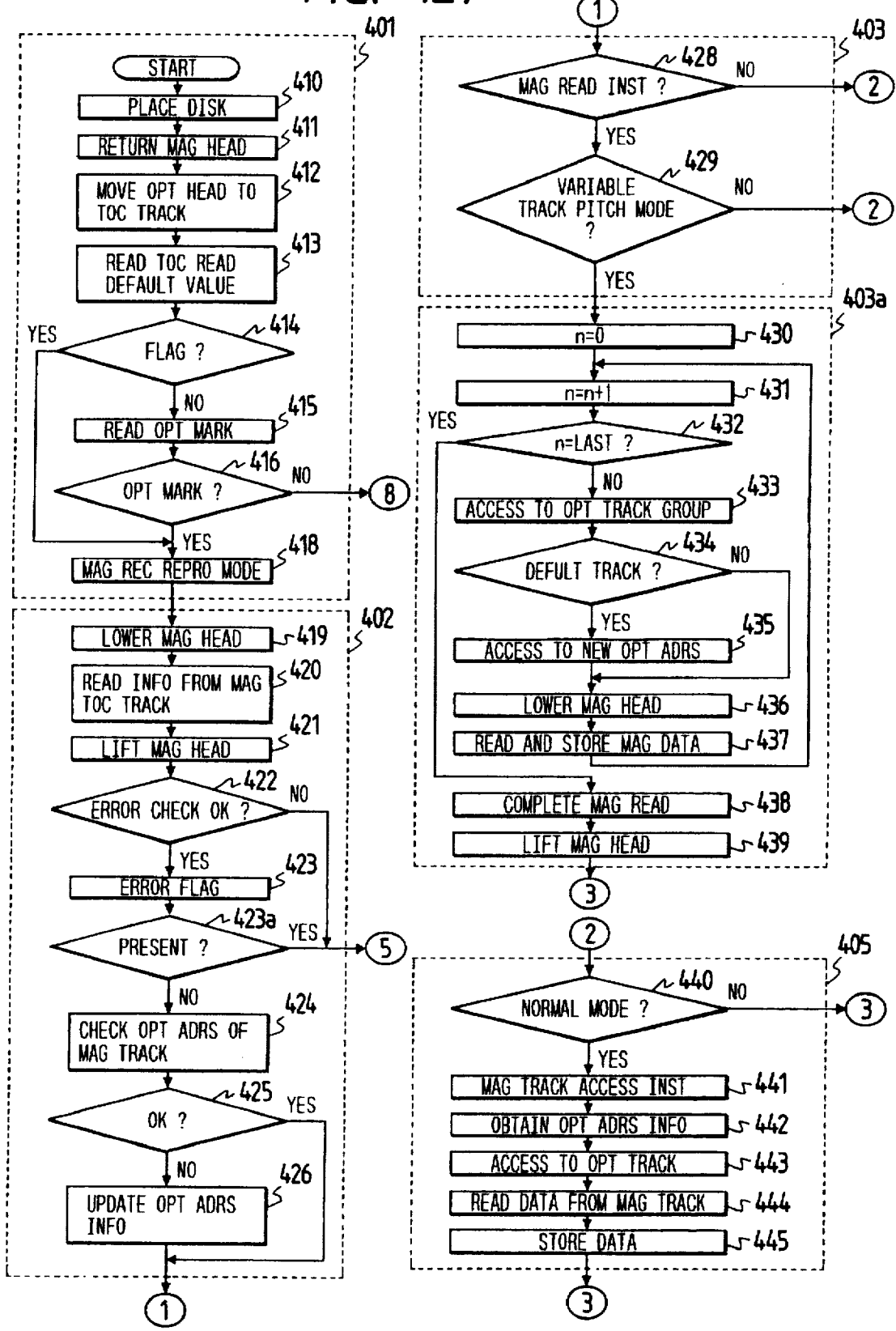

FIG. 127 is a flowchart of a recording and reproducing program in the thirteenth embodiment.

Figure 128:
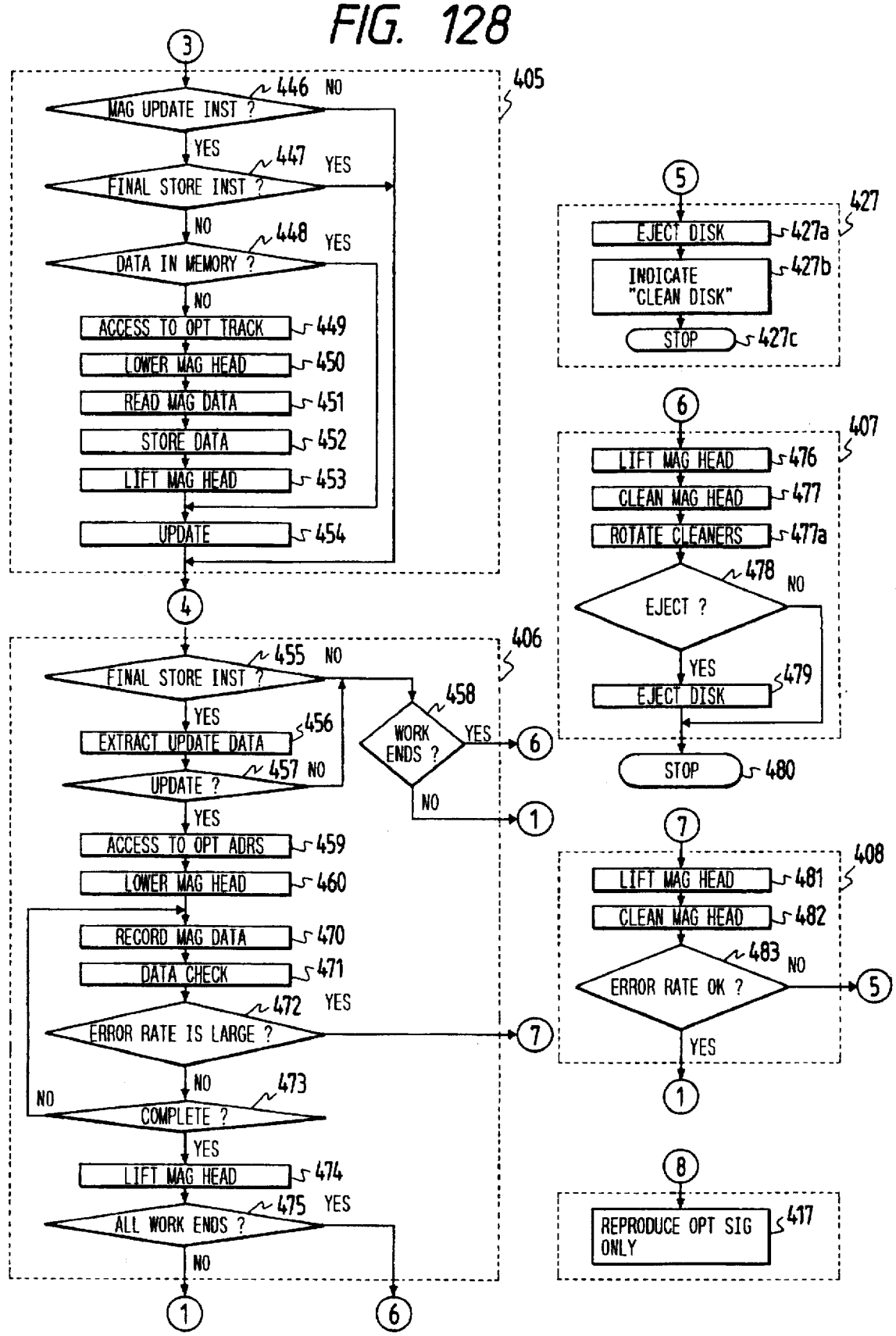

FIG. 128 is a flowchart of a recording and reproducing program in the thirteenth embodiment.

Figure 129A:
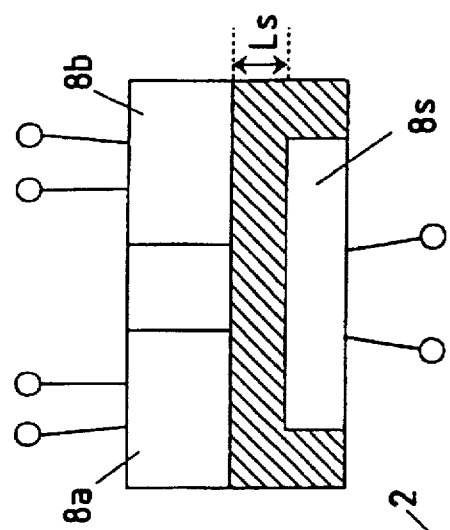
Figure 129B:
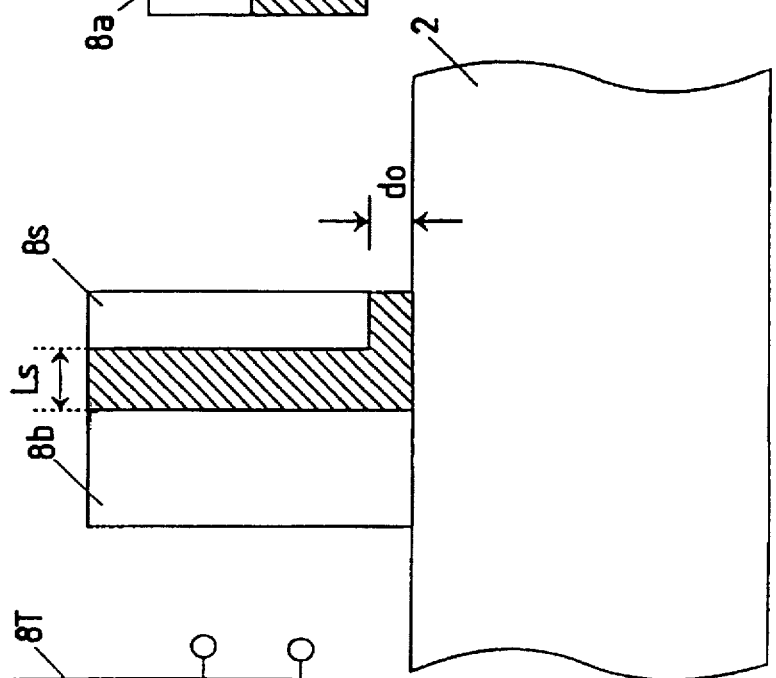
Figure 129C:
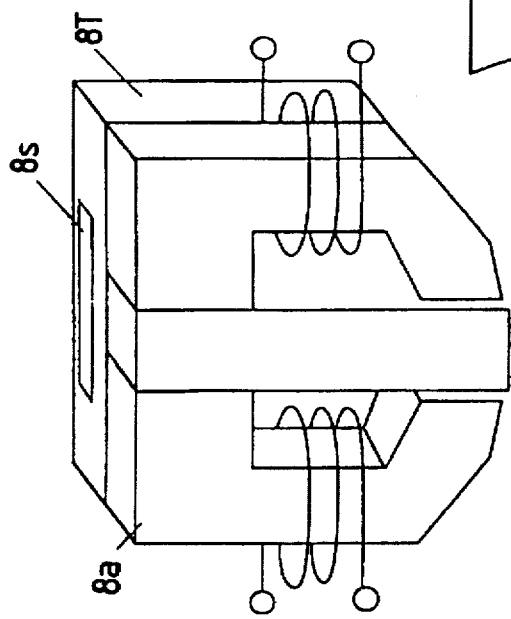

FIGS. 129(a)-129(c) are illustration of a noise detecting head in the thirteenth embodiment.

DESCRIPTION OF THE FIRST PREFERRED EMBODIMENT

Figure 1:
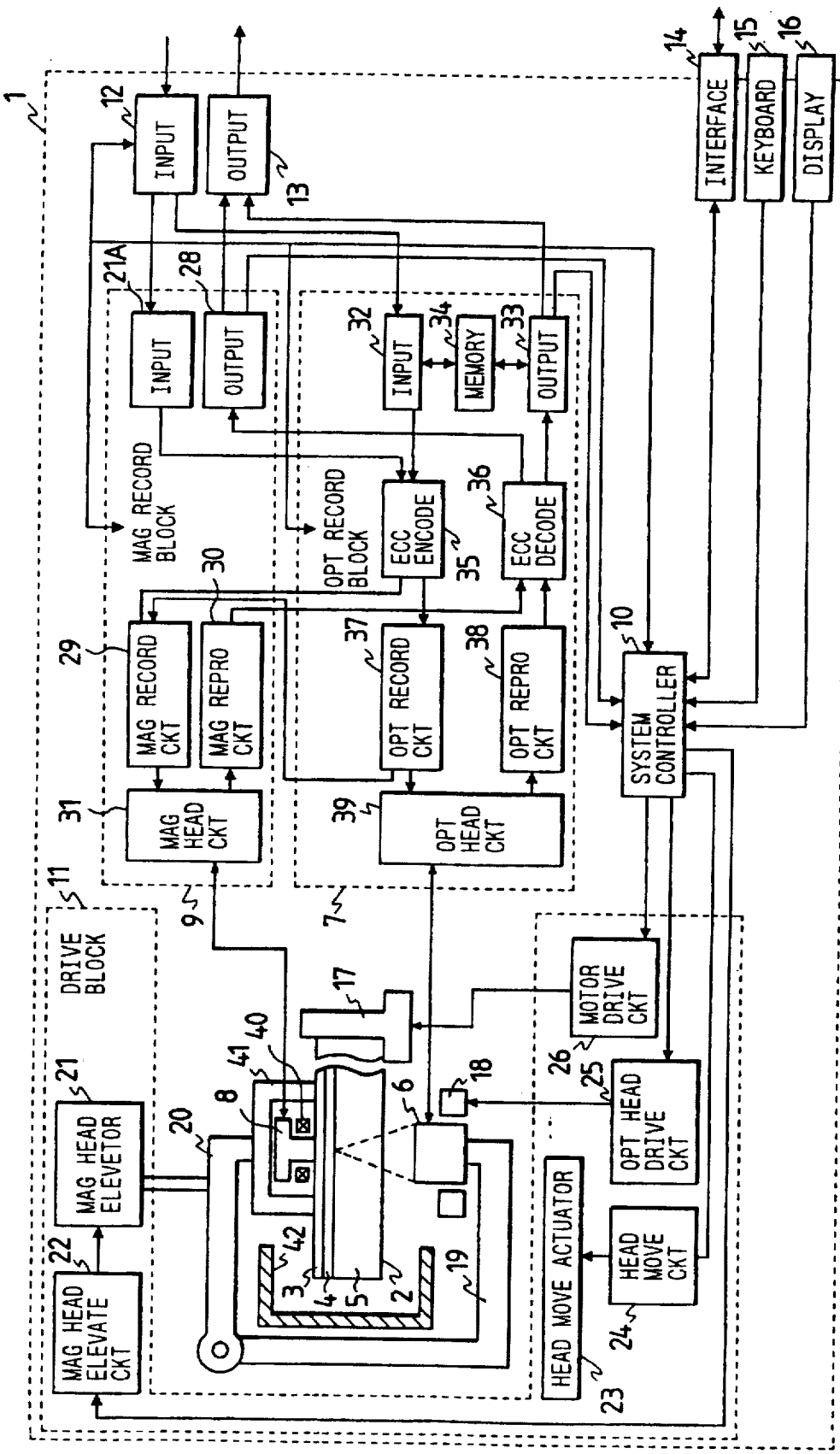
FIG. 1 is a block diagram of a recording and reproducing apparatus according to a first embodiment of this invention.

With reference to FIG. 1, a recording and reproducing apparatus 1 contains a recording medium 2 which includes a laminated structure of a magnetic recording layer 3, an optical recording layer 4, and a transparent layer 5.

During the magneto-optical reproduction, light emitted from a light emitting section is focused on the optical recording layer 4 by an optical head 6 and an optical recording block 7, and a magneto-optically recorded signal is reproduced from the recording medium 2.

During the magneto-optical recording, laser light is focused on a given region of the optical recording layer 4 by the optical head 6 and the optical recording block 7 so that a temperature at the given region increases to or above a Curie temperature of the optical recording layer 4. Under these conditions, a magnetic field applied to the given region of the optical recording layer 4 is modulated by a magnetic head 8 and a magnetic recording block 9 in response to information to be recorded, so that recording of the information on the optical recording layer 4 is done.

During the magnetic recording, the magnetic head 8 and the magnetic recording block 9 are used in recording information on the magnetic recording layer 3.

A system controller 10 receives operating information and output information from various circuits, and drives a drive block 11 and executes control of a motor 17 and tracking and focusing control with respect to the optical head 6. The system controller 10 includes a microcomputer or a similar device having a combination of a CPU, a ROM, a RAM, and an I/O port. The system controller 10 operates in accordance with a program stored in the ROM.

Figure 2:
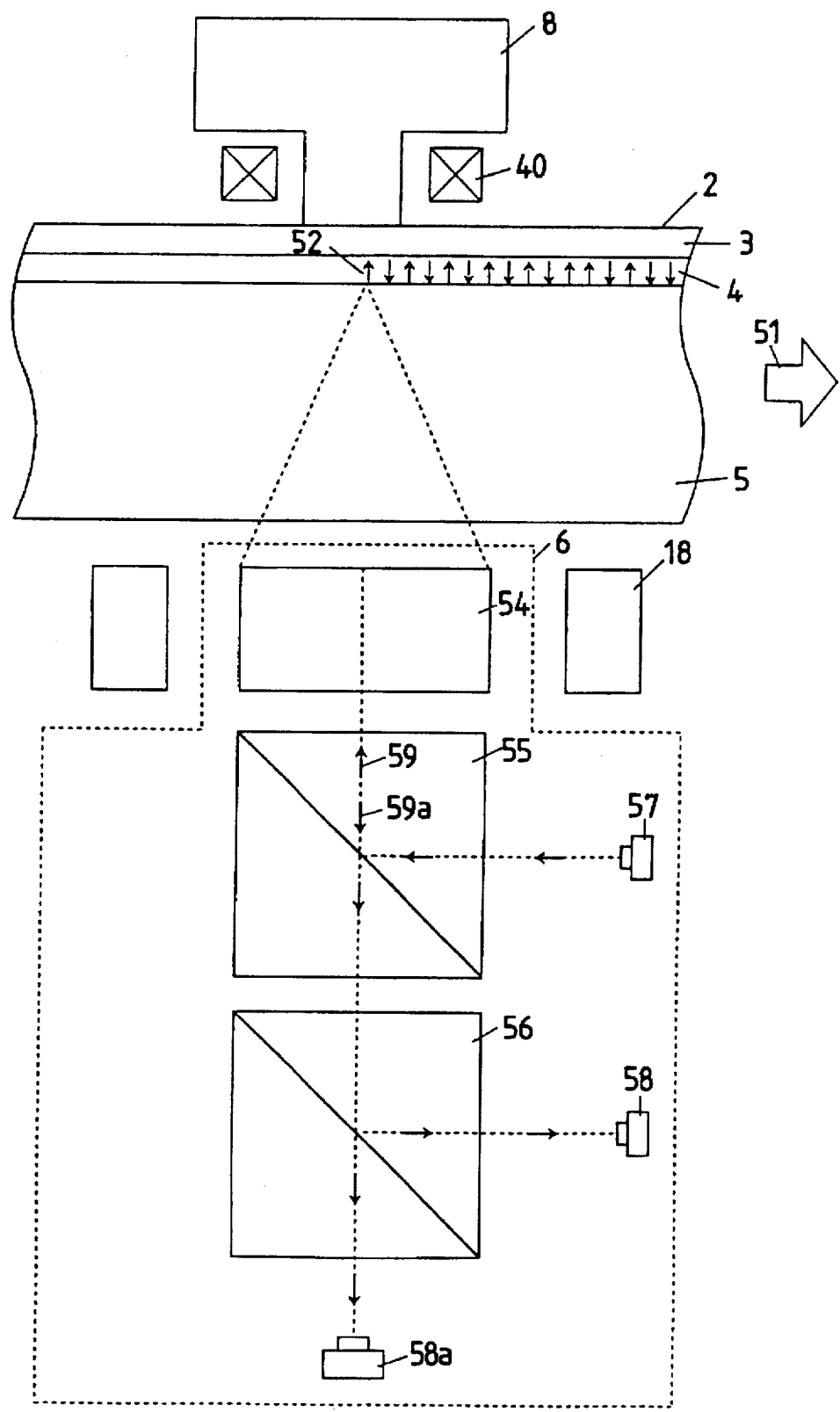
FIG. 2 is an enlarged view of an optical recording head portion in the first embodiment.

In the case where an input signal fed from an exterior is required to be recorded, a recording instruction is fed to the system controller 10 from an interface 14 or a keyboard 15 in response to the reception of the input signal or the operation of the keyboard 15 by the user. The system controller 10 outputs an inputting instruction to an input section 12, and also outputs an optical recording instruction to the optical recording block 7. The input signal, for example, an audio signal or a video signal, is received by the input section 12 and is converted by the input section 12 into a digital signal of a given format such as a PCM format. The digital signal is fed from the input section 12 to an input section 32 of the optical recording block 7, being coded by an ECC encoder 35 for error correction. An output signal of the ECC encoder 35 is transmitted to the magnetic head 8 via an optical recording circuit 37, and a magnetic recording circuit 29 and a magnetic recording circuit 29 in the magnetic recording block 9. The magnetic head 8 generates a recording magnetic field responsive to an optical recording signal, and applies the magnetic field to magneto-optical material (photo-magnetic material) in a given region of the optical recording layer 4. Recording material in a narrower region of the optical recording layer 4 is heated to a Curie temperature or higher by laser light applied from the optical head 6, so that this region of the optical recording layer 4 undergoes a magnetization change or transition responsive to the applied magnetic field. Thus, as shown in FIG. 2, narrower regions of the optical recording layer 4 are sequentially magnetized as denoted by arrows 52 while the recording medium 2 is rotated and scanned in a direction 51.

During the previously-mentioned recording of information on the optical recording layer 4, the system controller 10 receives tracking information, address information, and clock information from an optical head circuit 39 and an optical reproducing circuit 38 which have been recorded on the optical recording layer 4, and the system controller 10 outputs control information to the drive block 11 on the basis of the received information. Specifically, the system controller 10 feeds a control signal to a motor drive circuit 26 to control the rotational speed of the motor 17 for driving the recording medium 2 so that a relative speed between the optical head 6 and the recording medium 2 will be equal to a given linear velocity.

An optical head drive circuit 25 and an optical head actuator 18 execute tracking control responsive to a control signal from the system controller 10 so that a light beam will scan a target track on the recording medium 2. In addition, the optical head drive circuit 25 and the optical head actuator 18 execute focusing control responsive to a control signal from the system controller 10 so that the light beam will be accurately focused on the optical recording layer 4.

In the case where the access to another track is required, a head moving circuit 24 and a head moving actuator 23 move a head base 19 in response to a control signal from the system controller 10 so that the optical head 6 and the magnetic head 8 on the head base 19 will be moved together. Thus, the both heads reach equal radial positions on opposite surfaces of the recording medium 2 which align with a desired track.

A head elevator 20 for the magnetic head 8 is driven by a magnetic head elevating circuit 22 and an elevating motor 21 in response to a control signal from the system controller 10. During a time where a disk cassette 42 is being loaded with the recording medium 2 or where magnetic recording is not executed, the magnetic head 8 and a slider 41 are separated from the magnetic recording layer 3 of the recording medium 2 to prevent wear of the magnetic head 8.

As described previously, the system controller 10 feeds various control signals to the drive block 11, and thereby executes tracking control and focusing control of the optical head 6 and the magnetic head 8, elevation control of the magnetic head 8, and control of the rotational speed of the motor 17.

A description will now be given of a method of reproducing a magneto-optically recorded signal. As shown in FIG. 2, laser light emitted from the light emitting section 57 is incident to a polarization beam splitter 55, being reflected and directed toward an optical path 59 by the polarization beam splitter 55. The laser light travels along the optical path 59, being incident to a lens 54 and then being focused on the optical recording layer 4 of the recording medium 2 by the lens 54. In this case, focusing and tracking control is done by driving only the lens 54 through the optical head drive section 18.

As shown in FIG. 2, the magneto-optical material of the optical recording layer 4 is in magnetized conditions depending on the optical recorded signal. Thus, the polarization angle of reflected light traveling back along an optical path 59a depends on the direction of the magnetization of the optical recording layer 4 due to the Kerr effect.

The reflected light is separated from the forward light by the polarization beam splitter 55, traveling through the polarization beam splitter 55 and entering another polarization beam splitter 56. The reflected light is divided by the polarization beam splitter 56 into two beams incident to light receiving sections 58 and 58a respectively. The right receiving sections 58 and 58a convert the incident light beams into corresponding electric signals respectively. A subtractor (not shown) derives a difference between the output signals of the right receiving sections 58 and 58a. Since the derived difference depends on the direction of the magnetization of the optical recording layer 4, the subtractor generates a signal equal to the reproduction of the optical recorded signal. In this way, the optical recorded signal is reproduced.

The reproduced signal is fed from the optical head 6 to the optical recording block 7, being processed by the optical head circuit 39 and the optical reproducing 38 and being subjected to error correction by an ECC decoder 36. As a result, the original digital signal is recovered from the reproduced signal. The recovered original digital signal is fed to an output section 33. The output section 33 is provided with a memory which stores a quantity of the recorded signal (the recorded information) which corresponds to a given interval of time. In the case where the memory 34 consists of a 1-Mbit IC memory and a compressed audio signal having a bit rate of 250 kbps is handled, a quantity of the recorded signal which corresponds to a time of about 4 seconds can be stored. In the case of an audio player, if the optical head 6 moves out of tracking by an external vibration, the recovery of tracking in a time of 4 seconds prevents the occurrence of a discontinuity in a reproduced audio signal. The reproduced signal is then transmitted from the output section 33 to an output section 13 at a final stage. In the case where the reproduced signal represents audio information, the reproduced signal is subjected to PCM demodulation before being outputted to an external device as an analog audio signal.

A description will now be given of a magnetic recording mode of operation. In FIG. 1, an input signal applied to an input section 12 from an external device or an output signal of the system controller 10 is transmitted to an input section 21A of the magnetic recording block 9, being subjected by the ECC encoder 35 in the optical recording block 7 to a coding process such as an error correcting process. The resultant coded signal is transmitted to the magnetic head 8 via the magnetic recording circuit 29 and the magnetic head circuit 31.

Figure 3:
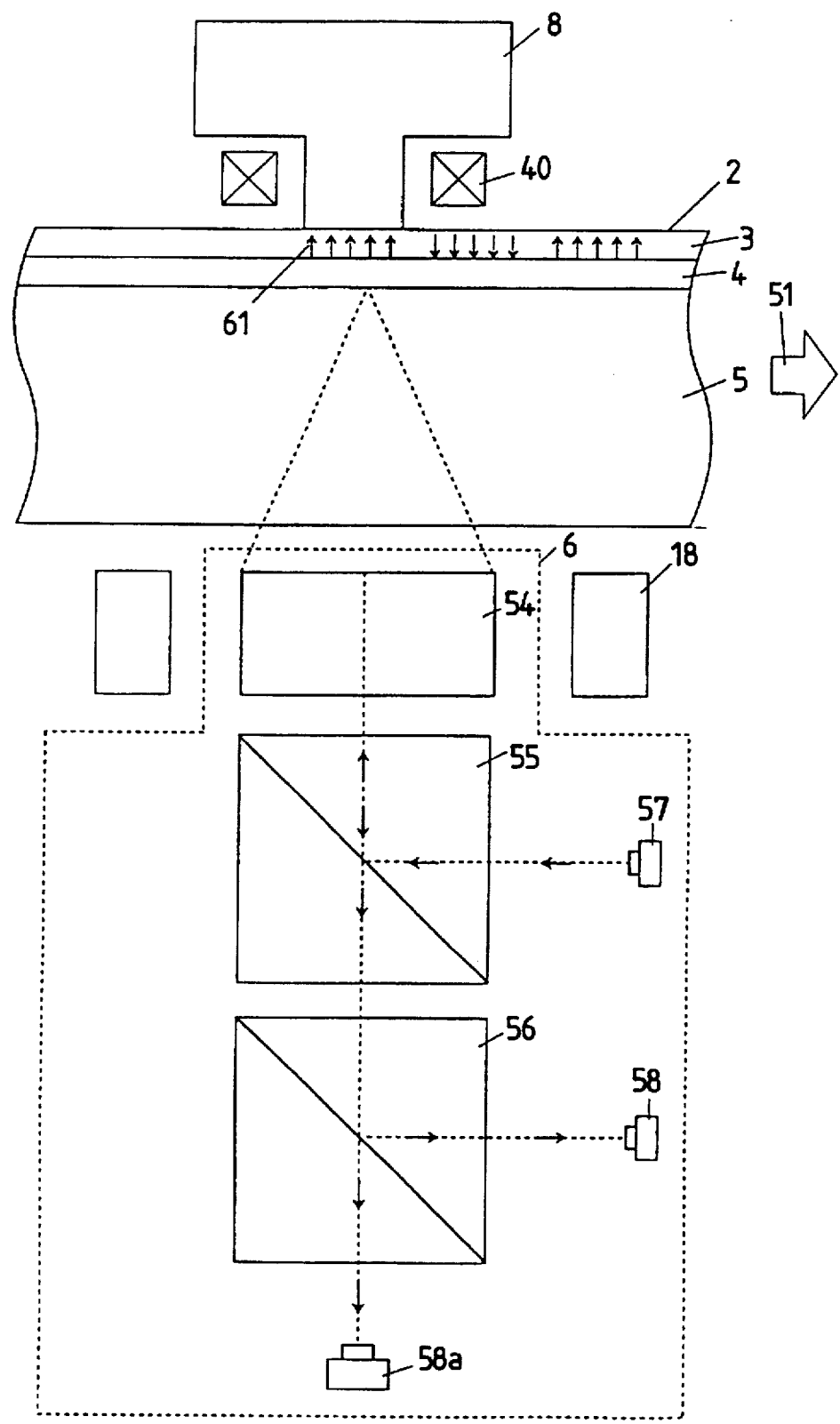
FIG. 3 is an enlarged view of a head portion in the first embodiment.

With reference to FIG. 3, the magnetic recorded signal fed to the magnetic head 8 is converted by a winding 40 into a corresponding magnetic field. The magnetic material of the magnetic recording layer 3 is vertically magnetized by the magnetic field as denoted by arrows 61 in FIG. 3. In this way, magnetic recording in a vertical direction is done so that the information signal is recorded on the recording medium 2. The recording medium 2 has a vertically magnetized film. As the recording medium 2 is moved along a direction 51, time segments of the information signal is sequentially recorded on the magnetic recording medium 2. In this case, although the optical recording layer 4 is also subjected to the magnetic field, the optical recording layer 4 is prevented from being magnetized by the magnetic field since the magneto-optical material of the optical recording layer 4 has a magnetic coercive force of several thousands to ten thousands of Oe at temperatures below the Curie temperature.

Figure 7:
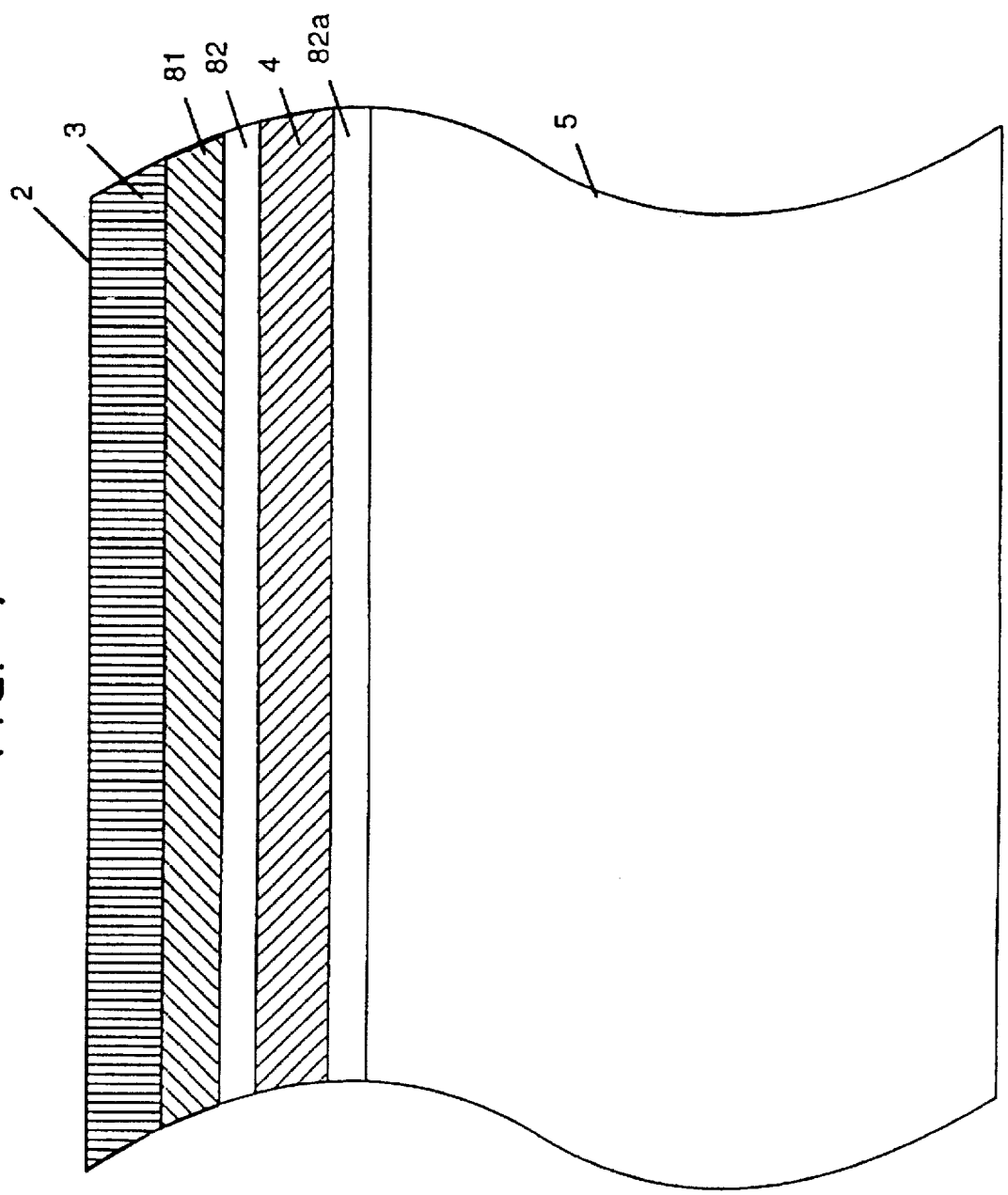
FIG. 7 is a sectional view of a recording medium in the first embodiment.

In the case where a portion of the magnetic recording layer 3 which actually undergoes the magnetic recording process is excessively close to the optical recording layer 4, the intensity of a magnetic filed applied to the optical recording layer 4 from the magnetic recording portion of the magnetic recording layer 3 sometimes reaches a level of several tens to several hundreds of Oe. Under these conditions, in the case where the temperature of the optical recording layer 4 is increased above the Curie temperature for magneto-optical recording, the optical recording layer 4 tends to undergo a magnetization change or transition in response to the magnetic field from the magnetic recording portion of the magnetic recording layer 3 so that an error rate increases during the magneto-optical recording. To resolve such a problem, it is preferable to provide an interference layer 81 of a given thickness between the magnetic recording layer 3 and the optical recording layer 4 as shown in FIG. 7. Opposite surfaces of the optical recording layer 4 are provided with protective layers 82 and 82a to prevent deterioration thereof. The sum of the thickness of the interference layer 81 and the thickness of the protective layer 82 is equal to an interference interval or distance L. In this case, an attenuation rate is given as $56.4 \times L/\lambda$ where $\lambda$ denotes a magnetic recording wavelength. When $\lambda=0.5$ μm, an interference interval L of 0.2 μm or greater can provide an adequate level of the effect.

Figure 8:
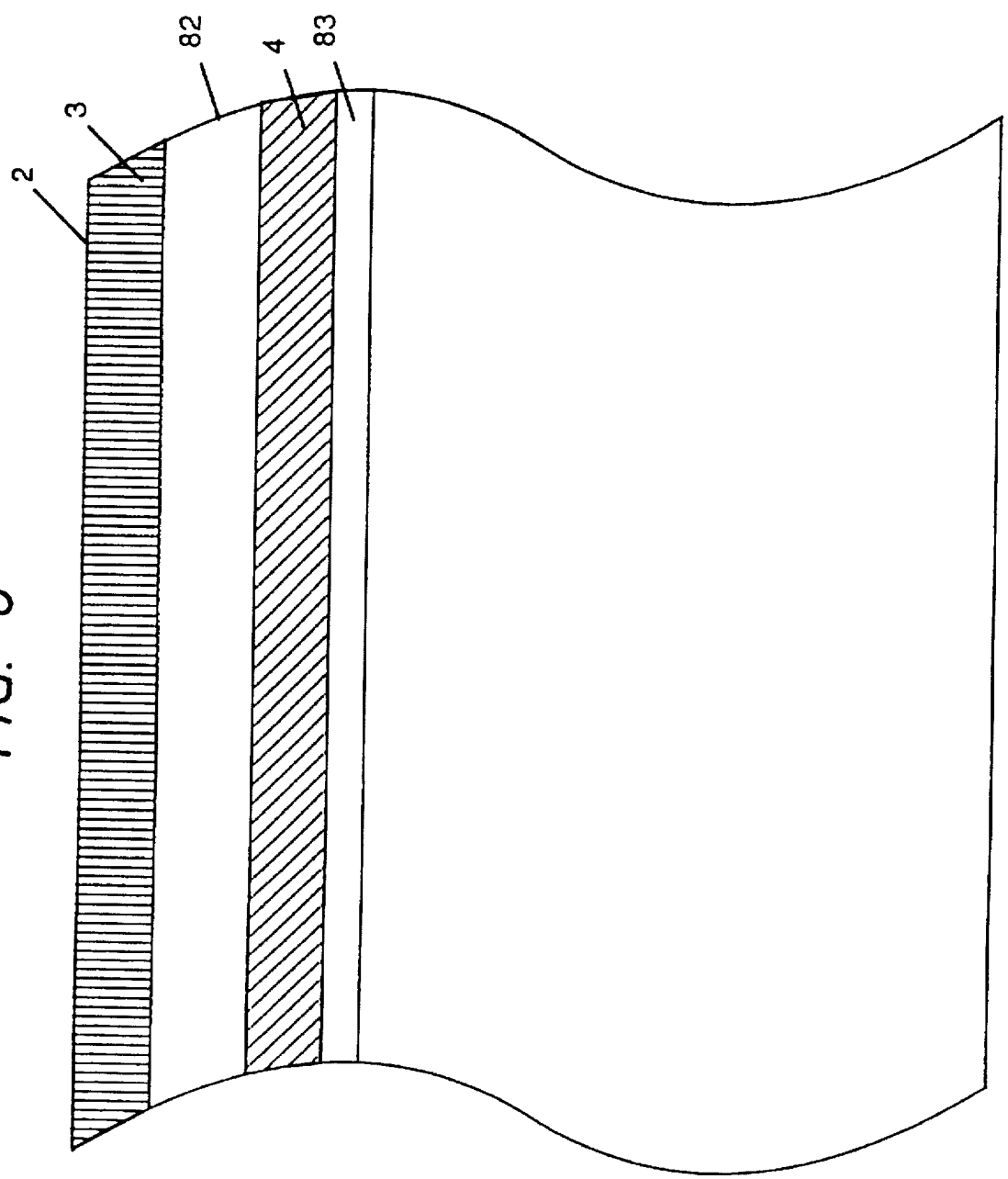
FIG. 8 is a sectional view of a recording medium in the first embodiment.

As shown in FIG. 8, a protective layer 82 of a thickness equal to or greater than the interference interval may be provided between the magnetic recording layer 3 and the optical recording layer 4.

The magnetic recording medium 2 of FIG. 7 was fabricated as follows. The protective layer 82 and the interference layer 81 were sequentially formed on the optical recording layer 4. Magnetic material such as barium ferrite was prepared which had vertical anisotropy. Lubricant, binder, and the magnetic material were mixed. The resultant mixture was applied to the substrate by spin coat to form the magnetic recording layer 3 while a magnetic field was applied to the substrate in the vertical direction of the substrate.

Figure 9:
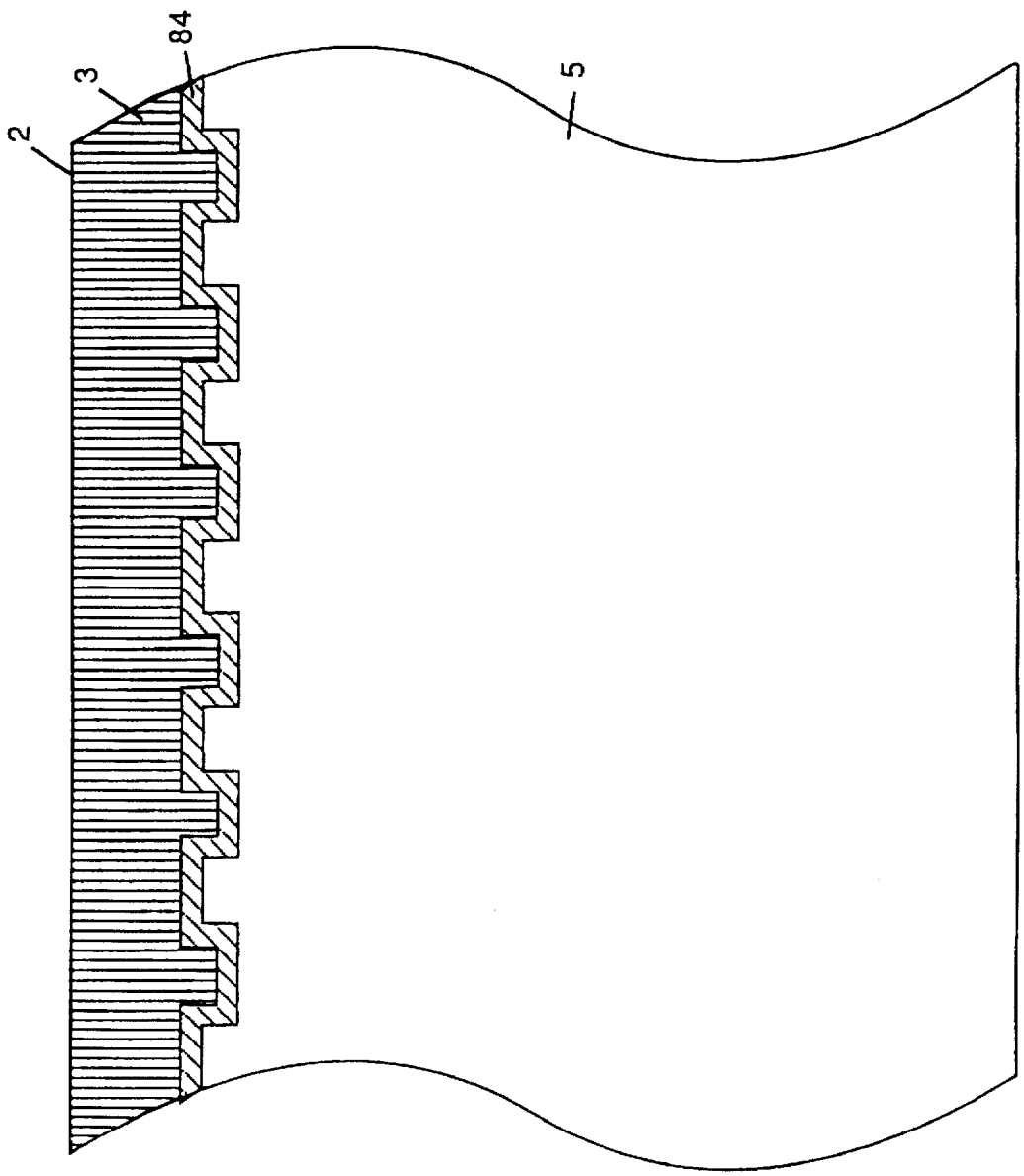
FIG. 9 is a sectional view of a recording medium in the first embodiment.

The recording and reproducing apparatus 1 can operate on a ROM disk similar to a compact disk (CD). FIG. 9 shows an example of a ROM-type recording medium 2. The recording medium 2 of FIG. 9 was fabricated as follows. A substrate 5 was provided with pits. A reflecting film 84 of suitable material such as aluminum was formed over the pits of the substrate 5. Lubricant, binder, and magnetic material were mixed. The resultant mixture was applied to the reflecting film 84 to form a magnetic recording layer 3 while a magnetic field was applied to the substrate 5 in the vertical direction of the substrate 5. The magnetic recording layer 3 had a vertical magnetic recording film. The recording medium of FIG. 9 has the function of a CD ROM at one side, and has the function of a RAM at the other side. Thus, the recording medium of FIG. 9 provides various advantages as described later. In this case, a cost increase results from only adding the magnetic substance to the material which will form a protective film through spin coat similar to that executed to fabricate a currently-used CD. Accordingly, a manufacturing cost increase corresponds to only the cost of the magnetic substance. Since the cost of the magnetic substance is equal to a few percent of the manufacturing cost of the recording medium, the cost increase is very small.

Figure 4:
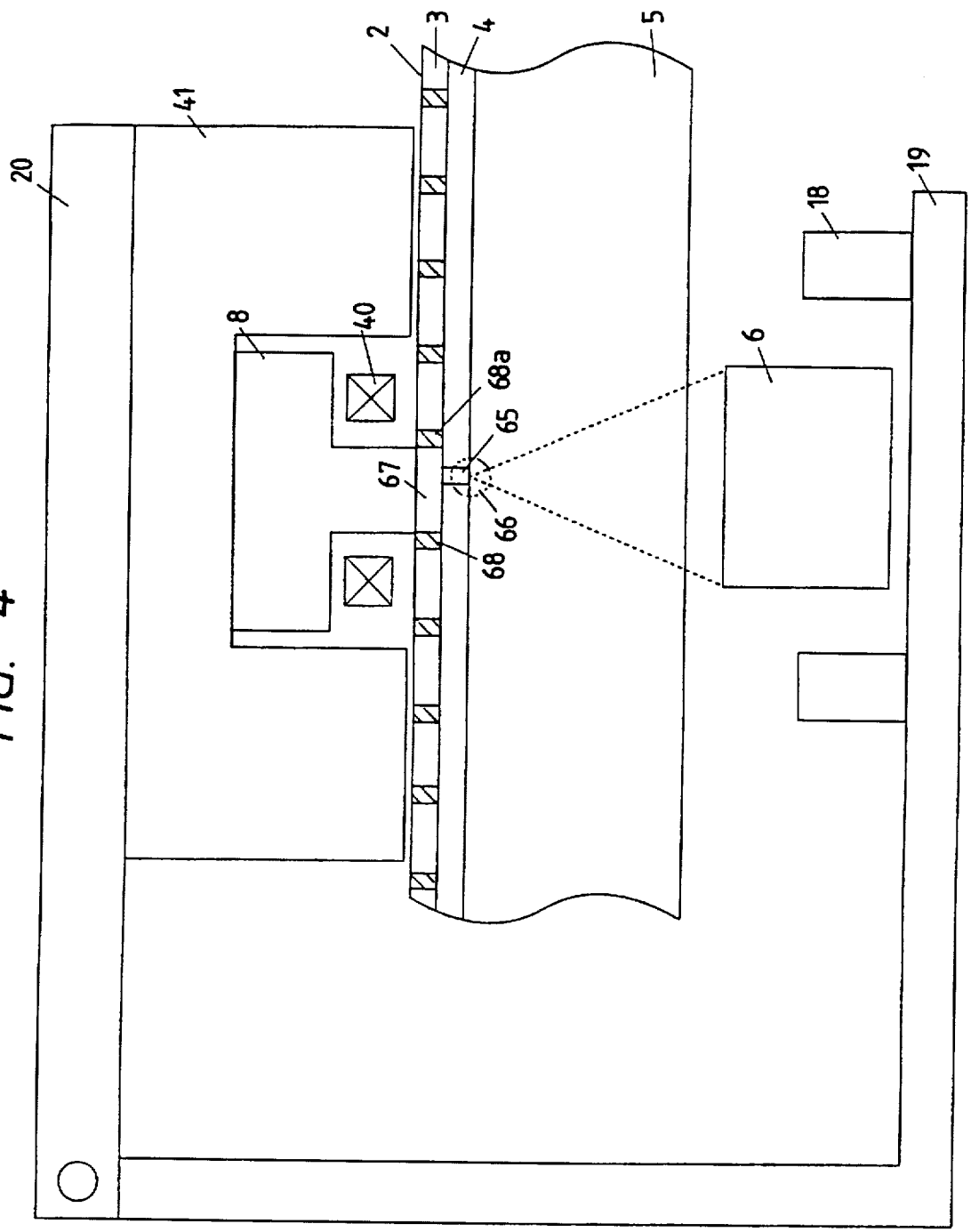
FIG. 4 is an enlarged view of a head portion in the first embodiment as viewed in a tracking direction.
Figure 5:
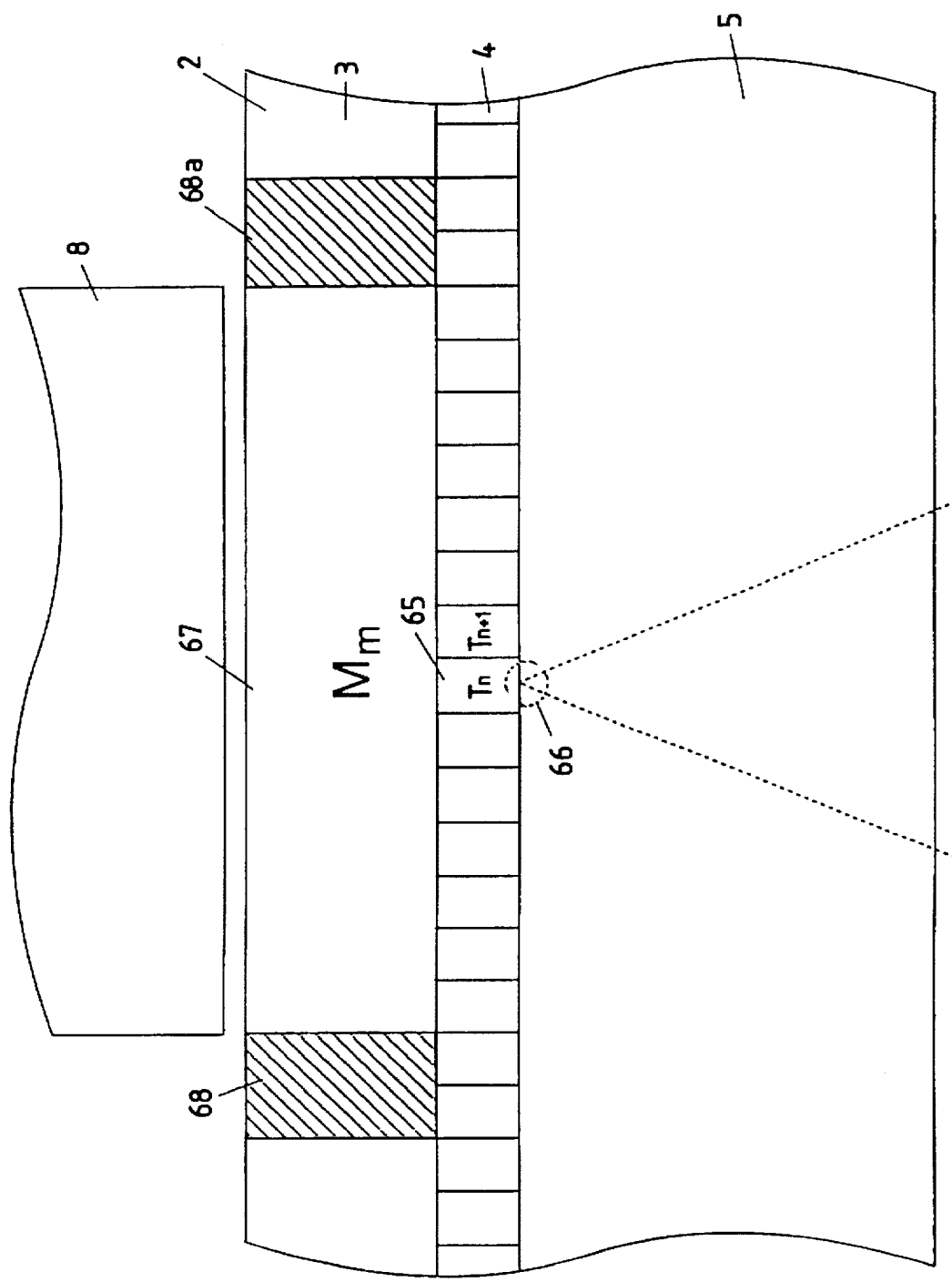
FIG. 5 is an enlarged view of a magnetic head portion in the first embodiment.

During the magnetic recording, tracking is executed as follows. In FIG. 1, the optical head 6 and the optical head circuit 39 reproduce tracking information from the recording medium 2. The system controller 10 outputs a moving instruction to the head moving circuit 24 in response to the reproduced tracking information, driving the actuator 23 and thereby moving the head base 19 in the tracking direction. Thus, as shown in FIG. 4, light beam emitted from the optical head 6 is focused into a spot 66 near a given optical recording track 65 of the optical recording layer 4. The optical head drive section 18 for driving the optical head 6 is mechanically couped with the magnetic head 8 via the head base 19 and the head elevator 20. Therefore, the magnetic head 8 moves in the tracking direction as the optical head 6 moves. Thus, when the optical head 6 is aligned with the given optical track 66, the magnetic head 8 is moved into alignment with a given magnetic track 67 which extends at the opposite side of the optical track 66. Guard bands 68 and 68a are provided at opposite sides of the magnetic track 67. As shown in FIG. 5, when the position of the optical head 6 is controlled so as to scan a given Tn-th optical track 65, the magnetic head 8 runs along a given Mm-th magnetic track 67 extending at the opposite side of the optical track 65. In this case, the drive system for the optical head 6 suffices and it is unnecessary to provide a tracking control device for the magnetic head 8. Furthermore, it is unnecessary to provide a linear sensor required in a conventional magnetic disk drive.

A description will now be given of a method of accessing an optical track and a magnetic track. The optical head 6 is subjected to tracking together with the magnetic head 8. Therefore, in the case where there is a difference in radial direction between an optical track currently exposed to an information recording or reproducing process from the lower surface and a magnetic track desired to be accessed from the upper surface, the two tracks can not be accessed at the same time. In the case of a data signal, this access problem causes only a delay in access and does not cause a significant problem. In the case of a continuous signal such as an audio signal or a video signal, an interruption is generally unacceptable. Thus, the magnetic recording can not be executed during an optical recording or reproducing process at a normal speed. This embodiment uses the system in which the memory 34 is provided in connection with the input section 32 and the output section 33 to store a quantity of a signal which corresponds to an interval equal to several times the maximum access time of magnetic recording.

Figure 6:
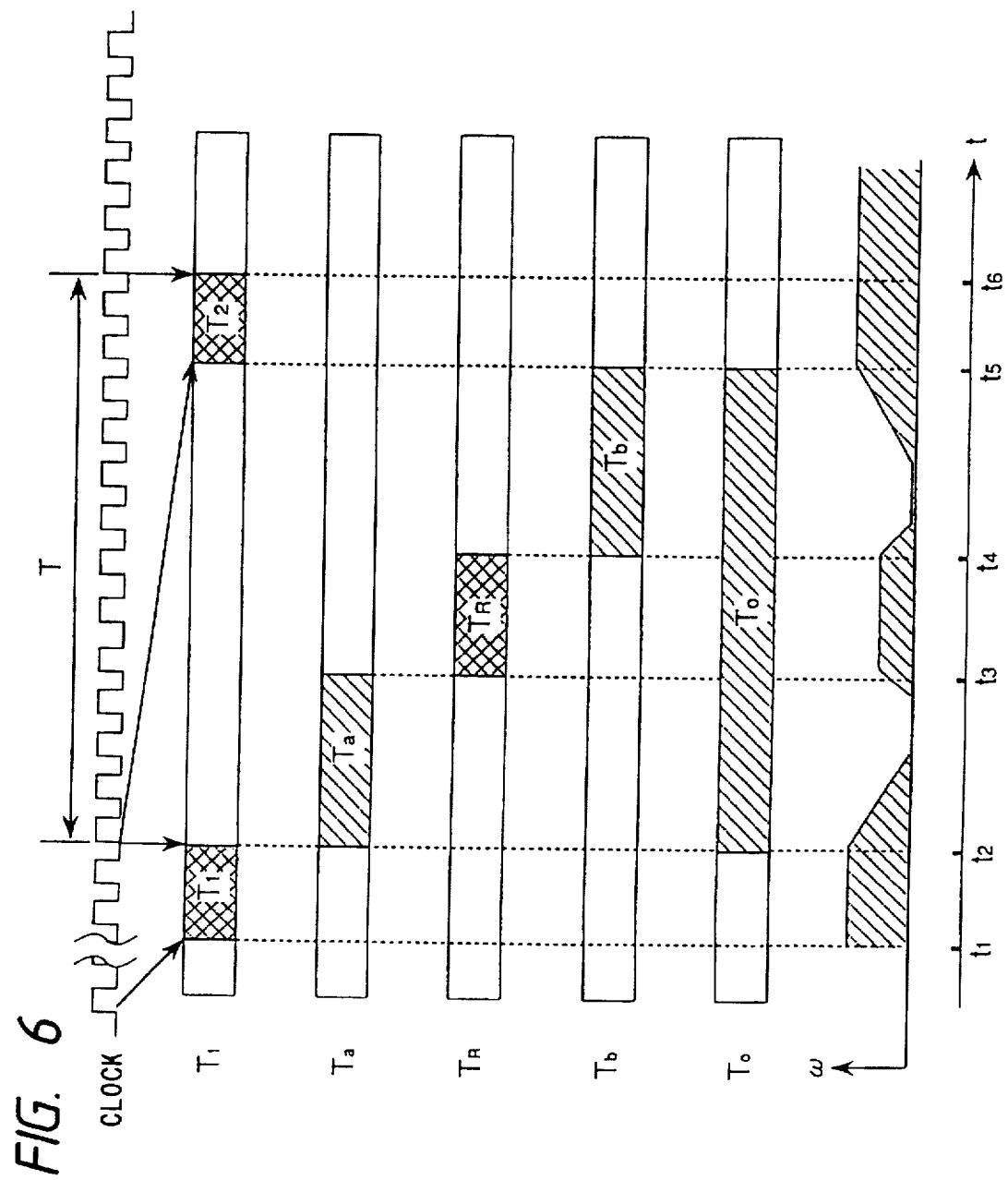
FIG. 6 is a timing chart of magnetic recording in the first embodiment.

As shown in FIG. 6, the rotational speed of the recording medium 2 is increased by n times during a recording or reproducing process, and thereby an optical recording or reproducing time T is shortened to 1/n as compared with that of a normal speed and becomes equal to T1 and T2. Thus, a time T0 between t2 and t5 which equals to n−1 times the recording or reproducing time is a margin time. In the case where a magnetic track is accessed during an access time Ta between t2 and t3 in the margin time T0 and a magnetic recording or reproducing process is done during a recording or reproducing time TR between t3 and t4 and where head return or motion to an original optical track or a next optical track is done during a return time Tb between t5 and t6, access for the optical recording and access for the magnetic recording can be executed in time division by a single head moving section. In this case, the capacity of the memory 34 is chosen so that the memory 34 can store a continuous signal during the margin time T0.

Figure 10:
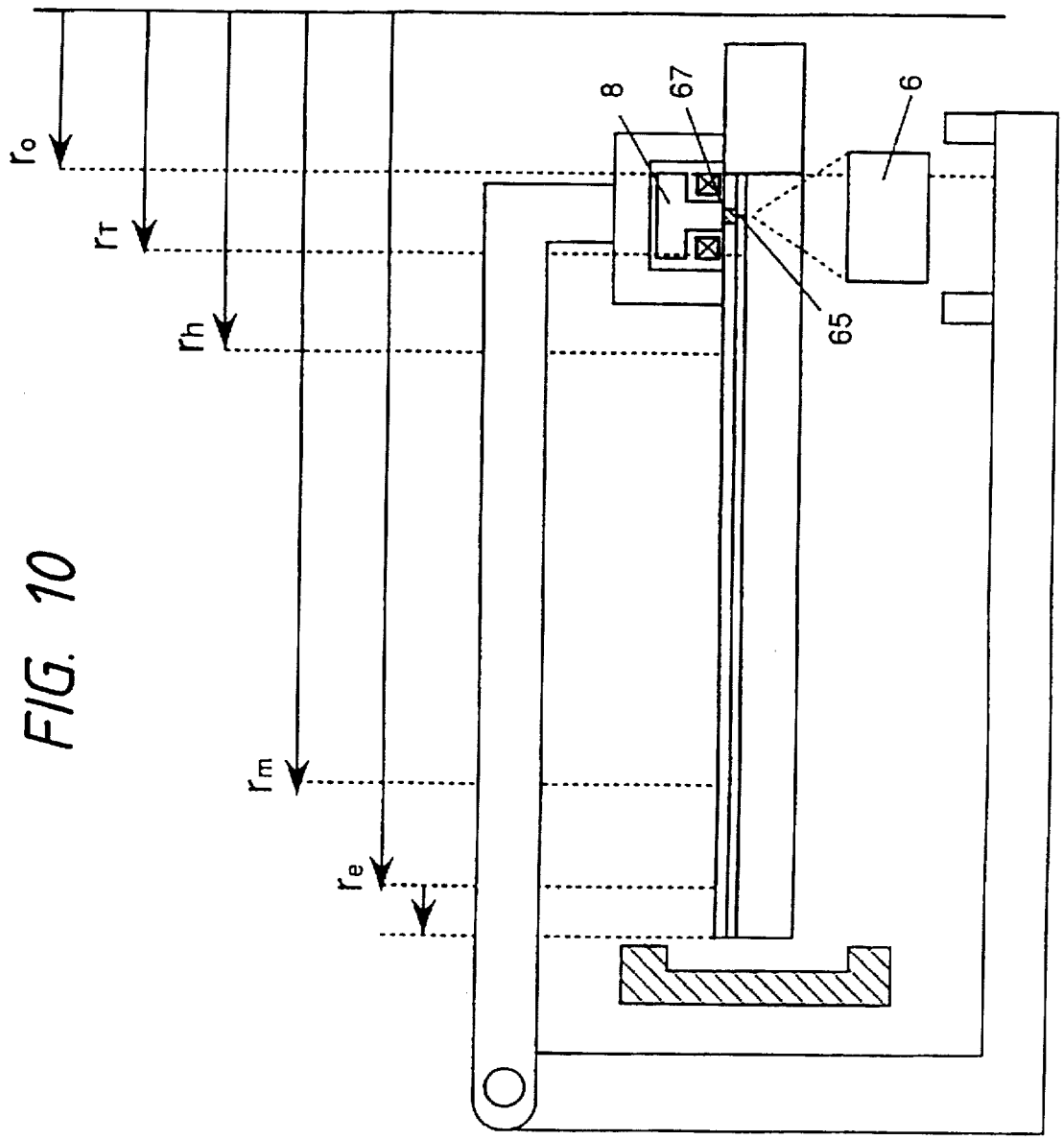
FIG. 10 is a sectional view of a recording portion in the first embodiment.

Access to a track by the magnetic head 8 will now be described with reference to FIG. 6 and FIGS. 10–16. A cassette 42 shown in FIG. 15 includes the recording medium 2. The cassette 42 is inserted into a recess in a casing of the recording and reproducing apparatus 1 shown in FIG. 16. Then, as shown in FIG. 10, a light beam emitted from the optical head 6 is focused on an optical track 65 in a TOC region on a recording surface of the recording medium 2, and TOC information is reproduced. Index information is recorded in the TOC region. During the reproduction of the TOC information, the magnetic head 8 travels on a magnetic track 67 at the opposite side of the optical track 65 so that magnetically recorded information is reproduced from the magnetic track 67. In this way, during the first process, information is reproduced from the optical track in the TOC region of the recording medium 2, and simultaneously information is reproduced from the magnetic track. The information reproduced from the magnetic track represents the contents of previous access, conditions at the end of previous operation, or others. As shown in FIG. 16, the contents of the reproduced information are indicated on a display 16.

In the case of audio information, a final music number, an elapsed time of an interruption thereof, a reserved music number, or others are automatically recorded on the magnetic recording region. When the magnetic recording medium 2 is inserted into the recording and reproducing apparatus 1 again, information of a table of contents is reproduced from the optical track 65 and also information at the end of previous operation is reproduced from the magnetic track 67 as previously described. The reproduced information is indicated on the display 16 as shown in FIG. 16. FIG. 16 shows conditions where the previous access end time, the operator name, the final music number, the elapsed time of an interruption, the previously preset music order, and the music number are recorded and indicated. Specifically, "Continue?" is indicated. When "Yes" is inputted as a reply, the music starts to be reproduced from a point at which the previous operation ends. When "No" is inputted as a reply, the music is reproduced in the preset order. In this way, the user is enabled to enjoy the automatic reproduction of the previously-interrupted contents as they are, or to listen the music in the desired order.

Figure 18:
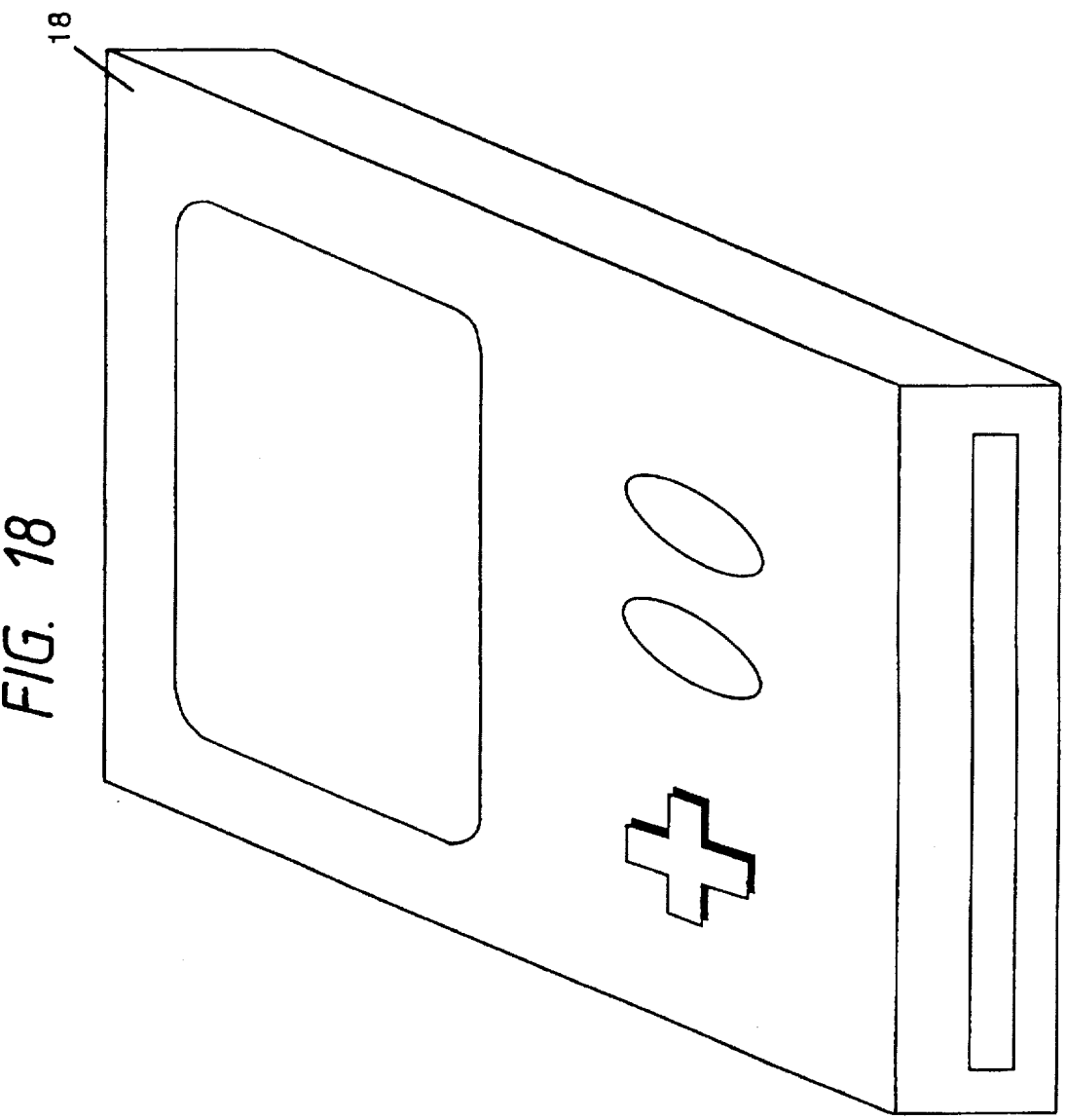
FIG. 18 is a perspective view of a game machine in the first embodiment.

In the case of a CD ROM game device 18 shown in FIG. 18, the previously interrupted game contents, for example, the stage number, the acquired points, and the item attainment number, are recorded and reproduced. Upon the start of the game a certain time after the previous end of the game, the game can be started from the place same as the previous place and the conditions same as the previous conditions. This advantage can not be provided by a prior art CD ROM game device.

The above-mentioned simple method of accessing the magnetic track in the TOC region has an advantage in that the structure is simple and the cost is low although the memory capacity is small.

Figure 11:
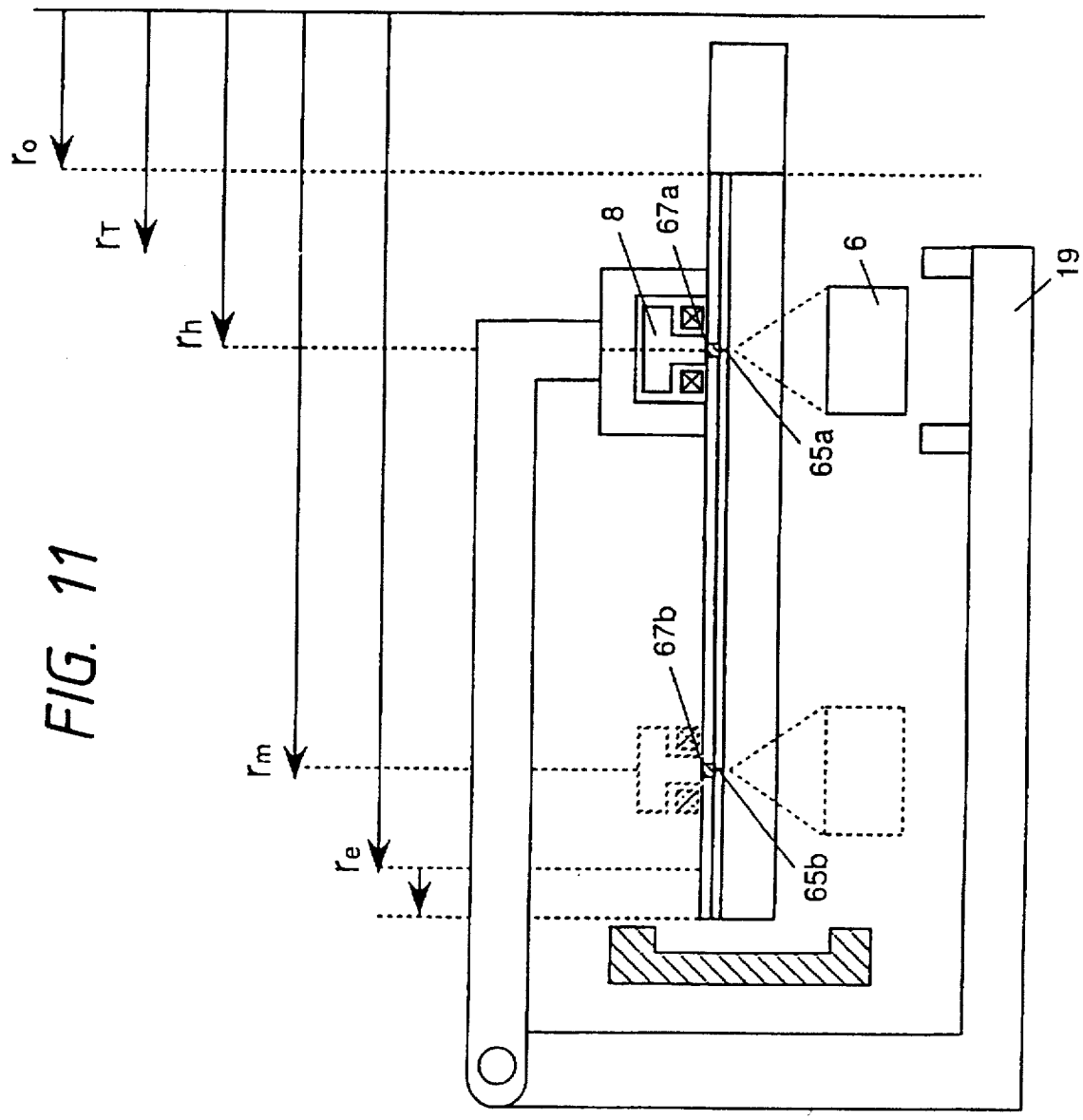
FIG. 11 is a sectional view of a recording portion in the first embodiment.
Figure 12:
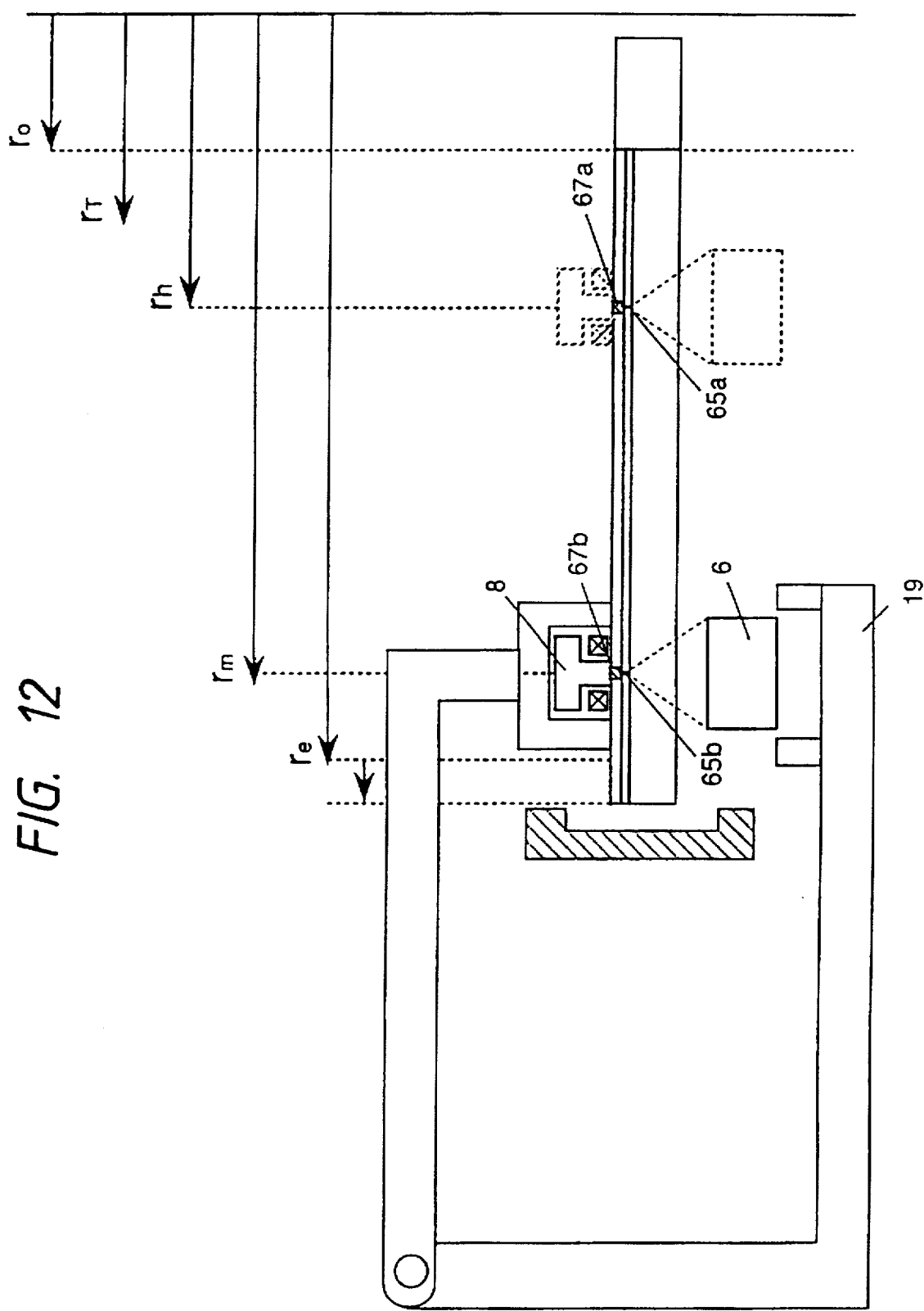
FIG. 12 is a sectional view of a recording portion in the first embodiment.
Figure 13:
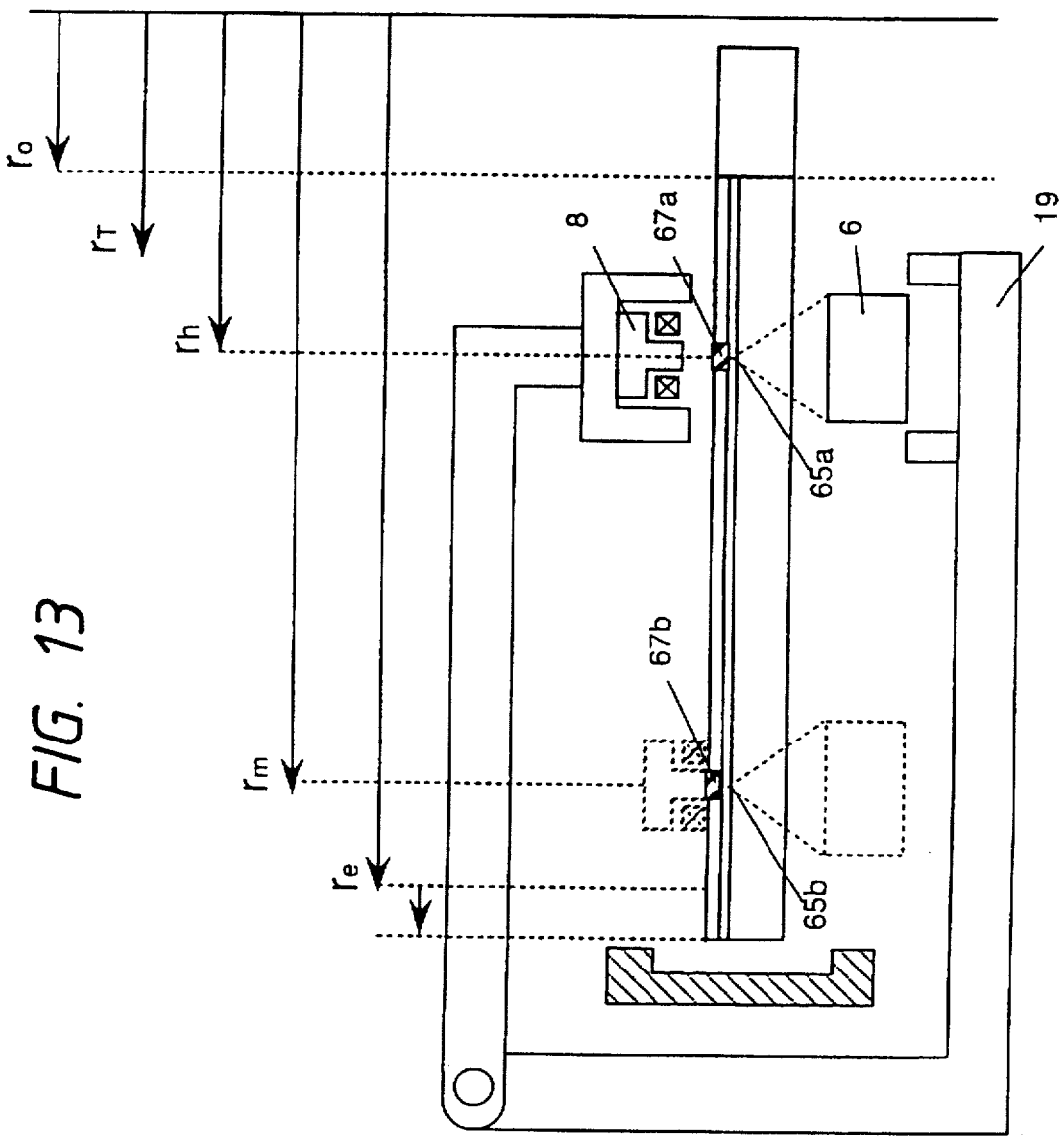
FIG. 13 is a sectional view of a recording portion in the first embodiment.
Figure 14:
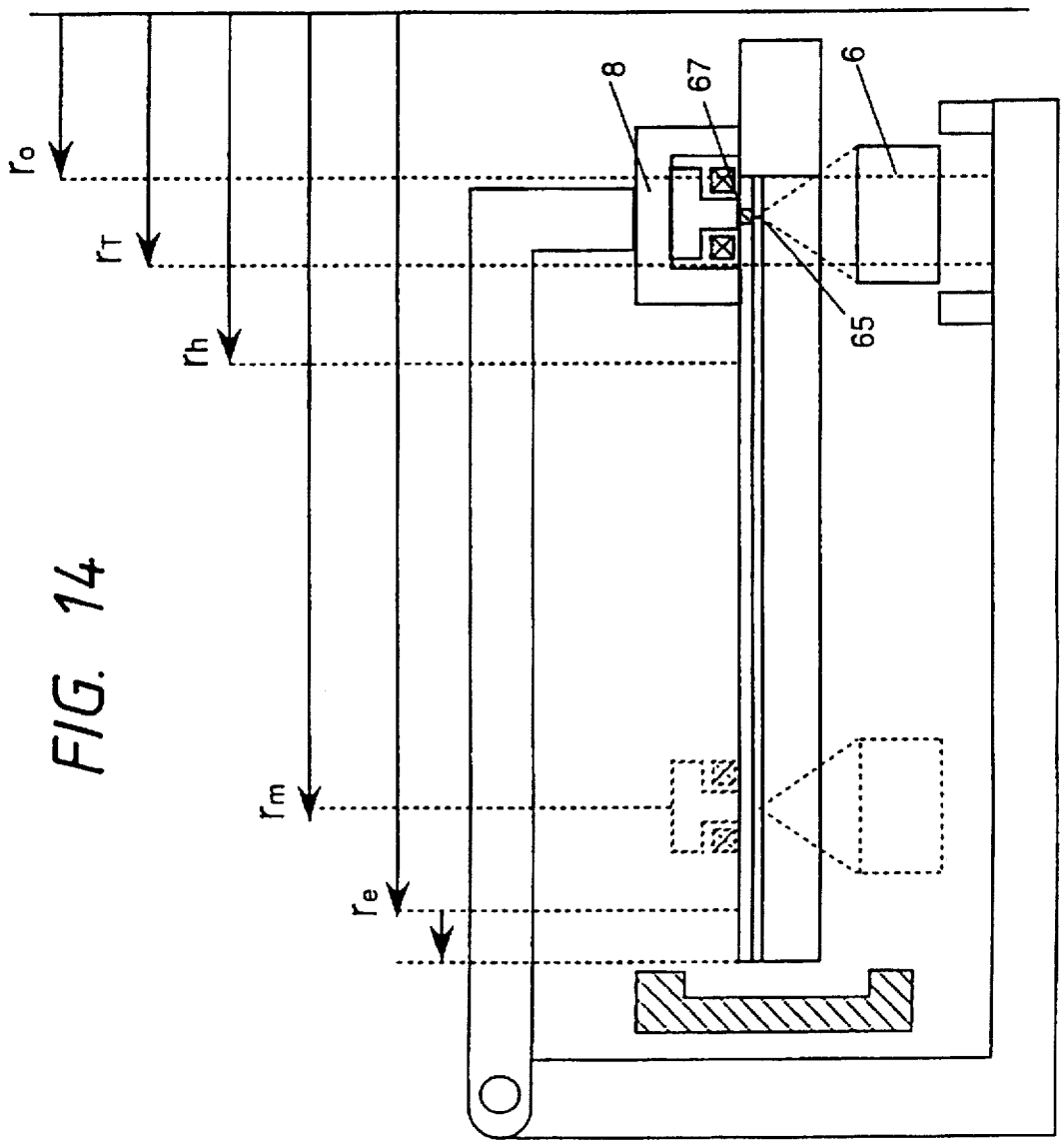
FIG. 14 is a sectional view of a recording portion in the first embodiment.

A description will now be given of access to a track outside the TOC region. FIG. 11 shows conditions where the optical head 6 accesses a given optical track 65a. At this time, the magnetic head 8 which moves together with the optical head 6 accesses a magnetic track 67a at the opposite side of the optical track 65a. In the case where required information is on a magnetic track 67b separate from the magnetic track 67a, it is necessary to move the magnetic head 8 to the magnetic track 67b. In this case, as previously described with reference to FIG. 6, it is necessary to complete the head movement, the recording, and the head return in a margin time T0. List information representing the correspondence between the magnetic track numbers and the optical track numbers is previously recorded on a TOC region or another given region of the optical recording layer 4. The list information is read out, and the optical track number corresponding to the required magnetic track number is calculated by referring to the list information. Then, as shown in FIG. 12, during an access time Ta, the head base 19 is moved and fixed so that the optical head 6 can access an optical track 65b corresponding to the calculated optical track number. Thus, the magnetic head 8 will follow the required magnetic track 67b. In this way, the magnetic recording or reproduction can be executed. In this case, as shown in FIG. 13, while the optical track 65a is being scanned, the magnetic head 8 remains lifted to an upper position well separated from the magnetic recording layer 3 by the elevating motor 21. In addition, during the access time Ta, as denoted by the character "ω" in FIG. 6, the rotational speed of the motor 17 is lowered. While the rotational speed remains low, the magnetic head 8 is moved downward into contact with the magnetic recording layer 3. Thereby, it is possible to prevent the magnetic head 8 from being damaged. During an interval TR, the rotational speed is increased and the magnetic recording is done. During an interval Tb, the rotational speed is lowered and the magnetic head 8 is lifted. Then, the rotational speed is increased again, and the optical head 6 is returned to the optical track 65a as shown in FIG. 13. During an interval T2, optical recording and reproduction is done. Since the data stored in the memory 34 is reproduced during the margin time T0, the reproduced signal or the reproduced music will not be interrupted. As shown in FIG. 14, during access to the TOC region, the magnetic head 8 is not moved downward in the presence of an instruction representing that magnetic recording on the TOC region is unnecessary. Thereby, even if a recording medium 2 having no magnetic recording layer 3 is inserted into the recording and reproducing apparatus, the magnetic head 8 can be prevented from contacting the recording medium 2 and being thus damaged. In this way, the execution of the upward and downward movement of the magnetic head 8 during a period of the occurrence of a lowered rotational speed provides an advantage such that a damage to the magnetic head 8 can be prevented and wear thereof can be remarkably reduced.

Figure 15:
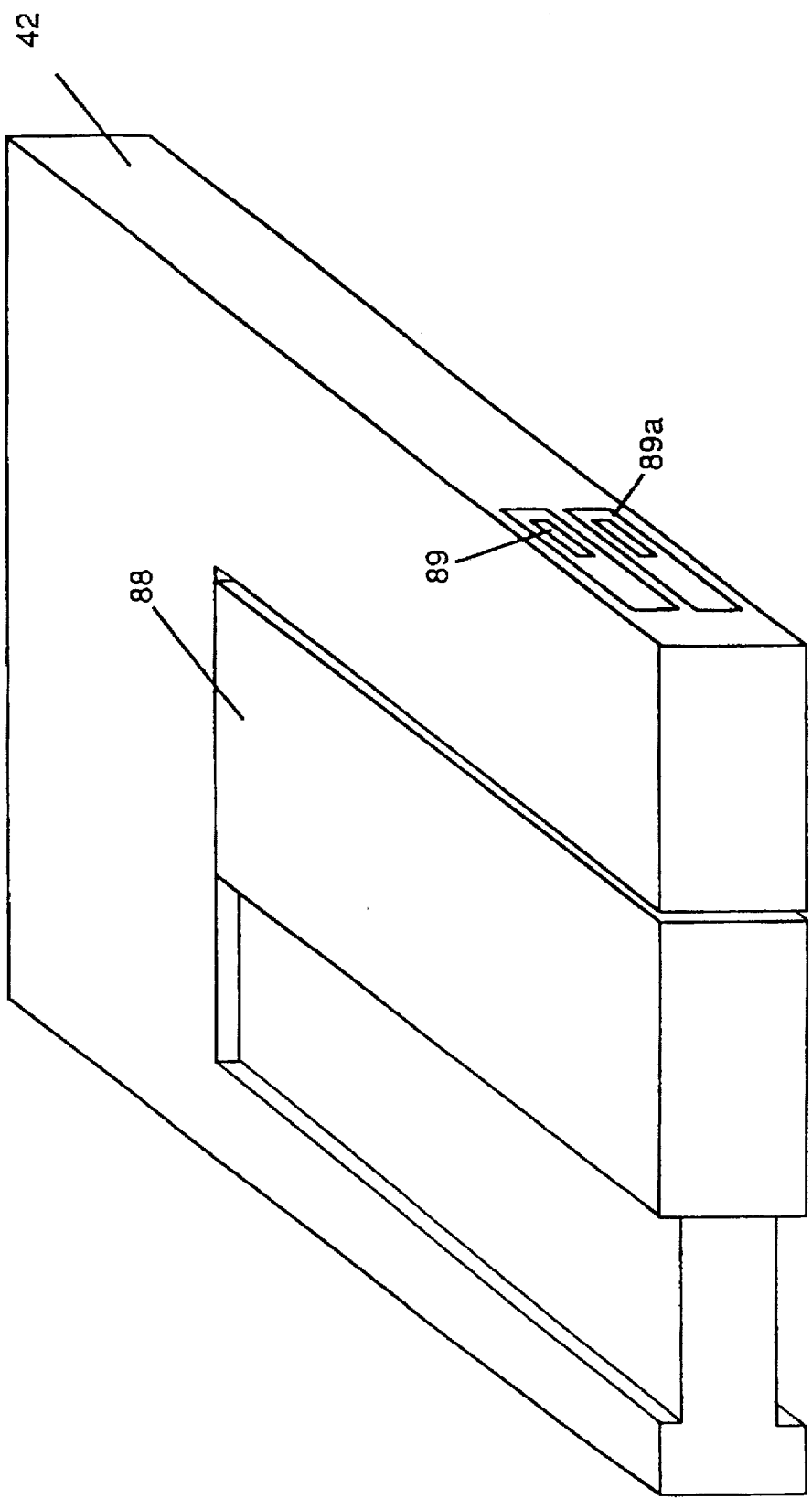
FIG. 15 is a perspective view of a cassette in the first embodiment.
Figure 16:
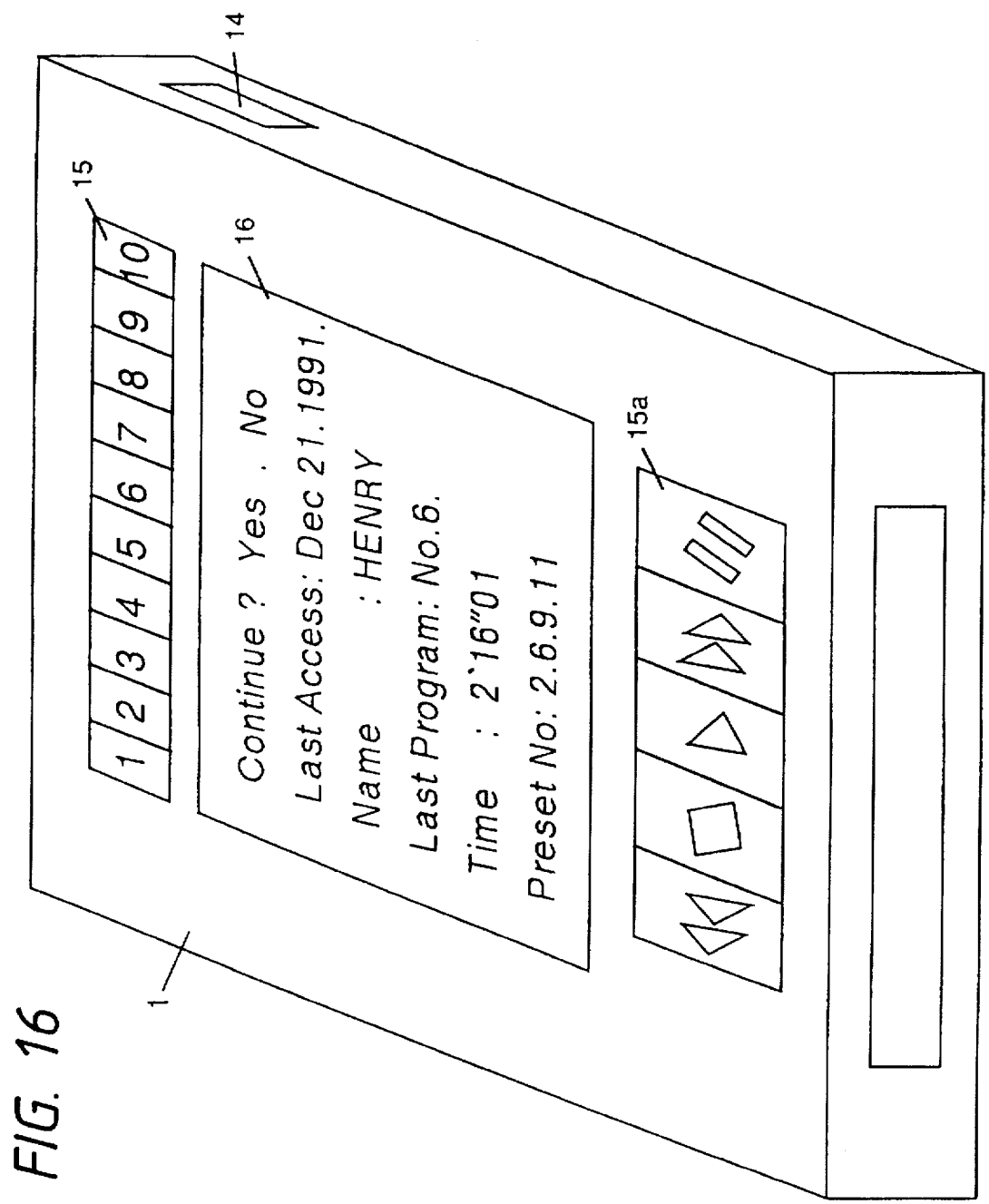
FIG. 16 is a perspective view of a recording and reproducing apparatus in the first embodiment.

FIG. 15 shows the cassette 42 which contains the recording medium 2. The cassette 42 is provided with a shutter 88, a magnetic recording prevention click 89, and an optical recording prevention click 89a. The magnetic recording prevention and the optical recording prevention can be set separately. In the case of a ROM cassette, only a magnetic recording prevention click 89a is provided thereon.

Figure 17:
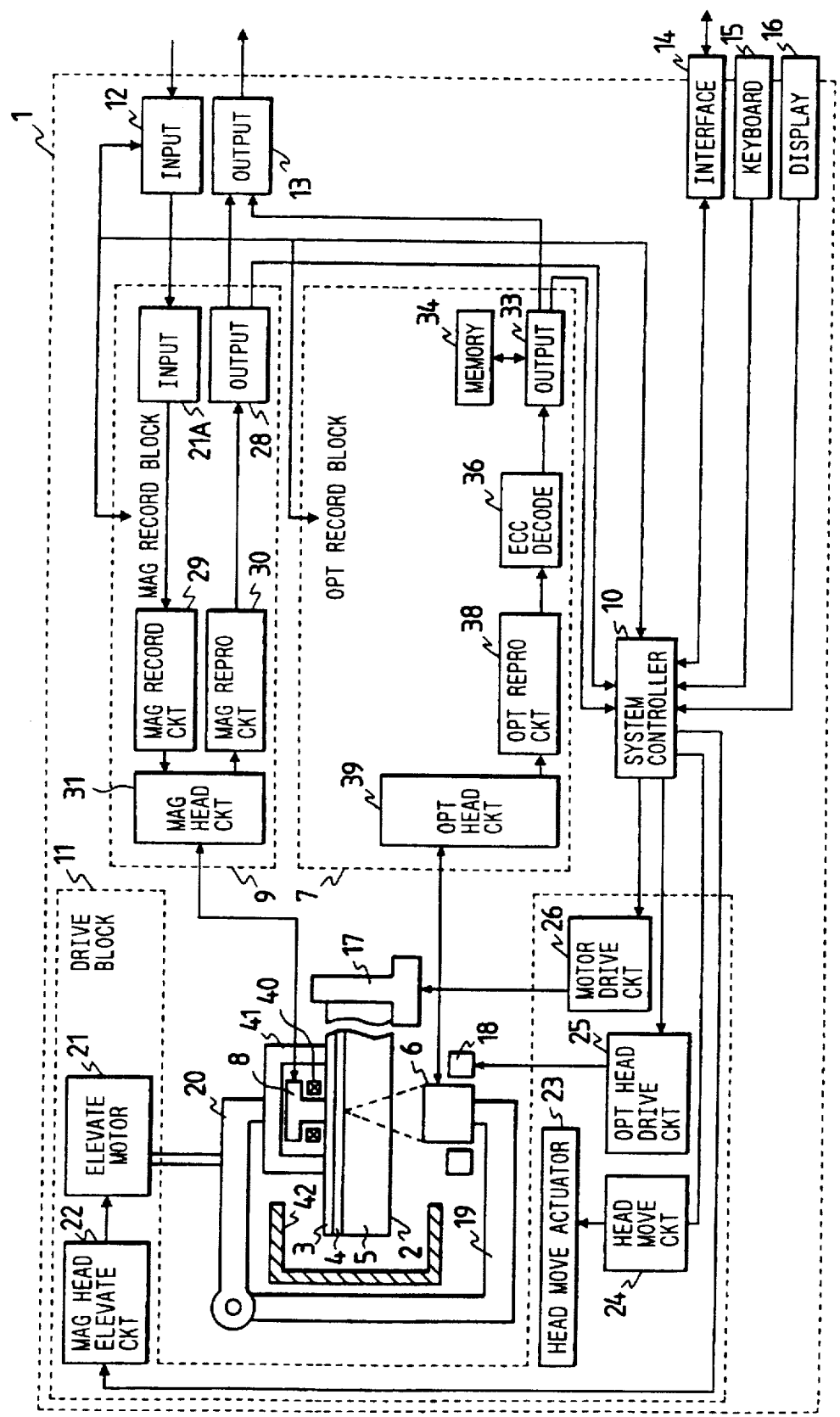
FIG. 17 is a block diagram of a recording and reproducing apparatus according to the first embodiment.

FIG. 17 shows a recording and reproducing apparatus for reproduction of optically recorded information. An optical recording circuit and an ECC encoder are omitted from an optical recording block 7 in the recording and reproducing apparatus of FIG. 17 as compared with that of FIG. 1. The recording and reproducing apparatus of FIG. 17 additionally includes a magnetic head elevator 20, a magnetic head 8, and a magnetic recording block 9 as compared with a conventional reproduction player such as a CD player. All the parts of the recording and reproducing apparatus of FIG. 17 can be used in common to the parts of the recording and reproducing apparatus of FIG. 1. Their costs are very low relative to optical recording parts, and the resultant cost increase is small. Although the memory capacity is smaller than that of a floppy disk, information can be recorded and reproduced on and from a ROM-type recording medium at such a low cost. Thus, in the case of a game device or a CD player requiring only a small memory capacity, various advantages are provided as previously described. According to estimation, in the case of a recording medium disk having a diameter of 60 mm, a magnetic recording memory capacity of about 1 KB to 10 KB is obtained by using a magnetic head for modulating a magnetic field. A memory of a 2-KB or 8-KB SRAM is provided on a typical game ROM IC, and thus the above-mentioned memory capacity is sufficient. Thus, there is an advantage such that the recording medium disk can replace a ROM IC.

DESCRIPTION OF THE SECOND PREFERRED EMBODIMENT

Figure 19:
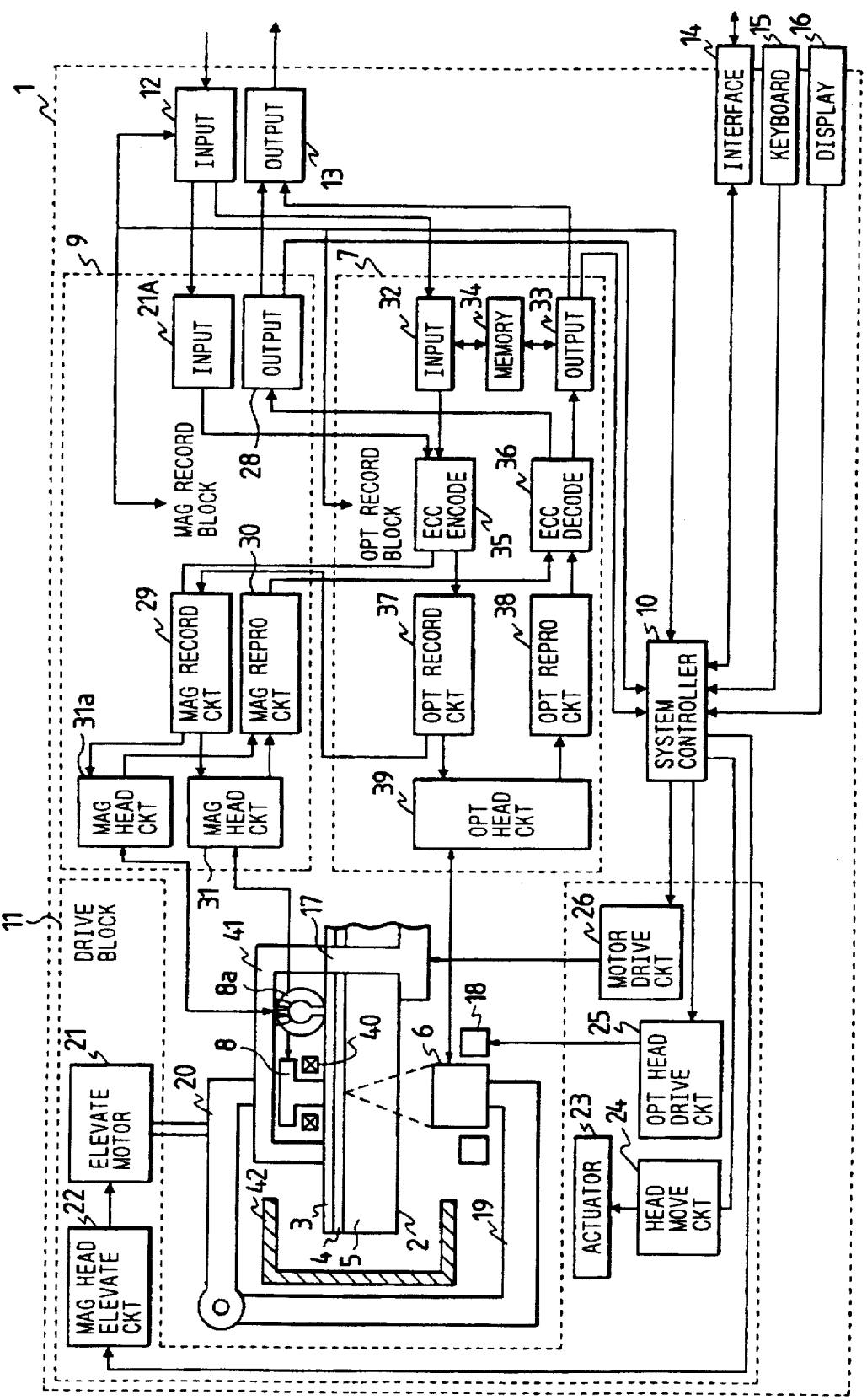
FIG. 19 is a block diagram of a recording and reproducing apparatus according to a second embodiment of this invention.

FIG. 19 shows a recording and reproducing apparatus according to a second embodiment of this invention which is similar to the recording and reproducing apparatus of FIG. 1 except that a magnetic head 8a and a magnetic head circuit 31a are added thereto.

Figure 20:
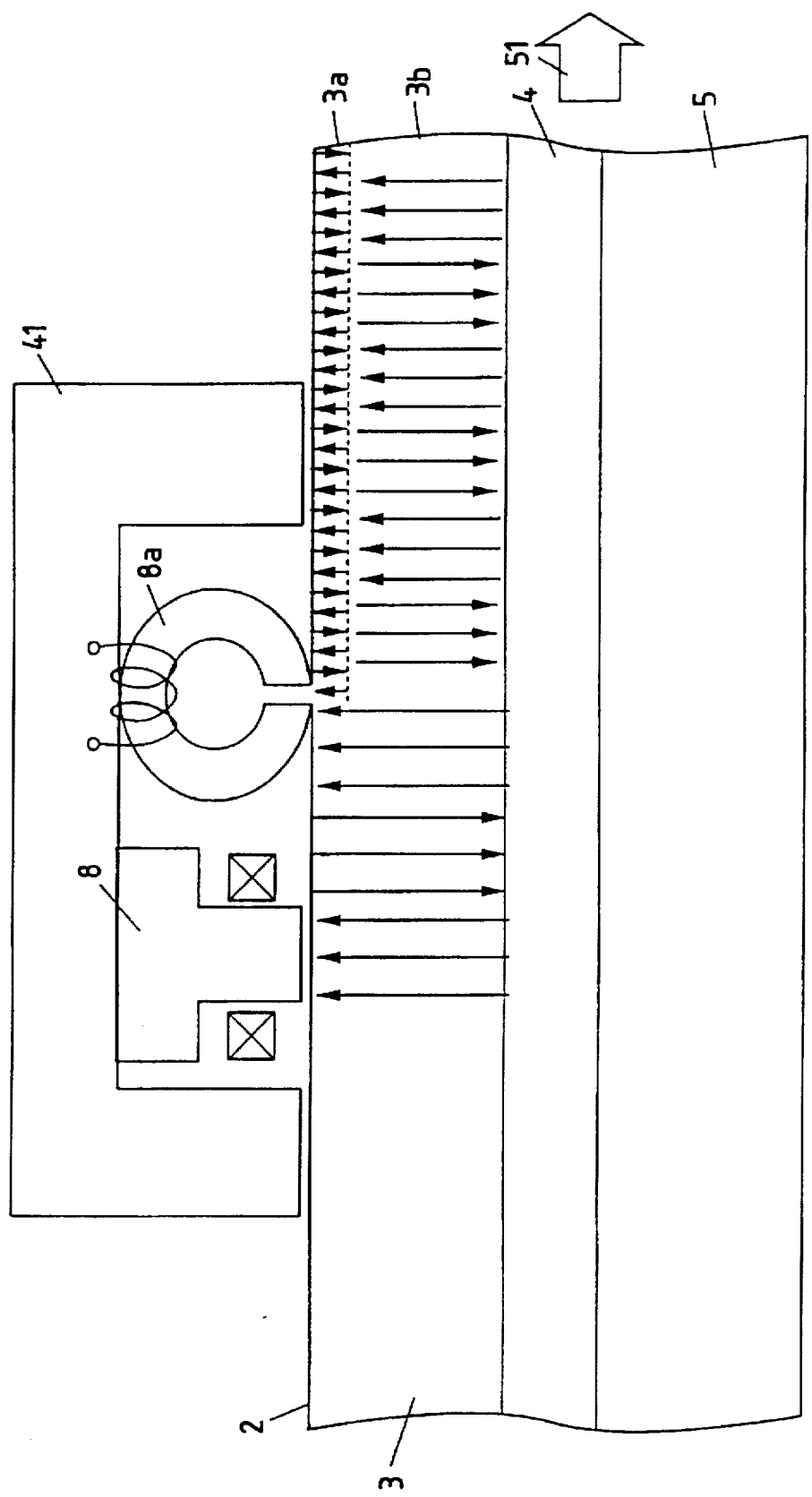
FIG. 20 is an enlarged view of a magnetic head portion in the second embodiment.

As shown in FIG. 20, a magnetic head 8 executes magnetic recording on an entire region of a magnetic recording layer 3, the magnetic recording having a long recording wavelength. This process is similar to the corresponding process in the first embodiment. Subsequently, the magnetic head 8a executes magnetic recording on a surface portion 3a, the magnetic recording having a short recording wavelength. Consequently, the surface portion 3a and a deep layer portion 3b are subjected to the magnetic recordings of independent sub and main channels having a shorter wavelength and a longer wavelength respectively. In the case where a magnetic recording layer subjected to two-layer recording as shown in FIG. 20 undergoes a reproducing process by use of a magnetic head for a long wavelength such as the magnetic head for modulating the magnetic field in the first embodiment, information can be reproduced from the main channel. Thus, provided that summary information is recorded on the main channel while detailed information is recorded on the sub channel, the summary information can be reproduced by the system of the first embodiment and thus there will be an advantage such that the compatibility can be ensured between the apparatus of the first embodiment and the apparatus of the second embodiment.

Figure 21:
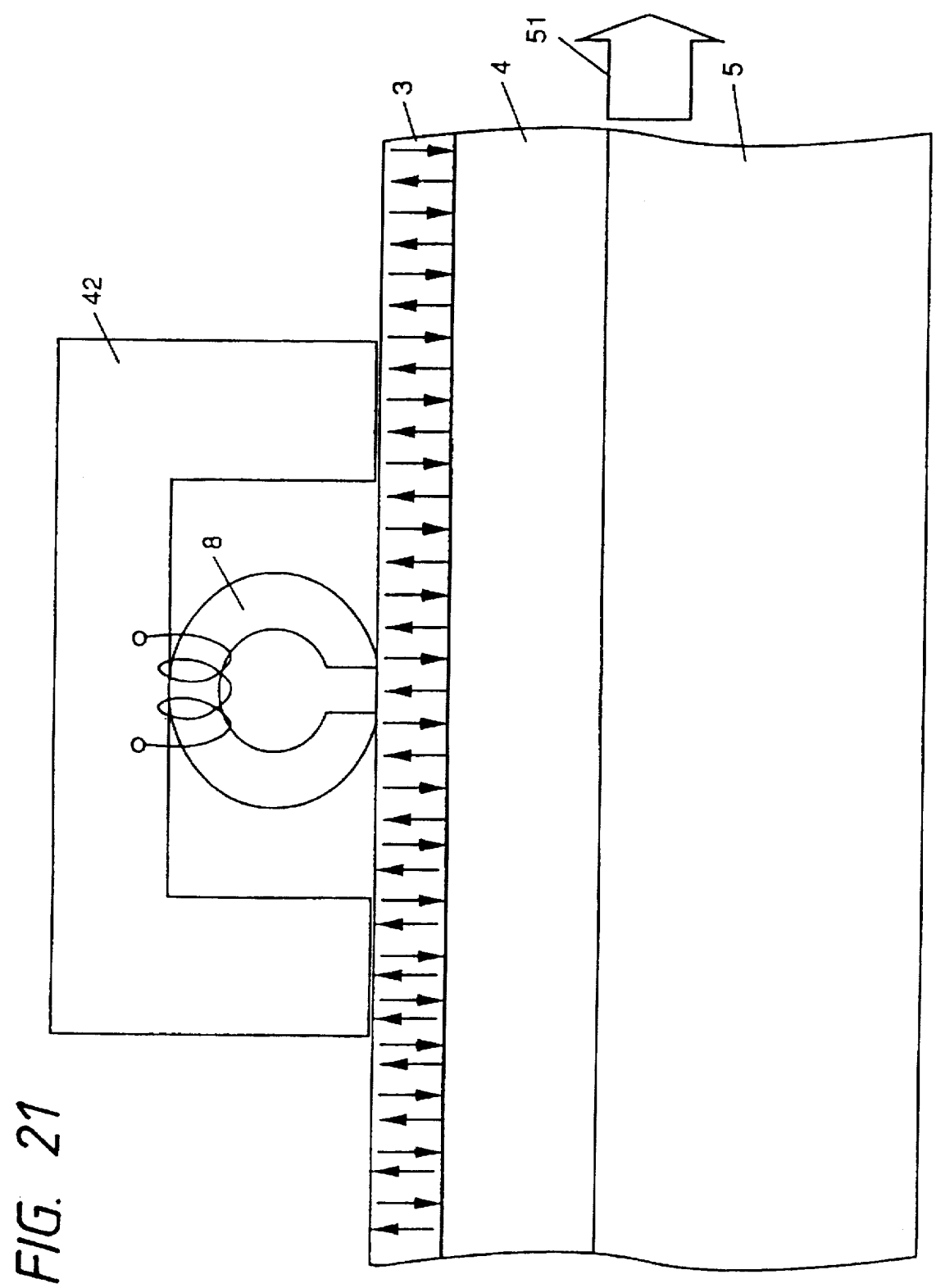
FIG. 21 is an enlarged view of a magnetic head portion in the second embodiment.

FIG. 21 shows a case where only a short-wavelength magnetic head 8 is provided. In this case, a signal of the sub channel, on which a signal of the main channel is superimposed, is reproduced so that information of both the main and sub channels can be reproduced. When the structure of FIG. 21 is applied to an apparatus exclusively for reproduction, its cost can be low.

Figure 22:
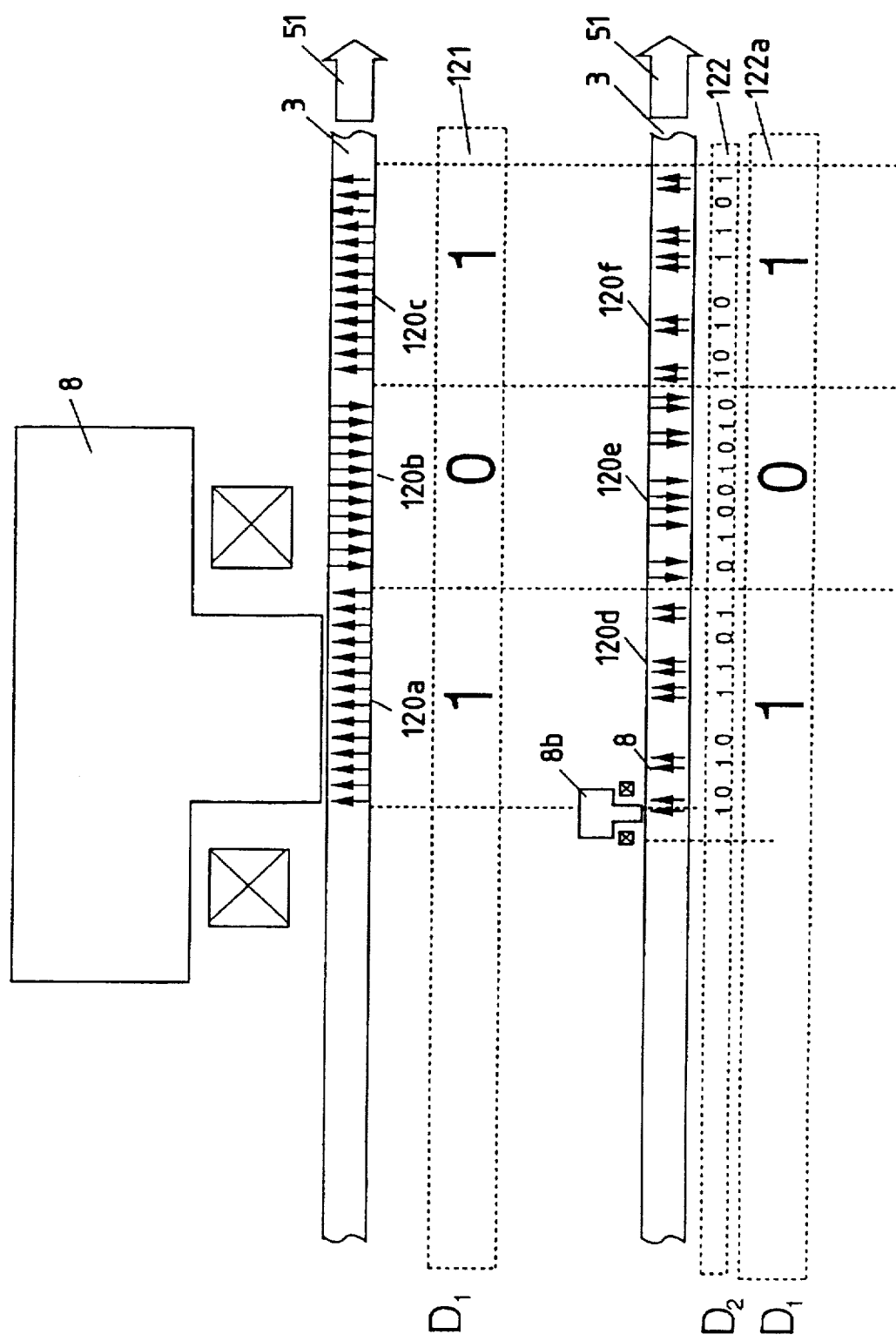
FIG. 22 is an enlarged view of a magnetic head portion in the second embodiment.

An upper part of FIG. 22 shows a case where recording is done by a magnetic head for modulating a magnetic field, that is, a magnetic head 8 for a long wavelength. As shown in the drawing, in the case where an N-pole portion is set "1" and a non-magnetized portion is set "0", recording is done as "0" in magnetization regions 120a and 120b and recording is done as "1" in a magnetization region 120c. Thus, a data sequence of "101" is obtained. As shown in a lower part of FIG. 22, in the case where an N-pole portion is set "1" and a non-magnetized portion is set "0" by using a short-wavelength magnetic head 8b for vertical, a data sequence of "10110110" is obtained. In this case, 8-bit information can be recorded on a region 120d equal in size to a region 120a in the upper part of the drawing. When the information is reproduced from the region 120d by the magnetic head 8, the reproduced information is decided to be "1" since there are only N-pole portions. This is the same as the region 120a. Thus, "1" in the data sequence 122a can be reproduced. In the case where an S-pole portion is defined as "0" and a non-magnetized portion is defined as "1" in a region 120e, 8-bit information, that is, a data sequence of "01001010", can be recorded. When this information is reproduced by the magnetic head 8, the reproduced information is decided to be "0" since there are only S-pole portions. This is one bit, and a signal equal in polarity to the signal on the region 120b is reproduced with a slightly-smaller amplitude. Thus, as shown in FIG. 22, the short-wavelength magnetic head 8b records and reproduces the signal of the data sequence 122a of the main channel D1 and the signal of the data sequence 122 of the sub channel D2, while the magnetic head 8 for modulating the magnetic field reproduces the data sequence 122a of the main channel D1. Accordingly, there will be an advantage such that the compatibility can be ensured. The gap of the magnetic head 8 for modulating the magnetic field is preferably equal to 0.2 to 2 µm.

DESCRIPTION OF THE THIRD PREFERRED EMBODIMENT

Figure 23:
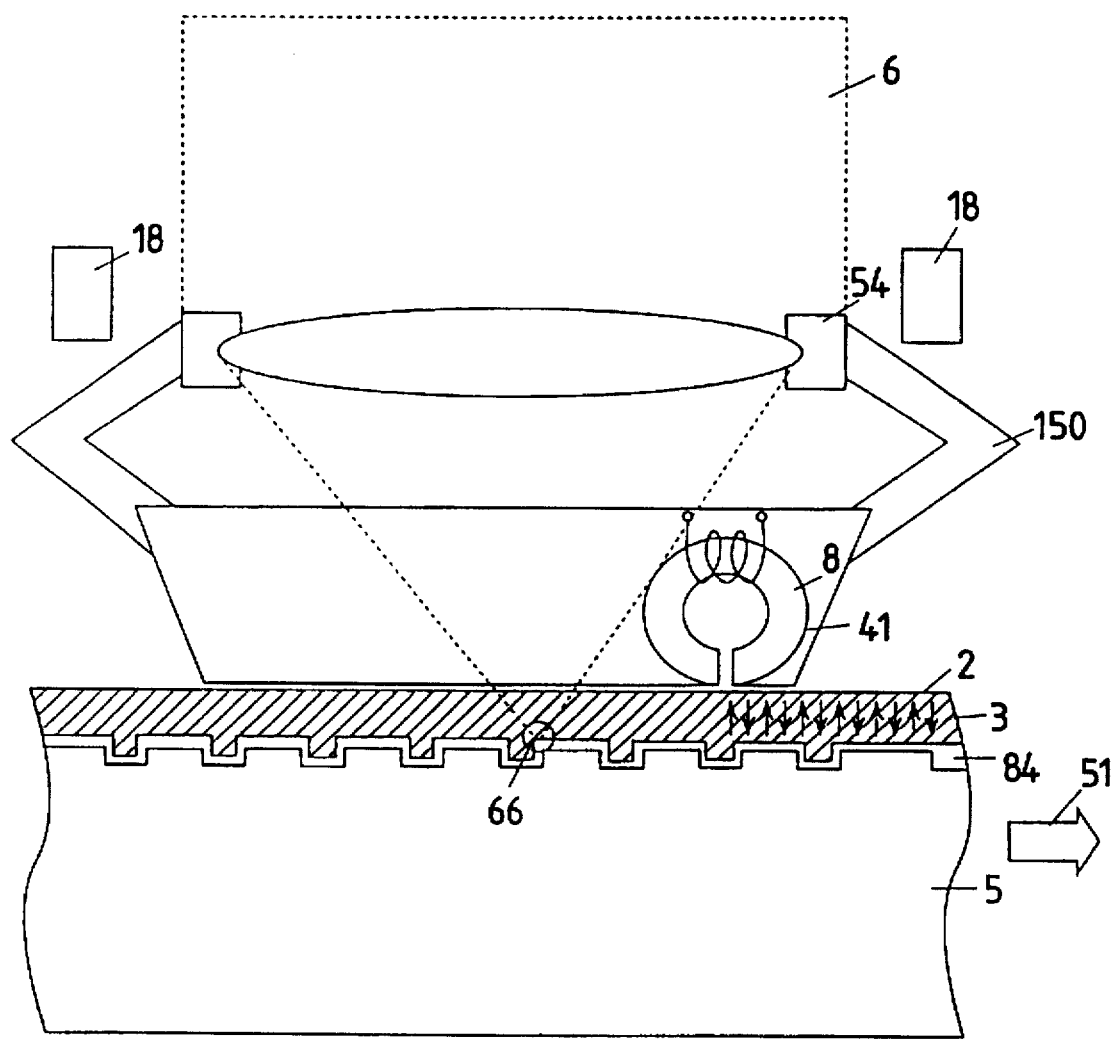
FIG. 23 is an enlarged view of a recording portion in a third embodiment of this invention.

FIG. 23 shows a recording portion of a third embodiment of this invention. In the third embodiment, a reflecting film 84 provided with pits as shown in FIG. 9 was formed on a transparent substrate 5 for a recording medium 2, and a magnetic recording film 3 was provided. This process is similar to the corresponding process in the first embodiment except that a film of Co-ferrite was formed by plasma CVD or others. This material has a transparency, and it has a high light transmissivity when its thickness is small.

As shown in FIG. 23, light emitted from an optical head 6 is focused into a spot 66 on the recording medium from the back side thereof. The optical head 6 has a lens 54 which is connected to a slider 41 by a connecting portion 150. The connecting portion 150 has a spring effect. The slider 41 is made of transparent material. A magnetic head 8 is embedded into the slider 41. Thus, the optical head 6 reads the pits in the reflecting film 84 from the back side, and thereby tracking and focusing are controlled. Thus, the slider 41 connected thereto is subjected to tracking control so that the optical head 6 can follow a given optical track. A positional error between the lens 54 and the slider 41 is caused by only the spring effect of the connecting portion 150, and the slider 41 is controlled with an accuracy of a micron order. Upward and downward head movement is done together with the focusing control, and the movement is controlled with an accuracy of an order of several microns to several tens of microns.

Segments of information are sequentially recorded on the magnetic recording layer 3 by magnetic recording. In this embodiment, since optical tracking is enabled, there is a remarkable advantage such that a track pitch of several microns can be realized. Since the slider 41 and the magnetic head 8 are moved upward and downward according to the focusing control, a given track can be correctly followed by the magnetic head 8 even when the surface accuracy of the substrate 5 of the recording medium 2 is low. Thus, it is possible to use a substrate having a low surface accuracy. Accordingly, there is an advantage such that an inexpensive substrate, for example, a plastic substrate or a non-polished glass substrate, can be used which is much cheaper than a polished glass substrate.

FIG. 23 shows the case where the optical head 6 executes the information reproduction on the recording medium 2 from the back side thereof. The information reproduction can also be done on the recording medium 2 by a mechanism such as a conventional optical disk player from the upper side thereof, and thus there is an advantage such that the compatibility can be ensured. In addition, there is a notable advantage such that a memory capacity greater than that in a conventional case by one or more orders can be realized by using the optical tracking.

DESCRIPTION OF THE FOURTH PREFERRED EMBODIMENT

Figure 24:
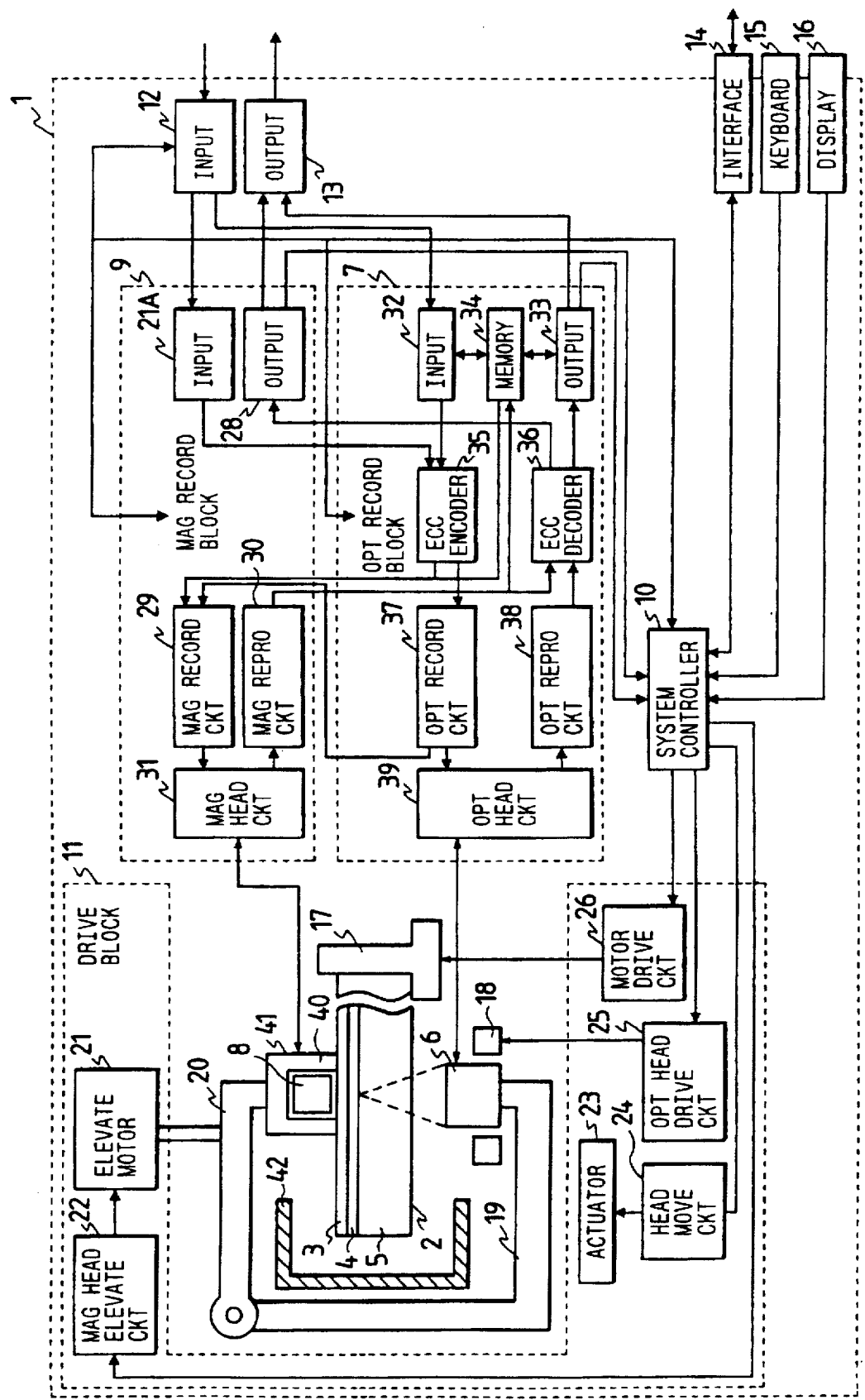
FIG. 24 is a block diagram of a recording and reproducing apparatus according to a fourth embodiment of this invention.

FIG. 24 shows a recording and reproducing apparatus according to a fourth embodiment of this invention which is similar to the recording and reproducing apparatus of FIG. 1 except for design changes indicated hereinafter. In the first embodiment, the magnetic head 8 uses the magneto-optical recording head for modulating the magnetic field as it is, and the vertical recording is done as shown in FIG. 3. On the other hand, in the fourth embodiment, as shown in FIG. 25, a magnetic head 8 has the function of horizontal magnetic recording and also the function of magneto-optical recording magnetic-field modulation, and the magnetic head 8 is used to execute horizontal recording on a magnetic recording layer 3 of a recording medium 2.

An equivalent head gap of the magnetic-field modulating head in the first embodiment, for example, a head for an MD (a mini-disk), is generally 100 µm or greater, so that the recording wavelength λ is several hundreds of µm. In this case, a counter magnetic field is generated and thus a magnetism effectively used for actual recording is reduced, so that the level of a reproduced output is lowered. The first embodiment has a remarkable advantage such that a cost increase is prevented since a change of the structure is unnecessary, but the level of a reproduced output tends to be low.

In the case where a high level of a reproduced output is required with respect to long-wavelength recording, horizontal recording is preferable. In order to realize the horizontal recording, the fourth embodiment is modified from the first embodiment in a manner such that the structure of a magnetic head is changed and a recording system is changed from vertical recording to horizontal recording.

Figure 25:
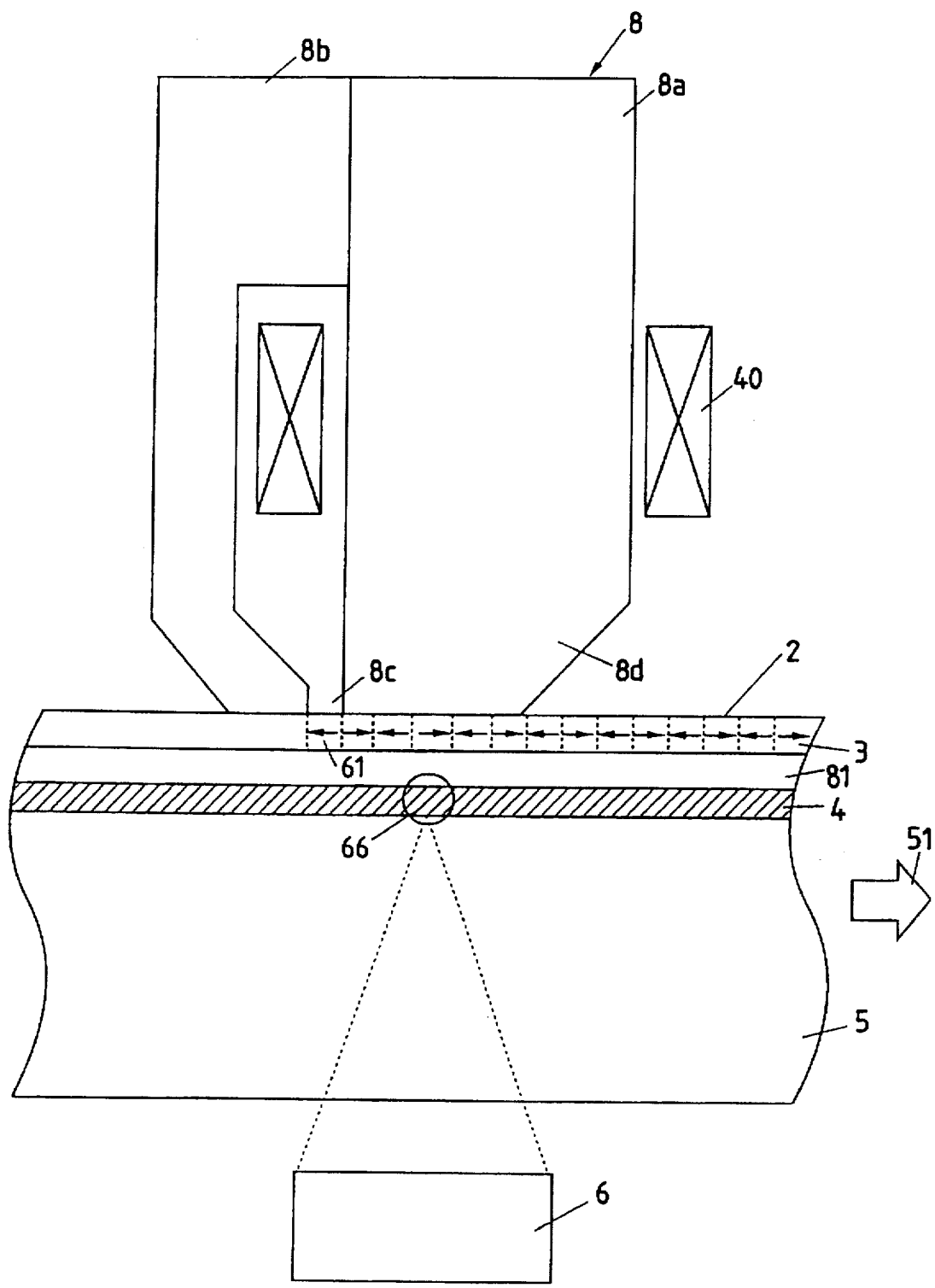
FIG. 25 is an enlarged view of a magnetic recording portion in the fourth embodiment.

As shown in FIG. 25, the magnetic head 8 of the fourth embodiment has a main magnetic pole 8a, a sub magnetic pole 8b, a head gap 8c, and a winding 40. The main magnetic pole 8a has the function of a magnetic head for modulating a magnetic field. The sub magnetic pole 8b serves to form a closed magnetic circuit. The head gap 8c has a gap length L. During horizontal recording, the magnetic head 8 is regarded as a ring head having a gap length L. The magnetic head 8 is designed so as to apply a uniform magnetic field to an optical recording layer 4 during the magneto-optical recording of the magnetic field modulation type.

In the case of a magnetic recording mode of operation which is shown in FIG. 25, light emitted from the optical head 6 is focused into a spot 66 on the optical recording layer 4, and the optical head 6 reads out track information or address information therefrom. The optical head 6 is subjected to tracking control so that a given optical track can be scanned. Thus, the magnetic head 8 connected to the optical head 6 travels on a given magnetic track. As shown in FIG. 25, while the recording medium 2 is moved in a direction 51, horizontal magnetic signals 61 are sequentially recorded in the magnetic recording layer 3 in accordance with an electric information signal fed from a magnetic recording block 9. When the gap length is denoted by L and the recording wavelength is denoted by λ, there is a relation as λ>2L. Thus, as the gap length L is decreased, a recording capacity is greater. In the case where the gap length L is reduced, a region subjected to a uniform magnetic field is narrowed during the generation of a modulation magnetic field for the magneto-optical recording. Thus, in this case, the recordable region with respect to the light spot 66 provided by the optical head 6 is narrowed and it is necessary to increase the accuracy of the sizes of the recording medium and the tracking mechanism, and thus the cost tends to be increased.

Figure 26:
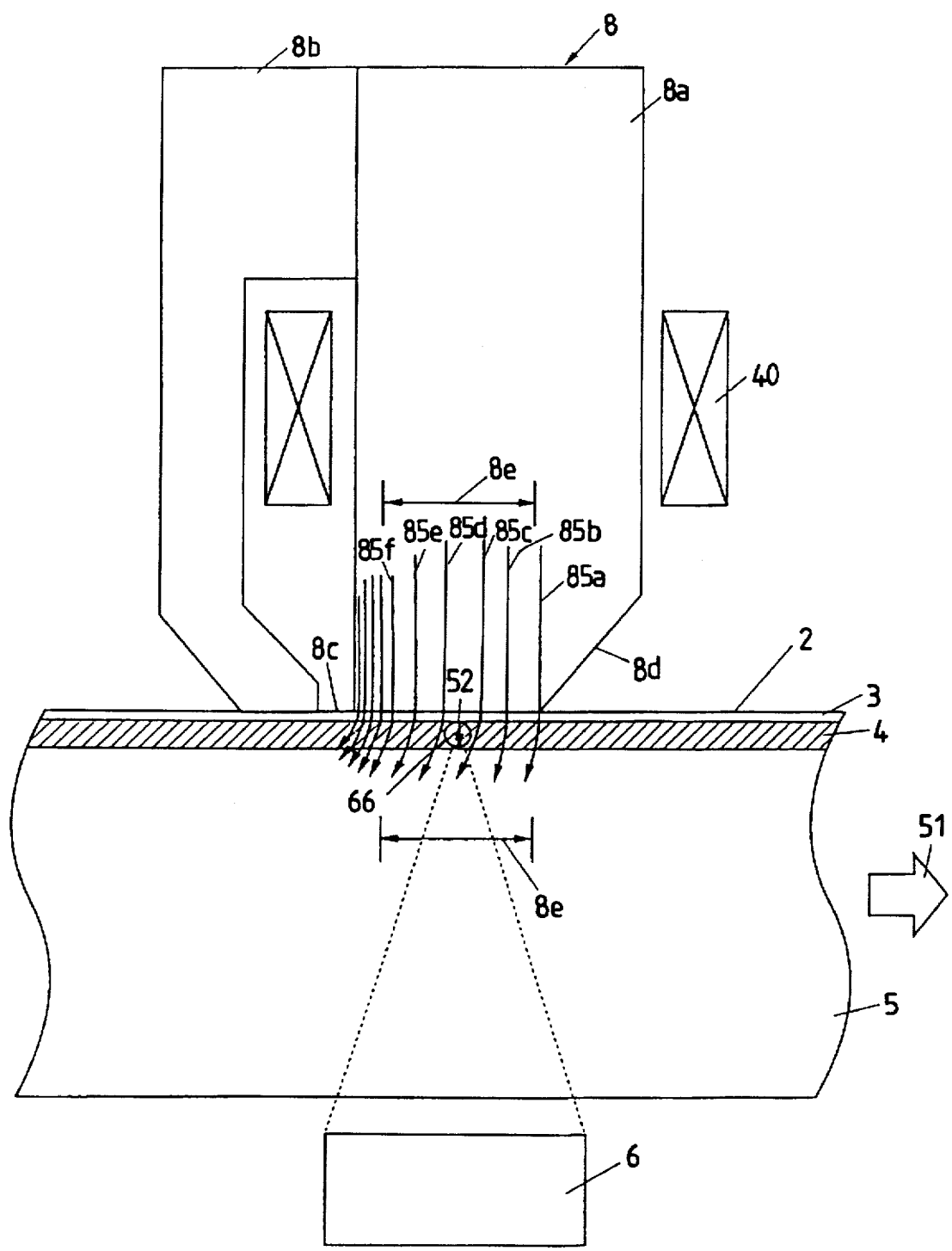
FIG. 26 is an enlarged view of a magneto-optical recording portion in the fourth embodiment.

In the case of the execution of the magneto-optical recording as shown in FIG. 26, a spot 66 of laser light from the optical head 6 heats the corresponding point of the optical recording layer 4 to a temperature equal to or higher than a Curie temperature thereof. The point of the optical recording layer 4 which is exposed to the light spot 66 is magnetized in accordance with a modulation magnetic field generated by the magnetic head 8, and segments of an information signal 52 are sequentially recorded on the optical recording layer 4. The positional relation between the optical head 6 and the magnetic head 8 is affected by the accuracy of the size of the tracking mechanism which includes a head base 19. In the case of an MD, to lower the cost, the standard of the size accuracy is lenient. Thus, when worst conditions are considered, there is a chance that the positional relation between the optical head 6 and the magnetic head 8 is greatly out of order. Accordingly, it is preferable that the area of a region 8e exposed to a uniform magnetic field is as large as possible.

As shown in FIG. 26, the main magnetic pole portion 8a of the magnetic head 8 is formed with a tapered condensing section 8d, and thereby right-hand magnetic fluxes 85a and 85b are condensed so that a magnetic field is strengthened. Thus, the magnetic fluxes 85a and 85b are made equivalent to magnetic fluxes 85c, 85d, 85e, and 85f, and there is an advantage such that the region 8e exposed to a uniform magnetic field is enlarged. In this way, even when the relative position between the optical head 6 and the magnetic head 8 moves out of the correct position so that the relative position between the light spot 66 and the magnetic head 8 also moves out of the correct position, an optimal modulation magnetic field is applied to the optical recording layer 4 provided that the light spot 66 exists within the region 8e exposed to the uniform magnetic field. Accordingly, the magneto-optical recording is surely executed, and an error rate is prevented from being worse.

As shown in FIG. 31, magnetic fluxes of the magnetically recorded signal 61 on the magnetic recording layer 3 are formed as magnetic fluxes 86a, 86b, 86e, and 86d. During the magneto-optical recording, the portion of the magneto-optical recording material which is heated by the light spot 66 to a temperature equal to or higher than the Curie temperature thereof is subjected to the magnetic field of the magnetic flux 86a by the magnetically recorded signal 61 and also the modulation magnetic field from the magnetic head 8. When the magnetic field of the magnetic flux 86a is stronger than the modulation magnetic field from the magnetic head 8, the magneto-optical recording responsive to the modulation magnetic field can not be correctly done. Thus, it is necessary to limit the magnitude of the magnetic flux 86a to a given level or less. Accordingly, an interference layer 81 having a thickness d is provided between the magnetic recording layer 3 and the optical recording layer 4 to reduce the adverse influence of the magnetic flux 86a. When the shortest recording wavelength is denoted by $\lambda$, the strength of the magnetic flux 66 at the optical recording layer 4 is attenuated by about $54.6 \times d/\lambda$. In the case of a recording medium, it can be thought that various recording wavelengths $\lambda$ are used. It is general that the shortest recording wavelength is equal to 0.5 µm. In this case, when the thickness d is 0.5 µm, attenuation of about 60 dB is obtained so that the adverse influence of the magnetically recorded signal 61 hardly occurs.

As previously described, by using an interference film of a thickness of 0.5 µm or greater between the magnetic recording layer 3 and the optical recording layer 4, there is provided an advantage such that the magnetically recorded signal hardly affects the magneto-optical recording. The interference film is preferably made of non-magnetic material or magnetic material having a weak coercive force.

Figure 27:
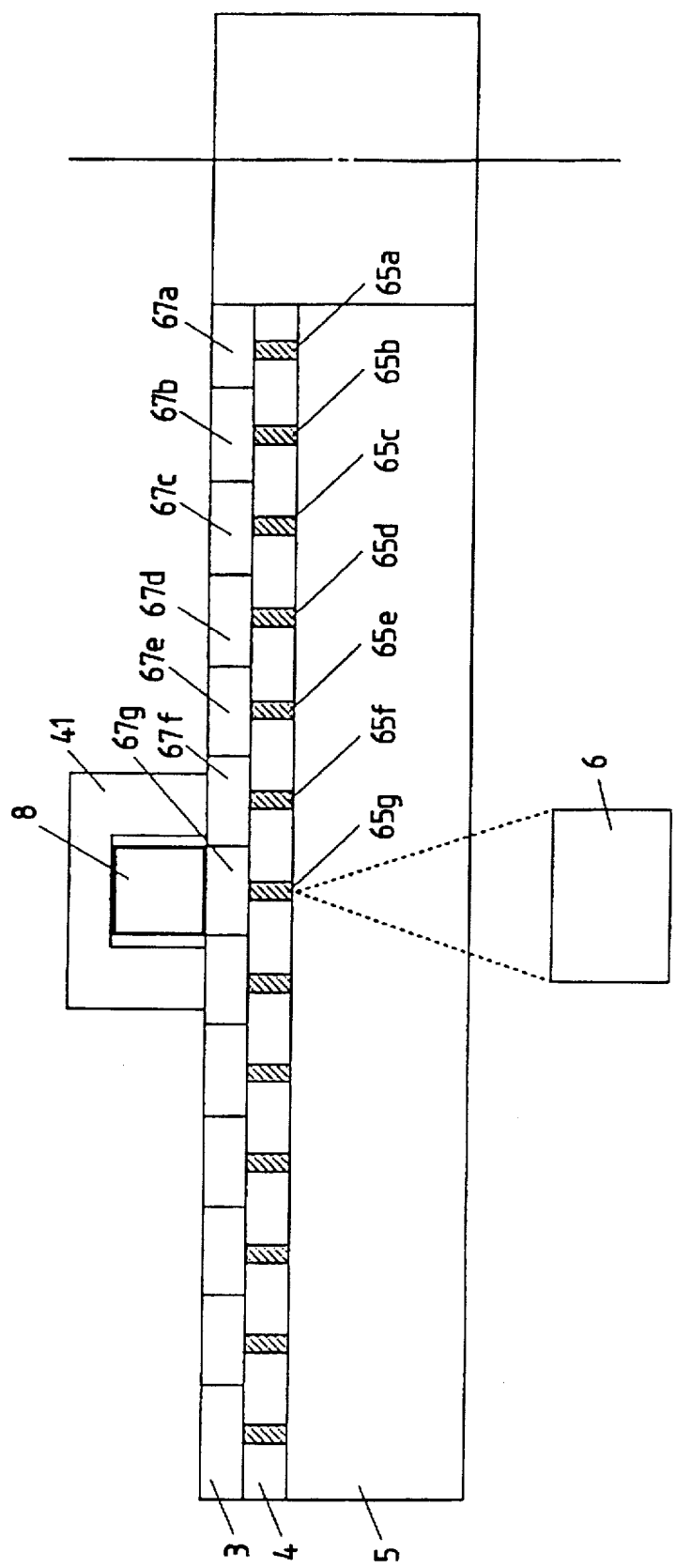
FIG. 27 is a sectional view of a recording portion in the fourth embodiment.

In the case where the magneto-optical recording and the magnetic recording are done by using a magneto-optical recording medium, a modulation magnetic field is prevented from injuring a recorded magnetic signal provided that the modulation magnetic field for the magneto-optical recording is sufficiently weaker than the coercive force of magnetic material for a magnetic recording layer. When a ring-type head is used as in the previously-mentioned case, a strong magnetic field occurs in a head gap portion. Thus, even if the modulation magnetic field is weak, there is a chance that the modulation magnetic field adversely affects a recorded magnetic signal and thus an error rate is increased. This problem is resolved as follows. In the case of recording on a magneto-optical recording medium, as shown in FIG. 27, before the optical head 6 records a main information signal on the optical recording layer, an information signal magnetically recorded on a magnetic track 67g at the opposite side of an optical track 65g to be scanned is transferred to the memory 34 in the recording and reproducing apparatus or written on the optical recording layer to be saved. The saving prevents a problem even when recorded data in the magnetic recording layer are damaged by the modulation magnetic field during the magneto-optical recording.

Figure 28:
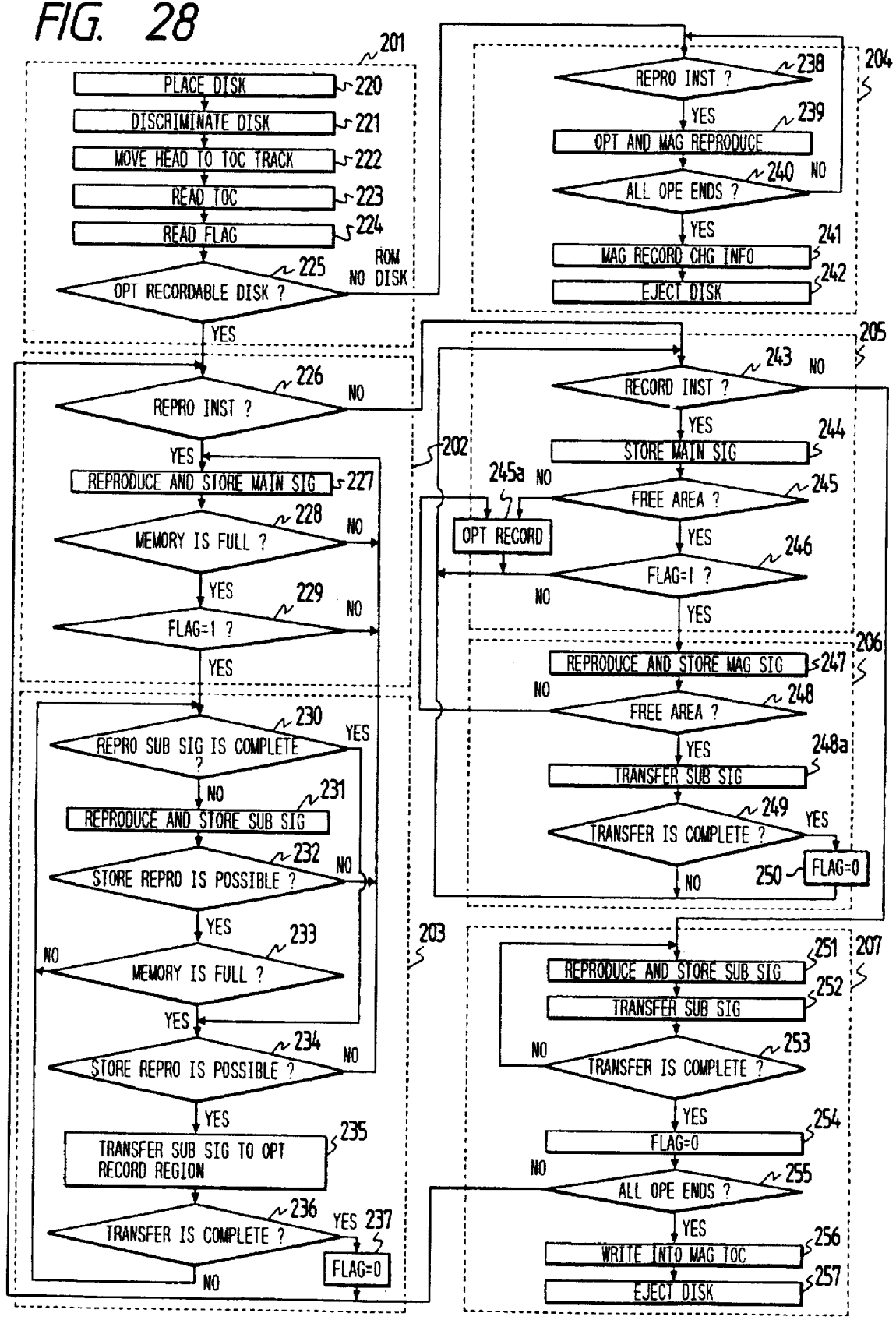
FIG. 28 is a flowchart of a program in the fourth embodiment.

A system controller 10 operates in accordance with a program stored in an internal ROM. FIG. 28 is a flowchart of this program. The program of FIG. 28 is divided into six large blocks. A decision block 201 decides the character of a disk. In the case of a ROM disk, an exclusive-reproduction block 204 is used. In the case of reproduction on an optical RAM disk, a reproduction block 202 is executed and sometimes a reproduction/transfer block 203 is executed. In the case of recording on an optical RAM disk, a recording block 205 is used and sometimes a recording/transfer block 206 is used. In the presence of a free time, only transfer is executed by a transfer block 207.

The program of FIG. 28 will now be described in more detail. In the decision block 201, a step 220 places a recording medium 2, that is, a disk, into a correct position or an operable position. A step 221 decides the type of the disk by detecting a click on a disk cassette such as shown in FIG. 16. There are various disk types such as a ROM, a RAM, an magneto-optical recording medium, an optical recording prevention disk, and a magnetic recording prevention disk. A subsequent step 222 moves the optical head 6 to a position aligned with an inner most optical track 65a and an innermost magnetic track 67a. A step 223 reads out magnetic information data and optical information data from a TOC region of the recording medium. In the case of a music disk, data is inputted which represents a music number at the end of previous operation. In the case of a game disk, data is inputted which represents a stage number at the previous end of the game. As shown in FIG. 16, when the user desires continuation in response to the inputted data, conditions at the end of previous operation are retrieved. A step 224 reads out an un-transfer flag from the magnetic TOC region. The un-transfer flag being "1" represents that magnetic data which is not transferred to an optical data section remains. The un-transfer flag being "0" represents it does not remain. A step 225 decides whether the disk is a magneto-optical disk or a ROM disk. When the disk is a ROM disk, an advance toward a step 238 is done. When the disk is a magneto-optical disk, an advance toward a step 226 is done. When the step 238 detects the presence of a reproducing instruction, a step 239 reproduces an optically recorded signal and a magnetically recorded signal. When the operation ends at a step 240, a step 241 writes information into the TOC region of the magnetic track. The written information represents various changes occurring during the reproduction, for example, changes in the music reproduction order, and the music number at the end of the operation. After writing the information is completed, a step 242 ejects the disk.

As previously described, when the disk is a magneto-optical disk, an advance toward a step 226 is done. In the presence of a reproducing instruction, an advance to a step 227 is done. Otherwise, an advance to a step 243 is done. The step 227 executes reproducing a main recorded signal on an optical recording surface at a speed higher than a normal reproduction speed, and sequentially stores the reproduced information into a memory. In the case of a music signal, an amount of data which corresponds to several seconds can be stored. Thus, even if the reproduction is interrupted, reproduced music can be continued. When a step 228 detects that the memory is completely filled with the reproduced information, a step 229 is executed. When the step 229 decides that an un-transfer flag is "1", the reproduction of the main recorded signal is interrupted and an advance to a step 230 in the reproduction/transfer block 203 is done. A check is made as to whether or not all of a sub recorded signal on a magnetic recording surface has been reproduced. When the result of the check is Yes, an advance to a step 234 is done. Otherwise, an advance to a step 231 is done, and the sub recorded signal on the magnetic recording surface is reproduced and the reproduced information is stored into the memory. A step 232 checks whether or not outputting the stored main recorded signal such as the music signal is still possible. When the result of the check is No, a return to the step 227 is done and reproducing and storing the main recorded information are executed. In the case where the result of the check is Yes, at the moment at which the sub recorded signal reaches a preset memory amount in a step 233, the step 234 again checks whether or not storing and reproducing the main recorded signal can be done. When the result of the check is Yes, a step 235 transfers and writes the sub recorded signal from the memory into a transfer region on the optical recording surface. Then, a step 236 checks whether or not transferring all the data is completed. When the result of the check is No, a return to the step 230 is done and the transfer is continued. When the result of the check is Yes, a step 237 changes the un-transfer flag from "1" to "0" and then a return to the step 226 is done.

In the case of recording on the optical recording layer, an advance to a step 243 in the recording block 205 is done, and a check is given with respect to a recording instruction. When the result of the check is Yes, a step 244 executes storing the main recorded signal into the memory and the optical recording is not executed. A step 245 checks whether or not the memory has a free area. When the result of the check is No, a step 245a executes the optical recording of the main recorded signal and a return to the step 243 is done. When the result of the check is Yes, an advance to a step 246 is done. When the un-transfer flag is not "1", a return to the step 243 is done. Otherwise, an advance to a step 247 in the recording/transfer block 206. The step 247 stores the main recorded signal into the memory and simultaneously reproduces a sub recorded signal on a magnetic track 67g at the opposite side of an optical track 65g of FIG. 27 which is planned to be subjected to the optical recording at this time. In addition, the step 247 stores the reproduced sub recorded signal into the memory. A step 248 checks whether or not the memory has a free area. When the result of the check is Yes, a step 248a transfers and writes the sub recorded signal into the optical recording layer. When the result of the check is No, a return to the step 245a is done and the optical recording is executed. A step 249 checks whether or not transferring all the data has been completed. When the result of the check is Yes, a step 250 changes the un-transfer flag from "1" to "0" and then a return to the step 243 is done. Otherwise, nothing is done and a return to the step 243 is done.

The step 243 checks whether or not a recording instruction is present. When the result of the check is No, an advance to a step 251 in the transfer block 207 is done. Here, recording and also reproducing the main recorded signal are unnecessary, and thus only the transfer of a sub recorded signal from a magnetic data surface to an optical data surface is executed. The step 251 executes reproducing the sub recorded information and storing the reproduced sub recorded information into the memory. A step 252 executes the transfer of the sub recorded signal from the memory to the optical recording layer. A step 253 checks whether or not transferring all the data has been completed. When the result of the check is No, a return to the step 251 is done so that the transfer is continued. Otherwise, a step 254 changes the un-transfer flag from "1" to "0", and then a step 255 checks whether or not all the operation has been ended. When the result of the check is No, a return to the first step 226 is done. Otherwise, an advance to a step 256 is done, and the information which has been changed by this work and other information such as information representing that the un-transfer flag is "0" are magnetically recorded on the TOC region of a magnetic track. Then, a step 257 ejects the disk, and the work regarding this disk is ended.

It should be noted that the step 256 may again write all the sub recorded signal into the magnetic recording layer from the memory to return the magnetic recording layer to the conditions which occur before the execution of the optical recording.

As previously described, only the data in the magnetic track among the data on the magnetic recording surface, which might be damaged by a modulation magnetic field during the optical recording, is transferred and saved into the memory or the optical recording surface. Thus, there is an advantage such that a damage to the data on the magnetic recording surface can be substantially prevented.

Optical recording may be done by recording saved data on a magnetic track again and retrieving the saved data after the work of optical recording. In this case, there is an advantage such that data on a magnetic recording surface is retrieved upon the ejection of a disk.

Figure 29:
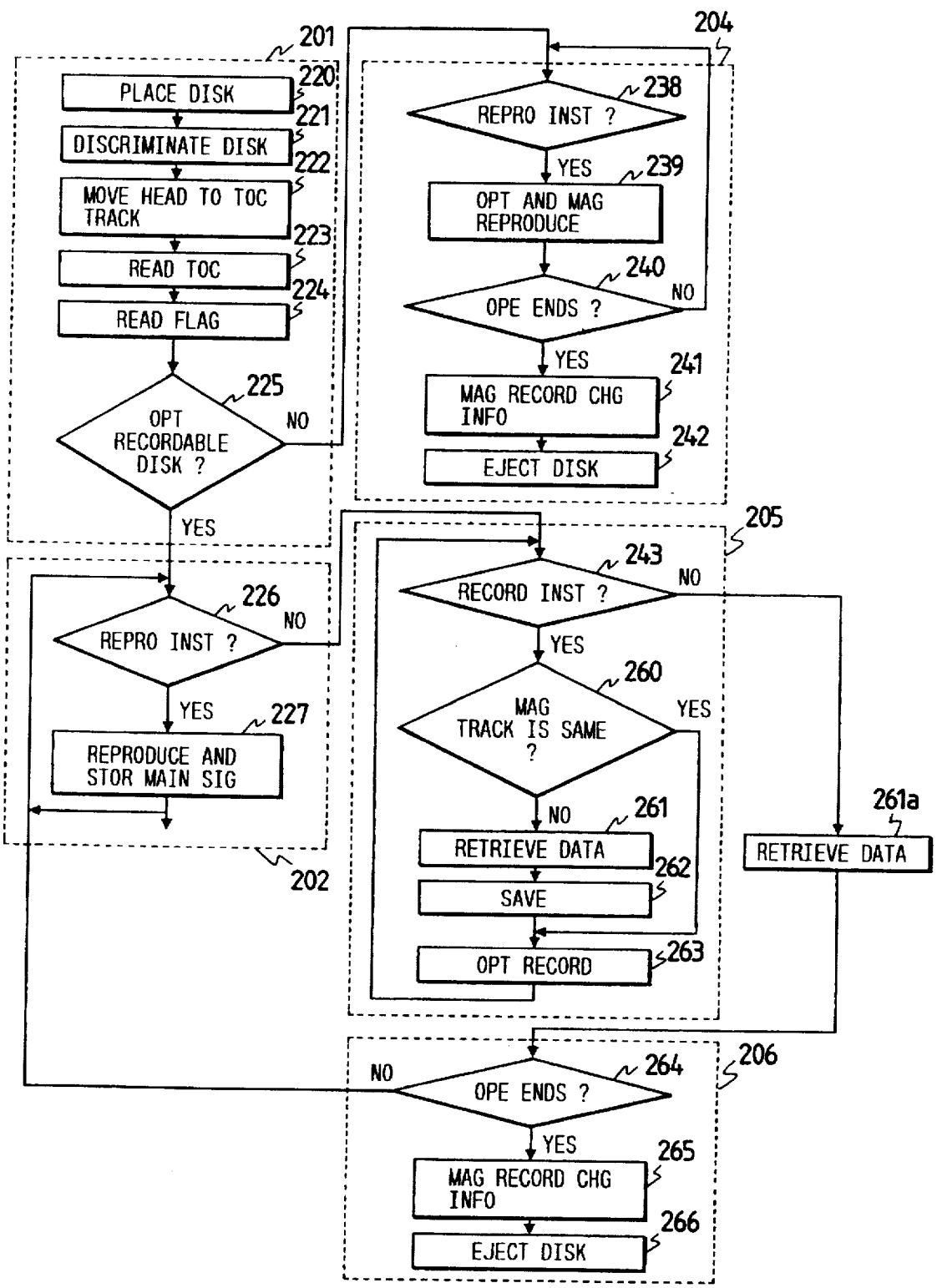
FIG. 29 is a flowchart of a program in the fourth embodiment.

The design of FIG. 28 uses a method where data on a magnetic recording surface, which might be damaged, is transferred to an optical recording surface before magneto-optical recording is done. On the other hand, a design of FIG. 29 uses a method where data transfer to an optical recording surface is not executed. A decision block 201, a reproduction block 202, and an exclusive reproduction block 204 of FIG. 29 are similar to those of FIG. 28, and a description thereof will be omitted. Since the data transfer is not executed, it is unnecessary to provide a reproduction/transfer block 203, a recording/transfer block 206, and a transfer block 207. A recording block 205 of FIG. 29 differs from that of FIG. 28, and a detailed description thereof will be given hereinafter.

A step 226 in the reproduction block 202 checks whether or not a reproducing instruction is present. When the result of the check is No, an advance to a step 264 is done. Otherwise, an advance to a step 260 is done. The step 260 manages a processed optical track in unit of a magnetic track, and a calculation is given of a magnetic track at the opposite side of an optical track which may be damaged by magneto-optical recording. In addition, a check is made as to whether or not the present track is the same as the track subjected to previous saving. When the result of the check is Yes, a step 263 executes magneto-optical recording on the optical track. Otherwise, a step 261 writes the saved data into the previous magnetic track, and thereby the data on the previous magnetic track can be fully retrieved. Next, a step 262 reads out data from the magnetic track which may be damaged at this time, and saves the readout data into the memory. Then, a step 263 executes recording on the optical track, and a return to a step 243 is done. When the result of a check by the step 243 is No, a step 261 a retrieves the previous conditions of the magnetic track. Thereafter, a step 264 in an end block 206A checks whether or not the operation is ended. When the result of the check is No, a return to the step 226 is done. Otherwise, a step 265 executes magnetically recording information which has been changed during the interval from the placement of the disk to the end, for example, information of the ending music number. Then, a step 266 ejects the disk. In this way, the work is ended. When a next disk is placed into an apparatus, the work is started again at the step 220.

In the design of FIG. 28, all the magnetic data is transferred to the optical recording layer to cope with a damage to the magnetic data by the magneto-optical recording. On the other hand, in the design of FIG. 29, magnetic data is managed in unit of a magnetic track, and reading is given on only magnetic data from a magnetic track which may be damaged by the magneto-optical recording. The readout data is stored into the memory. When the magnetic track is damaged by the magneto-optical recording and optical recording on another magnetic track is done, the former magnetic track is completely retrieved. Thereby, a memory capacity which corresponds to one magnetic track to three magnetic tracks suffices, and the capacity of the memory can be relatively small. As made clear from FIG. 29, the design of this drawing has an advantage such that a simple process can protect magnetic data from being damaged by the magneto-optical recording.

As shown in FIG. 30(a) and FIG. 30(b), a reproducing process can be given on a magneto-optical disk and a CD by using a same mechanism. In the case of a CD, since a protective cartridge is absent, the CD tends to be affected by an external magnetic field. By setting a magnetic coercive force in a magnetic recording layer 3 of a CD to 1,000 to 3,000 Oe and thus making it much stronger than that in a magnetic recording layer of a magneto-optical recording medium, there is provided an advantage such that magnetic data can be prevented from being damaged by an external magnetic field. In the case of a magneto-optical disk, if a magnetic coercive force is increased to a level near the magnitude of a modulation magnetic field, the magnetic coercive force can provide an adverse influence. Thus, the magnetic coercive force is set to 1,000 Oe or less.

DESCRIPTION OF THE FIFTH PREFERRED EMBODIMENT

Figure 32:
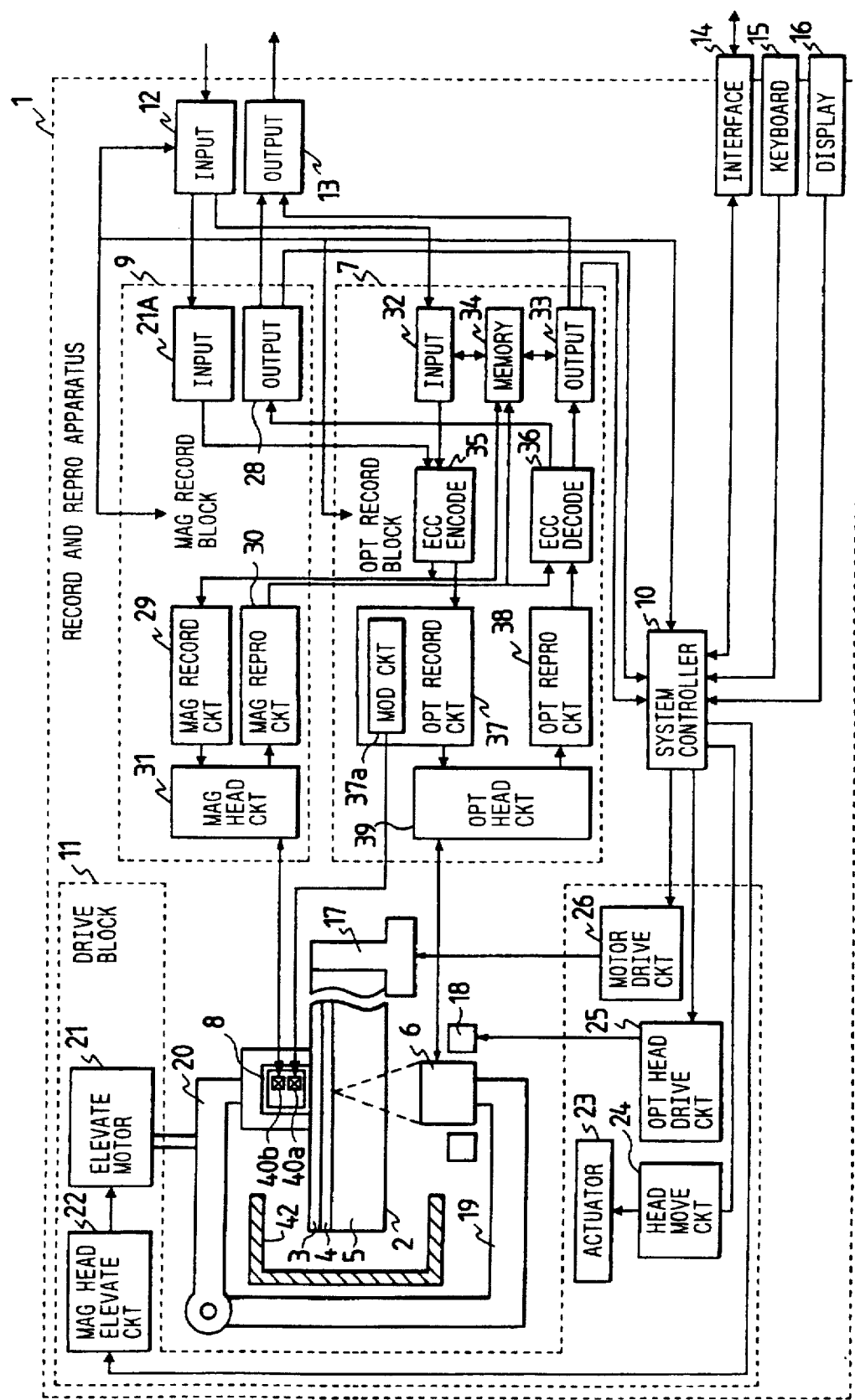
FIG. 32 is a block diagram of a recording and reproducing apparatus according to a fifth embodiment of this invention.

FIG. 32 shows a recording and reproducing apparatus according to a fifth embodiment of this invention which is similar in basic operation to the apparatus of FIG. 1 and FIG. 24 related to the first embodiment and the fourth embodiment. The fifth embodiment differs from the first embodiment in the following points.

Figure 33:
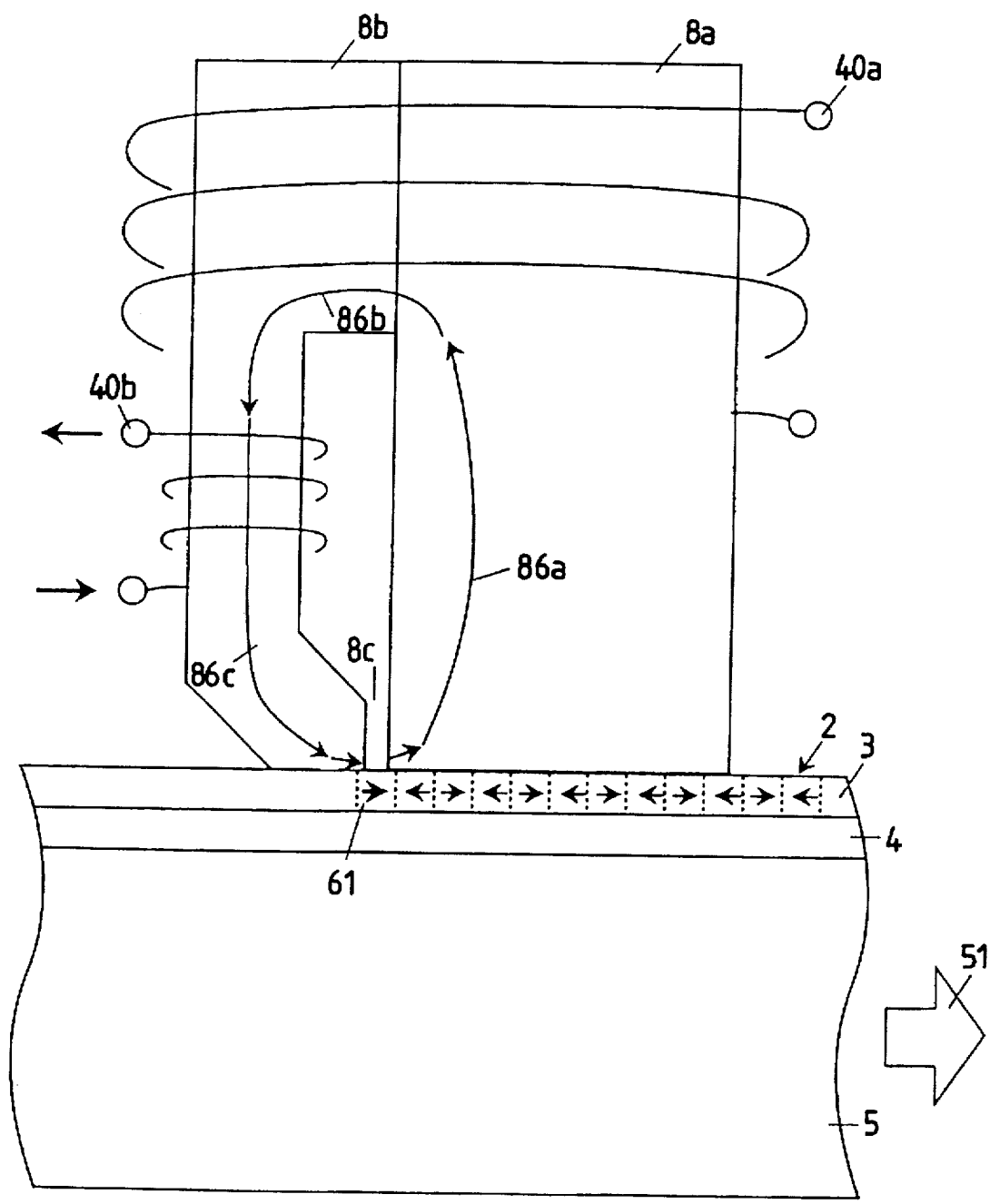
FIG. 33 is an enlarged view of a magnetic recording portion in the fifth embodiment.

As shown in FIG. 33, the fifth embodiment includes two windings, that is, a magnetic-field modulating winding 40a and a magnetically recording winding 40b. With reference to FIG. 32, during the magnetic recording or reproduction, a magnetic head circuit 31 feeds or receives a current to or from the magnetic recording winding 40b to execute the magnetic recording or reproduction.

During the execution of the magneto-optically recording of the magnetic-field modulation type, a magnetic-field modulating circuit 37a in an optical recording circuit 37 feeds a modulation signal to the magnetic-field modulating winding 40a to realize the magneto-optical recording.

With reference to FIG. 33, a description will now be given of operation of the recording and reproducing apparatus which occurs during the magnetic recording and reproduction. A recording current fed from the magnetic head circuit 31 flows in a direction denoted by the arrow in the drawing. Thus, a magnetic closed circuit of magnetic fluxes 86c, 86a, and 86b is formed, and time segments of an information signal 61 are sequentially recorded on a magnetic recording layer 3. The magnetic recording is done in a horizontal direction. In this case, no current is basically fed to the magnetic-field modulating winding 40a. In this structure, a closed magnetic circuit including a gap 8c is formed, and optimal designing of a reproduction sensitivity is enabled.

Figure 34:
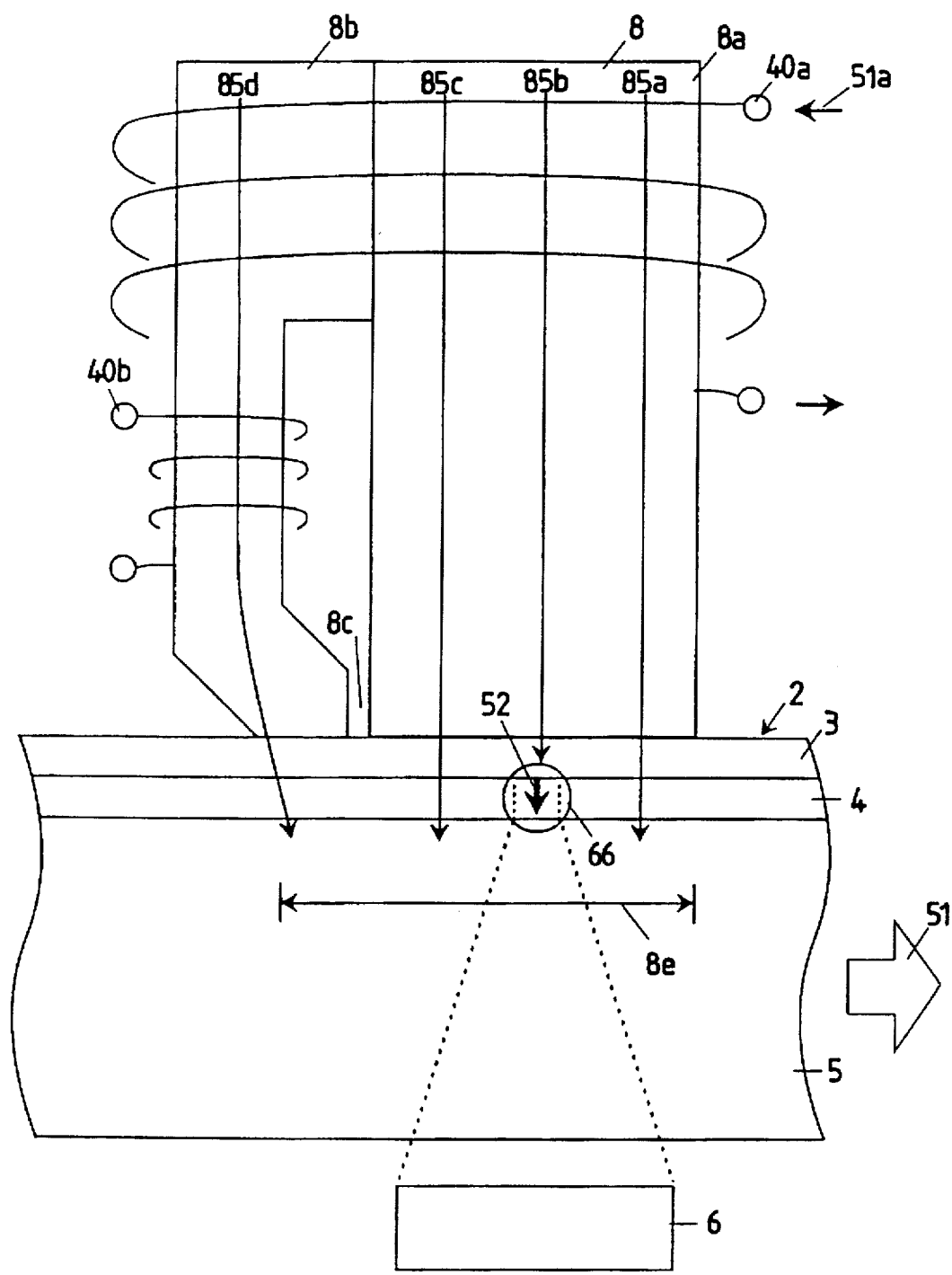
FIG. 34 is an enlarged view of a magneto-optical recording portion in the fifth embodiment.

With reference to FIG. 34, a description will now be given of operation of the recording and reproducing apparatus which occurs during the magneto-optical recording. The magnetic-field modulating winding 40a is wound on a main magnetic pole 8a and a sub magnetic pole 8b of a yoke in equal directions. Thus, when a modulating current flows from the magnetic-field modulating circuit 37a in a direction 51a, downward magnetic flues 85a, 85b, 85c, and 85d occur. Magneto-optically recording material in a point of an optical recording layer 4, which is exposed to a light spot 66 and which is heated to a Curie temperature thereof or higher, undergoes magnetization inversion in response to the magnetic field so that an information signal 52 is recorded. In this case, the strength of the magnetic field at the light spot 66 is generally set to 50–150 Oe in a region 8e exposed to a uniform magnetic field. As shown in FIG. 25, it is preferable to provide an interference layer 81 to prevent the magneto-optical recording material from being subjected to magnetization inversion in response to an information signal 61. It is good to set the thickness d of the interference layer 81 as λ>d.

Figure 35:
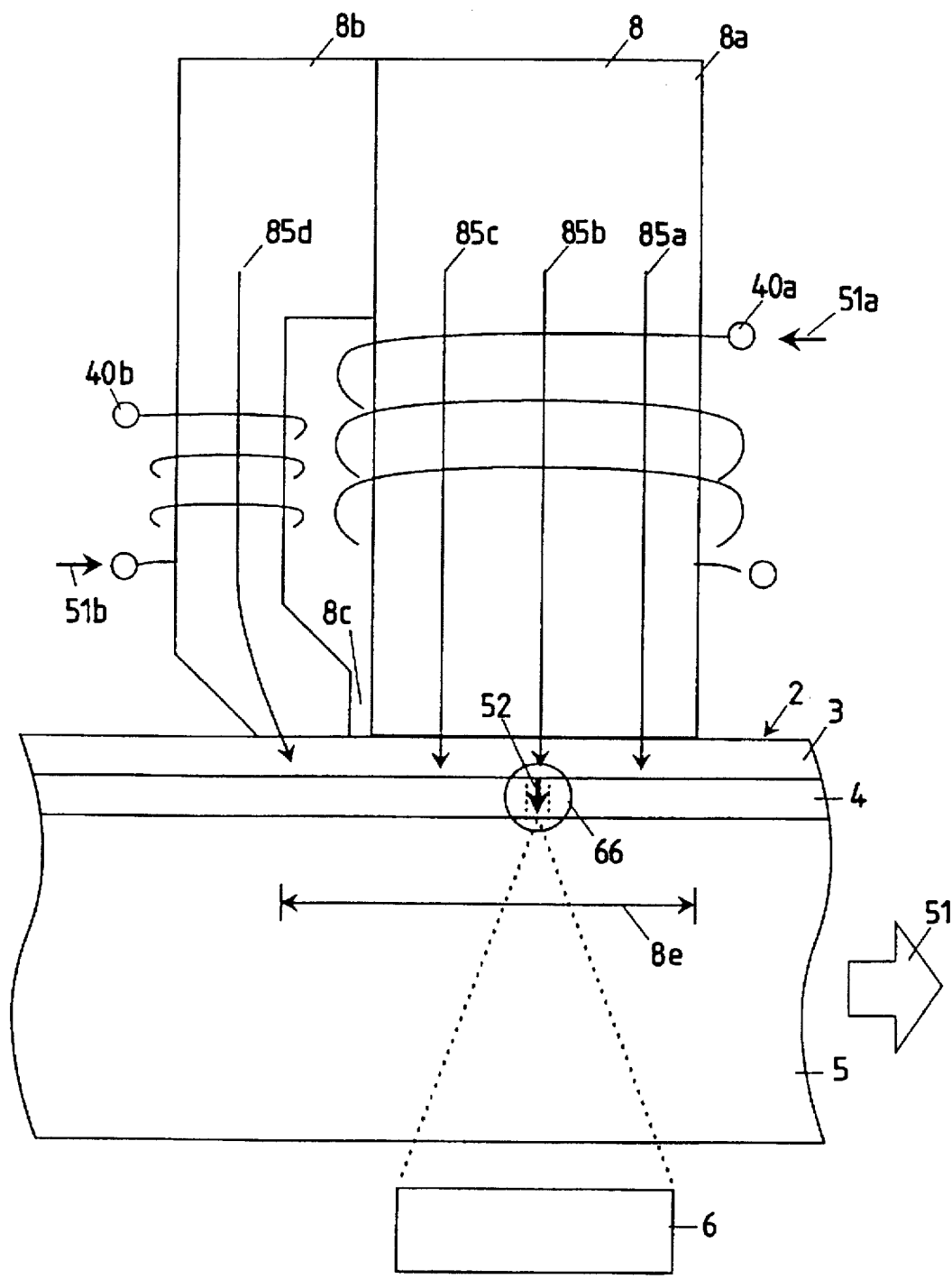
FIG. 35 is an enlarged view of a magneto-optical recording portion in the fifth embodiment.

The structure of FIG. 34 has an advantage such that the region 8e exposed to the uniform magnetic field can be wide. In addition, since recording heads can be independently designed with respect to the two windings, there is provided an advantage such that optimal magnetic-field modulating characteristics, optimal magnetic recording characteristics, and optimal magnetic reproducing characteristics can be attained. Since the head gap 8c of FIG. 33 can be small, it is possible to shorten the wavelength which occurs during the magnetic recording. Since optimal designing of the formation of a closed magnetic field is enabled, the reproduction sensitivity can be enhanced. As shown in FIG. 34, during the magnetic-field modulation, the magnetic flux 85a of the main magnetic pole 8a and the magnetic flux 85d of the sub magnetic pole 8b extend in the equal directions, so that a strong magnetic field does not occur in the gap 8c but only a weak magnetic field corresponding to the modulation magnetic field occurs. Since a magnetic coercive force in the magnetic recording layer 3 is 800–1,500 Oe and is adequately stronger than the modulation magnetic field and since there is an easily magnetized axis in a horizontal direction, there is provided an advantage such that a magnetically recorded signal 61 is prevented from being damaged by the modulation magnetic field. Thus, by setting the magnetic coercive force Hc of the magnetic recording layer 3 stronger than the recording magnetic field Hmax applied to the magneto-optical recording material, a damage to the data is prevented. In the case of the provision of an allowance corresponding to double, it is good to maintain a relation as Hc<2Hmax. In addition, it is good to fabricate a recording medium 2 shown in FIG. 8. As shown in FIG. 35, in a magnetic head 8, windings 40a and 40b may be separately wound on a main magnetic pole 8a and a sub magnetic pole 8b respectively. In this case, during the magnetic-field modulation, a modulating current is also driven through the magnetic recording winding 40b in a direction 51b by using a magnetic head circuit 31, and thereby a magnetic flux 85d occurs which extends in a direction equal to the directions of the magnetic fluxes 85c, 85b, and 85a. Thus, it is possible to obtain an advantage similar to the advantage of the design of FIG. 34.

Figure 36:
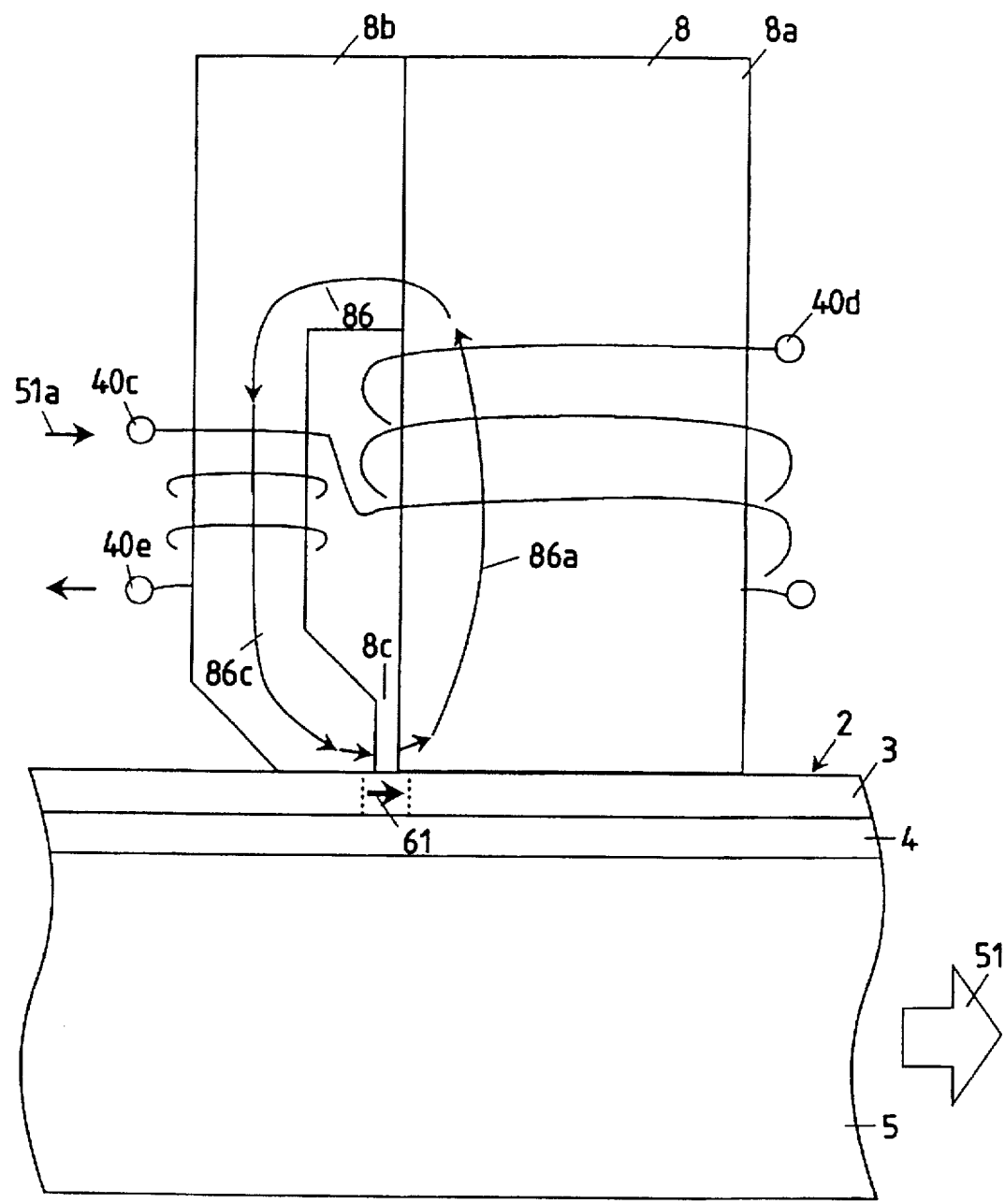
FIG. 36 is an enlarged view of a magnetic recording portion in the fifth embodiment.
Figure 37:
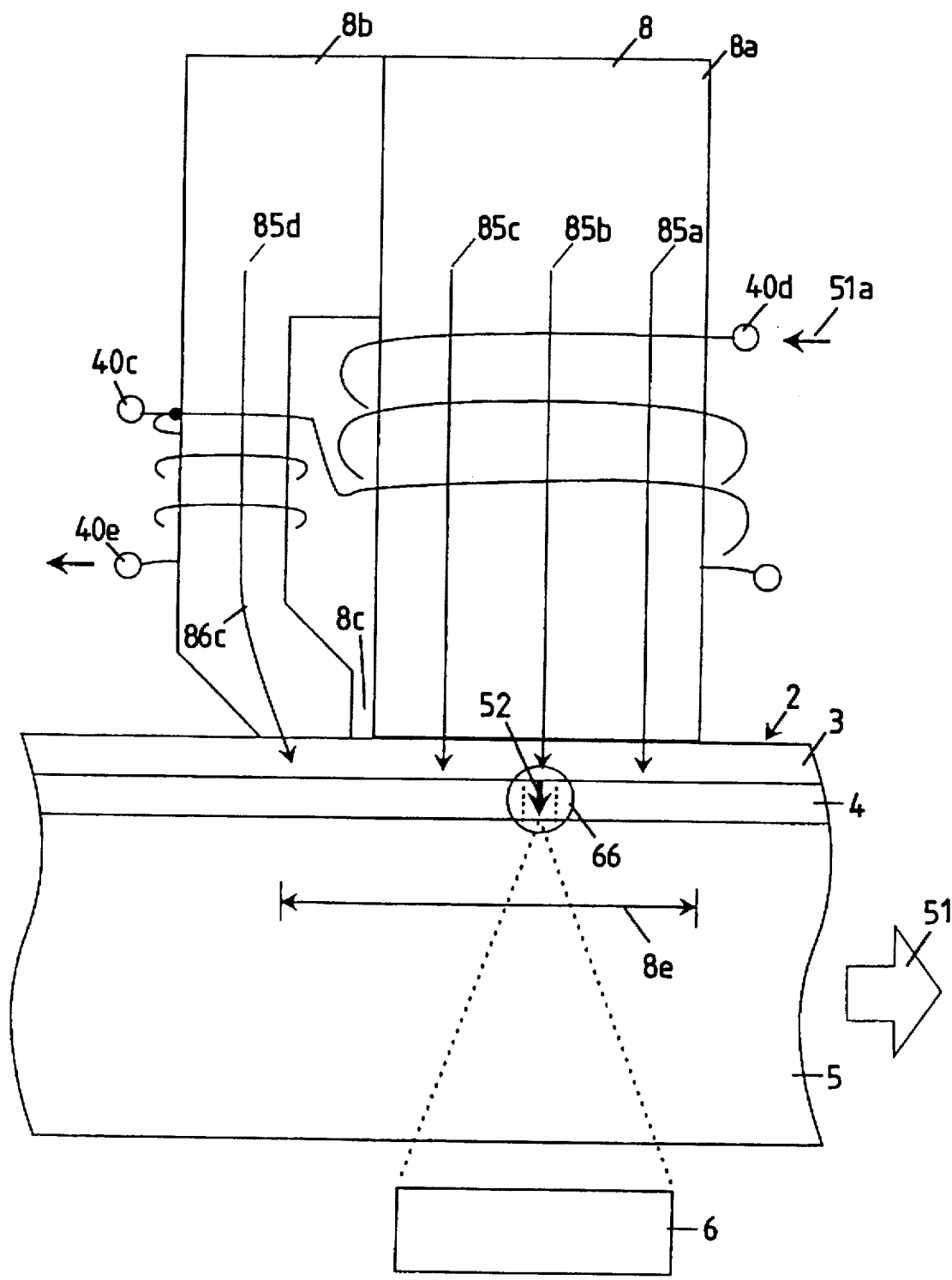
FIG. 37 is an enlarged view of a magneto-optical recording portion in the fifth embodiment.

As shown in FIG. 36, a tap 40c may be provided to a single winding to form two divided sub windings having three terminals. During the magnetic recording, the tap 40c and a tap 40e are used. During the magneto-optical recording, as shown in FIG. 37, a tap 40d and a tap 40e are used to generate a modulating magnetic field for the magneto-optical recording. In this way, three taps enable the formation of a magnetic head, and thus there is an advantage such that wiring is simple.

DESCRIPTION OF THE SIXTH PREFERRED EMBODIMENT

Figure 38:
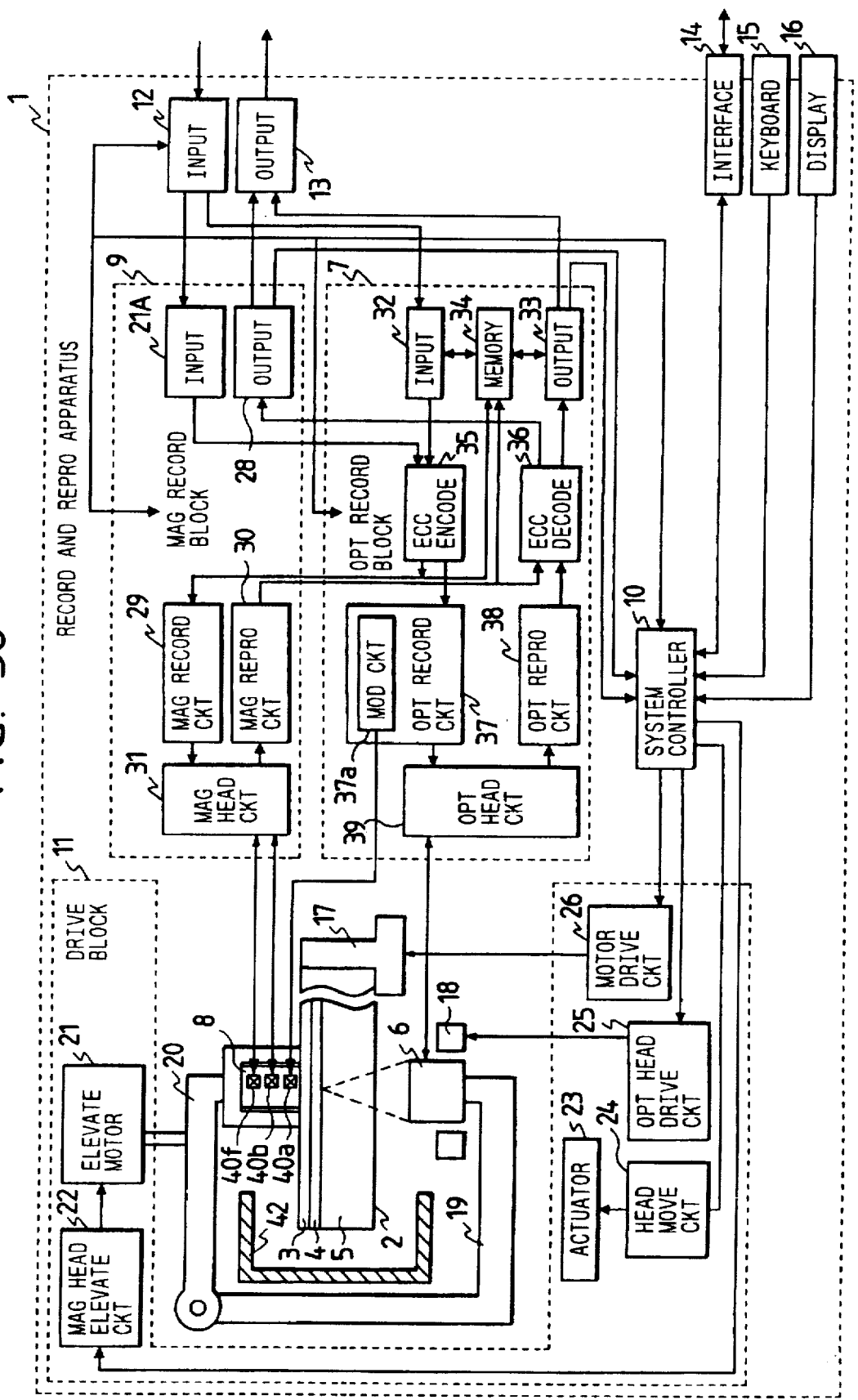
FIG. 38 is a block diagram of a recording and reproducing apparatus according to a sixth embodiment of this invention.

FIG. 38 shows a recording and reproducing apparatus according to a sixth embodiment of this invention which is similar in basic operation to the apparatus of FIG. 1, FIG. 24, and FIG. 32 related to the first embodiment, the fourth embodiment, and the fifth embodiment. The sixth embodiment differs from the fifth embodiment in the following points.

As shown in FIG. 38, a magnetic head 8 is formed with two gaps 8c and 8e. In addition, two windings 40b and 40f are connected to a magnetic head circuit 31, and one is used for recording and the other is used for erasing. Thus, erasing and recording can be done by a single head.

Figure 39:
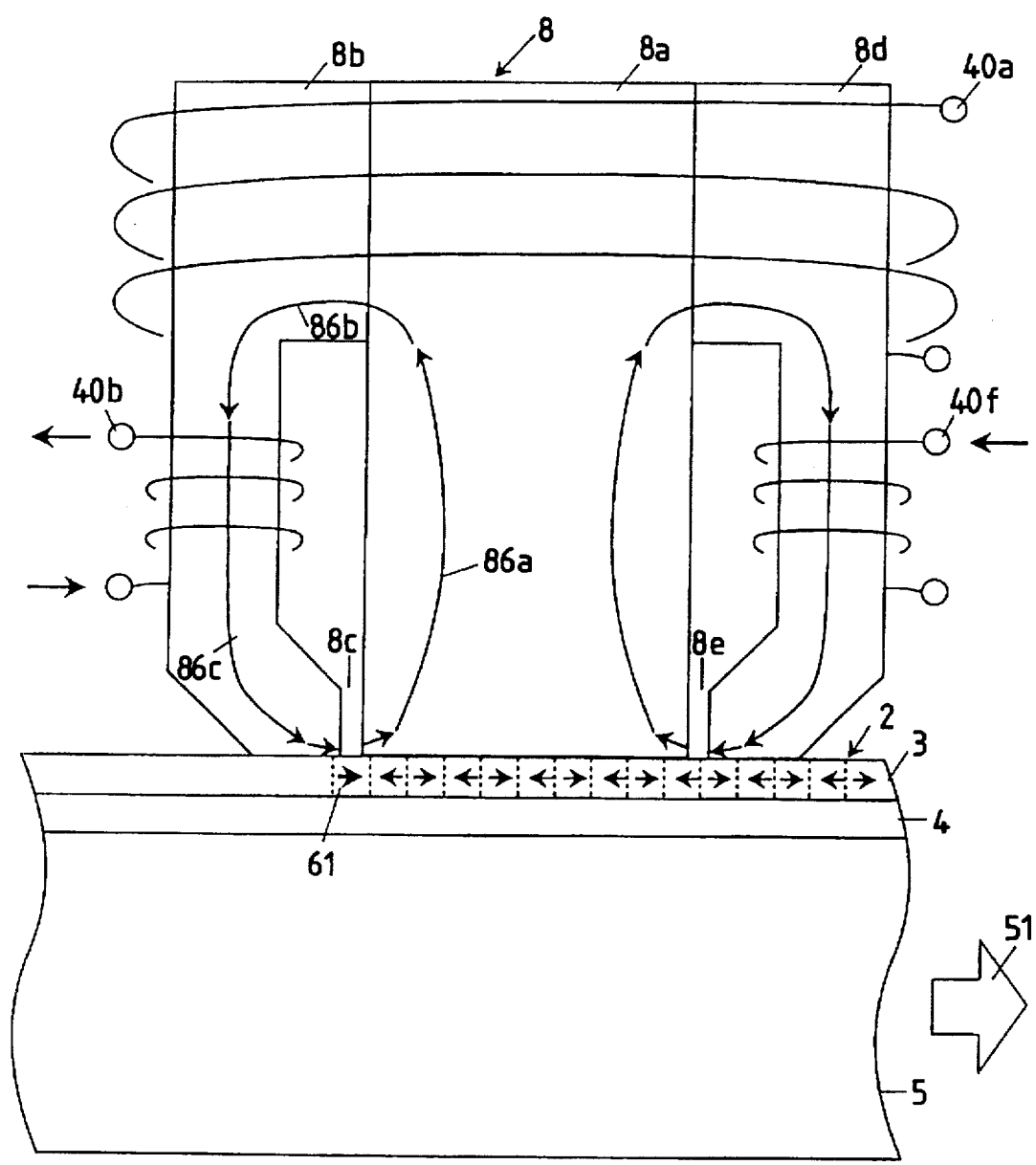
FIG. 39 is a block diagram of a magnetic recording portion in the sixth embodiment.

As shown in FIG. 39, the magnetic head 8 includes a first sub magnetic pole 8b and a second sub magnetic pole 8d. Before the magnetic recording is done by a magnetically recording winding 40b as described with reference to FIG. 33, the magnetic head circuit 31 feeds an erasing current via the second sub magnetic pole 8d. Thus, before the recording, erasing magnetization from a magnetic recording layer 3 can be done by the gap 8e. Therefore, ideal magnetic recording can be done by using the gap 8c, and there is provided an advantage such that C/N and S/N are enhanced while an error rate is reduced.

Figure 41:
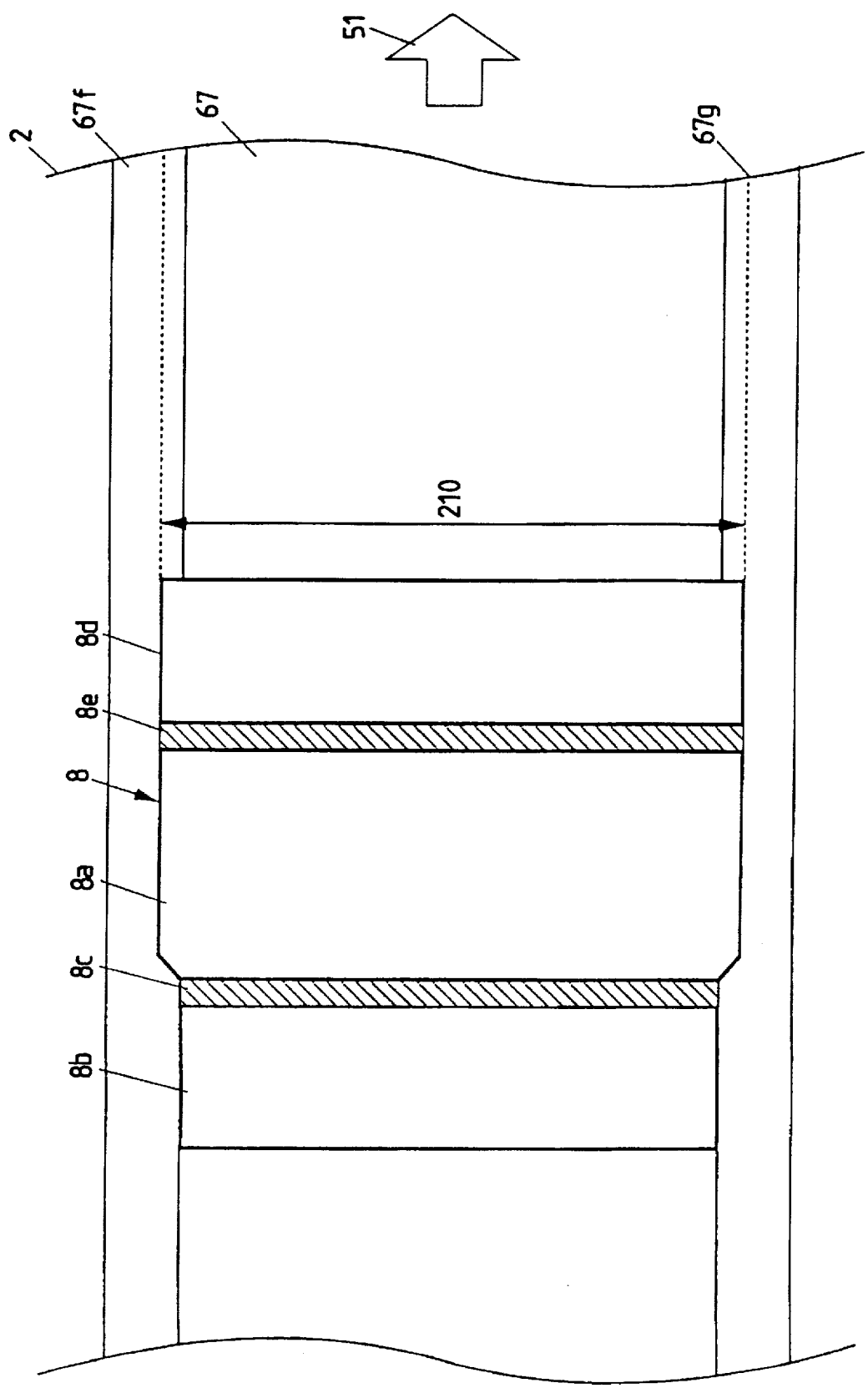
FIG. 41 is a top view of a magnetic recording portion in the sixth embodiment.

As shown in FIG. 41, guard bands 67f and 67g are provided along opposite sides of a recording track 67. First, the gap 8e of the second sub magnetic pole 8d executes an erasing process with a width of an erased region 210. As a result, an entire region of the recording track 67 and portions of the guard bands 67f and 67g are subjected to the erasing process. Thus, even if the magnetic head 8 has an tracking error, the gap 8c will not move out of the erased region 210 and the gap 8c can execute good recording.

Figure 42:
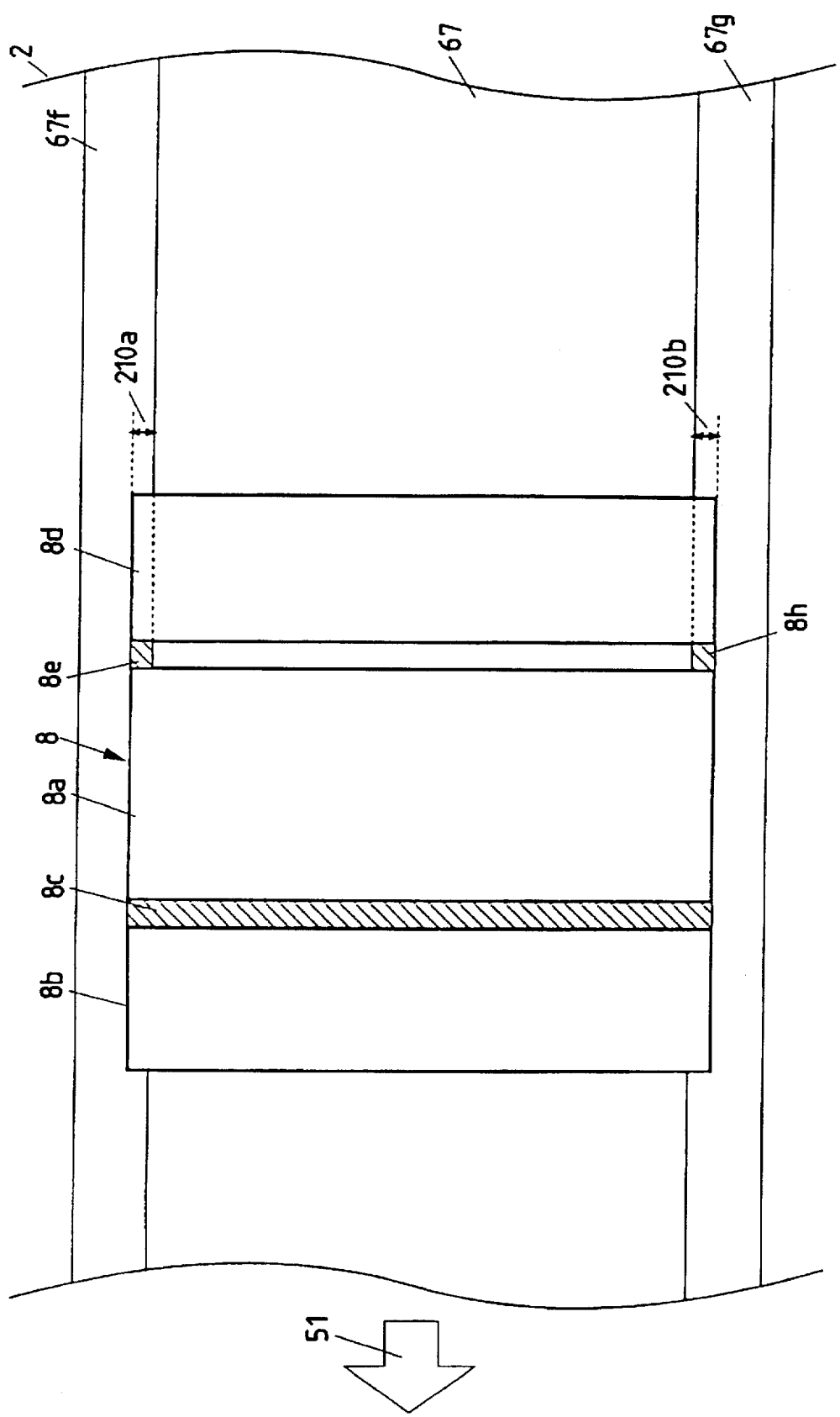
FIG. 42 is a top view of a magnetic recording portion in the sixth embodiment.

As shown in FIG. 42, an erasing gap may be divided into two gaps 8e and 8h. In this ease, a recording medium 2 is driven in a direction 51, and the magnetic recording is done by a gap 8c having a width greater than the width of a recording track 67 so that recording on portions of guard bands 67f and 67g is executed in an overlapped manner. Magnetization is erased from the overlapped portions by two erased regions 210a and 210b. Therefore, guard bands 67f and 67g are fully maintained. As a result, there is an advantage such that crosstalk between recording tracks is reduced and an error rate is lowered.

Figure 40:
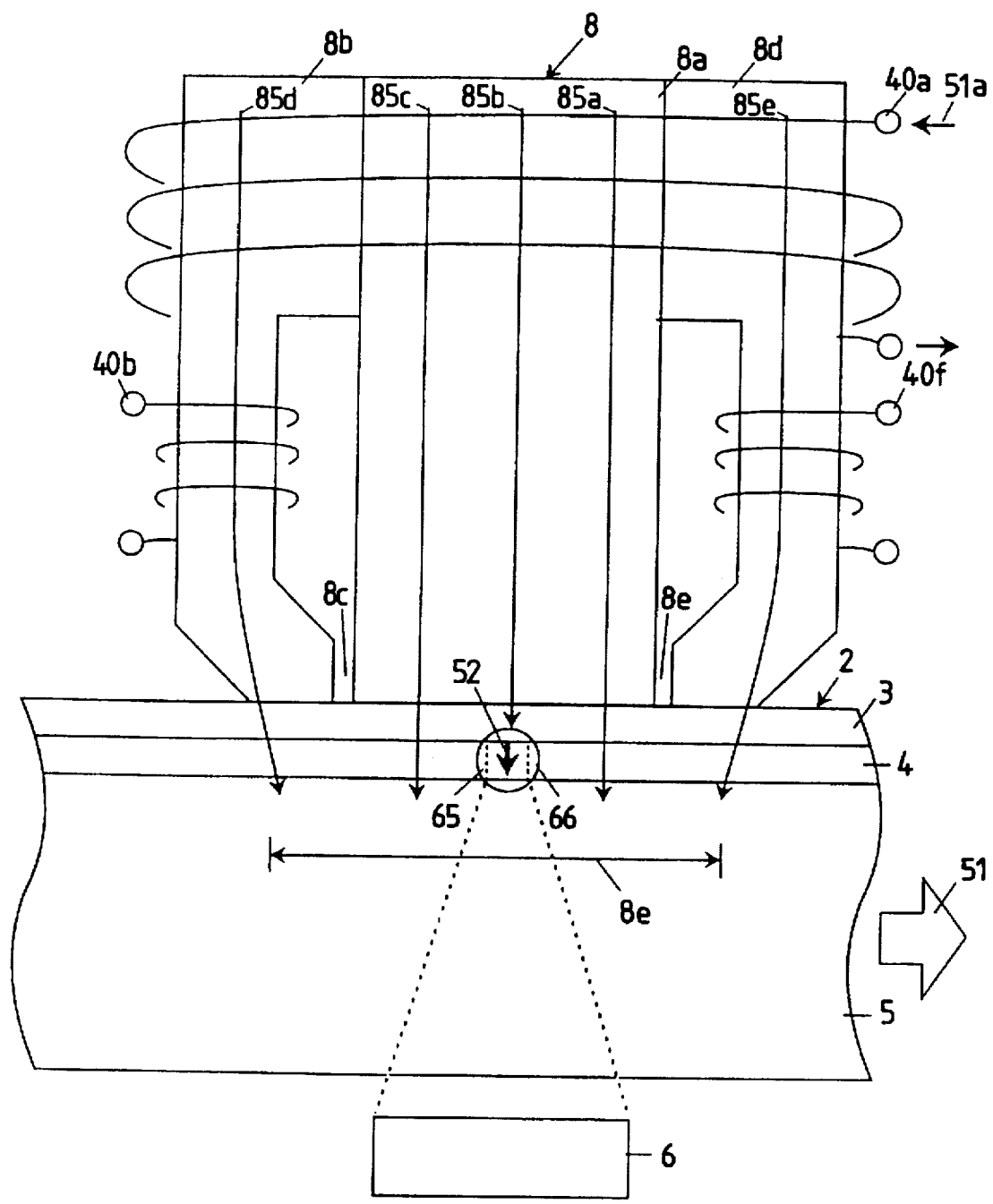
FIG. 40 is an enlarged view of a magnetic field modulating portion in the sixth embodiment.

With reference to FIG. 40, a description will now be given of the case where magnetic-field modulation for magneto-optical recording is done by using the magnetic head 8. The magnetic-field modulating winding 40a is wound on the main magnetic pole 8a, the first sub magnetic pole 8b, and the second sub magnetic pole 8d so that magnetic fluxes 85a, 85b, 85c, 85d, and 85e uniformly occur in the respective magnetic poles. Thus, there is an advantage such that a wide region 8e exposed to a uniform magnetic field can be provided. In addition, even if an accuracy of track positions is low, a light spot 66 can be prevented from being out of an optical recording track 65.

Figure 43:
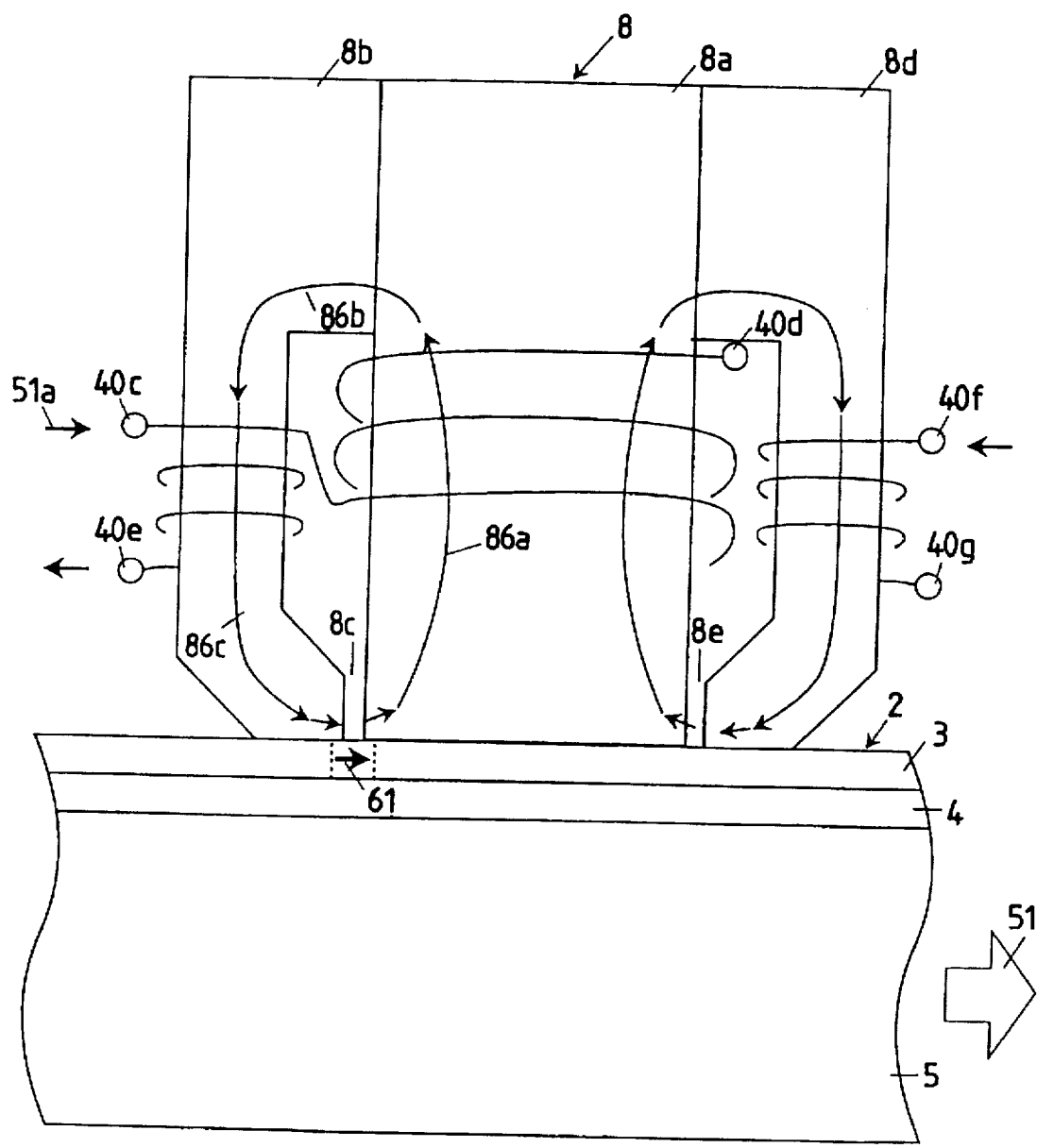
FIG. 43 is an enlarged view of a magnetic recording portion in the sixth embodiment.
Figure 44:
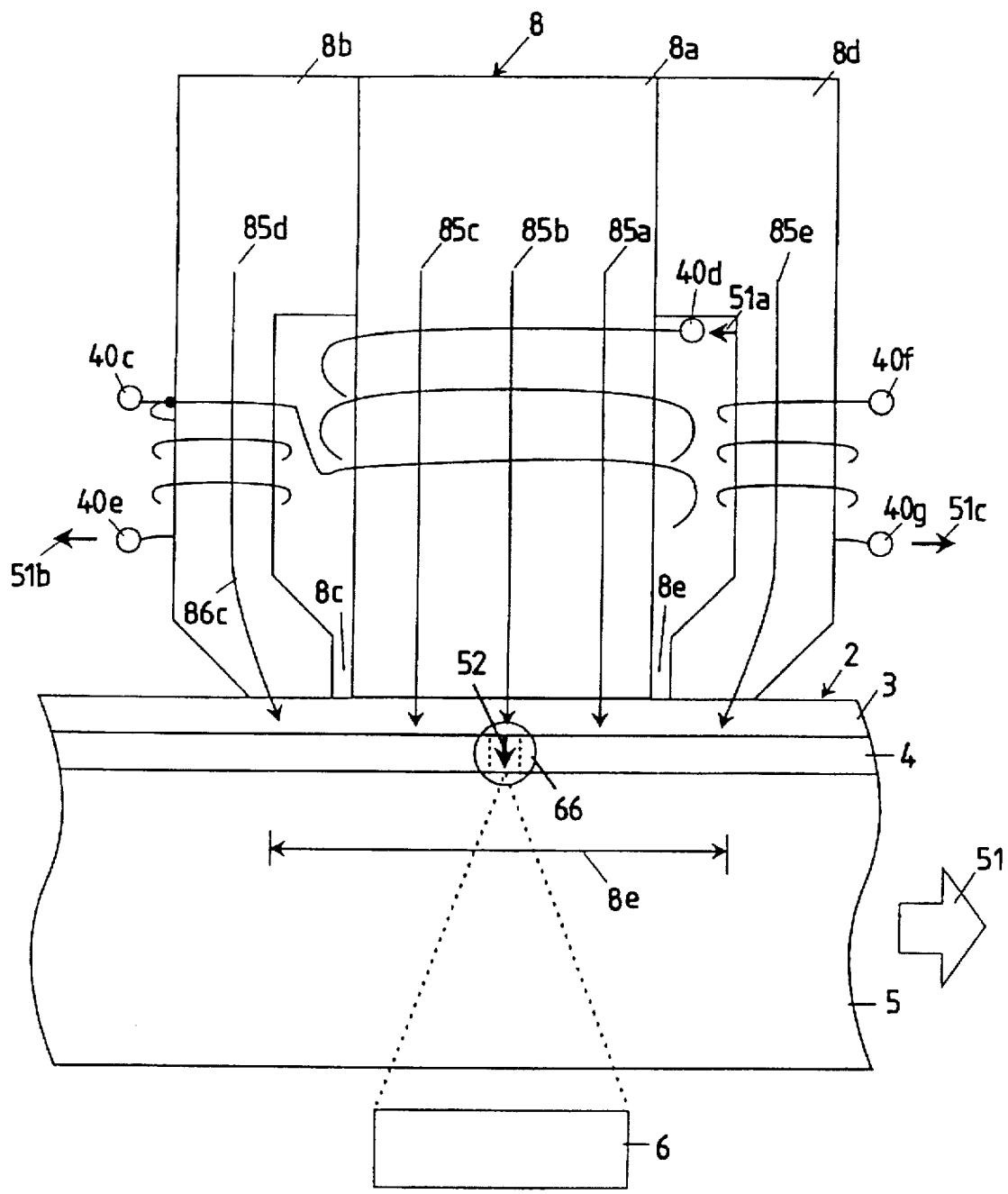
FIG. 44 is an enlarged view of a magnetic field modulating portion in the sixth embodiment.

FIG. 43 shows a magnetic head 8 having a modified winding. As shown in the drawing, a magnetic-field modulating winding 40d is extended and is used in common to a magnetic recording winding, and a central tap 40c is provided. Magnetic recording can be executed by using the tap 40c and a tap 40e. As shown in FIG. 44, currents are driven into the tap 40d and the tap 40e in directions 51a and 51b respectively while a current is driven into a tap 40f in a direction 51c, and thereby magnetic fluxes 85a, 85b, 85c, 85d, and 85e in equal directions occur so that a uniform modulation magnetic field results. In this case, there is an advantage such that the number of taps is reduced by one and the structure is simplified.

As previously described, according to the sixth embodiment, a single head can be used as an erasing head, a magnetic recording head, and a magnetic-field modulating head for the magneto-optical recording.

DESCRIPTION OF THE SEVENTH PREFERRED EMBODIMENT

Figure 45A:
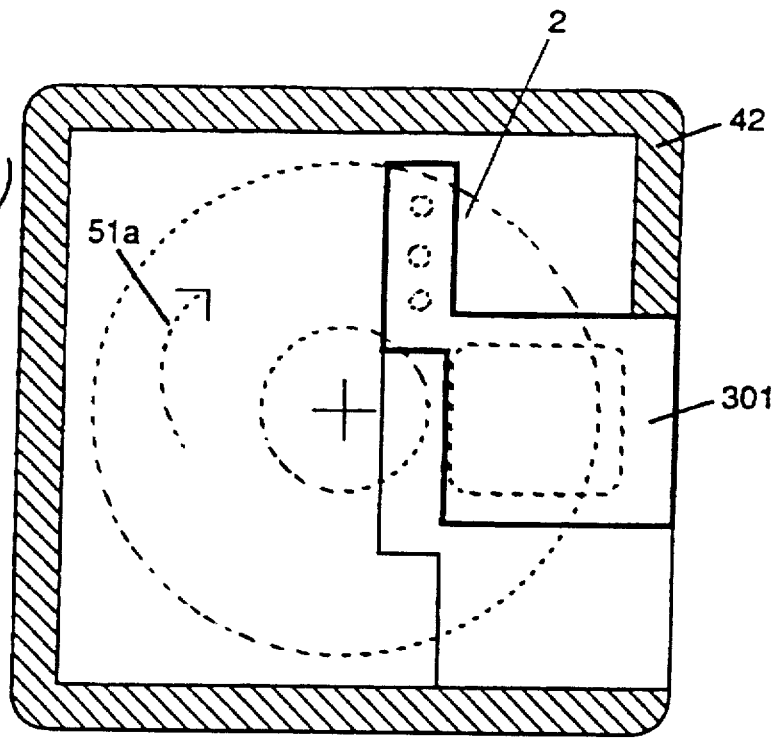
FIG. 45(a) is a top view of a disk cassette in a seventh embodiment of this invention.
Figure 45B:
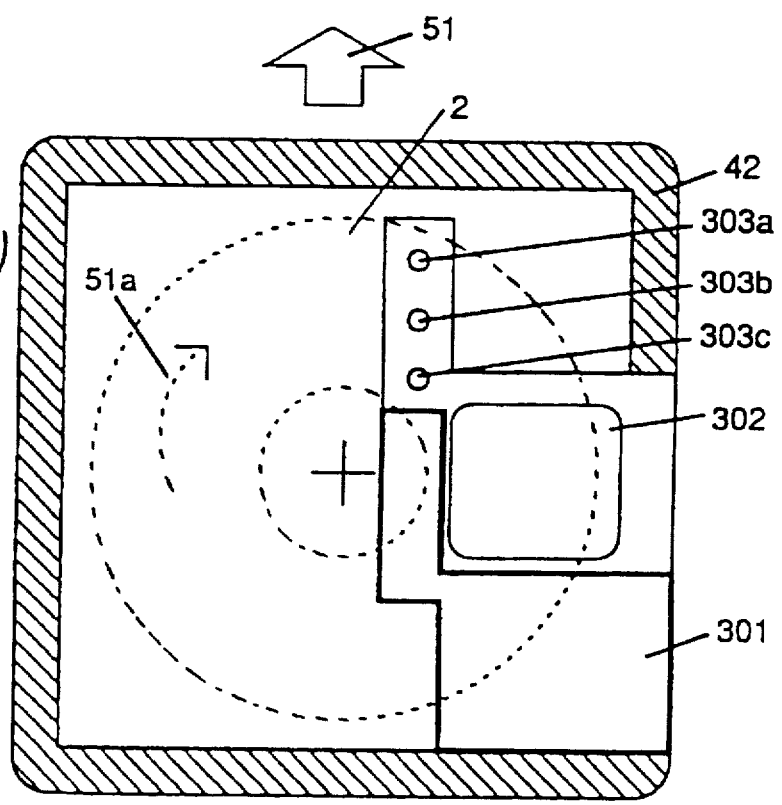
FIG. 45(b) is a top view of a disk cassette in the seventh embodiment.

A seventh embodiment of this invention relates to a disk cassette containing a recording medium. With reference to FIG. 45(a), a disk cassette 42 has a movable shutter 301 which can cover an opening 302 for a head and holes 303a, 303b, and 303c for a liner. As shown in FIG. 45(b), the shutter 301 is opened to unblock the opening 302 and also the holes 303a, 303b, and 303c in accordance with the insertion of the disk cassette 42 into a body of a recording and reproducing apparatus.

Figure 46A:
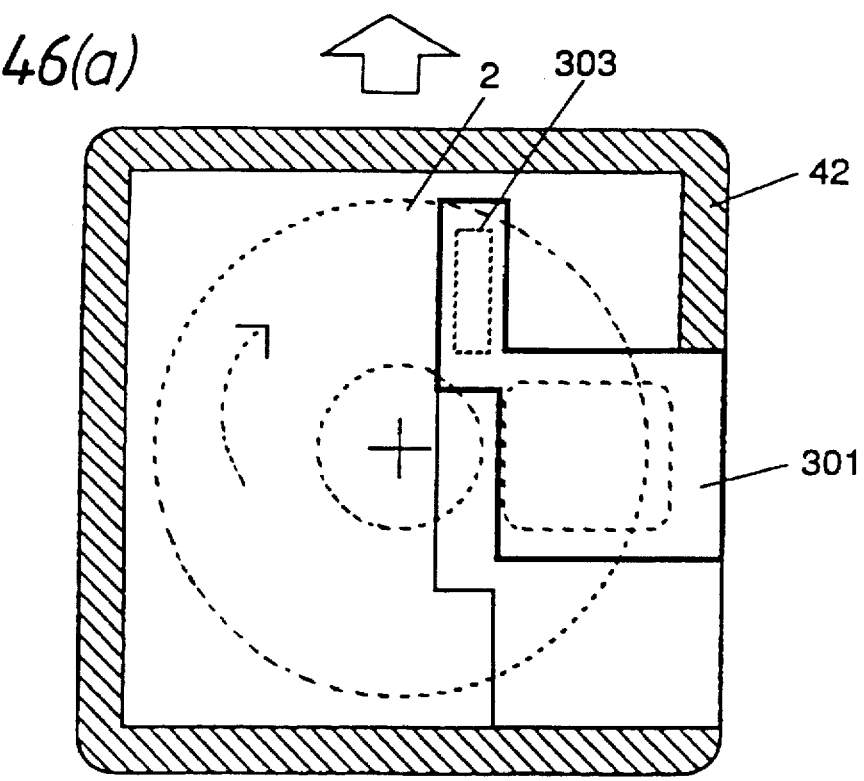
FIG. 46(a) is a top view of a disk cassette in the seventh embodiment.
Figure 46B:
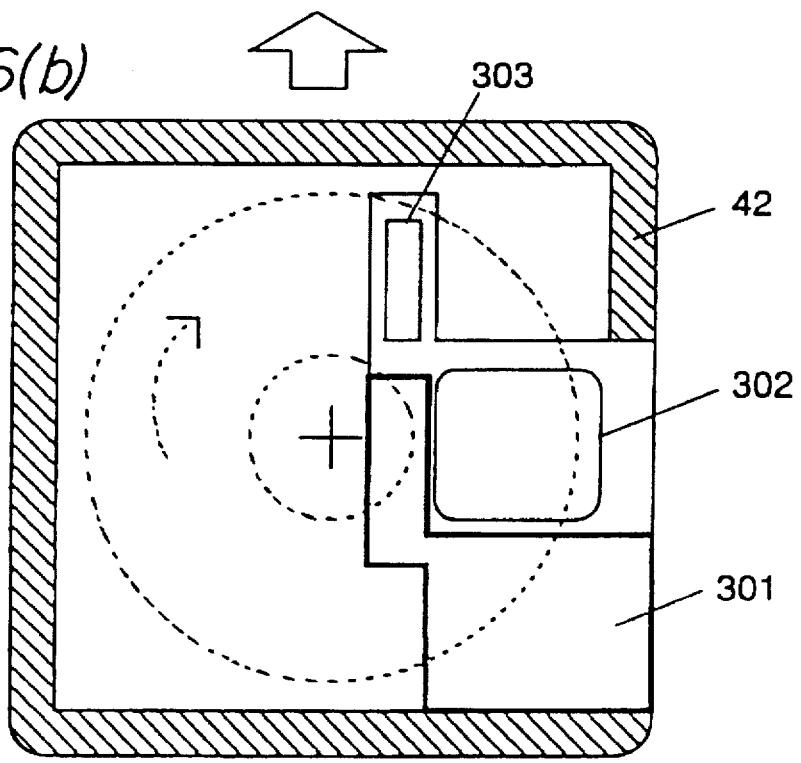
FIG. 46(b) is a top view of a disk cassette in the seventh embodiment.

As shown in FIG. 46, a single rectangular opening 303 for a liner may be provided.

Figure 47A:
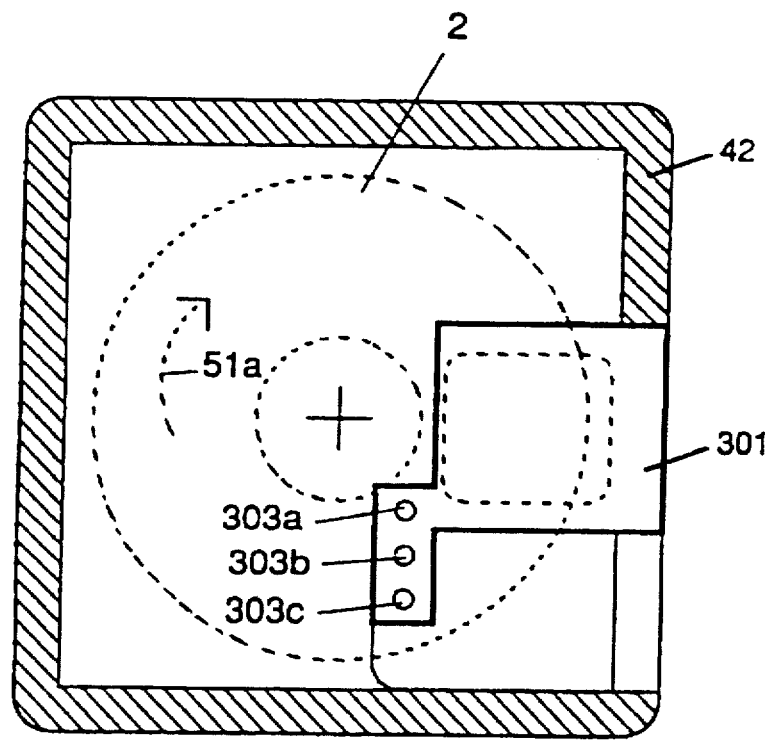
FIG. 47(a) is a top view of a disk cassette in the seventh embodiment.
Figure 47B:
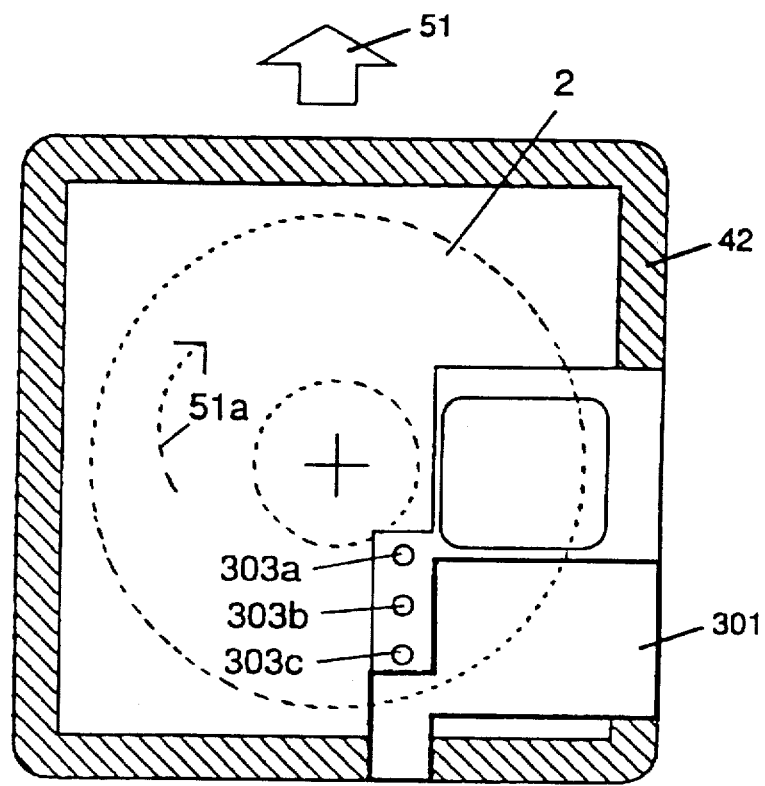
FIG. 47(b) is a top view of a disk cassette in the seventh embodiment.
Figure 48A:
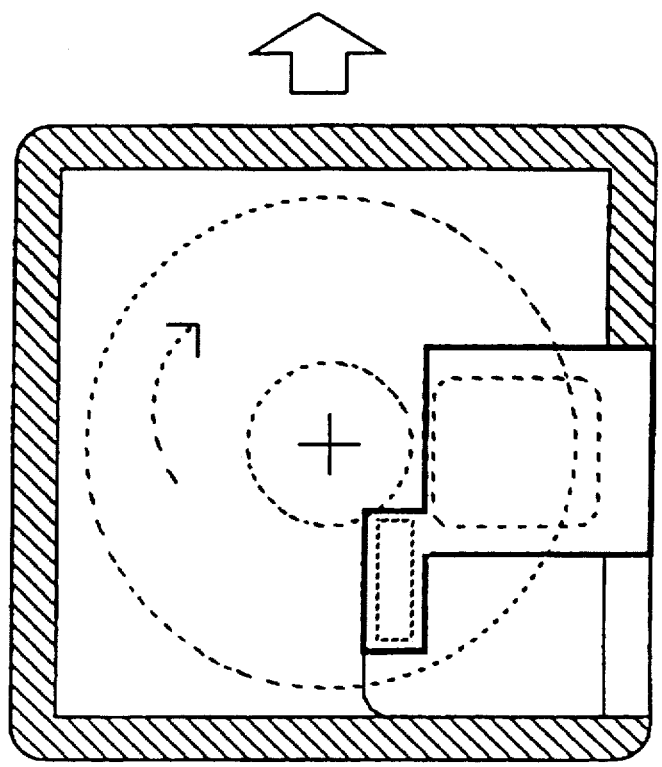
FIG. 48(a) is a top view of a disk cassette in the seventh embodiment.
Figure 48B:
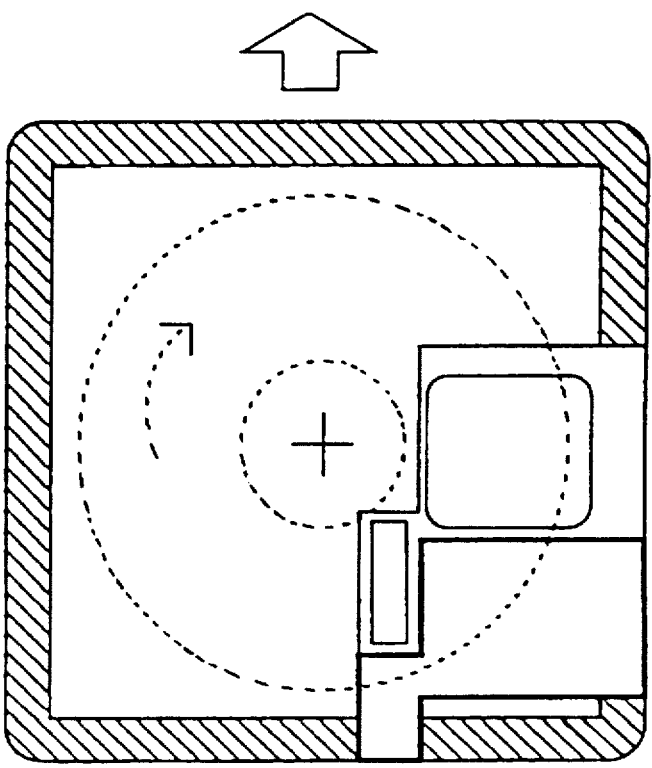
FIG. 48(b) is a top view of a disk cassette in the seventh embodiment.
Figure 49A:
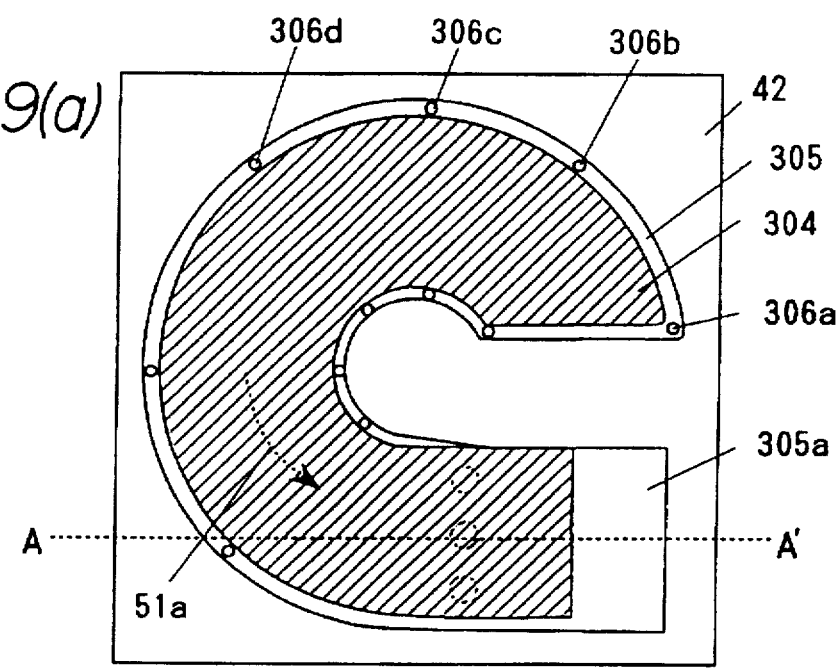
FIG. 49(a) is a top view of a liner and a portion around the liner in the seventh embodiment.
Figure 49B:
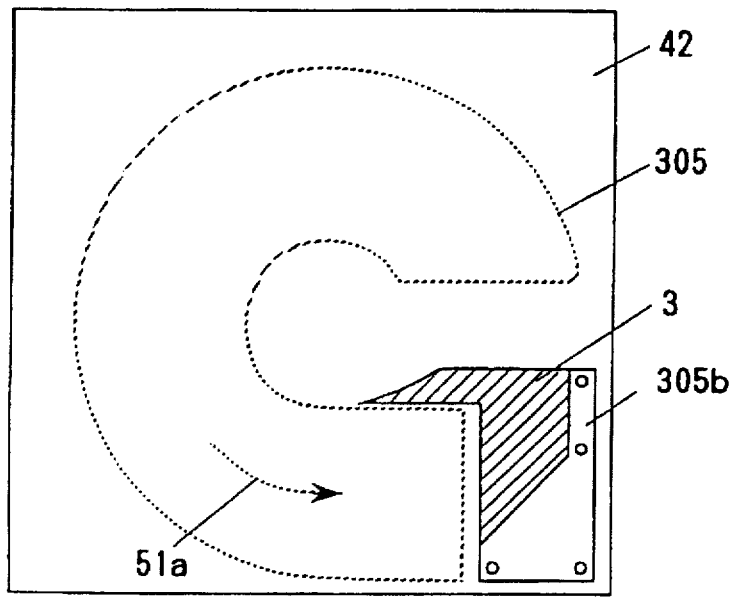
FIG. 49(b) is a top view of a liner and a portion around the liner in the seventh embodiment.
Figure 49C:
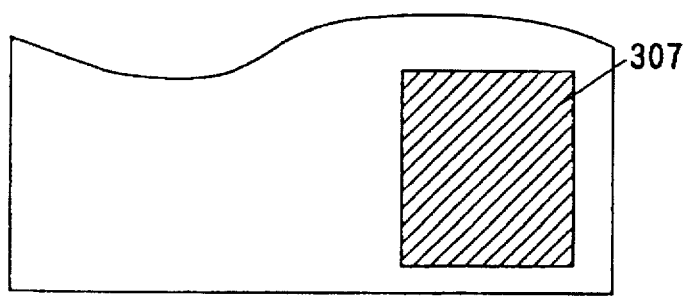
FIG. 49(c) is a top view of a liner and a portion around the liner in the seventh embodiment.

As shown in FIG. 47 and FIG. 48, an opening for a liner may be provided in a direction opposite to an opening 302 for a head. In this case, as shown in FIGS. 49(a), 49(b), and 49(c), a liner 304 except a movable portion 305a is fixed to a disk cassette 42 by a liner support portion 305 and liner support fixing portions 306a, 306b, 306c, and 306d. The liner support portion 305 is made of a leaf spring or a plastic sheet. As shown in FIG. 49(c), a cassette half is formed with a groove 307 for a liner. The liner movable portion 305a is accommodated in the groove 307, and is held by an auxiliary liner support portion 305b. The liner 304 is held in a flat state by the return spring force of the liner support portion 305 as long as an external force is not applied thereto. The liner 304 being in this state separates from a recording layer at a surface of a recording medium 2. Thus, it is possible to prevent wear of the recording layer 3.

When an external force is applied in a direction toward the interior of the disk cassette 42 by a liner pin 310 through the opening 303, the liner support portion 305 and the liner 304 are pressed against the surface of the recording media 2.

Figure 50A:
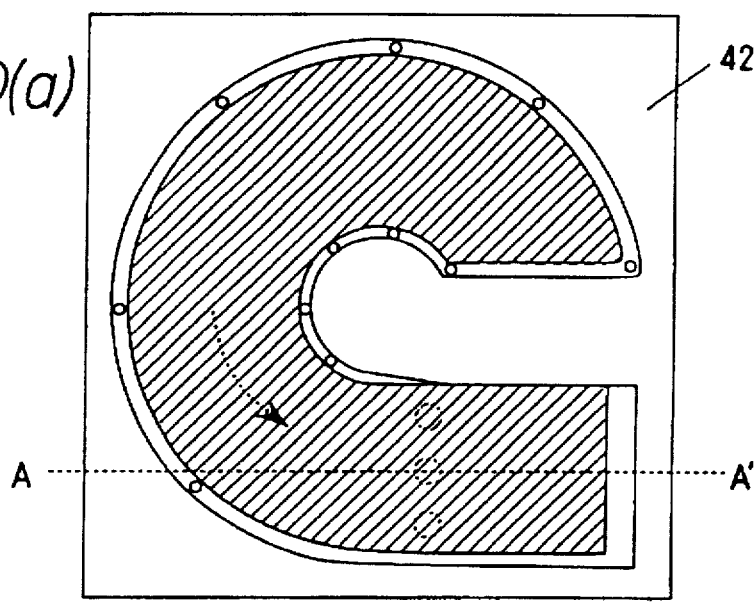
FIG. 50(a) is a top view of a liner and a portion around the liner in the seventh embodiment.
Figure 50B:
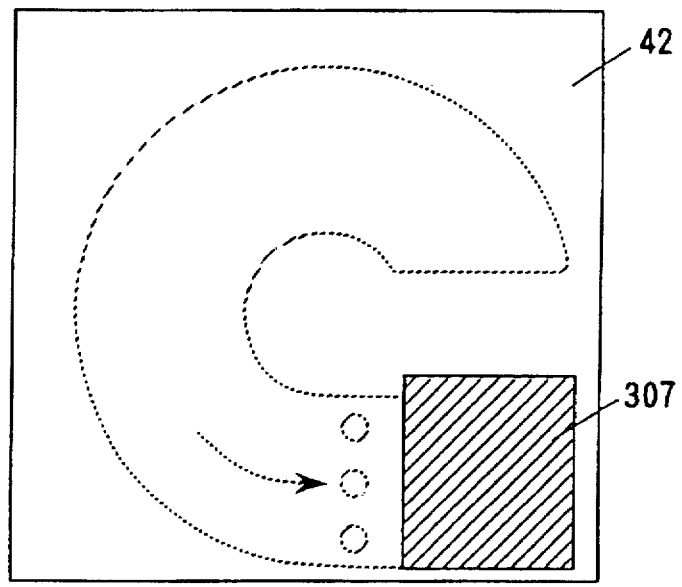
FIG. 50(b) is a top view of a liner and a portion around the liner in the seventh embodiment.
Figure 50C:
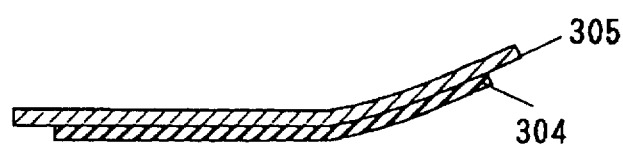
FIG. 50(c) is a transversely sectional view of a liner portion in the seventh embodiment.
Figure 50D:
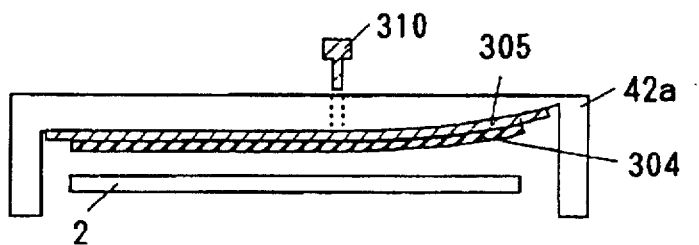
FIG. 50(d) is a transversely sectional view of a disk cassette in the seventh embodiment.

Another disk cassette will now be described. As shown in FIGS. 50(a), 50(b), and 50(c), a leaf spring of a liner support portion 305 is previously deformed toward the upper surface of a disk cassette 42. Thereby, as shown in FIG. 50(d), when the liner support portion 305 is fixed to the disk cassette 42, the liner support portion 305 continuously abuts against an upper cassette half 42a. Thus, as long as the liner support portion 305 is not depressed by a liner pin 310, a liner 304 and a recording medium 2 remain out of contact with each other. According to this design, it is possible to omit the auxiliary liner support portion 305b.

Figure 51:
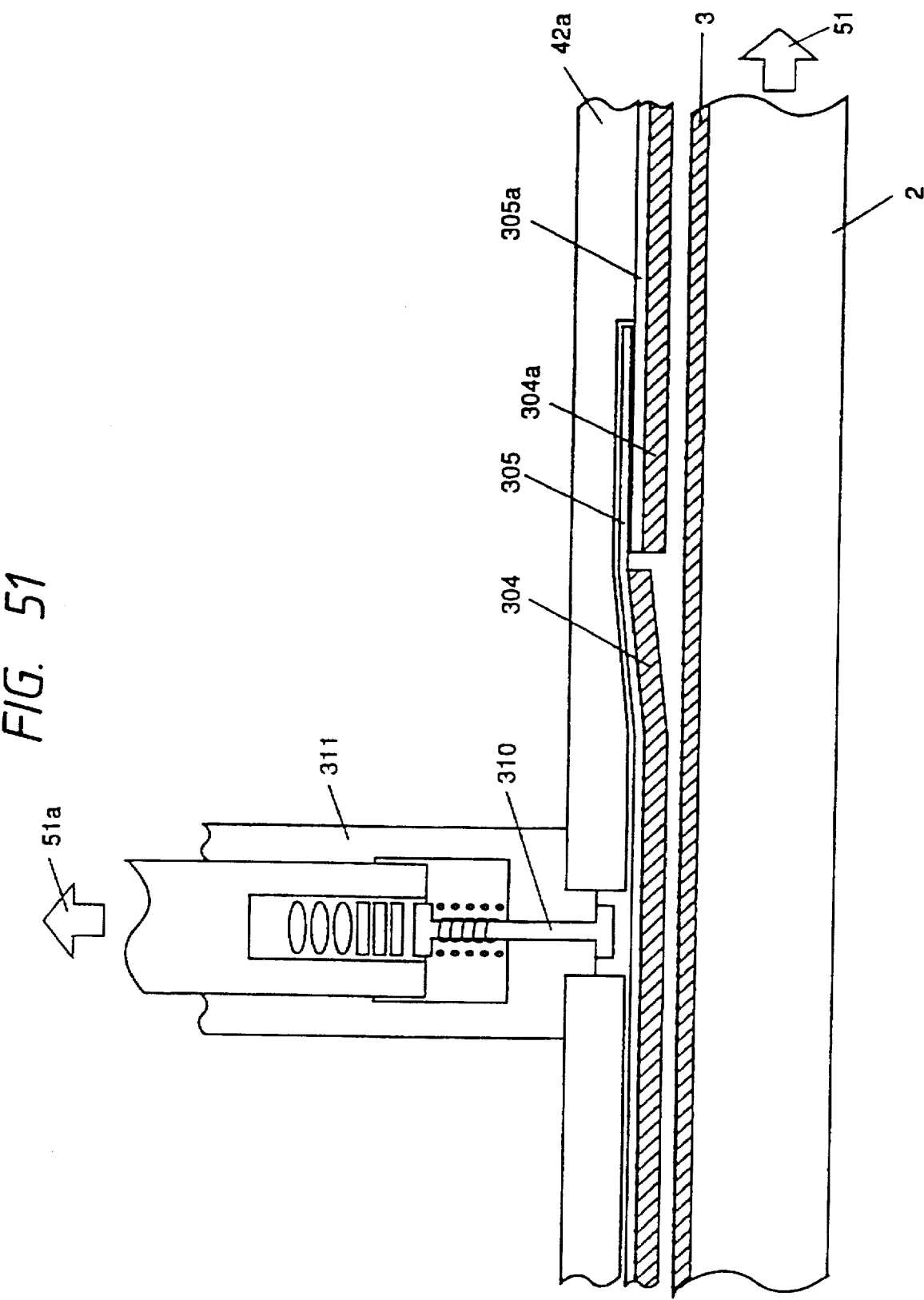
FIG. 51 is a transversely sectional view of conditions where liner pin insertion is off in the seventh embodiment.

A description will now be given of a way of moving the liner and the disk into and out of contact with each other by operating the liner pin 310. FIG. 51 shows conditions where the liner pin 310 is raised along a direction 51a in a liner pin guide 311, and thus the liner 304 and the recording layer 3 of the recording medium 2 are out of contact with each other. Therefore, the recording medium 2 receives a weak frictional force and can be rotated by a weak drive force.

As shown in FIG. 52, when the liner pin 310 is moved downward by an external force in a direction 51a, the liner 304 is pressed against the magnetic recording layer 3 of the recording medium 2 via the liner support portion 305. As the recording medium 2 is moved or rotated in a direction 51, dust is removed from the surface of the magnetic recording layer 3 by the liner 304. The liner 304 is made of, for example, cloth. Thus, in the case where the magnetic recording, the magnetic reproduction, or the magnetic-field modulation for the magneto-optical recording is executed by a recording head 8 in the head opening 301 of FIG. 46, there is provided an advantage such that an error rate is remarkably reduced. The material of the liner 304 may be the same as the material of a liner for a conventional floppy disk. As shown in FIG. 45(a), the liner pin 310 is located above the portion of the magnetic recording layer 3 which precedes the magnetic head 8 with respect to the rotation of the recording medium 2 in the direction 51, and thus there is an advantage such that the cleaning effect is enhanced.

In the case where the liner control method of this invention is applied to a disk cassette 42 for a contact-type magneto-optical recording medium having no magnetic recording layer 3, dust is removed and thus there is provided an advantage such that an error rate is improved during the magneto-optical recording.

As shown in FIG. 52(b), the control of the liner pin 310 is designed so that the liner pin 310 can be moved together with the magnetic head 8. When the magnetic head 8 falls into a contact state, the liner 304 is surely moved into contact with the recording medium 2. Thus, a single actuator can be used in common. In the case where the magnetic head 8 separates from the contact state, the line pin 310 is generally raised to move the liner 304 out of contact with the recording medium 2. As shown in FIG. 53(a), the liner 304 and the recording medium 2 can be out of contact with each other when the liner pin 310 is designed to be movable together with the magnetic head 8. Thus, the liner 304 less wears the surface of the magnetic recording layer 3. In addition, the frictional force on the recording medium 2 is reduced, and thus there is an advantage such that a weaker rotational torque of a drive motor suffices and the rate of consumption of electric power is decreased.

Figure 54A:
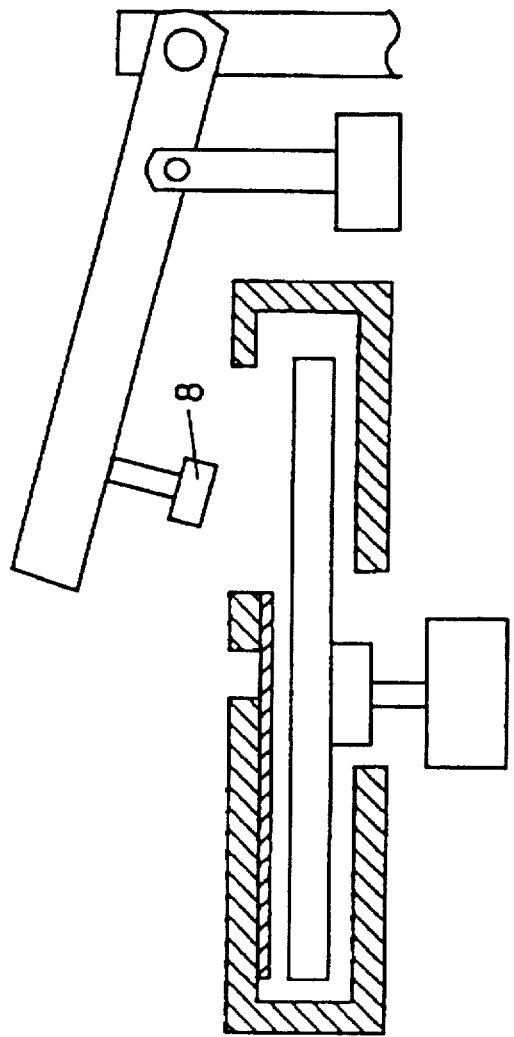
FIG. 54(a) is a transversely sectional view of conditions where magnetic head mounting is off in the seventh embodiment.
Figure 54B:
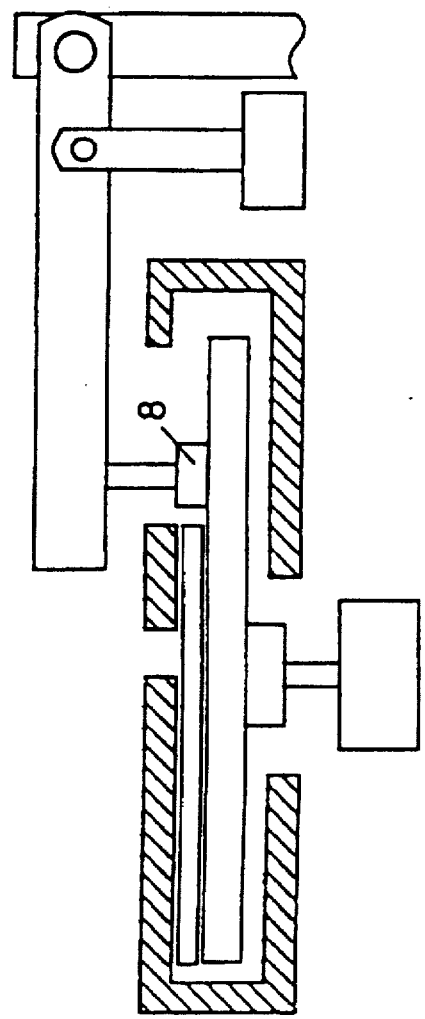
FIG. 54(b) is a transversely sectional view of conditions where magnetic head mounting is on in the seventh embodiment.

In the case where the disk cassette 42 of this invention is placed into a conventional recording and reproducing apparatus, the liner 304 does not contact the recording medium 2 as shown in FIG. 54(b) since the conventional apparatus does not have the liner pin 310 and the related elevating function as shown in FIGS. 54(a) and 54(b). Thus, the recording medium 2 can be stably rotated by the conventional apparatus which generally provides a weak disk drive torque. Accordingly, there is an advantage such that the compatibility between the disk cassette 42 of this invention and conventional disk cassettes can be maintained.

Figure 56:
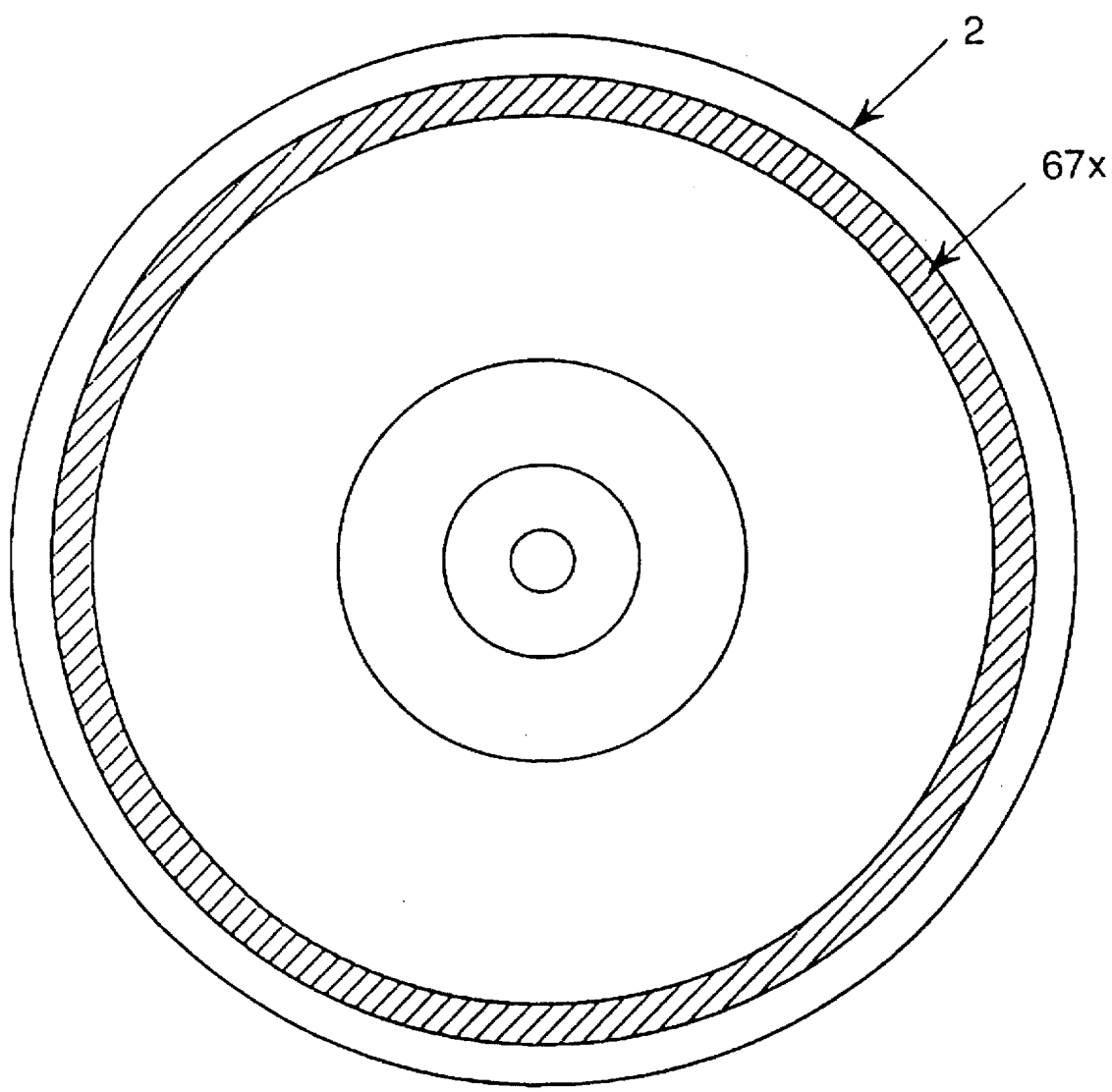
FIG. 56 is a top view of a recording medium in the seventh embodiment.

In the case where a conventional disk cassette 42 which does not have the liner 304 and the opening 303 is placed into the recording and reproducing apparatus of this invention, the liner pin 310 is not inserted since the opening 303 is absent as shown in FIGS. 55(a) and 55(b). Thus, the liner pin 310 does not contact the recording medium 2 and the liner 304, and there occurs no problem. Accordingly, there is an advantage such that the compatibility between the disk cassette 42 of this invention and conventional disk cassettes can be maintained. In this case, lubricant on the conventional recording medium is liable to adhere to the contact surface of the magnetic head 8 so that the error rate tends to be increased. To remove this problem, a cleaning track 67x is set as shown in FIG. 56. In the case where the conventional recording medium 2 is placed into and ejected from the recording and reproducing apparatus of this invention and then the recording medium 2 of this invention is inserted thereinto, the magnetic head 8 is forced to travel on the cleaning track 67x at least once. Thereby, the lubricant is transferred from the magnetic head 8 to the cleaning track 67x. Then, the lubricant is removed from the cleaning track 67x by the liner 304 which contacts the recording medium 2. In this way, the lubricant or dust is removed from the contact surface of the magnetic head 8. Thus, there is an advantage such that the error rate is small and reliable recording and reproduction are enabled.

Figure 58:
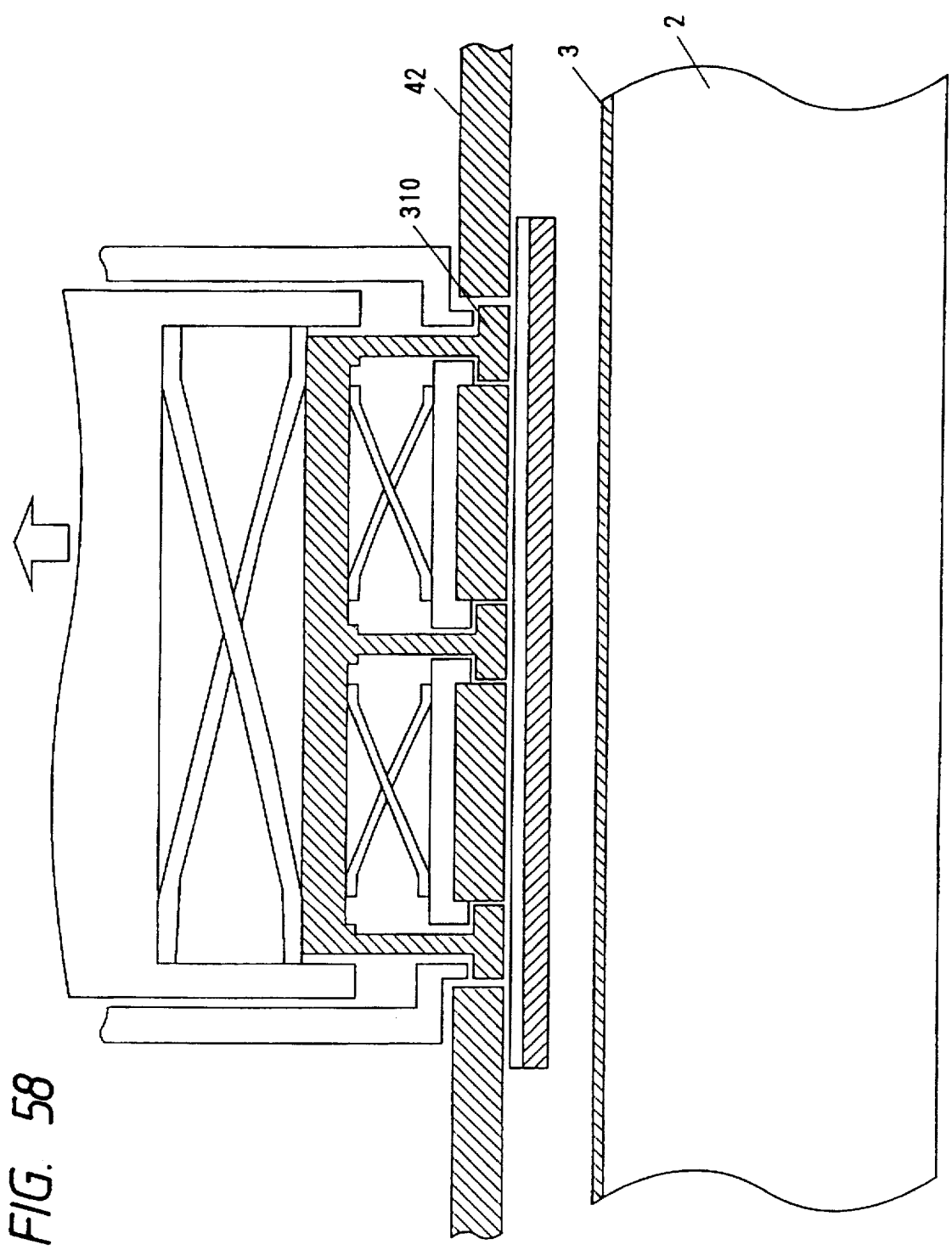
FIG. 58 is a sectional view of a liner pin front portion which assumes an off state in the seventh embodiment.
Figure 59:
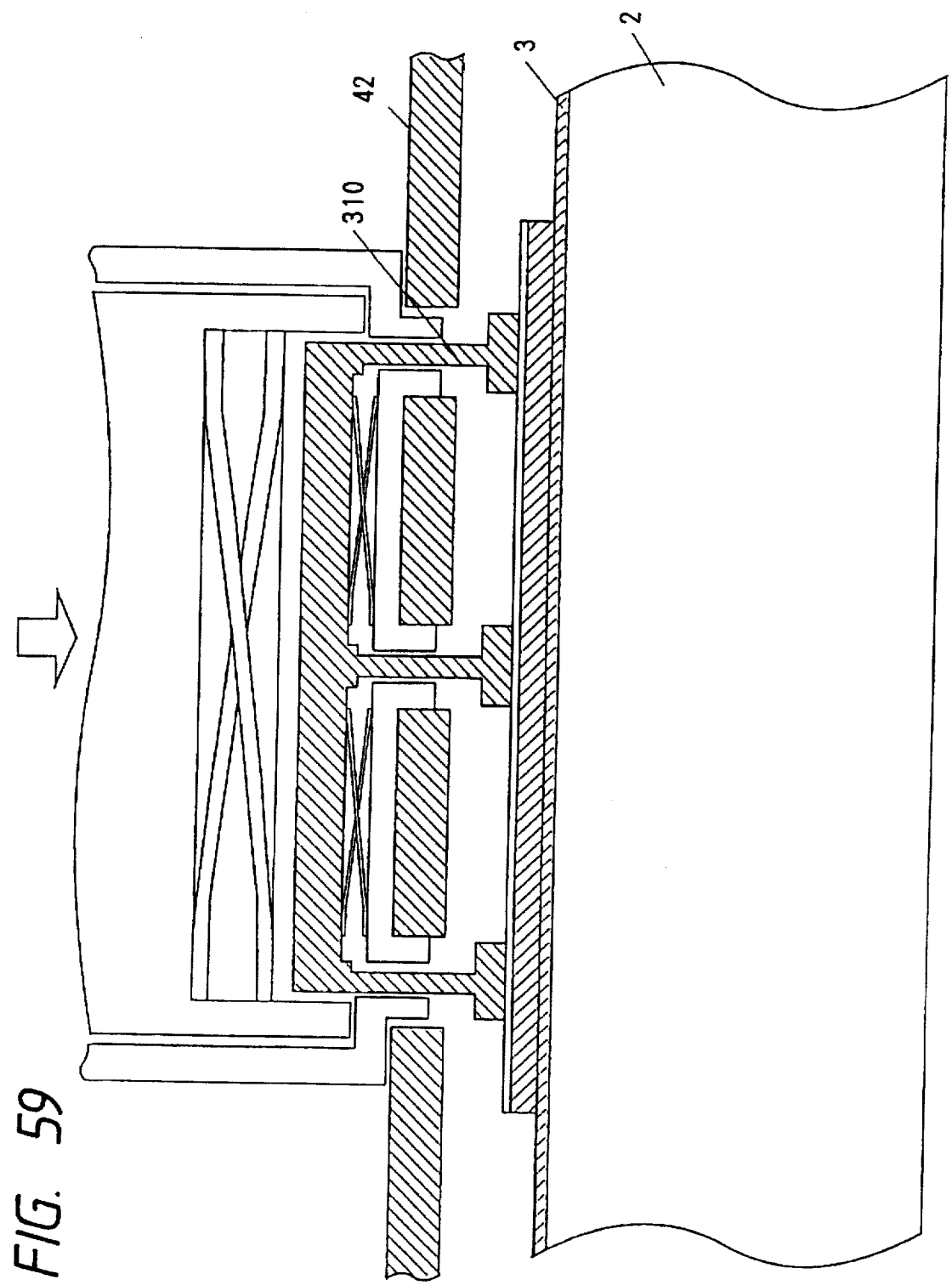
FIG. 59 is a sectional view of a liner pin front portion which assumes an on state in the seventh embodiment.

The liner pin 310 can be moved between an OFF position and an ON position as shown in FIGS. 57(a) and 57(b). The mechanism for elevating the liner 304 has a structure such as shown in FIG. 58 and FIG. 59.

Figure 60:
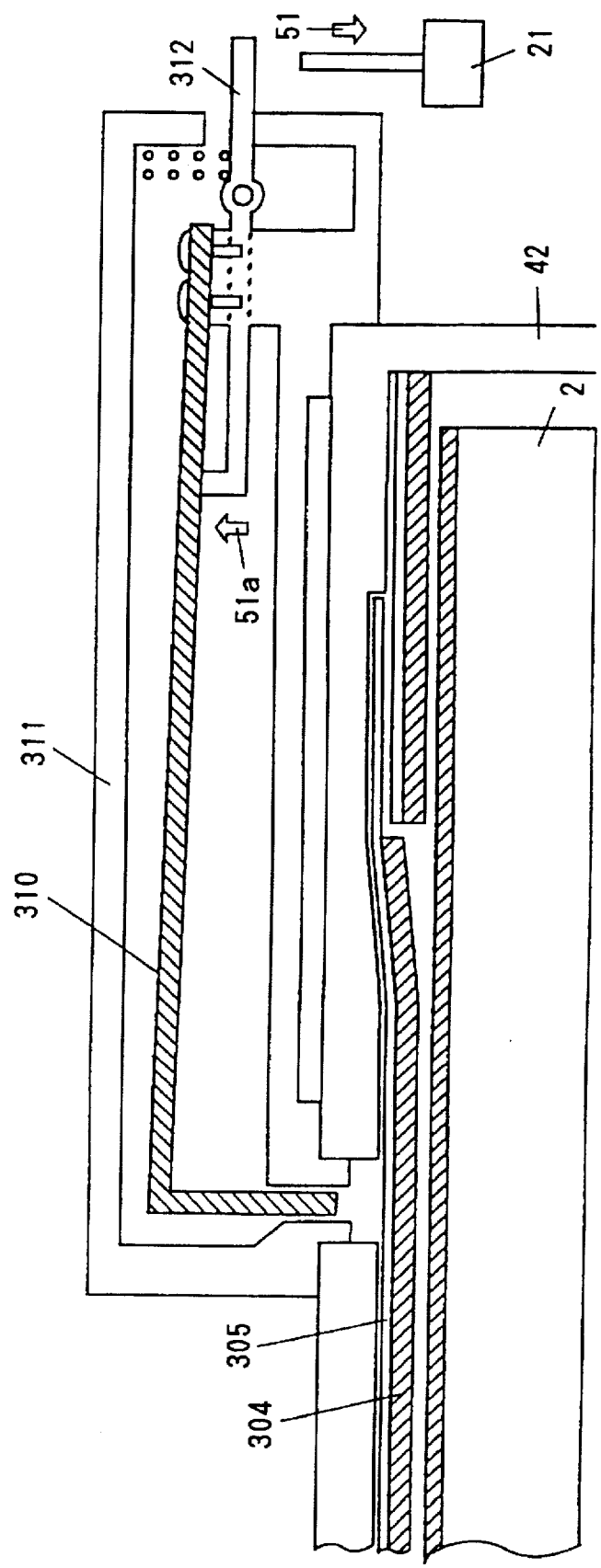
FIG. 60 is a transversely sectional view of a liner pin which assumes an off state in the seventh embodiment.
Figure 61:
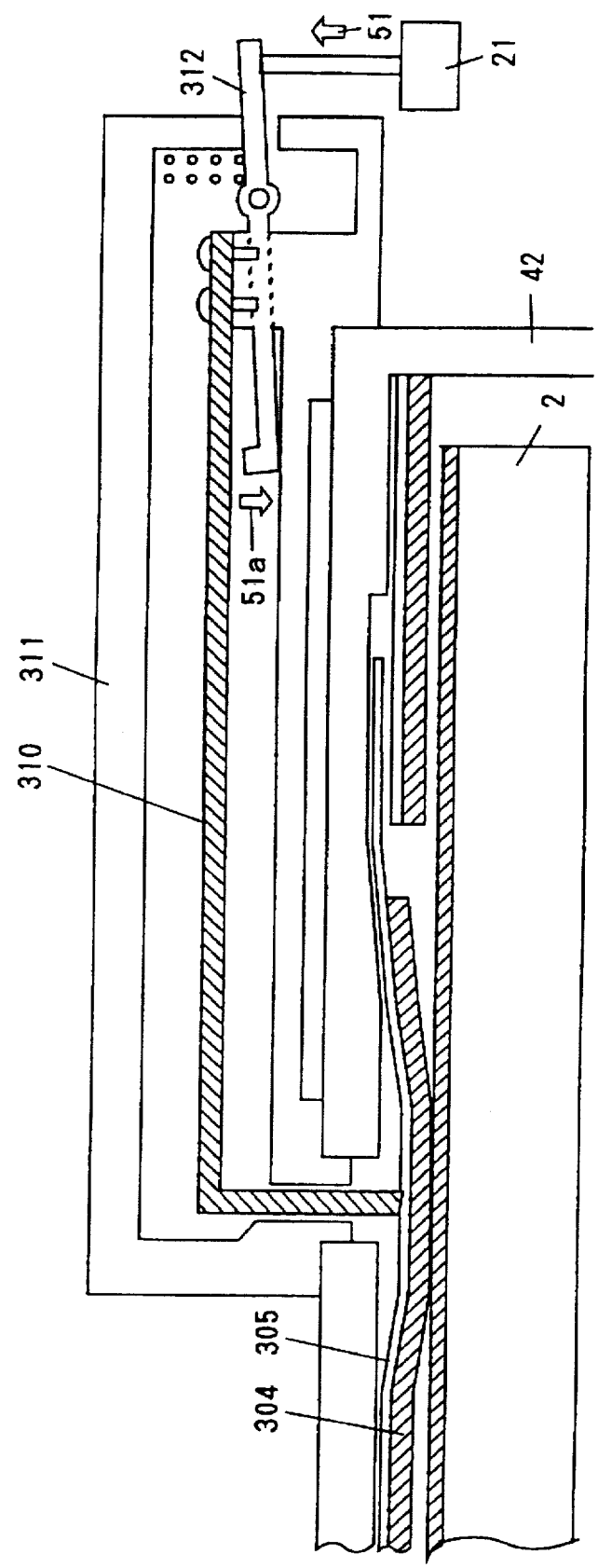
FIG. 61 is a transversely sectional view of a liner pin which assumes an on state in the seventh embodiment.
Figure 62:
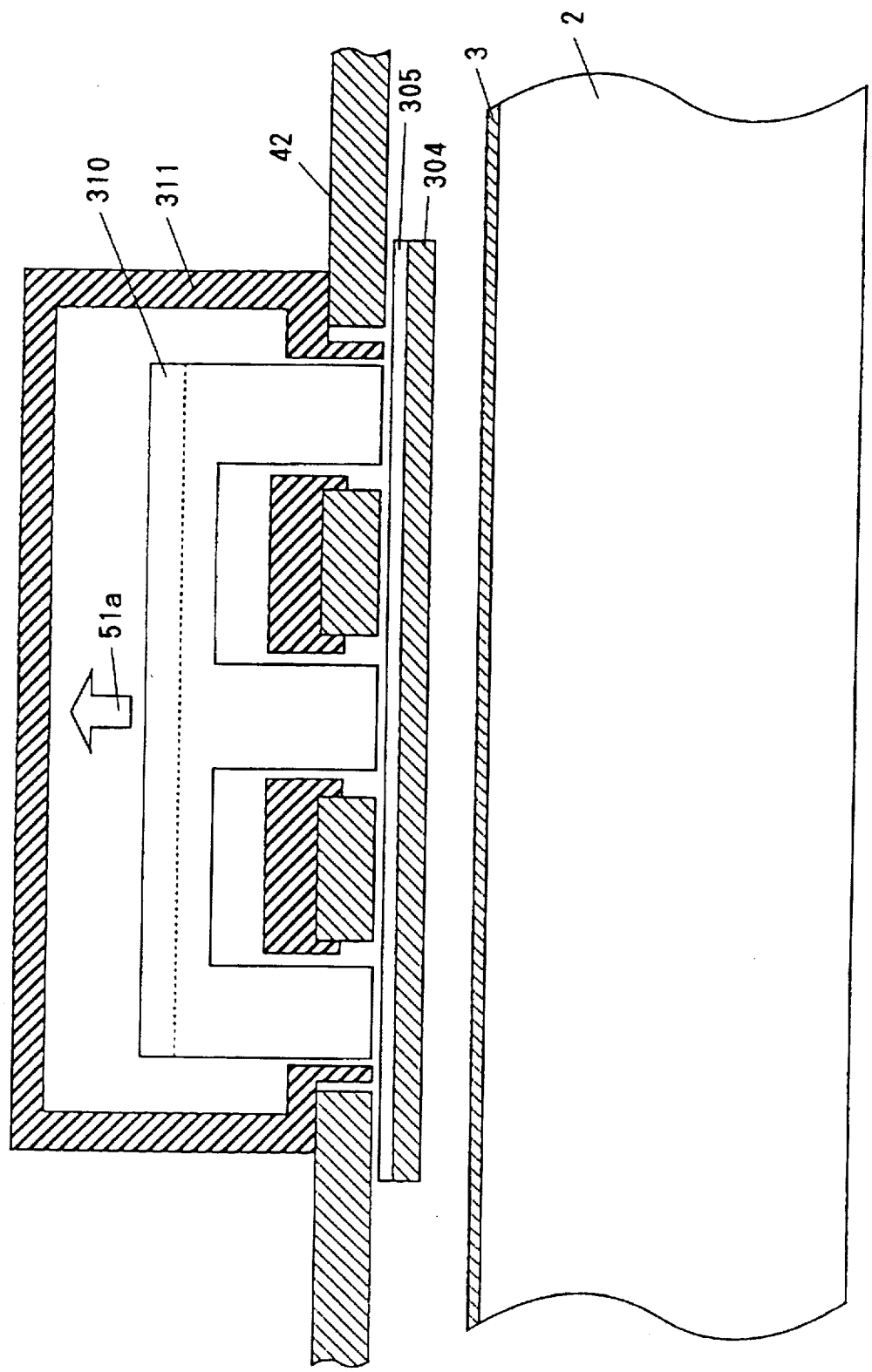
FIG. 62 is a sectional view of a front portion in the case where a liner pin is off in the seventh embodiment.
Figure 63:
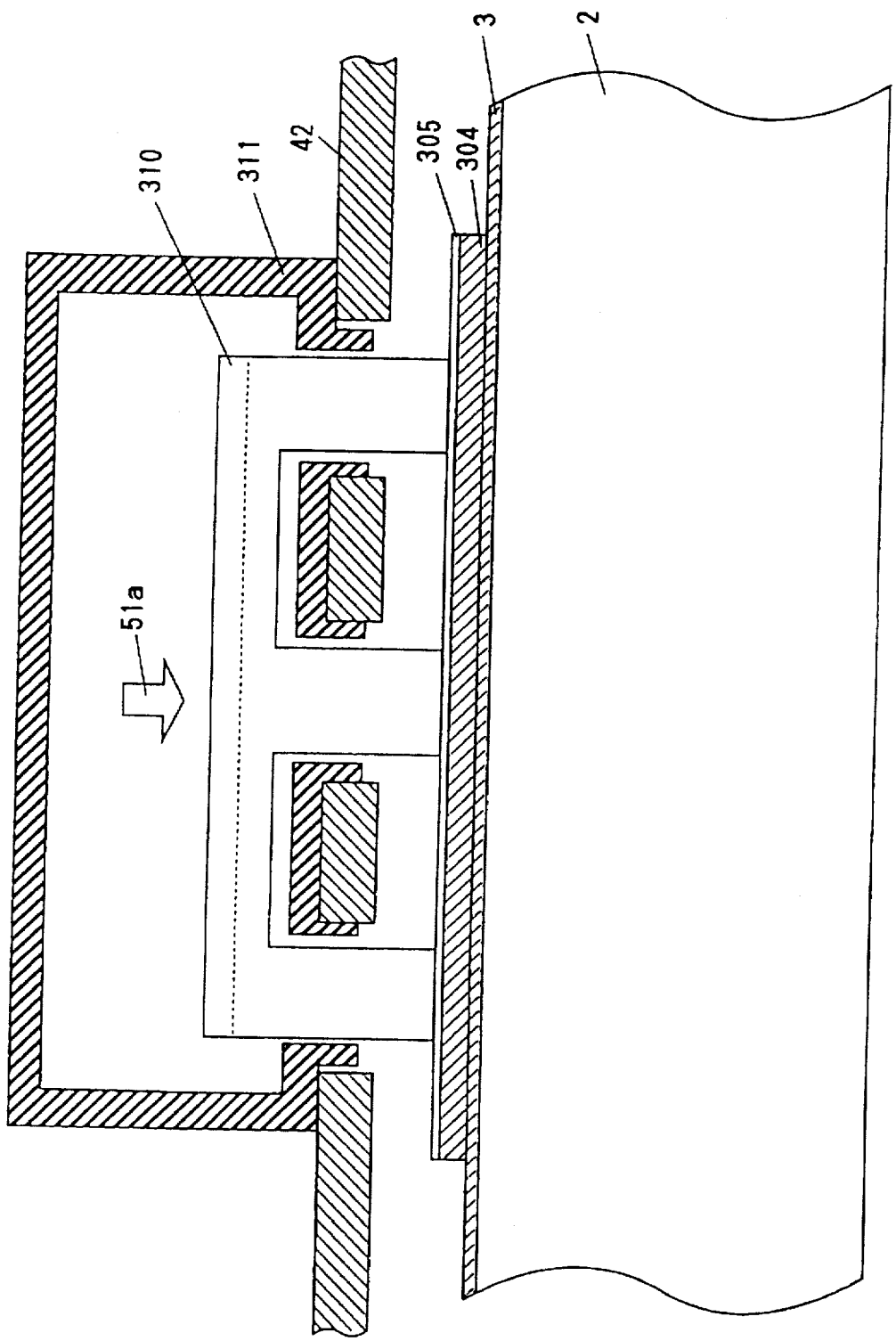
FIG. 63 is a sectional view of a front portion in the case where a liner pin is on in the seventh embodiment.

A modified liner pin 310 will now be described. As shown in FIG. 60 and FIG. 61, a liner pin 310 is of a leaf spring type. As shown in FIG. 62 and FIG. 63, the liner pin 310 can be moved between an OFF position and an ON position. The liner pin 310 is driven in directions 51 and 51 a by an elevating motor 21 via a pin drive lever 312, being moved between the ON position and the OFF position.

Figure 64:
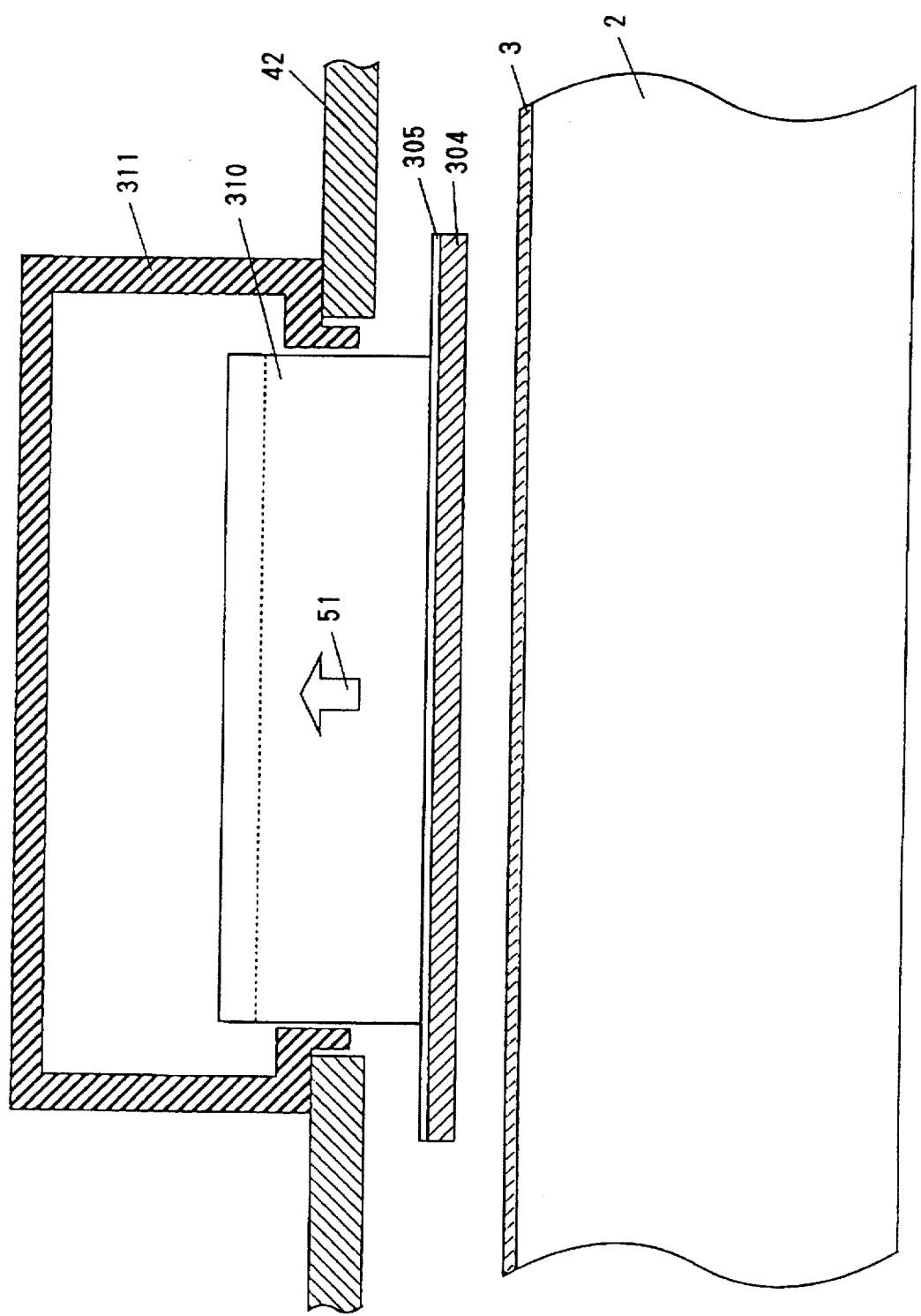
FIG. 64 is a sectional view of a front portion in the case where a liner pin is off in the seventh embodiment.
Figure 65:
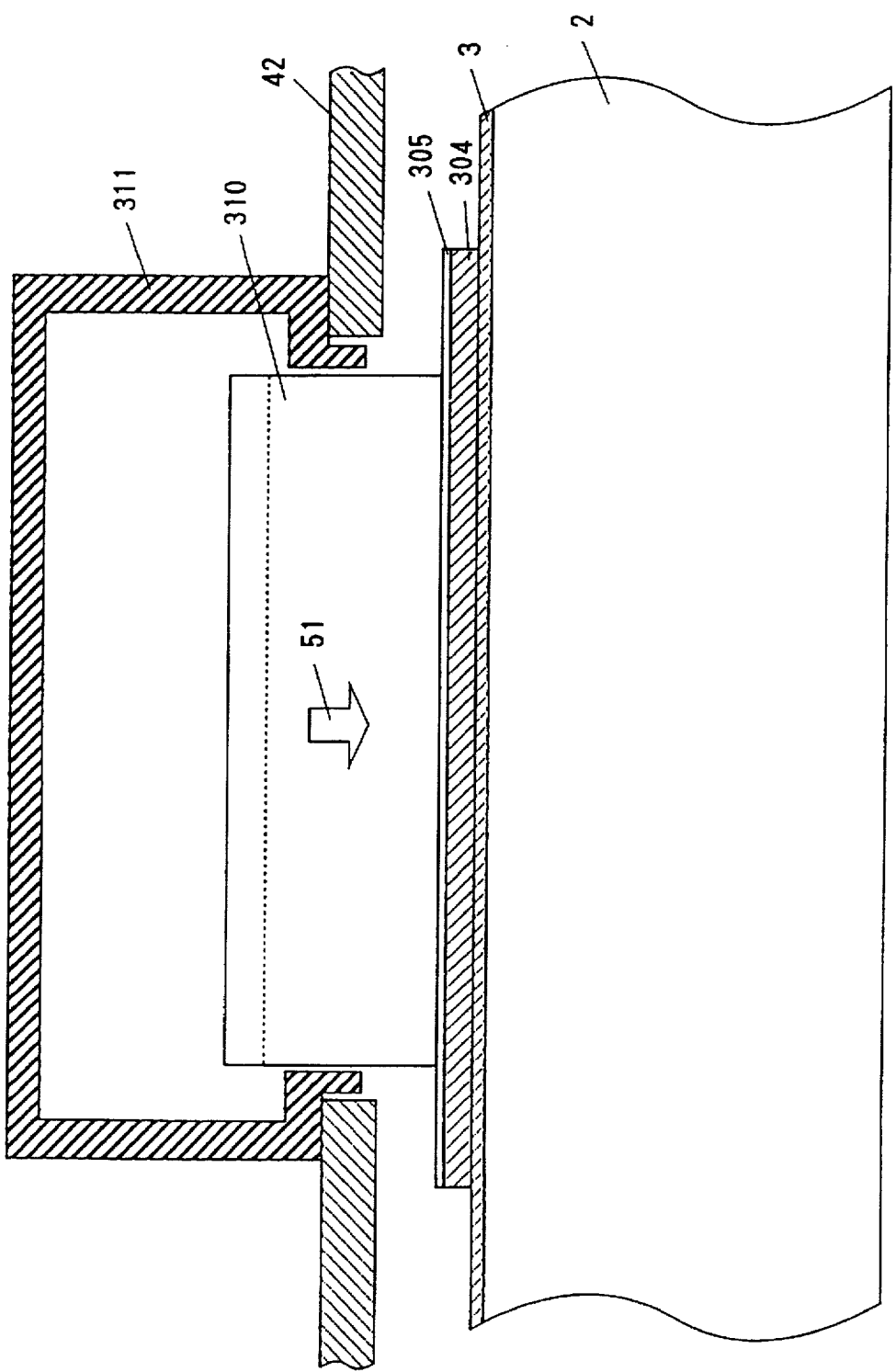
FIG. 65 is a sectional view of a front portion in the case where a liner pin is on in the seventh embodiment.

In the case of use of a single rectangular opening 303, a liner pin 310 can be moved between an OFF position and an ON position as shown in FIG. 64 and FIG. 65. In this case, the area of contact between the liner pin and the liner attachment portion is large, and thus there is an advantage such that dust can be surely removed.

Figure 66:
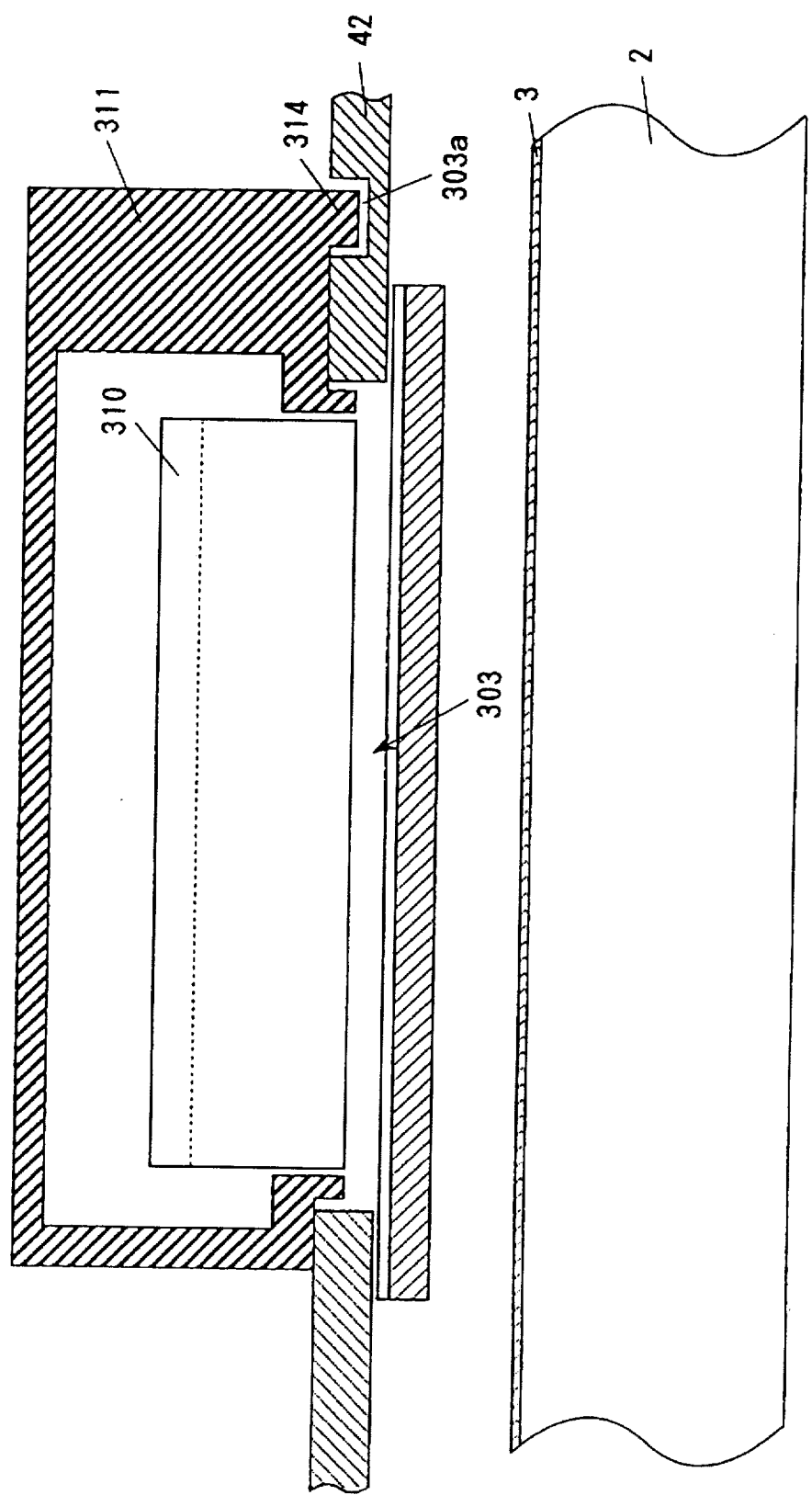
FIG. 66 is a sectional view of a front portion in the case where a liner pin is off in the seventh embodiment.
Figure 67:
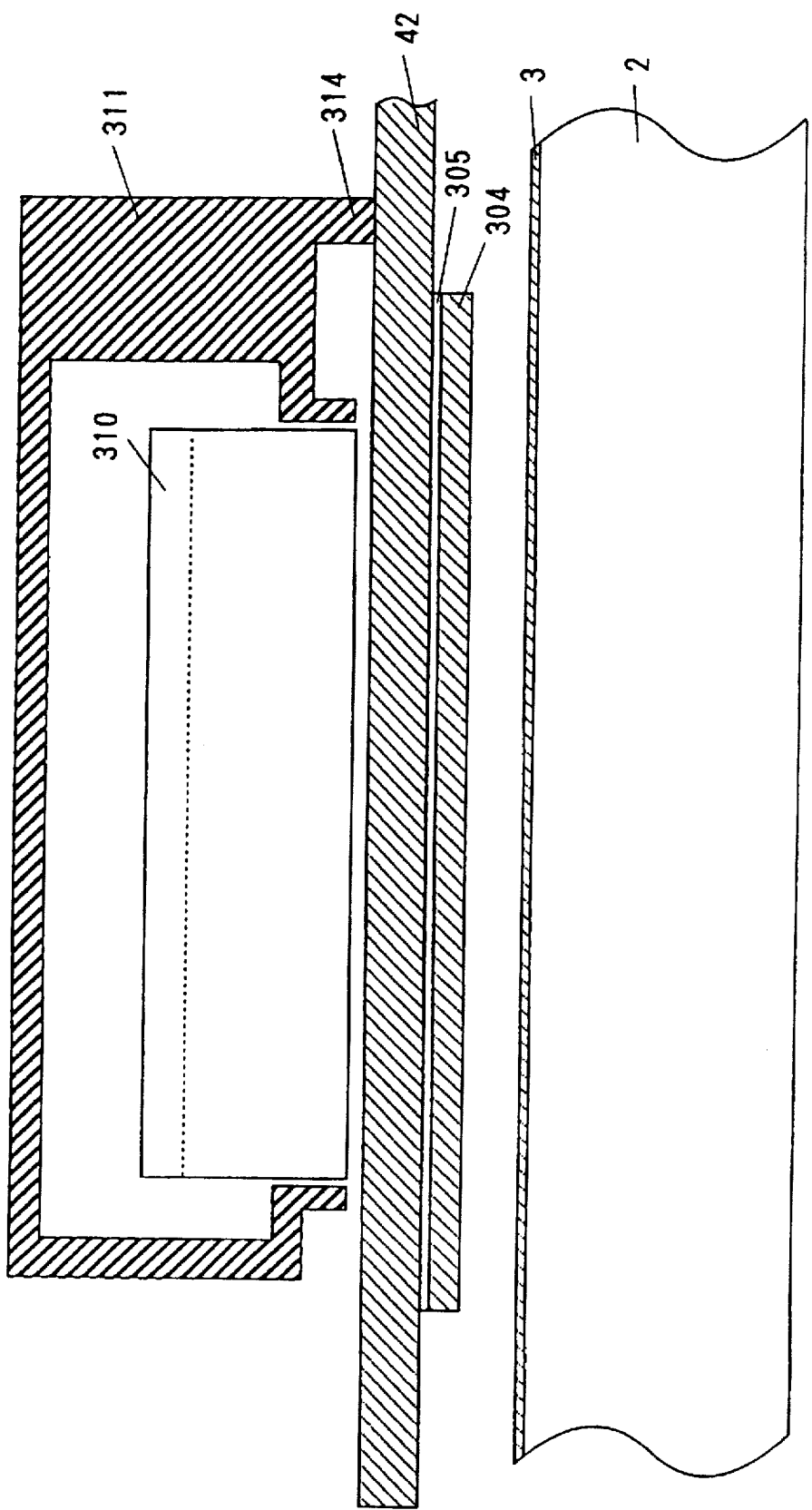
FIG. 67 is a sectional view of a front portion in the case where a liner pin is off and is inactive in the seventh embodiment.

According to a liner pin shown in FIG. 66 and FIG. 67, a liner guide 311 is provided with a protective portion 314. As shown in FIG. 66, a disk cassette 42 of this invention has a recognition hole 313. In the case where the disk cassette 42 of this invention is inserted into a recording and reproducing apparatus, the liner pin 310 is placed in an opening 303. In the case where a conventional disk cassette 42 which does not have a recognition hole 313 is inserted into the recording and reproducing apparatus, the protective portion 314 contacts an outer shell of the disk cassette 42 so that the liner pin 310 remains out of contact with the outer shell of the disk cassette 42. Thus, there is an advantage such that the liner pin 310 can be prevented from becoming dirty or being damaged.

DESCRIPTION OF THE EIGHTH PREFERRED EMBODIMENT

An eighth embodiment of this invention relates to a mechanism for elevating a liner pin to move a liner.

Figure 68A:
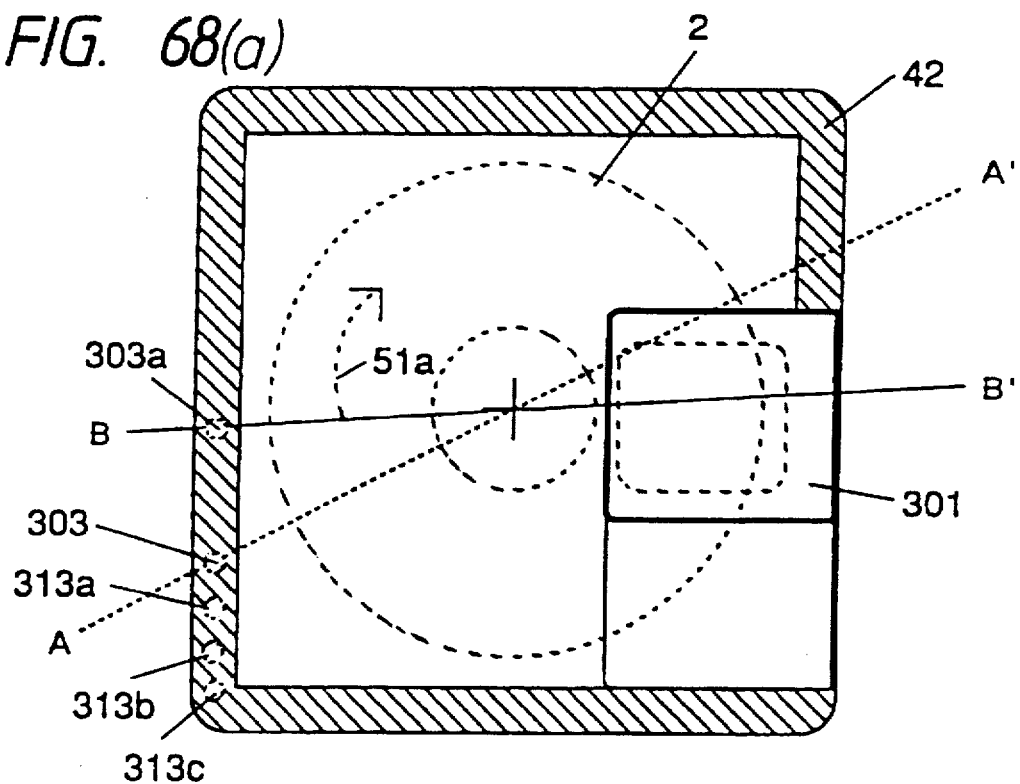
FIG. 68(a) is a top view of a disk cassette in an eighth embodiment of this invention.
Figure 68B:
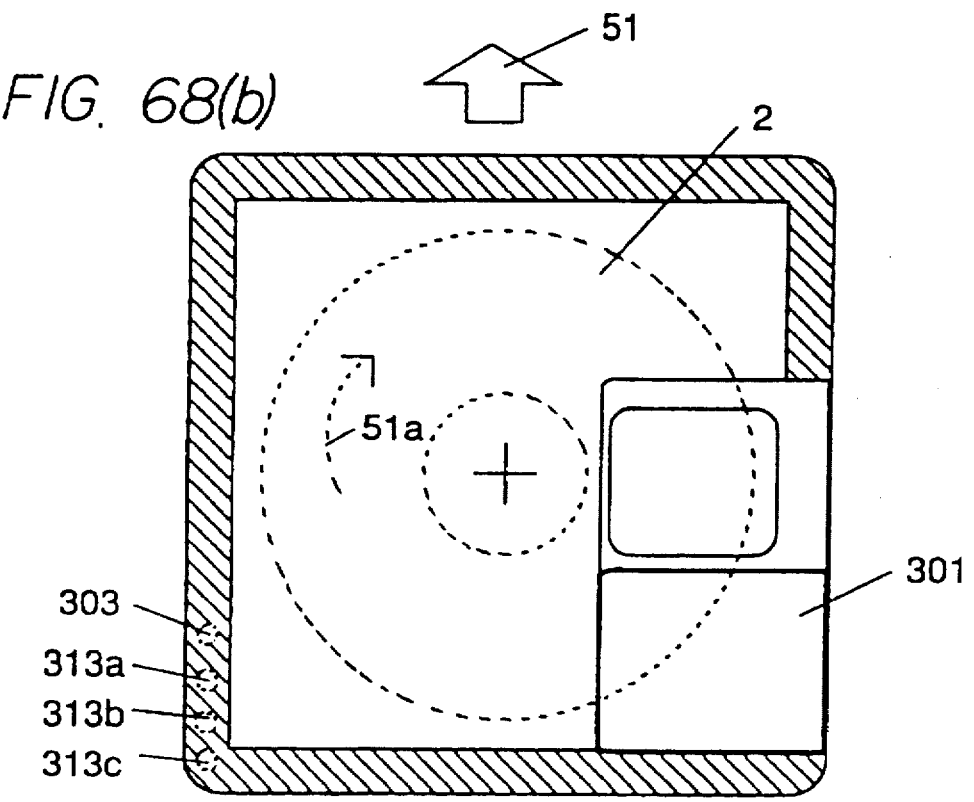
FIG. 68(b) is a top view of a disk cassette in the eighth embodiment.

As shown in FIGS. 68(a) and 68(b), an upper surface of a disk cassette has no opening for a liner. A back side of the disk cassette has recognition holes 313a, 313b, and 313c, and an opening 303 for a liner. The opening 303 extends near the recognition holes 313a, 313b, and 313c. A liner pin is inserted into the disk cassette through the opening 303 from the back side, and thereby a liner is moved vertically.

FIG. 69(a) shows conditions where a liner pin 310 is in an OFF position so that a liner 304 separates from a recording medium 2. As shown in FIG. 69(b), when a liner pin 310 is inserted into the opening 303, a liner drive member 316 is deformed by the liner pin 310 toward a right-hand side and is thus rotated counterclockwise about a pin shaft 315. Thereby, a liner support portion 305 is forced downward by the liner drive member 316 so that the liner 304 is brought into contact with the recording medium 2. As the recording medium 2 rotates, the liner 304 removes dust from the recording medium 2. The liner drive member 316 is made of a leaf spring.

Figure 70A:
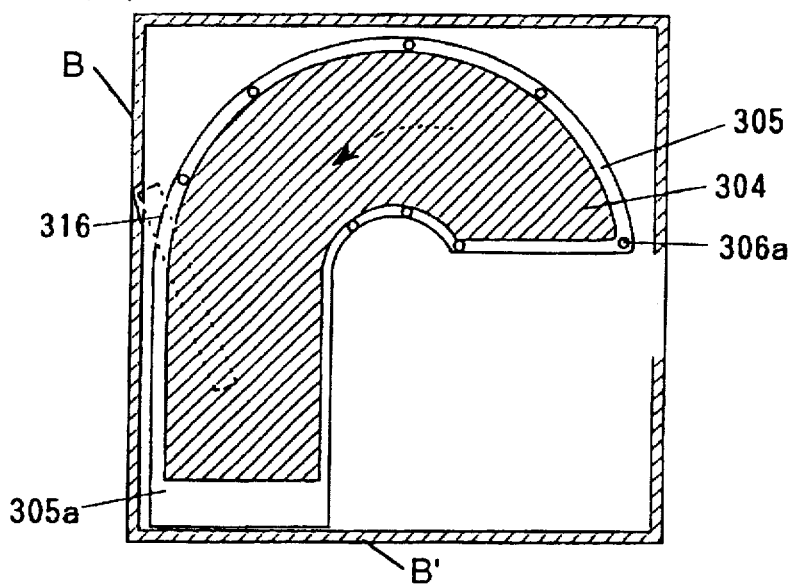
FIG. 70(a) is a top view of a disk cassette in the eighth embodiment.
Figure 70B:
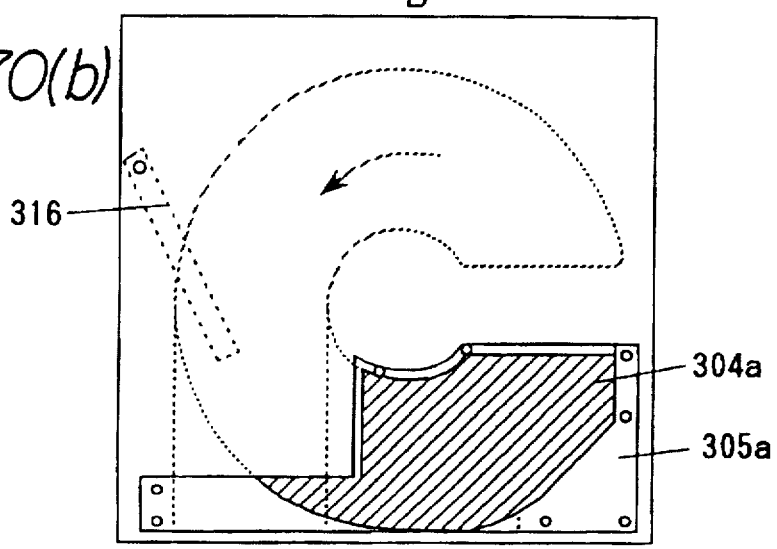
FIG. 70(b) is a top view of a disk cassette in the eighth embodiment.
Figure 70C:
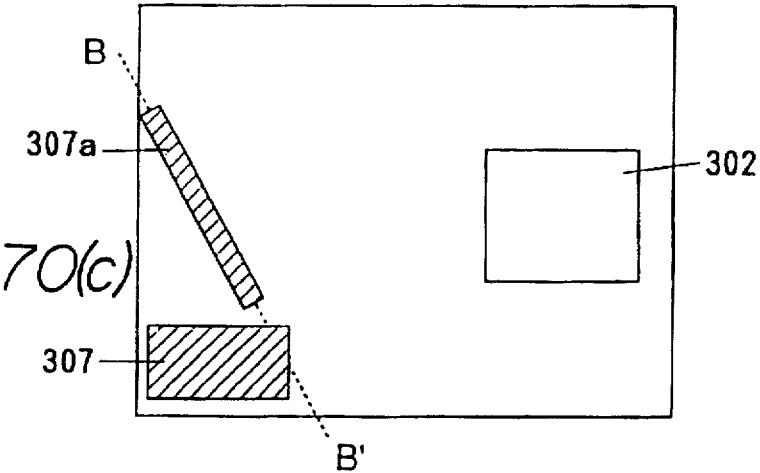
FIG. 70(c) is a top view of a disk cassette in the eighth embodiment.

The liner has a structure such as shown in FIGS. 70(a), 70(b), and 70(c). The liner structure is basically similar to the liner structure previously described with reference to FIG. 49 except for the following design changes. An edge of the liner drive member 316 is provided with a movable portion 305a. In addition, as shown in FIG. 70(c), a groove 30a is added for accommodating the liner drive member 316.

Figure 71:
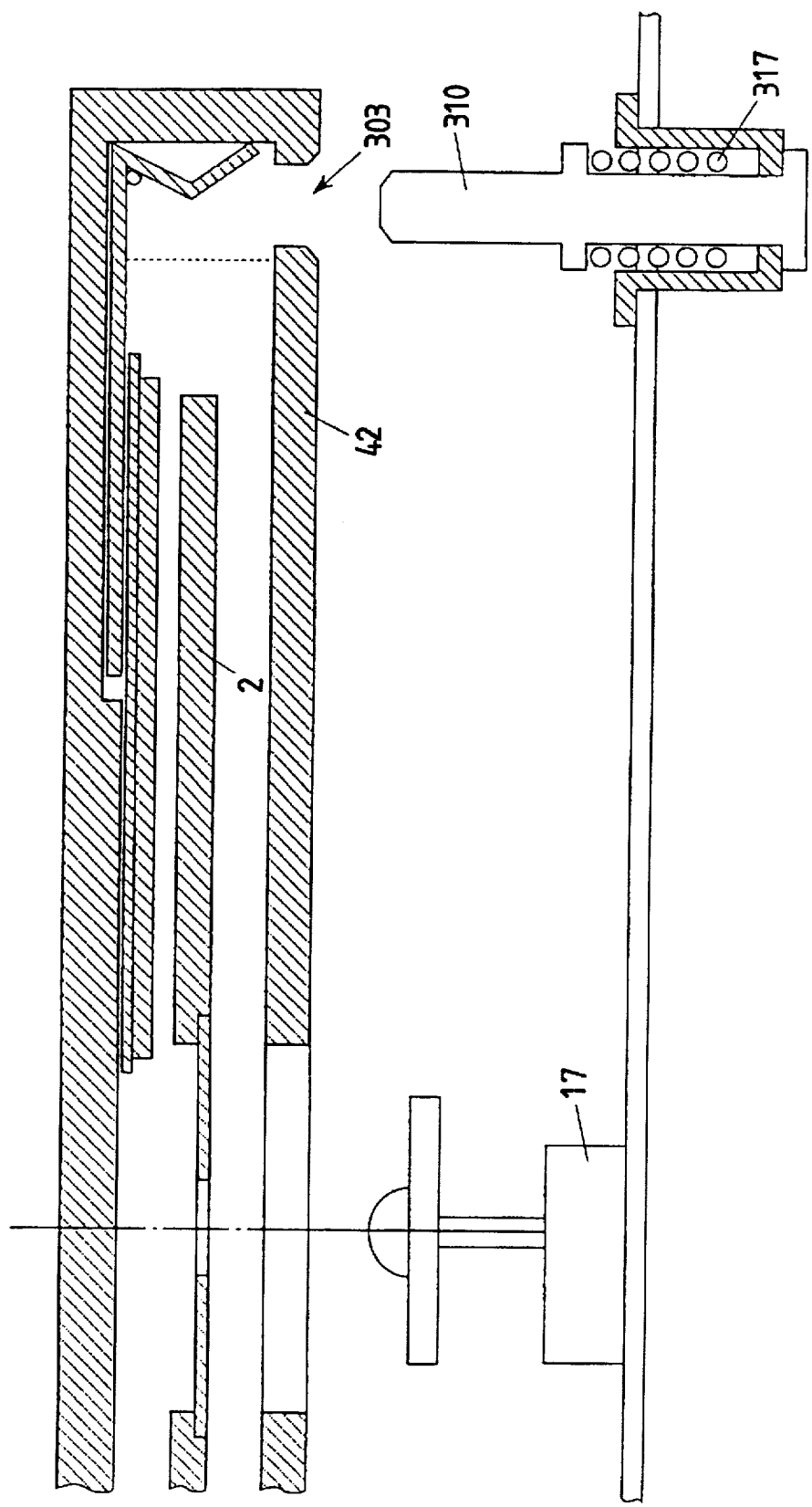
FIG. 71 is a transversely sectional view of a liner pin and a disk cassette in the eighth embodiment.
Figures 72A, 72B:
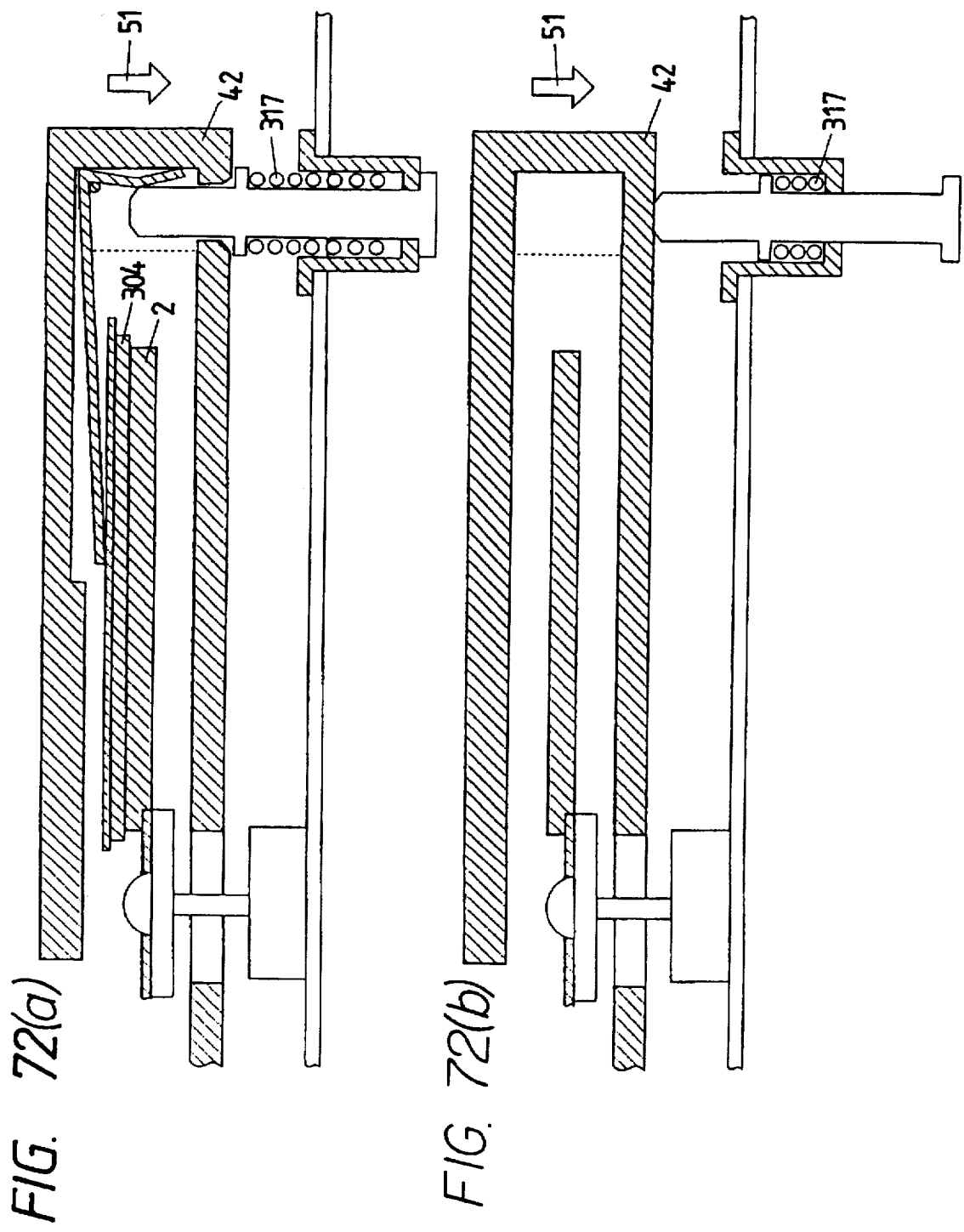
FIG. 72(a) is a transversely sectional view of a portion around a liner pin in the eighth embodiment.
FIG. 72(b) is a transversely sectional view of a portion around a liner pin in the case where a conventional cassette is placed in an operable position in the eighth embodiment.

The drive mechanism for the liner 310 will be further described. The liner pin 310 and a motor 17 are in a positional relation such as shown in FIG. 71. As shown in FIG. 72(a), in the case where a disk cassette 42 of this invention is inserted into a recording and reproducing apparatus in a direction 51, the liner 304 is moved vertically together therewith even if an actuator for the liner pin 310 is not provided. As shown in FIG. 72(b), in the case where a conventional disk cassette 42 having no opening 303 is inserted into the recording and reproducing apparatus, the liner pin 310 is automatically moved downward against the force of a spring 317 since the opening 303 is absent. Thus, there is an advantage such that the conventional disk cassette 42 is prevented from being damaged by the liner pin 310. In the case of use in an apparatus such is a game machine where the frequency of access to a disk is very low, the structure of the apparatus can be simplified since it is unnecessary to provide an actuator for the liner pin 310.

Figure 73A:
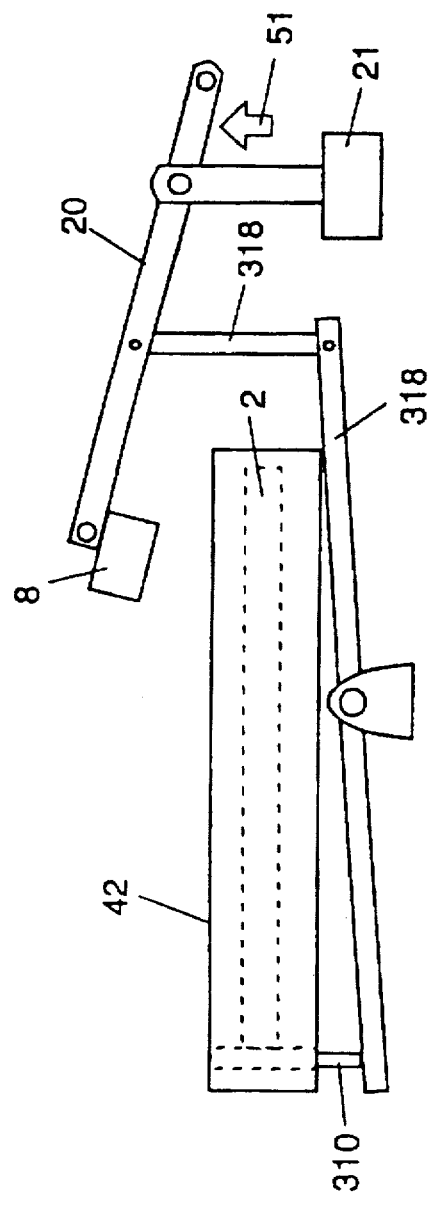
FIG. 73(a) is a transversely sectional view of a portion around a liner pin in the case where liner pin insertion is off in the eighth embodiment.
Figure 73B:
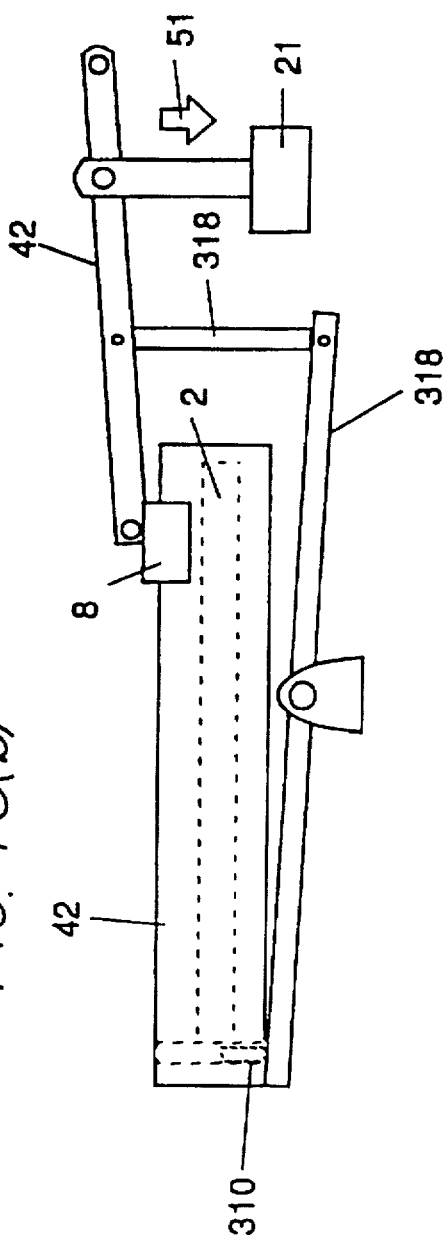
FIG. 73(b) is a transversely sectional view of a portion around a liner pin in the case where liner pin insertion is on in the eighth embodiment.

As shown in FIGS. 73(a) and 73(b), an elevating motor 21 for a magnetic head 8 may be used also to drive a liner pin 310 via an elevator 20 and a connecting portion 318. In this design, when the magnetic head 8 contacts a recording medium 2, a liner 304 always contacts the recording medium 2. Thus, there is an advantage such that a single actuator can be used in common for the magnetic head 8 and the liner pin 310.

Figure 74A:
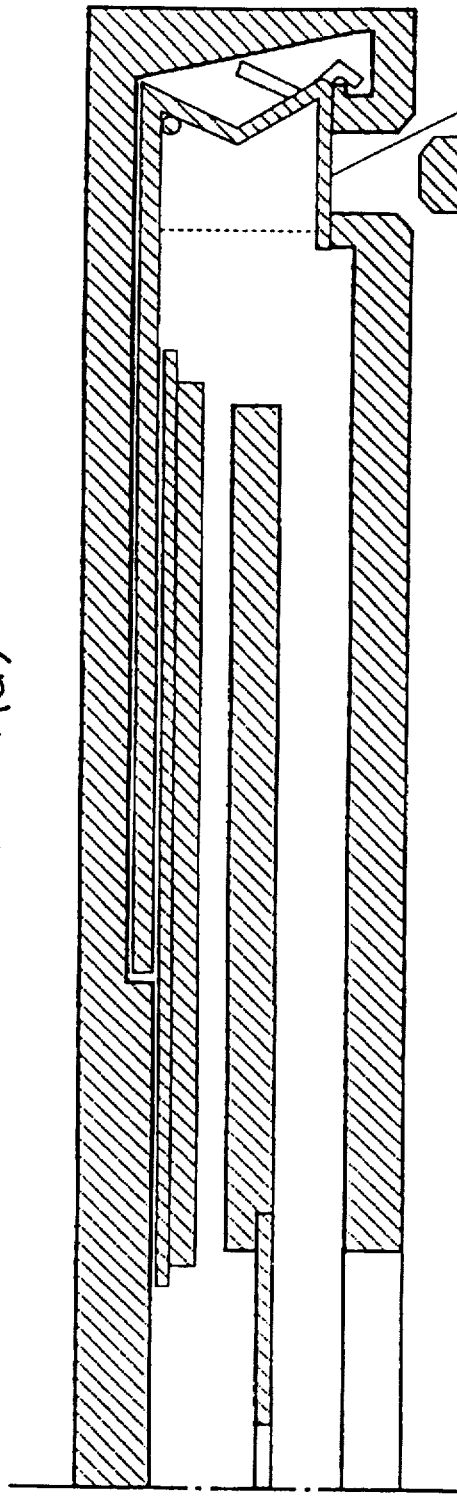
FIG. 74(a) is a transversely sectional view of a portion around a liner pin in the case where liner pin insertion is off in the eighth embodiment.
Figure 74B:
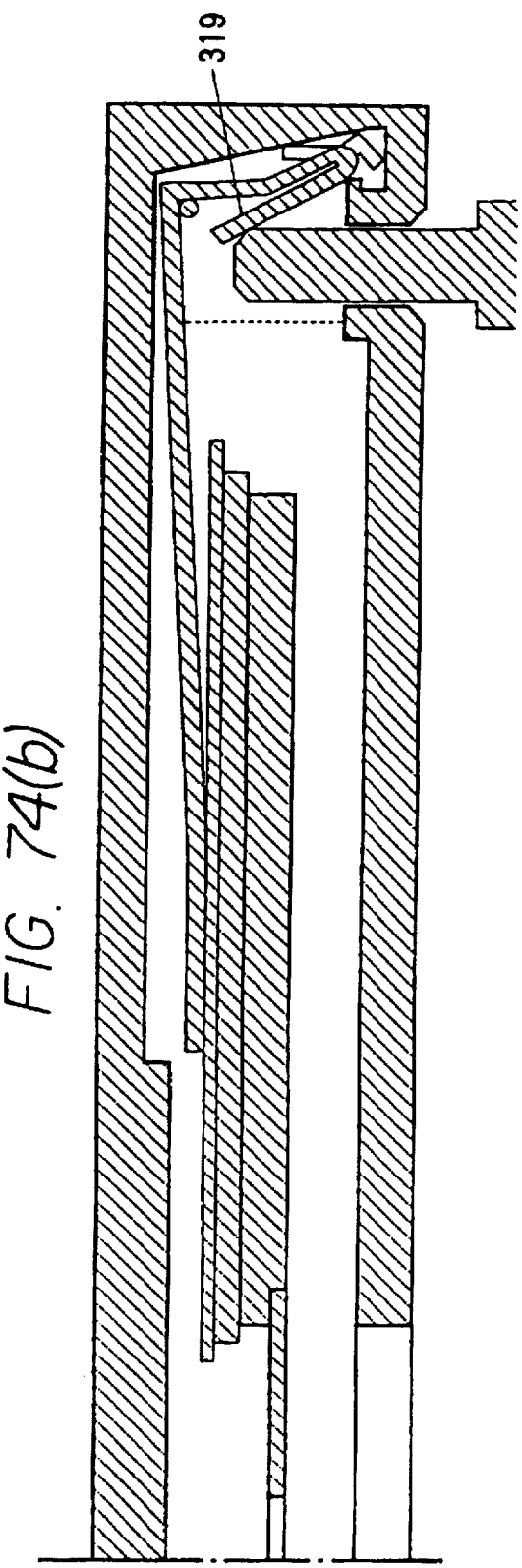
FIG. 74(b) is a transversely sectional view of a portion around a liner pin in the case where liner pin insertion is on in the eighth embodiment.

FIGS. 74(a) and 74(b) show another disk cassette 42 which is basically similar to the disk cassette of FIG. 69 except that a liner drive member 316 is extended and a pin shutter 319 is added. Thus, as shown in FIG. 74(a), the pin shutter 319 is closed when a liner pin 310 assumes an OFF state, and thus there is an advantage such that external dust is prevented from entering the disk cassette 42. According to this design, since the part near a recognition hole in the disk cassette is used, the addition of only one small hole through a conventional disk cassette suffices. Thus, there is an advantage such that the degree of the compatibility between the disk cassette of this invention and the conventional disk cassette can be enhanced. The structure of FIG. 69 has an advantage such that an occupied space in a horizontal direction can be small. Therefore, as shown in FIG. 68, even in the case where only a small usable space is present, an opening 303a for the liner can be provided. Thus, the degree of freedom in designing of a disk cassette is enhanced.

DESCRIPTION OF THE NINTH PREFERRED EMBODIMENT

Figure 75:
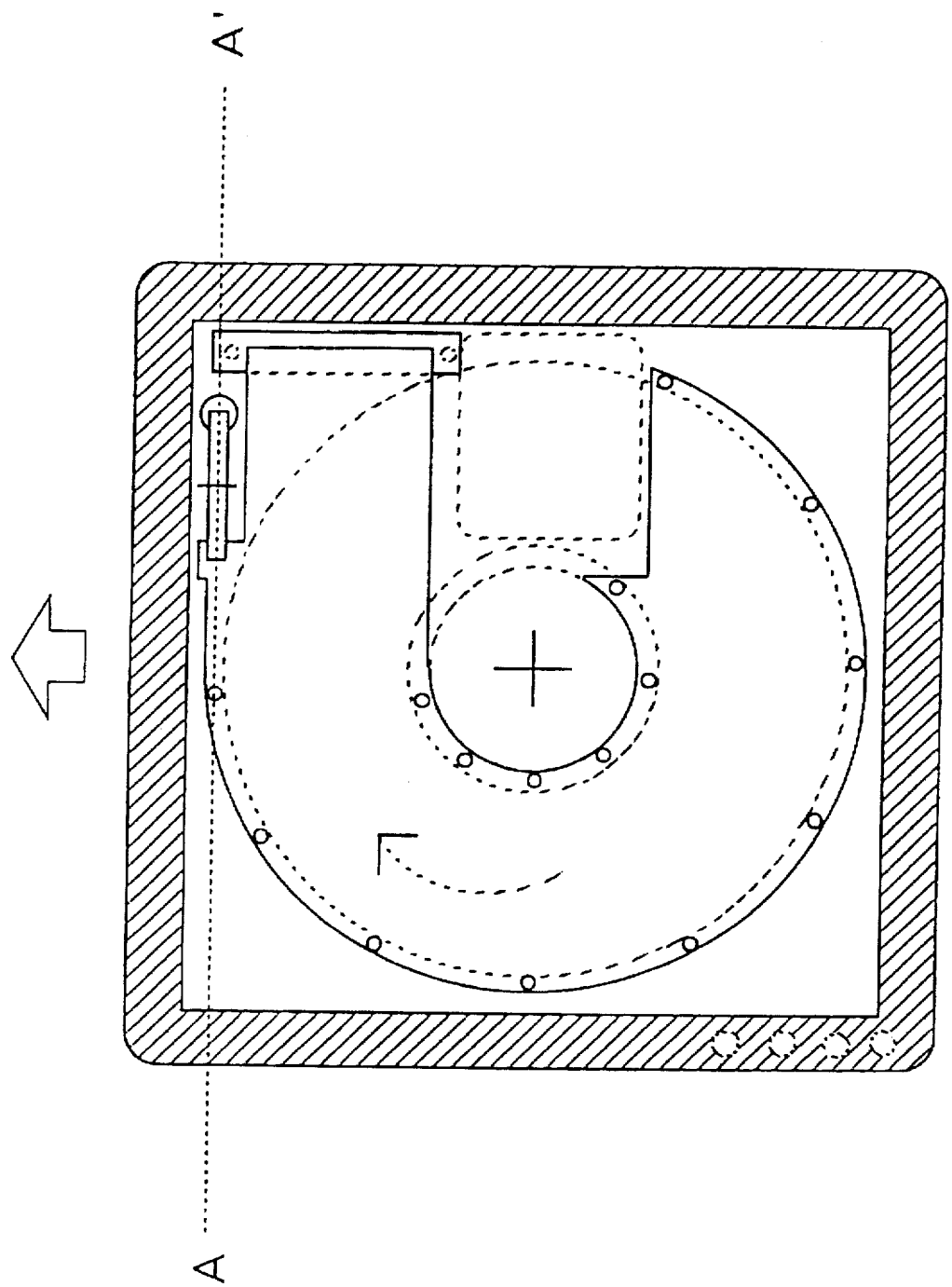
FIG. 75 is a top view of a disk cassette in a ninth embodiment of this invention.
Figure 76:
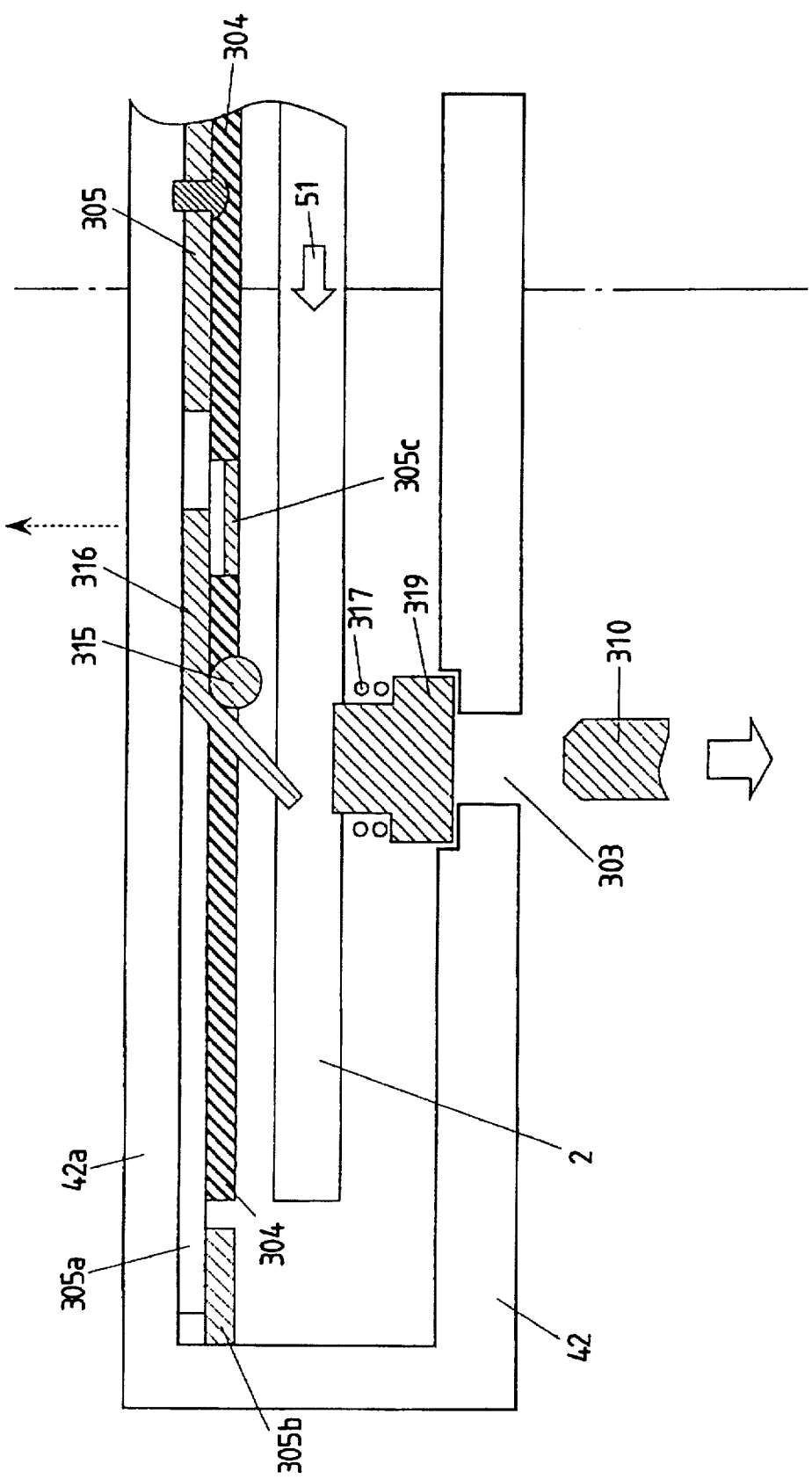
FIG. 76 is a transversely sectional view of a portion around a liner pin in the case where liner pin insertion is off in the ninth embodiment.

FIG. 75 shows a disk cassette according to a ninth embodiment of this invention. A liner 304 and a liner attachment portion 305a are approximately similar in structure to those in FIG. 49. In this embodiment, as shown in FIG. 76 and FIG. 77, the liner attachment portion 305 has a movable section 305a provided with a liner elevator 305c. As the liner elevator 305c is depressed by a liner drive portion 316, the liner 304 is moved vertically. In the case where a liner pin 310 assumes an OFF state, a pin shutter 319 is pressed against a cassette lower wall by a spring 317 so that external dust is prevented from entering the disk cassette. The liner support portion 305 and the movable section 305a are pressed against a cassette upper wall by a leaf spring effect and an auxiliary liner support portion 305b. Thus, in this case, the liner 304 remains out of contact with a recording medium 2.

As shown in FIG. 77, when the liner pin 310 assumes an ON state, the pin shutter 319 forces the liner drive portion 316 to rotate clockwise about a pin shaft 316 so that the liner drive portion 316 depresses the liner elevator 305c. Therefore, the movable section 305a of the liner attachment portion 305 is lowered so that the liner 304 is brought into contact with the recording medium 2. As the recording medium 2 rotates in a direction 51, the liner 304 removes dust from the surface of the recording medium 2. Thus, there is an advantage such that an error rate can be reduced. In addition, the ninth embodiment has an advantage such that the structure thereof is relatively simple and the upward and downward movement of the liner 304 can be surely executed. Since it is unnecessary to provide a groove in the disk cassette 42, there is an advantage such that the durability of the disk cassette 42 can be high.

In the case where this embodiment is applied to the design of FIG. 68(a), the liner elevating mechanism has a structure such as shown in FIGS. 78(a) and 78(b). The operation of the structure of FIGS. 78(a) and 78(b) is similar to the operation of the structure of FIGS. 76 and 77. As shown in FIG. 78(a), when a liner pin 310 is in an OFF position, an opening for a liner is closed by a pin shutter 319. As shown in FIG. 78(b), when the liner pin 310 assumes an ON position, a liner drive portion 316 is rotated counterclockwise and depresses a liner elevator 305c. Thus, a liner attachment portion 305a and a liner 304 are lowered so that the liner 304 is brought into contact with a recording medium 2. This design has an advantage over the design of FIG. 76 such that the liner elevating mechanism occupies a smaller space.

In a design where a liner and a recording medium separate from each other when a liner pin 310 is inserted into a disk cassette 42, there is an advantage such that the liner contacts the recording medium and prevents the recording medium from being rotated and damaged during unuse conditions of the disk cassette 42.

DESCRIPTION OF THE TENTH PREFERRED EMBODIMENT

A recording and reproducing apparatus according to a tenth embodiment of this invention is similar to the recording and reproducing apparatus of FIG. 38 except for design changes indicated later.

Figures 79A, 79B:
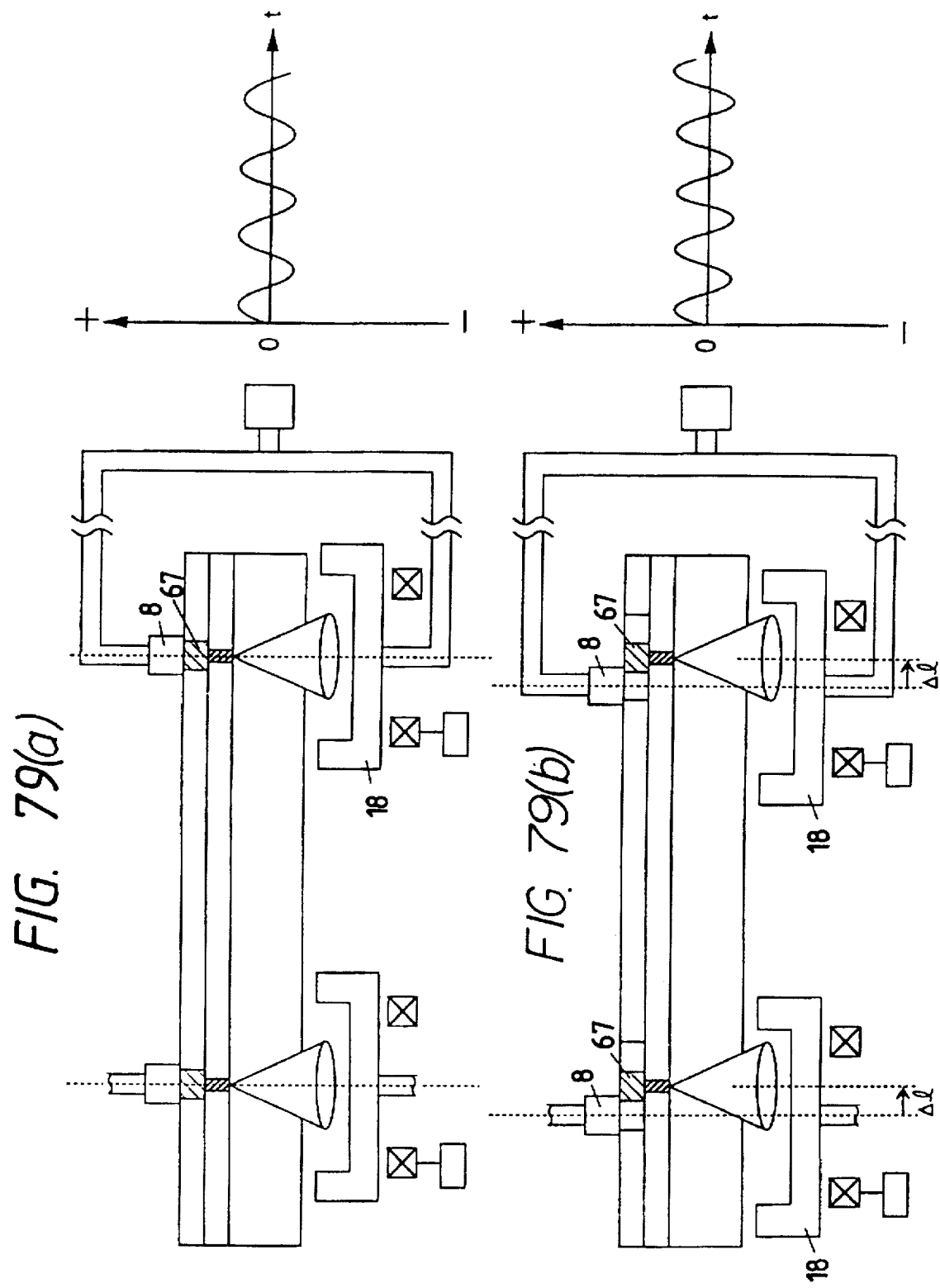
FIG. 79(a) is an illustration of a tracking principle which occurs in the absence of correction in a tenth embodiment of this invention.
FIG. 79(b) is an illustration of a tracking principle which occurs in the absence of correction in the tenth embodiment.

First, tracking will be described. As shown in FIG. 79, under ideal conditions, a magnetic head 8 vertically aligns with an optical head 6. Thus, when the optical head accesses an optical track 65 of a given address, the magnetic head 8 accesses a corresponding magnetic track 67 at the opposite side of the optical track 65. In this case, a DC offset voltage is absent from a tracking error signal outputted by an optical head actuator 18. However, in fact, a variation in a spring constant of the optical actuator 18 and an influence of gravity cause the center of the optical head actuator 18 to be subjected to a positional offset of several tens of μm to several hundreds of μm. In addition, during assembly, a positional error is offered to the center of the magnetic head 8. Thus, as shown in FIG. 79(b), there occurs a positional offset Δl between the center of the magnetic head 8 and the center of the optical head actuator 18.

Even when an optical track of a given address is scanned by the optical head 6, there is a chance that an unrelated magnetic track is scanned by the magnetic head 8 since a correspondence relation with a magnetic track scanned by the magnetic head 8 is absent. Specifically, a pitch of magnetic tracks is generally set to 50 to 200 μm. A possible maxima offset between the center of the optical head 6 and the magnetic head 8 is equal to several hundreds of μm. Thus, under bad conditions, there is a chance that the magnetic head 8 travels on a magnetic track neighboring a desired magnetic track and thereby wrong recording of data is executed.

To prevent such a problem, this invention adopts a method in which an offset voltage ΔVo is provided to a tracking control signal to compensate for the positional offset of the optical head 6 so that the optical head 6 can accurately face the opposite side of a reference (currently-scanned) magnetic track 67. According to this design, the magnetic head 8 and the optical head 6 reliably remain in vertical alignment with each other, and the positions of the optical track 65 and the magnetic track 67 are more highly correlated. In general, the offset between the magnetic head 8 and the optical head 6 falls in a range well covered by a normal tracking error of several μm to several tens of μm. Even in the case where the track pitch is set to 50 μm, the magnetic head 8 can be held in good tracking conditions with respect to a desired magnetic track by referring to the address of a currently-scanned optical track.

Figures 80A, 80B:
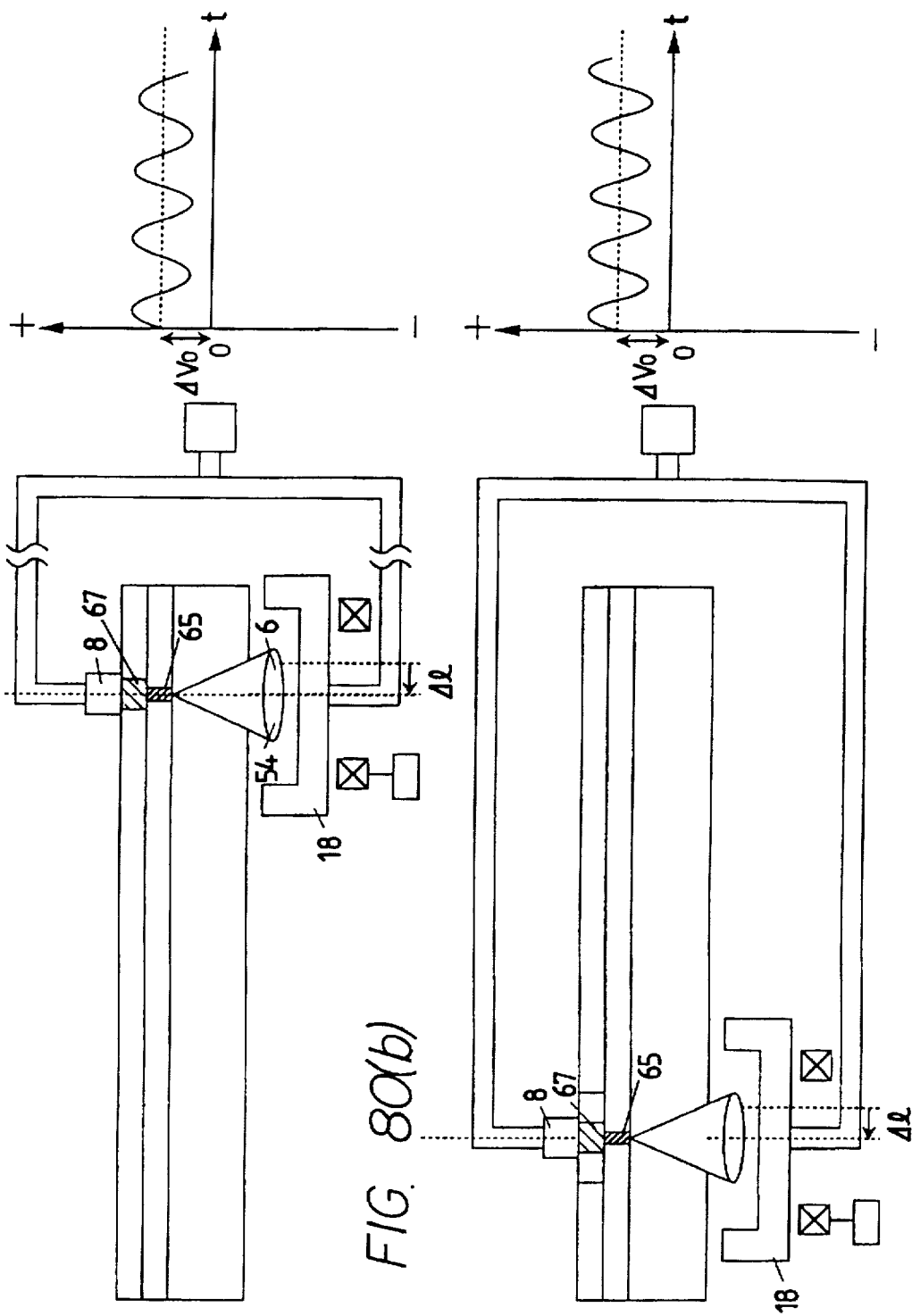
FIG. 80(a) is a view of tracking conditions of an optical head in the tenth embodiment.
FIG. 80(b) is a view of tracking conditions of an optical head in the tenth embodiment.

In the case where an offset voltage ΔVo is applied as shown in FIG. 80(b), the offset of the optical head 6 is corrected so that the magnetic head 8 can access a desired magnetic track 67 by accessing the address of a currently-scanned optical track 68.

A description will now be given of calculation of a desired value of the offset voltage ΔVo. According to the standards for a CD or an MD (a mini-disk), a maximum possible offset of an optical track 65 is 200 μm. A pitch of magnetic tracks 67 corresponds to 2DD and is thus equal to 200 μm in the case of a 135-TPI class. Thus, if no countermeasure is provided, it is generally difficult to access a desired magnetic track 67 by referring the address of an optical track 65 at the opposite side thereof.

Figure 81B:
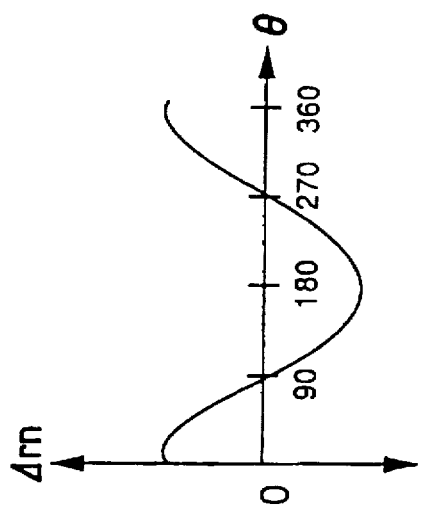
FIG. 81(b) is an illustration of an offset mount of an optical track on a disk in the tenth embodiment.
Figure 81C:
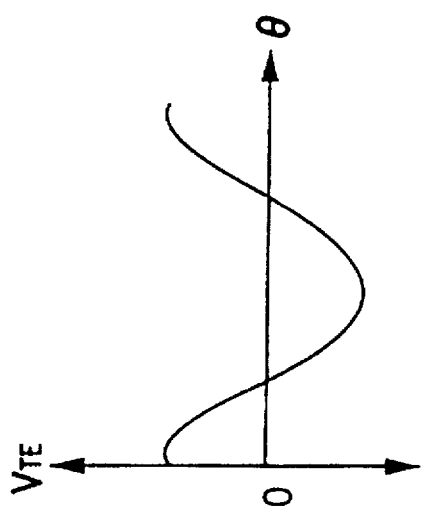
FIG. 81(c) is an illustration of a tracking error signal in the tenth embodiment.
Figure 81A:
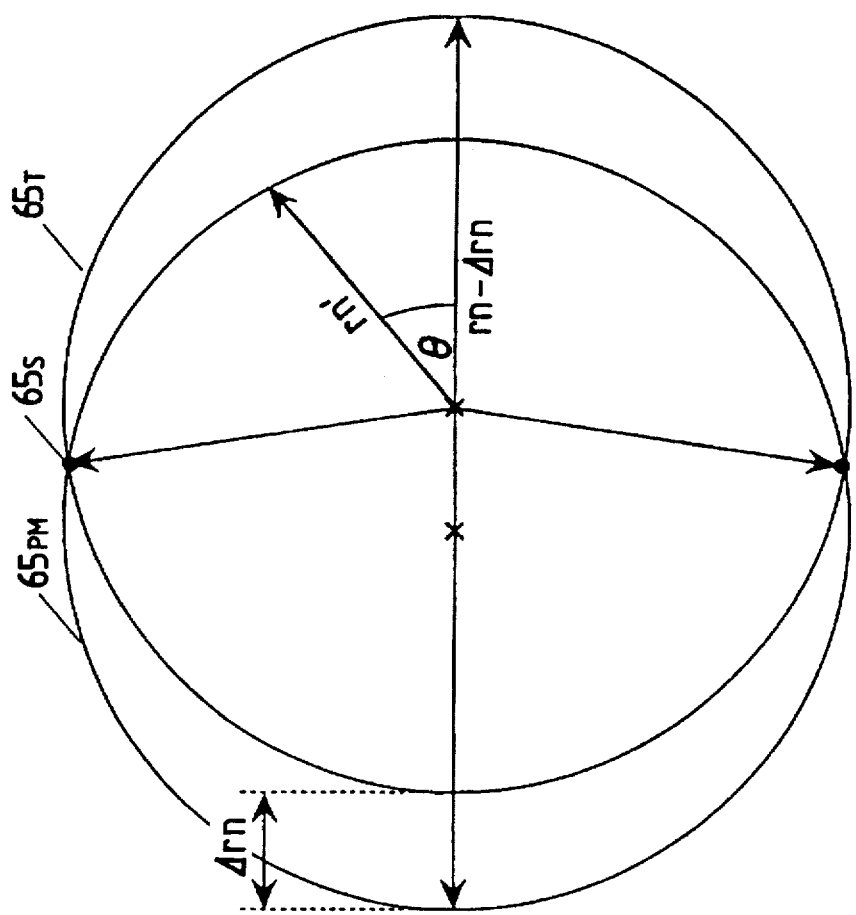
FIG. 81(a) is an illustration of an offset amount of an optical track on a disk in the tenth embodiment.

As shown in FIG. 81(a), there occurs an offset Δrn between a pre-mastered optical track 65PM and a locus 65T of the optical head 6 free from servo control. Here, in the case where a traverse is held fixed and the optical head 6 is subjected to tracking servo control, the offset of the optical track causes a tracking error signal such as shown in FIG. 81(b).

In the case where an optical track address is read out and is set as a reference point when θ=0°, the tracking radius is made equal to rn-Δrn by the offset and is thus smaller than a designed tracking radius rn. On the other hand, in the case where an optical track address is read out and is set as a reference point when θ=180°, the tracking radius is made equal to rn+Δrn by the offset and is thus greater than the designed tracking radius rn.

In the case where the track pitch is equal to 100–200 μm and the offset of the optical track is equal to ±200 μm, the tracking radius tends to deviate from a desired radius if tracking servo control is absent.

As shown in FIG. 81, the error is minimized when θ=90° and θ=270°. Accordingly, the address of an optical track 65PM which occurs when θ=90° or θ=270° is used as a reference and the position of the center of an optical track is determined on the basis of the reference, and thereby the radius rn of an n-th track corresponding to a setting value is determined.

As made clear from FIG. 81, Δrn=0 when θ=90° and θ=270°, and a standard (reference) tracking radius rn is determined. The positions of θ=90° and θ=270° are determined by referring to the tracking error signal. The address of an optical track 65 in a position on a line of extension of these angles is used, and the optical head is subjected to tracking control with respect to this optical track address 65s. Thereby, there is provided an advantage such that a standard (reference) tracking radius rn is obtained and more accurate tracking by the magnetic head is enabled. It should be noted that the optical track address information is recorded on a first track of a magnetic track 67 or a TOC track.

In the case of the CD or MD format, the number of pieces of address information per round of an optical track is relatively small. Thus, 360 addresses can not be obtained for one degrees of 360°. As shown in FIG. 86, it can be known what degrees of an angle θ a block in a given order number in an address 1 corresponds to. Thereby, for example, an angular resolution in unit of degree can be obtained. Thus, by executing management in unit of block, it is possible to obtain optical address information of an arbitrary radius and an arbitrary angle. A table representing the correspondence between optical address information and a magnetic track number will be referred to as an address correspondence table.

Next, a description will be given of methods of providing the correspondence between a magnetic track radius rm and an optical track radius ro. A positional offset between the optical head and the magnetic head has a first component caused during manufacture and assembly and a second component caused during operation. Positions and sizes vary parts by parts or devices to devices, and therefore the offset components can not be uniquely determined. To maintain the compatibility, it is important to clarify the correspondence between the magnetic track radius and the optical track radius.

According to a first method, a reference track is not provided on a magnetic surface of a recording medium. As shown in FIG. 79(b), during the formatting of a magnetic surface, a positional offset is always present between the magnetic head 8 and the optical head 6. If the formatting is done under these conditions, a track with a positional offset is recorded. In the case where recording and reproduction are done on a same disk by a same drive, there is no problem since an equal positional offset is always present.

In the case where tracking is moved to a given track, a traverse is required to be moved always in a same direction, for example, a direction from an inside toward an outside, in view of the fact that an actuator for the traverse has a backlash. In the case where tracking is done again on an n-th track, an offset distance is present between the magnetic track 8 and the optical head 6 as shown in FIG. 79(b) if an offset voltage is not applied during the tracking. Thus, when an optical track same as the optical track during the recording is accessed, tracking is done with respect to a magnetic track same as the magnetic track during the recording so that data can be recorded and reproduced into and from the desired magnetic track.

Figures 82A, 82B:
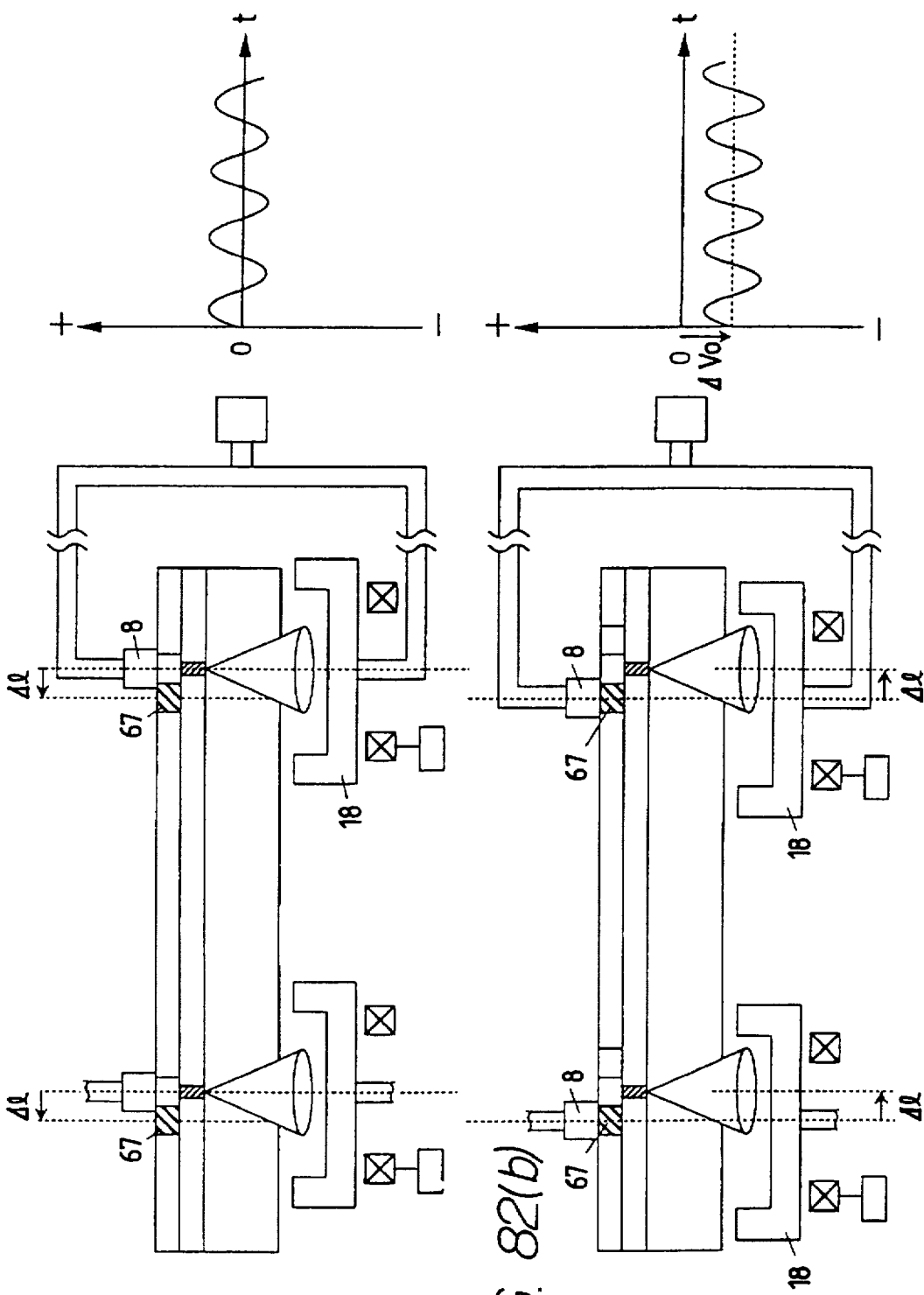
FIG. 82(a) is a view of tracking conditions of an optical head which occur in the absence of correction in the tenth embodiment.
FIG. 82(b) is a view of tracking conditions of an optical head which occur in the presence of correction in the tenth embodiment.

In the case where the recording medium which has been formatted is operated by another drive and the drive has characteristics such that an offset equals zero in the absence of an offset voltage as shown in FIG. 82(a), an optical track and a magnetic track are out of alignment by an offset distance as compared with the previous recording so that data will be recorded and reproduced into and from a wrong magnetic track.

In this invention, to remove such a problem, the traverse is controlled and moved so that a reference magnetic track will be accessed first as shown in FIG. 82(a). Then, under conditions where the traverse is fixed, an offset voltage $\Delta V$ is varied so that the optical track 6 will access an optical track 65 containing a reference address signal. As a result, the offset voltage $\Delta Vo$ is determined. Thereby, the relation of the correspondence between the optical track and the magnetic track is provided similar to the drive which has executed the previous formatting.

The offset voltage $\Delta Vo$ is continuously applied to the actuator for the optical head 6. Thereby, a simple structure can produce an advantage such that all the magnetic tracks and the optical tracks correspond to each other with an accuracy of several μm to several tens of μm. Thus, by applying the offset voltage, it is possible to automatically access a given magnetic track when a given optical track is accessed. Since this advantage is obtained by the structure having no position sensor for the lens of the optical head 6, there is an advantage such that the number of parts can be reduced.

Figure 83:
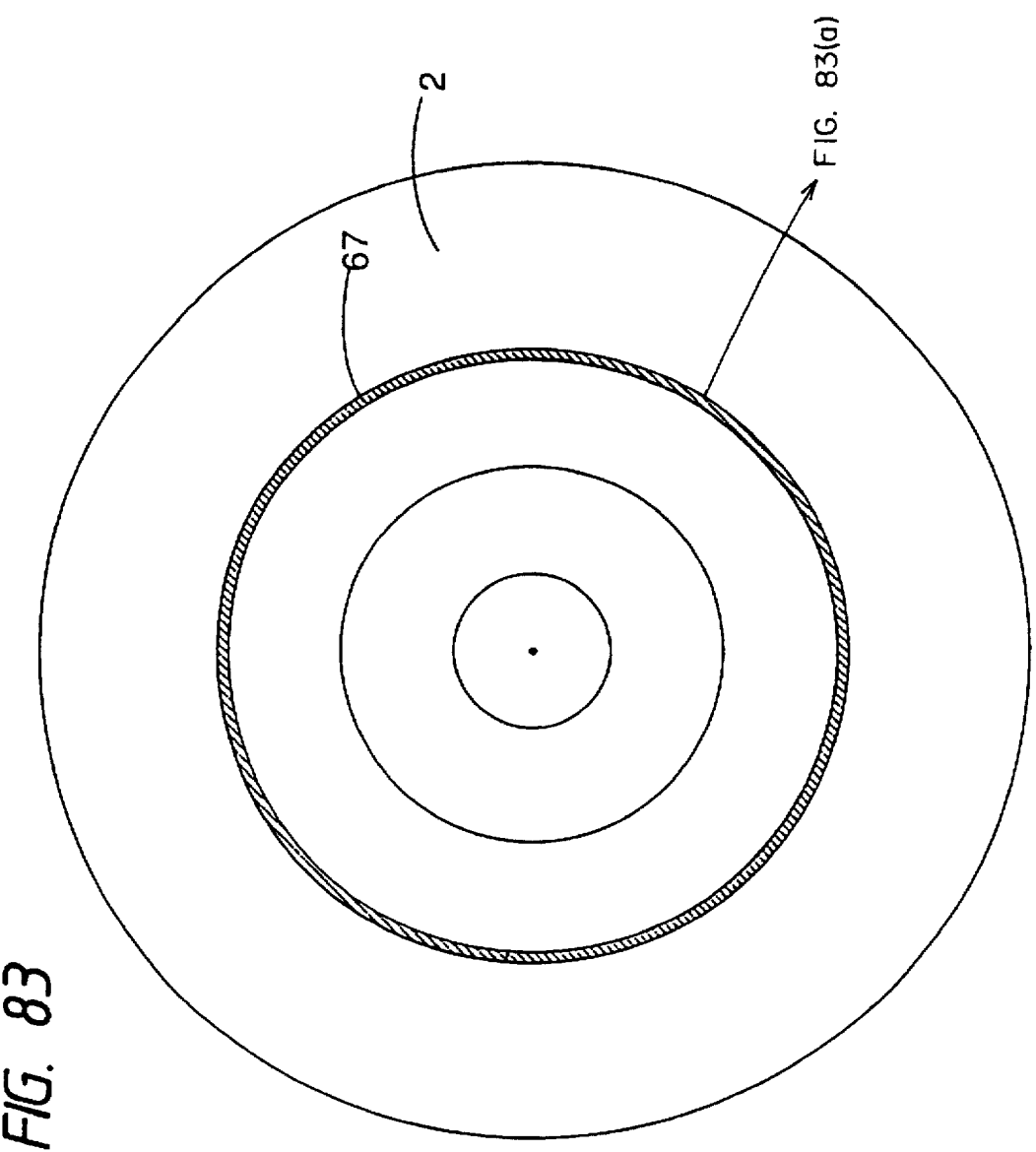
FIG. 83 is an illustration of a reference track in the tenth embodiment.
Figure 83A:
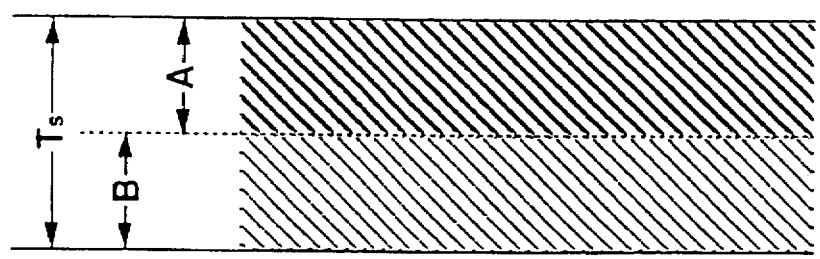

Next, a description will be given of a second method in which a reference track is previously recorded on a magnetic recording surface. As shown in FIG. 83, during the fabrication of a disk, one magnetic track 67 is provided which records an embedded servo track. With respect to this servo magnetic track 67s, as shown in the left-hand part of FIG. 83, two magnetic tracks are recorded while they are partially overlapped. Carriers of frequencies fa and fb are recorded on the two magnetic tracks respectively.

When the magnetic head 8 executes tracking on the center of the servo magnetic track during the reproduction, the magnitudes of reproduced signals of the frequencies fa and fb are equal to each other. When the tracking deviates inwardly from the center, the output signal of the frequency fa is greater. On the other hand, when the tracking deviates outwardly from the center, the output signal of the frequency fb is greater. Thus, the traverse is moved so that the magnetic head 8 can be positionally controlled at the center of the track.

Although the provision of the servo magnetic track causes a slight increase in the cost of a recording media, there is an advantage such that the offset voltage $\Delta Vo$ can be more accurately calculated in connection with FIG. 80(a). In addition, eccentricity information of an optical track can be more accurately determined.

As shown in FIGS. 84(a) and 84(b), a slider 41 of the magnetic head 8 is made of soft material such as teflon other than metal, and is formed by molding. Thereby, there is an advantage such that the slider 41 less damages a magnetic recording layer 3.

As shown in FIGS. 85(a) and 85(b), when the magnetic recording is not executed, a slider actuator inclines the slider 41 so that the magnetic head 8 is separated from the magnetic recording layer 3 and a part of an edge of the slider 41 is brought into contact therewith.

As shown in FIG. 85(b), only when the magnetic recording is executed, the actuator inclines the slider into parallel with the magnetic recording layer so that the magnetic head 8 moves into contact with the magnetic recording layer 3. Thus, the magnetic recording is possible. In this case, there is an advantage such that wear of the magnetic head 8 can be reduced during unexecution of magnetic recording.

DESCRIPTION OF THE ELEVENTH PREFERRED EMBODIMENT

Figure 87:
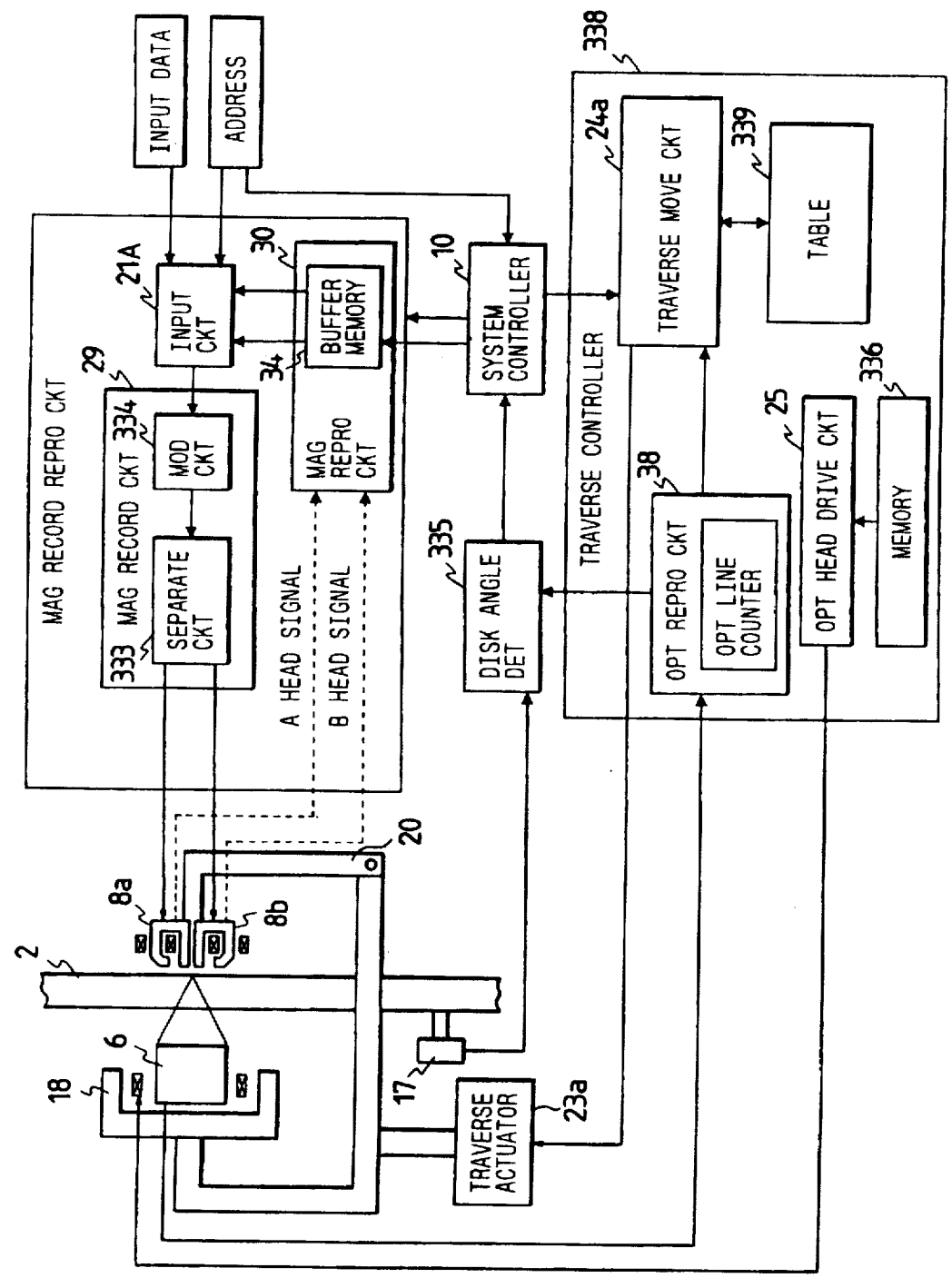
FIG. 87 is a block diagram of a magnetic recording portion in an eleventh embodiment of this invention.

A recording and reproducing apparatus according to an eleventh embodiment of this invention is similar to the recording and reproducing apparatus of FIG. 38 except for design changes indicated later. The eleventh embodiment uses a non-tracking system in which tracking servo control is not executed on a magnetic head. The eleventh embodiment includes a recording circuit such as shown in FIG. 87.

Figures 88A, 88B, 88C:
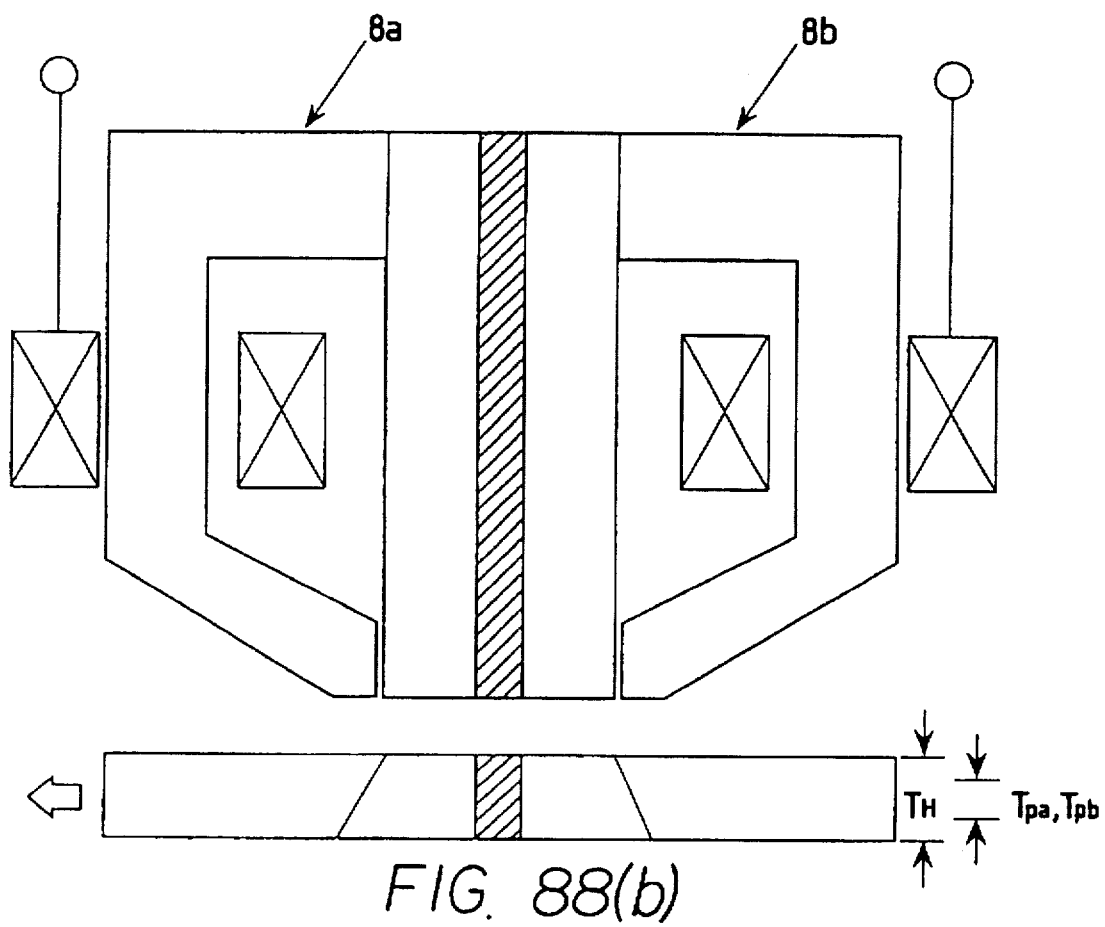
FIG. 88(a) is a transversely sectional view of a magnetic head in the eleventh embodiment.
FIG. 88(b) is a bottom view of a magnetic head in the eleventh embodiment.
FIG. 88(c) is a bottom view of another magnetic head in the eleventh embodiment.

As shown in FIGS. 88(a) and 88(b), recording is done by using two magnetic heads 8a and 8b, that is, an A head 8a and a B head 8b, which have different azimuth angles respectively. As shown in FIG. 88(b), the track pitch Tp of a magnetic track 67 and a head width TH have a relation as Tp<TH<2 Tp. Normally used conditions are as TH=1.5~2.0 Tp. Thus, in the case of recording on an n-th track, recording is also done on a region of an (n+1)-th track in an overlapped manner. The overlapped portion is subjected to overwriting record during the recording on the (n+1)-th track, and therefore a recording track is formed which has a width corresponding to the width Tp.

Figure 89:
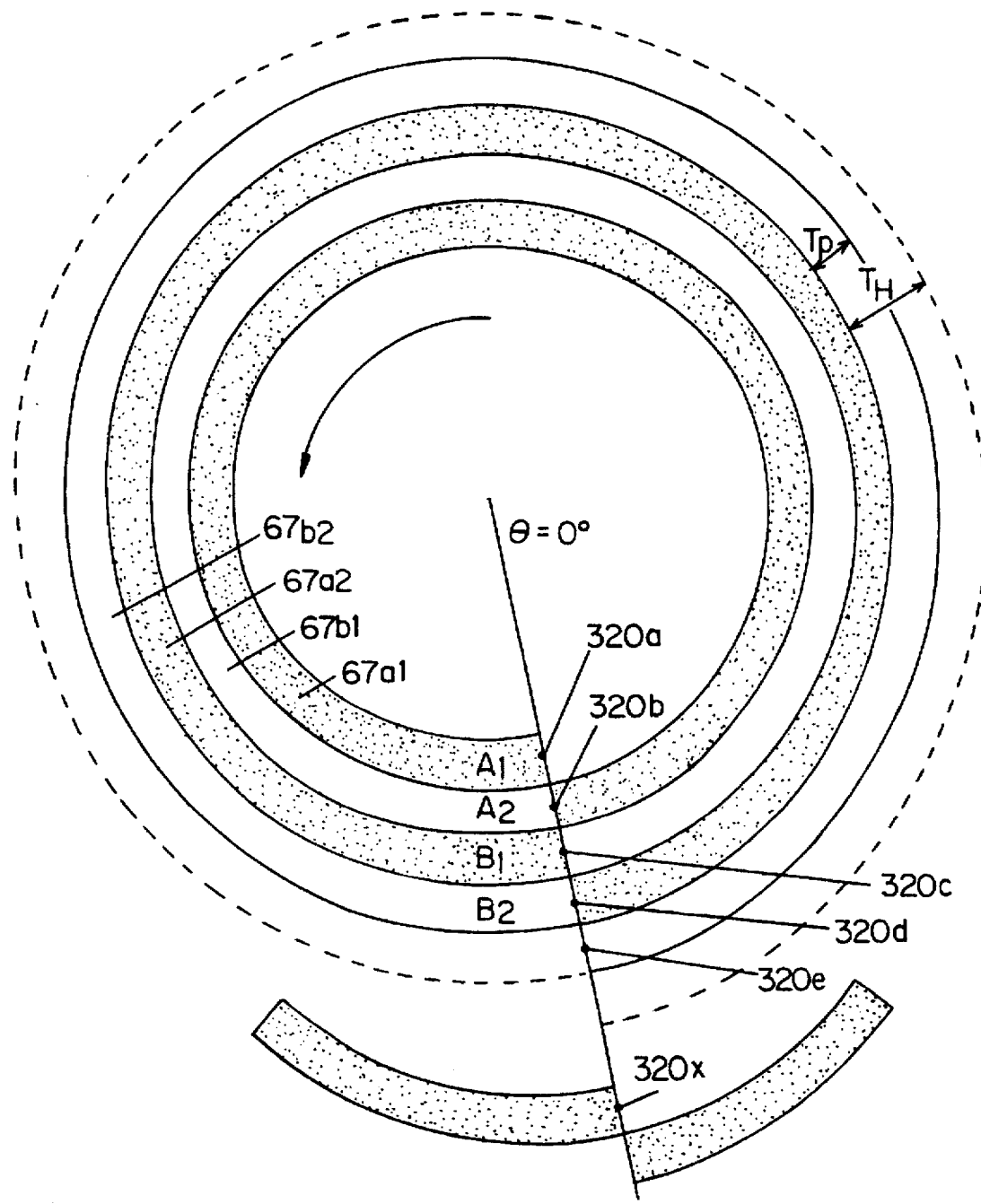
FIG. 89 is an illustration of a spiral-shaped recording format in the eleventh embodiment.
Figure 90:
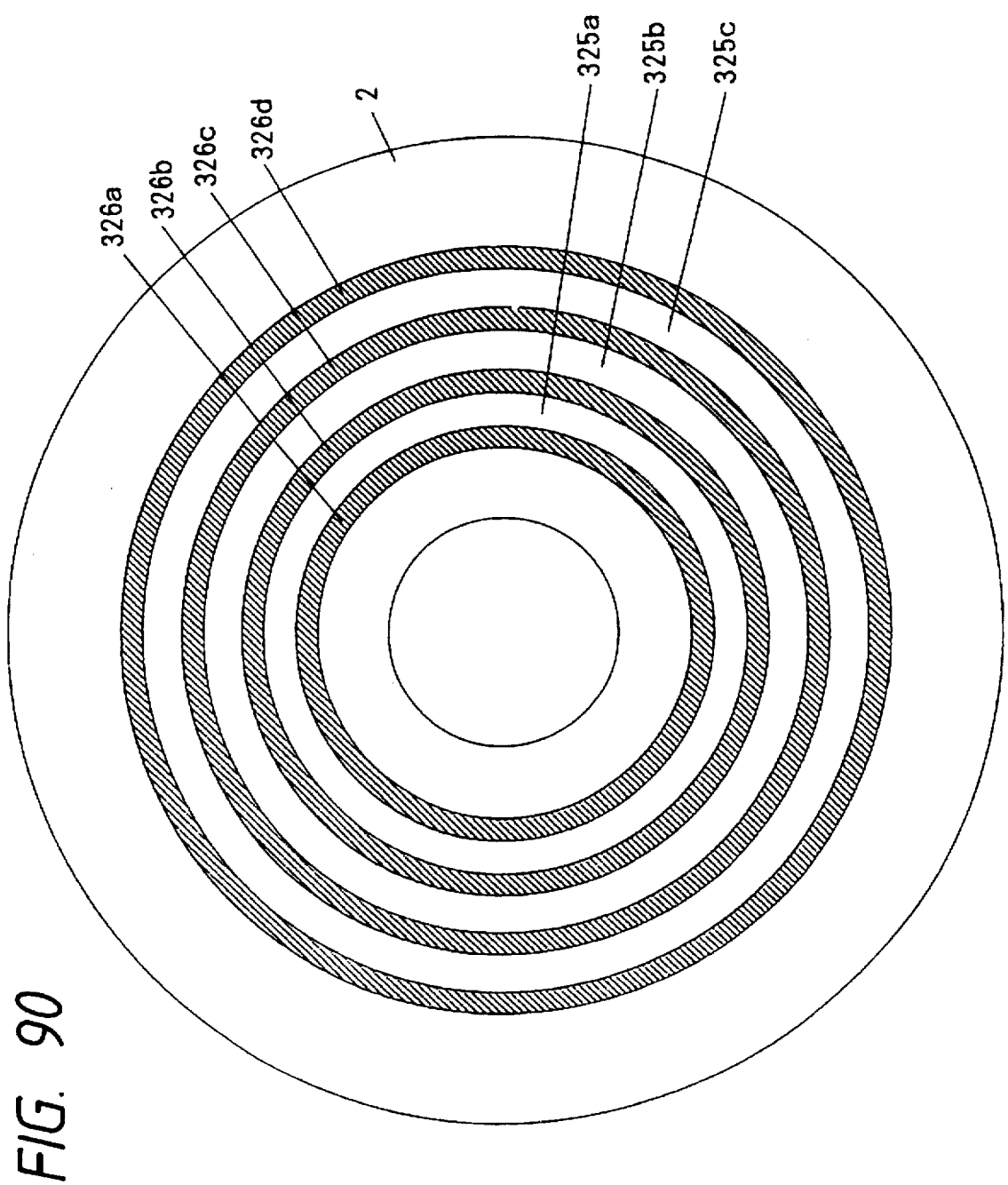
FIG. 90 is an illustration of a recording format of a guard band in the eleventh embodiment.

As shown in FIG. 89, recording is done while the two heads, that is, the A head 8a and the B head 8b, which have the different azimuth angles are changed at $\theta=0°$ and data is overwritten thereby alternately in a spiral shape. Thus, as shown in FIG. 88, the formed track width Tp is smaller than the head width TH. Since A tracks 67a and B tracks 67b having different azimuth angles alternate with each other, crosstalk between tracks is absent during the reproduction. As shown in FIG. 90, guard bands 325 are provided between neighboring track groups 326, and thus independent recording and reproduction can be done on each of the track groups.

Figure 91:
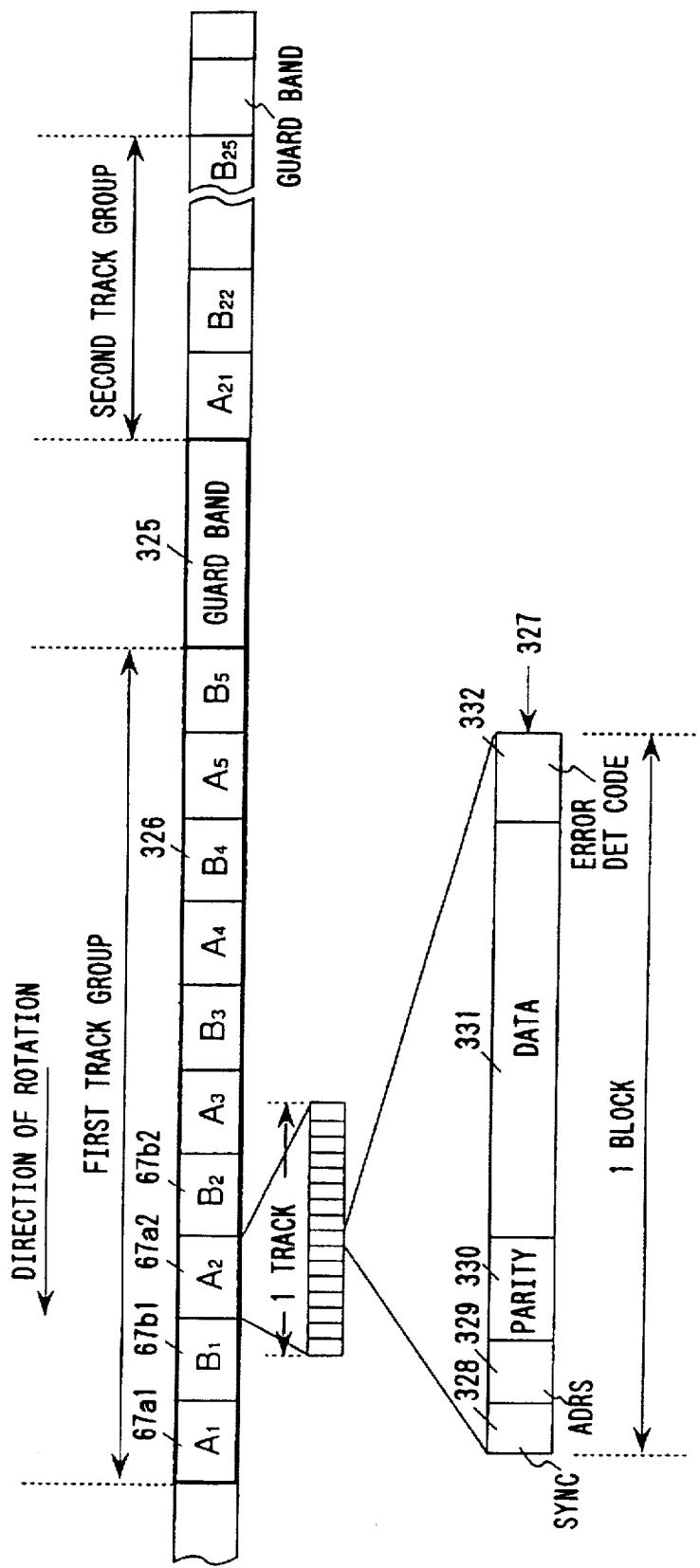
FIG. 91 is an illustration of a data structure in the eleventh embodiment.

As shown in FIG. 91, data of respective tracks such as A1, B1, and A2 is composed of a plurality of blocks 327, and one track group is set by combining a plurality of tracks. Guard bands 325 are provided between track groups so that rewriting can be done in unit of track group. A plurality of blocks which compose one track have a sync signal 328, an address 329, a parity 880, data 331, and an error detection signal 332.

Operation which occurs during the recording will now be described. Input data related to a designated address is fed to an input circuit 21. In the eleventh embodiment, data is rewritten while a track group 326 of FIG. 91 is used as a unit. Thus, simultaneous recording is done with respect to a plurality of tracks. Since track groups 326 are separated by guard bands 325 as shown in FIG. 90, an adverse influence on other track groups is prevented even if the recording and reproduction is done in this unit.

In the case where the input data contains only information of a part of a plurality of tracks, the data is insufficient and thus rewriting can not be done on the whole of one track group 326. Accordingly, in the case of rewriting on an n-th track group, reproduction is previously done on the n-th track group and all the data is stored into a buffer memory 34 of a magnetic reproducing circuit 30. The data is transmitted to the input circuit 21 as an address and data during the writing, and data of an address equal to the input data address is replaced by the input data. In this case, data of an address equal to the address related to the input data in the buffer memory 34 may replace the input data.

All the data of the n-th track group 326n which should be written is transmitted from the input circuit 21 to a magnetic recording circuit 29 and is modulated by a modulating circuit 334, and a separating circuit 333 generates data for the A head 8a and data for the B head 8b.

Figure 92A:
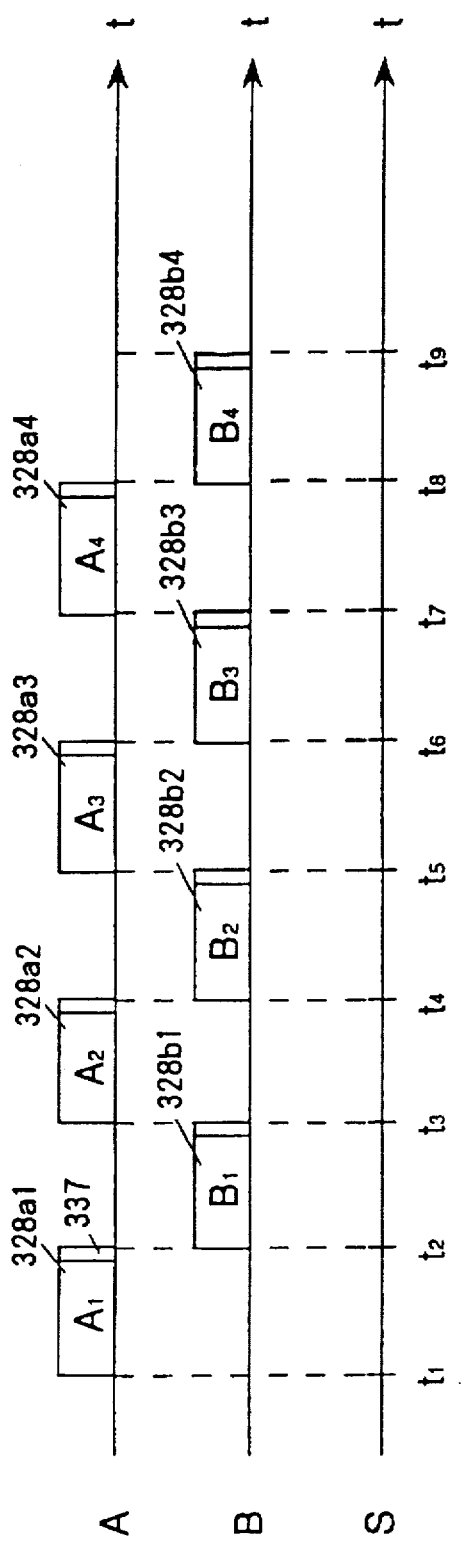
FIG. 92(a) is a timing chart of recording in the eleventh embodiment.

As shown in FIG. 92(a), recording A track data 328a1 is done by the A head 8a at t=t1. At t=t2 where a disk is rotated through 360°, recording B track data 328b1 is done by the B head 8b.

With respect to a timing signal for the change between the A head and the B head, a rotation signal for a disk motor 17 is used or 360°-revolution is detected by using optical address information from an optical reproducing circuit 38. The timing signal is transmitted from a disk rotation angle detecting portion 335 to the magnetic recording circuit 29. An end of each track data 328 is provided with a non-signal part 337, and a signal guard band results which prevents A track data 328a and B track data 328b from overlapping.

The guard bands are present on the disk. To prevent data from being recorded on a track group 326 adjacent to a desired track group while being passed over a guard band 325, it is necessary to accurately set a record starting radius and a record ending radius. This invention adopts a method in which a given optical address is used as a reference point and a permanent absolute radius is attained.

In FIG. 87, an optical address is read out by the optical head 6 and the optical reproducing circuit 38. The method of optical head offset correction which has been described with reference to FIGS. 80 and 82 is used to increase an accuracy. According to the same method, an offset corrective amount is calculated, and is stored into an offset corrective quantity memory 336. The offset corrective amount is read out therefrom when needed. Under conditions where an optical head drive circuit 25 offers an offset to the optical head 6, a traverse actuator 23a is driven by a traverse moving circuit 24a while an optical address is referred to, and a traverse is moved. In this way, an optical address of the optical track is referred to, and tracking can be accurately executed on a magnetic track 67. According to the example where the recording is done by alternately using the two magnetic heads 8a and 8b which have the different azimuth angles, the recording time tends to be long.

Figure 92B:
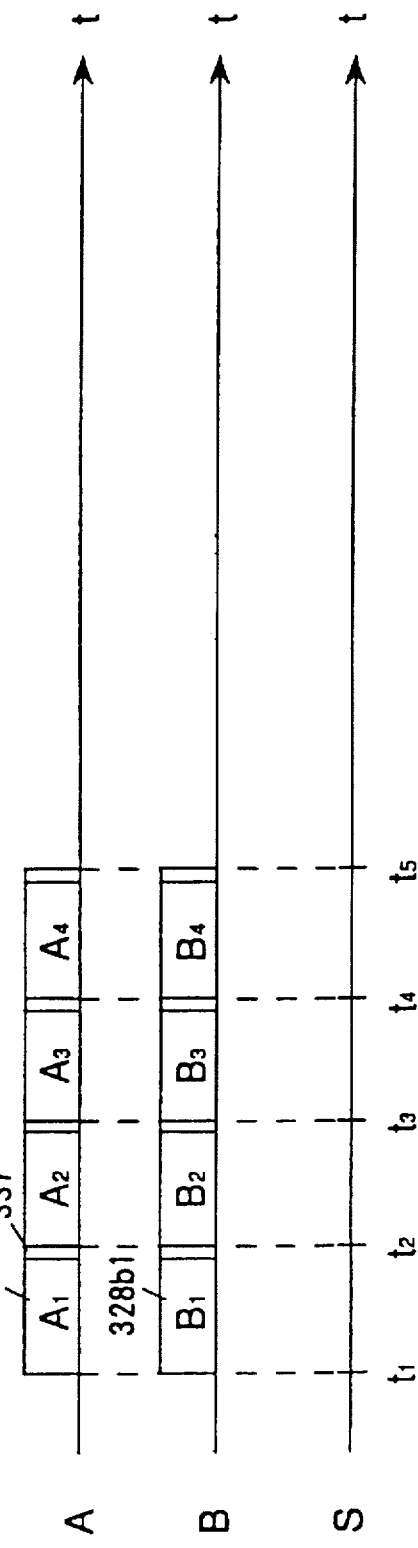
FIG. 92(b) is a timing chart of simultaneous recording by two heads in the eleventh embodiment.

As shown in FIG. 88(c), the radial positions of two heads are offset by Tp. In addition, A track data and B track data are simultaneously outputted and transmitted from the separating circuit 333 of FIG. 87, and the traverse is fed or moved at a pitch twice Tp every round. Thereby, as shown in FIG. 92(b), recording on one track group can be executed in a time half the time of the above-mentioned case, and there is an advantage such that higher-speed recording can be done.

In this way, the input data is recorded on the tracks in a spiral shape.

An example of specific designing will now be described. Even in the case where an offset of an optical track is ±200 μm, the offset correcting arrangement removes adverse affection of the offset and the offset falls into a range of a chucking offset amount which equals ±25 μm. An offset of the rotational shaft of a motor can be limited to within a range corresponding to ± several μm. In this case, by setting the guard band width equal to 50 μm or more, a track can be recorded which has a width of an error within ± several μm. Thus, there is an advantage such that a large amount of data can be recorded by the non-tracking system.

A description will now be given of traverse control which occurs in the case of spiral recording. With reference to FIG. 89, a record starting point optical address 320a and a record ending point optical address 320e are set as reference points. In the design of FIG. 89, it is good that while the disk is rotated four times, the traverse is driven at an equal pitch from the starting point to the ending point. This invention adopts a structure in which a rotational motor rotates a screw and thereby feeds or moves the traverse. Rotation pulses from the rotational motor can be obtained.

Figure 97:
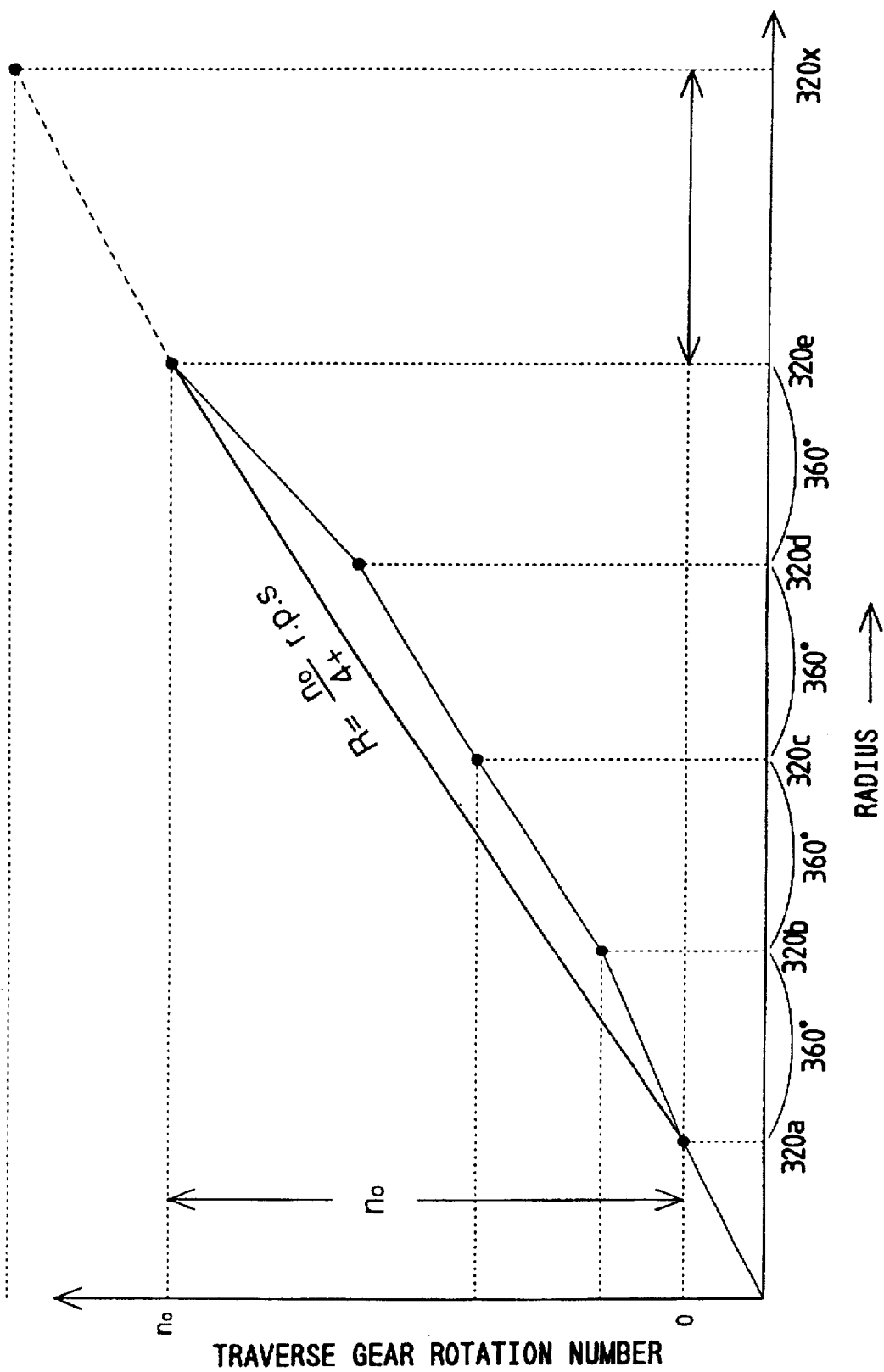
FIG. 97 is an illustration of the relation between a traverse gear rotation number and a radius in the eleventh embodiment.
Figure 98:
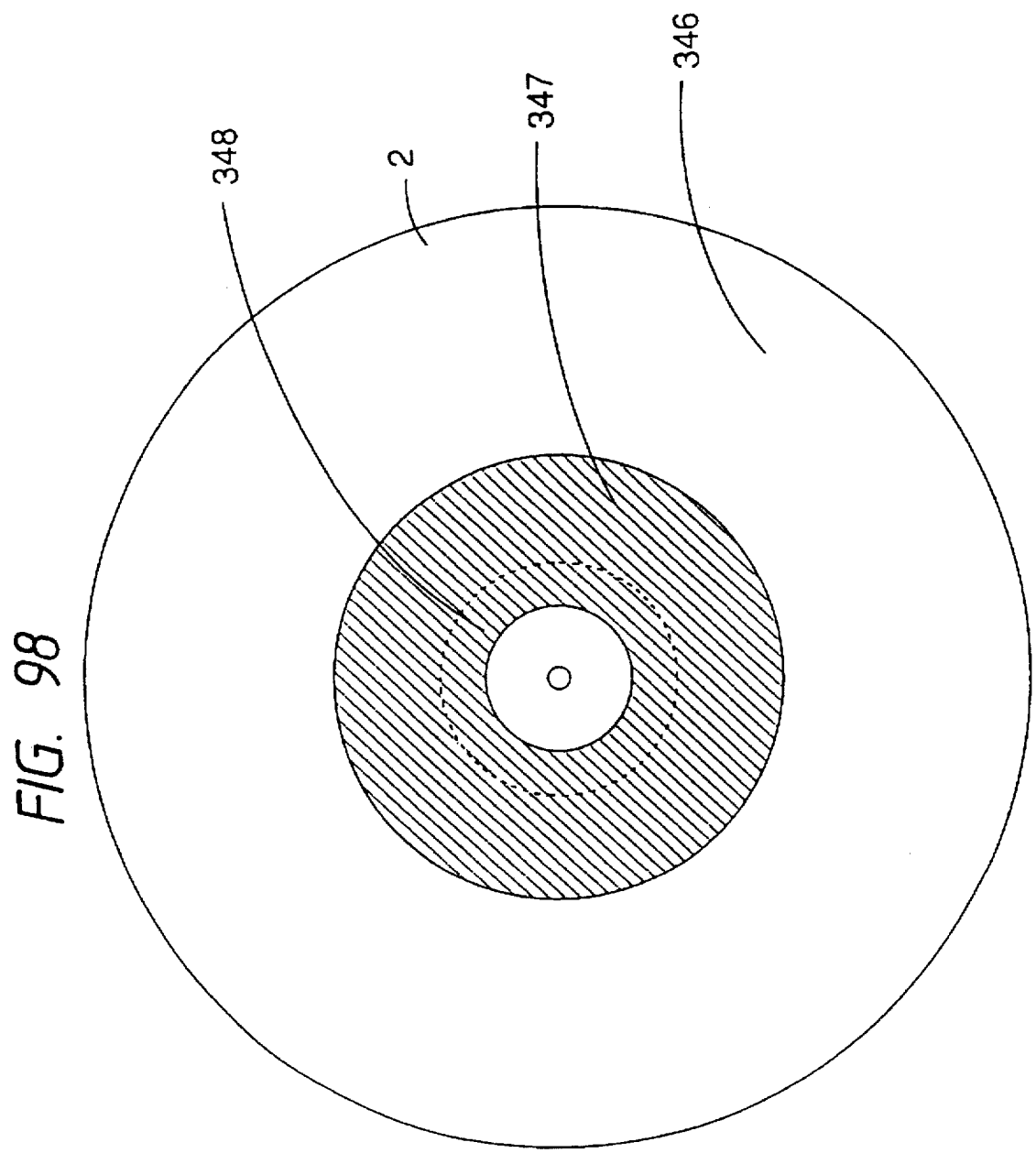
FIG. 98 is an illustration of an optical recording surface format in the eleventh embodiment.

As shown in FIG. 97, the traverse is moved from the starting point optical address 320a to the ending point optical address 320e. During this period, the rotation number no of a traverse drive gear is measured. Since the disk is rotated four times, a system controller 10 calculates a rotational speed corresponding to no/4T r.p.s. The system controller 10 outputs an instruction for rotating the traverse drive gear at this speed (rotation number). The magnetic head executes data recording with an accurate track pitch. At the end of the recording, since the magnetic head 8 lies near the ending point optical address 320e, passing over the guard band and reaching the starting point optical address 320x of a neighboring track group can be prevented. It is sufficient that measuring the rotational speed of the traverse drive gear is executed once each time disks are changed. This information may be recorded on a disk. By doing traverse control while counting the line number of an optical track, it is possible to execute smoother and more accurate feed of the traverse.

Figure 96:
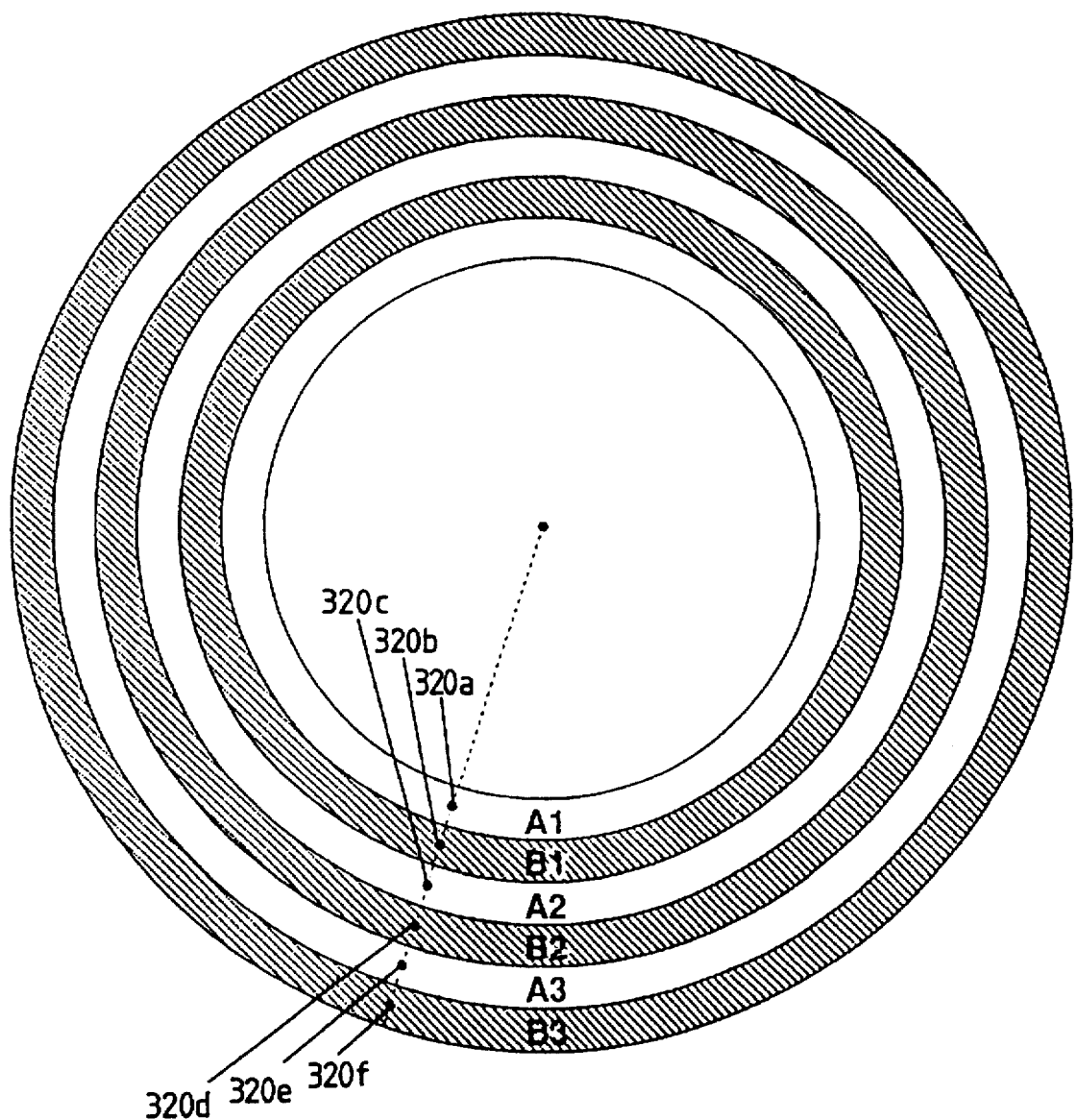
FIG. 96 is an illustration of a cylindrical recording format in the eleventh embodiment.

FIG. 96 shows designing which uses coaxial tracks. In this case, during the recording on respective tracks, the traverse is moved each time so that six points corresponding to optical addresses 320a, 320b, 320c, 320d, 320e, and 320f will be accessed by the optical head. Thereby, cylindrical tracks are formed.

In the presence of a non-address region 346 which does not have an optical address and a signal, access by referring to the optical address can not be executed. In this case, with respect to an optical address region 347, a reference radius and a disk rotational reference angle are determined, and the line number of an optical track is counted. Thereby, tracking can be done on a given relative position even in the non-address region 346. Provided that a table indicating the line numbers from reference optical address points for respective tracks is made and is written into a magnetic TOC region 348, another drive can access a target magnetic track. The method of executing access by referring to the line number is less accurate in absolute position than the method using the optical address, and is advantageous thereover in that an access speed is higher. It is preferable to use the two methods. From the standpoint of high-speed access, it is good to adopt the method which uses counting the line number during the reproduction. Drives are of a high density type and a normal density type. The high density type has a head width TH which equals ½ to ⅓ of that of the normal density type. In addition, its track pitch equals ½ to ⅓ of the track pitch Tpo of the normal density type. In the case of non-tracking, the high density type can reproduce data of a normal density type but the normal density type can not reproduce data of a high density type.

Figure 99:
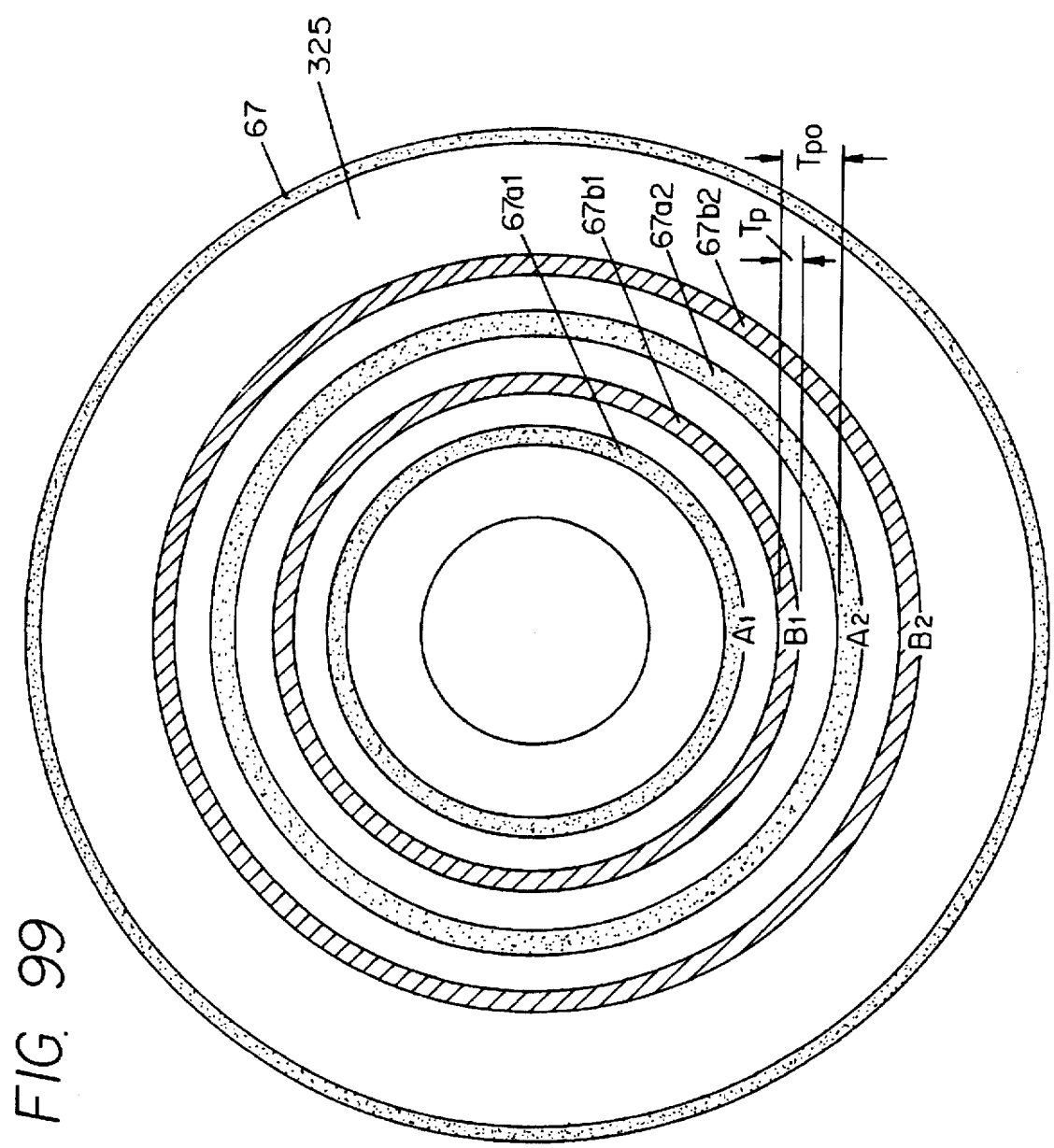
FIG. 99 is an illustration of a recording format in the presence of compatibility with a lower level apparatus in the eleventh embodiment.
Figure 100:
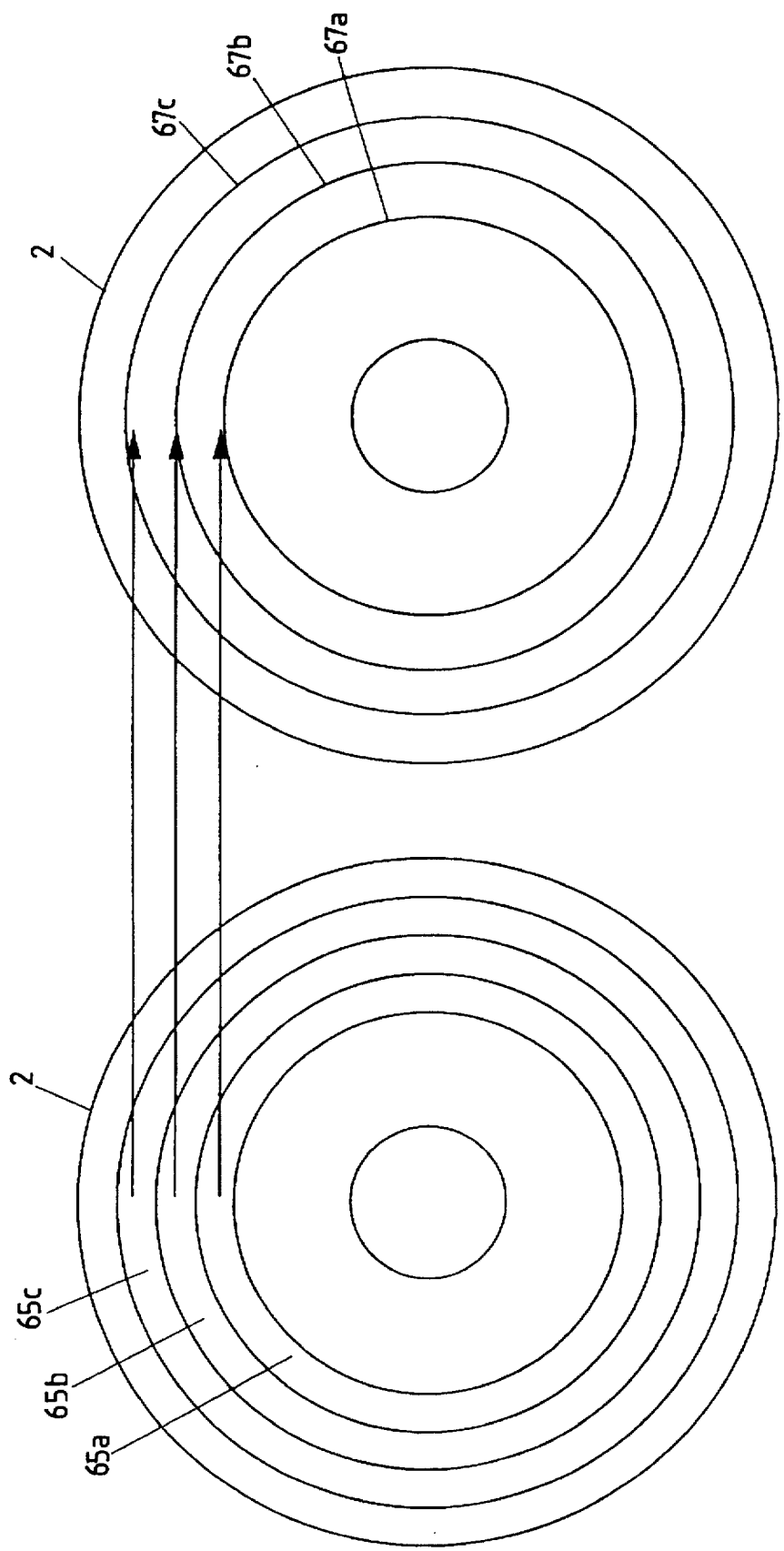
FIG. 100 is an illustration of the correspondence relation between an optical recording surface and a magnetic recording surface in the eleventh embodiment.

To attain the compatibility, a compatible track is provided during the recording by using the high density type. In addition, as shown in FIG. 99, the recording is done at a track pitch equal to Tpo. Thereby, the normal density type can reproduce the recorded data. In the case where data on an optical surface is divided into three programs 65a, 65b, and 65c as shown in FIG. 100, regions for magnetic recorded data to be saved are set in magnetic tracks 67a, 67b, and 67c extending on the surface. Thus, there is an advantage such that the displacement of the traverse is small and an access time is short.

Figure 93:
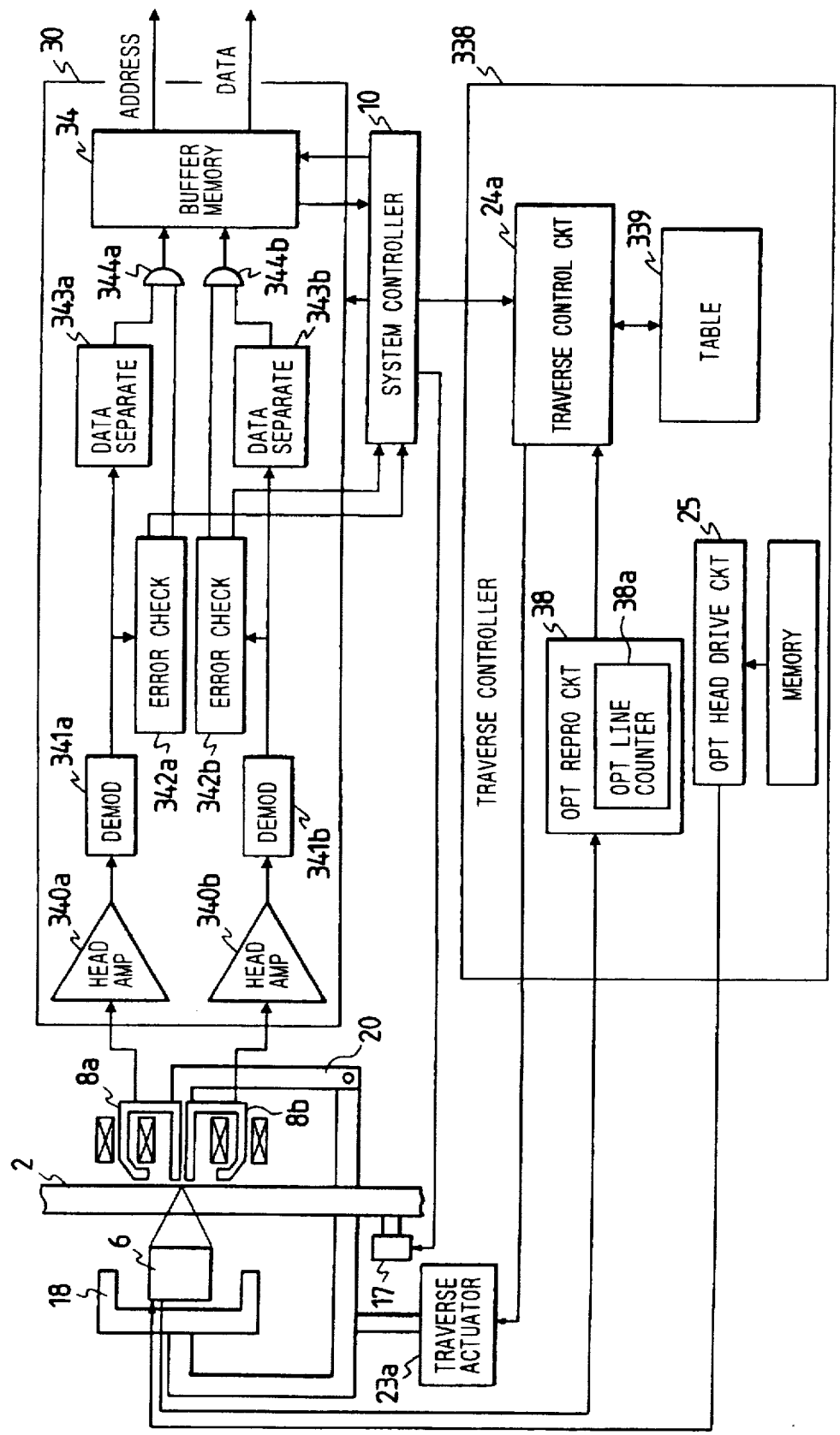
FIG. 93 is a block diagram of a reproducing portion in the eleventh embodiment.

Next, a description will be given of the reproduction principle. FIG. 93 shows a reproducing section of the apparatus. The reproducing section of FIG. 93 is approximately similar to that of FIG. 87 except for a magnetic reproducing portion 80.

First, the system controller 10 transmits a reproducing instruction and a magnetic track number accessing instruction to a traverse controller 338. As in the design of FIG. 87, the magnetic head accurately accesses a target magnetic track number.

As shown in FIG. 89, tracking is done with respect to a magnetic track 67 in a spiral shape, and both the output signals of the A head 8a and the B head 8b are simultaneously inputted into the magnetic reproducing portion 30. The input signals are amplified by head amplifiers 340a and 340b respectively, being subjected to demodulation by demodulators 341a and 341b and being subjected to error check by error check portions 342a and 342b to derive correct data. The correct data signals are fed to AND circuits 344a and 344b. Data separating portions execute the separation between addresses and data. Only data free from errors is transmitted to the buffer memory 34 via the AND circuits 344a and 344b, and respective pieces of the data are stored into respective addresses. The data is outputted from the memory 34 in response to a reading clock signal from the system controller 10. When the buffer memory 34 reaches given conditions close to overflow conditions, an overflow signal is transmitted to the system controller 10 and the system controller 10 outputs an instruction to the traverse controller to reduce the traverse feed width. Alternatively, the system controller 10 may lower the speed of the motor 17 to reduce the reproduction transmission rate. As a result, overflow is prevented.

In the case where the number of errors detected by the error check portion 342 is large, an error signal is transmitted to the system controller 10 and the system controller 10 outputs an instruction to a traverse control circuit 24a to reduce the track pitch. As a result, during the reproduction, the track pitch is reduced from the normal value Tp to ⅔Tp, ½Tp, and ⅓Tp so that the data of an equal address is reproduced 1.5 times, double, and three times. Thus, the error rate is lowered.

In the case where all data in an (n+1)-th track gathers before all data in an n-th track gathers in the buffer memory 34, there is a chance that the data of the n-th track can not be reproduced. In this case, the system controller 10 outputs a reverse direction traverse instruction to the traverse controller to return the traverse inwardly. Then, the n-th track is subjected to the reproducing process. As a result, the data of the n-th track can be reproduced.

In this way, there is an advantage such that data can be surely reproduced without increasing the error rate.

Figure 94:
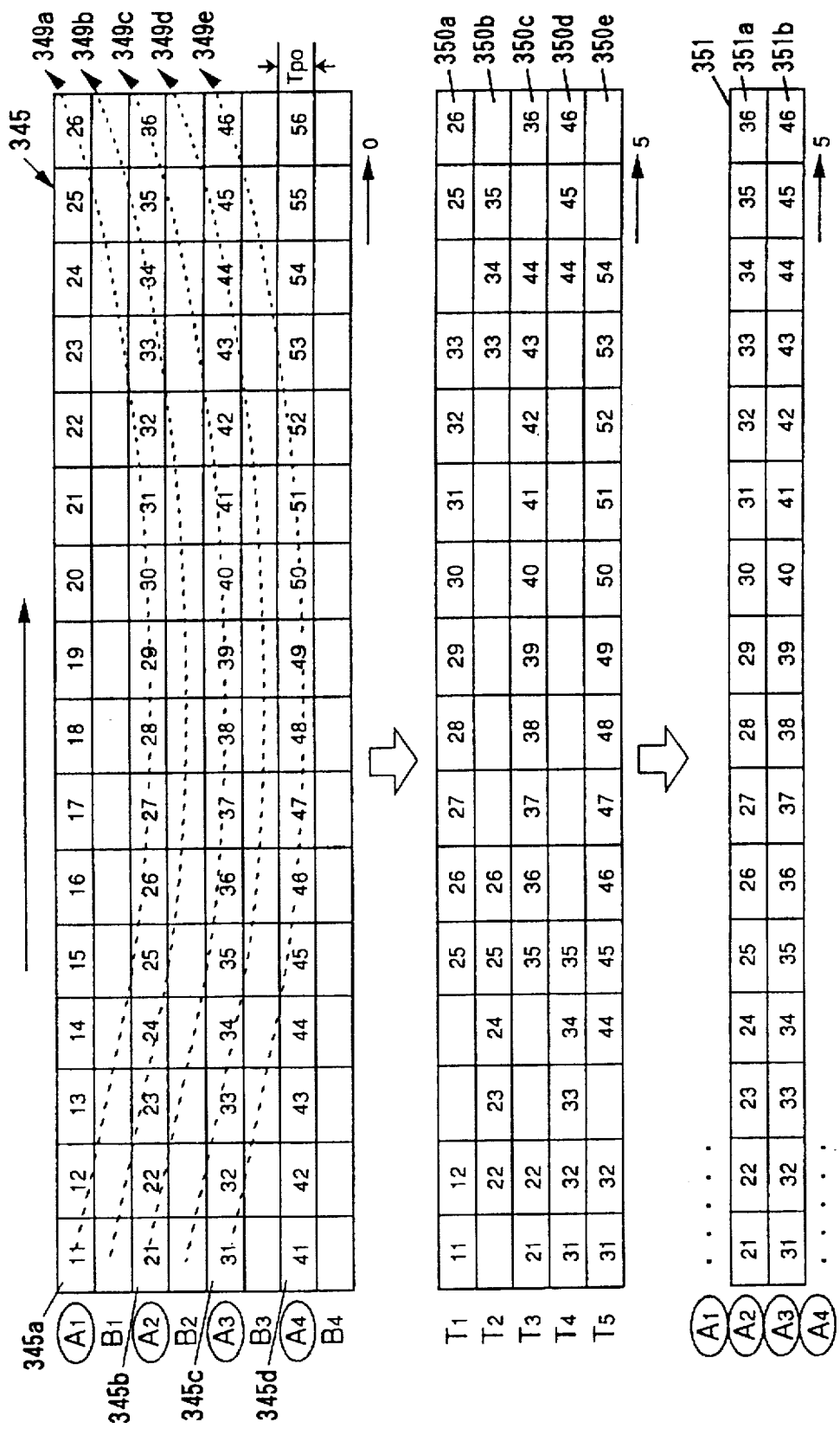
FIG. 94 is an illustration of a data arrangement in the eleventh embodiment.
Figure 95:
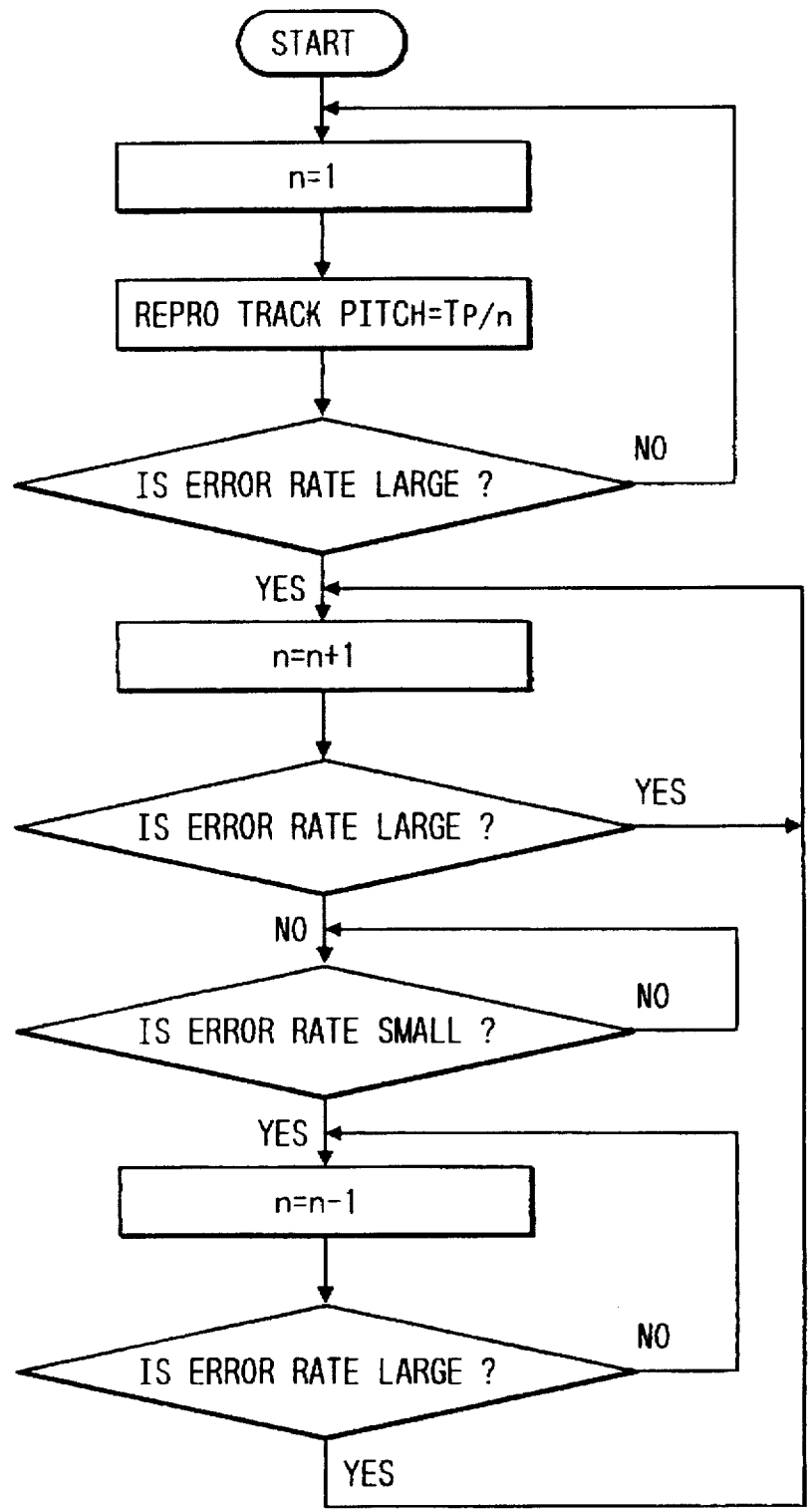
FIG. 95 is a flowchart of traverse control in the eleventh embodiment.

A description will now be given of operation of reproducing information from a disk with non-tracking. As shown in FIG. 94, data is recorded on a disk, and the data includes data 345a, 345b, 345c, and 345d in an A track. In addition, data B1, B2, B3, and B4 in a B track are also recorded. When the reproduction is executed by the A head, the data in the B track can not be reproduced due to a discrepancy in azimuth angle.

For the simplicity of description, the data in the B track will be omitted. In the case where the recorded data 345 in the A track is reproduced by the A head 8a with a track pitch Tpo equal to that during the recording, the loci of the track extend as track loci 349a, 349b, 349c, and 349d since there is an offset in chucking with respect to the disk. The head width TH of the A head 8a is greater than the track pitch Tpo, and therefore halves of tracks on both sides are subjected to a reproduction process. The B track is not subjected to a reproduction process. Accordingly, reproduced data free from errors, among signals reproduced from the respective track loci, have forms such as A head reproduced data 350a, 350b, 350c, 350d, and 350e. The data are sequentially transmitted to the buffer memory 34 of FIG. 93, and are recorded into given disk addresses. Thus, the data of the respective tracks are fully reproduced as memory data 351a and 351b. In this way, the data of the A track with non-tracking is reproduced. The data of the B track is similarly reproduced.

As previously described, in the eleventh embodiment, the recording and reproduction can be done with a small track pitch even in the absence of tracking servo control of the magnetic head. Thus, there is an advantage such that a memory of a large capacity can be realized by a simple structure. Since the traverse control is done by using the addresses on the optical surface, a low accuracy of feed of the traverse suffices and a linear sensor regarding a radial direction can be omitted. In the case of a non-tracking system, the accuracy of tracking basically depends on the accuracy of a bearing of a rotational motor. Generally, a high accuracy of the bearing of the rotational motor can be realized with a low cost. In the case of an MD ROM used in a cartridge, the recording wavelength can be equal to 1 μm or less so that a recording capacity of 2 to 5 MB can be obtained. In the case of a CD ROM, a print layer and a protective layer are formed on a magnetic layer as will be described later so that the recording wavelength is generally equal to 10 μm or more. Thus, a capacity of only several tens of KB can be obtained according to the normal system. On the other hand, a capacity of several tens of KB to 1 MB can be obtained by using the non-tracking system. As previously described, the eleventh embodiment has an advantage such that a large memory capacity can be realized with a low cost while a conventional optical access mechanism for a CD, a CD ROM, an MD, or an MD ROM is used as it is.

DESCRIPTION OF THE TWELFTH PREFERRED EMBODIMENT

A recording and reproducing apparatus according to a twelfth embodiment of this invention is similar to the recording and reproducing apparatus of FIG. 87 except for design changes indicated later. The twelfth embodiment uses a recording medium in which a magnetic recording layer is formed on the back side of a ROM disk without a cartridge such as a CD ROM.

Figure 101A:
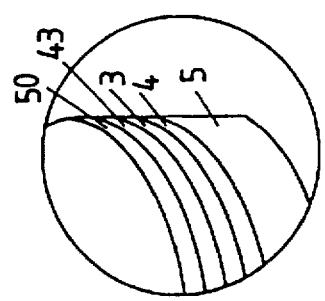
FIGS. 101 and 101(a) are a perspective view of a recording medium in a twelfth embodiment of this invention.
Figure 101:
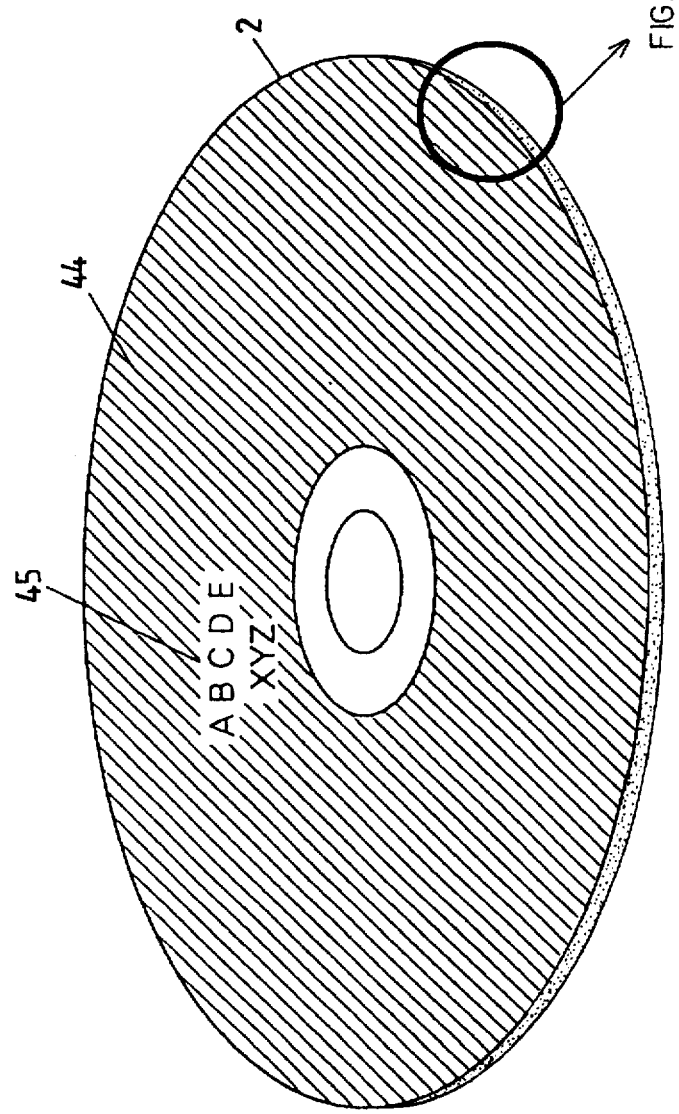
Figure 103A:
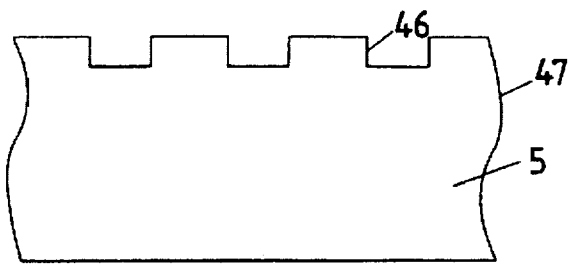
Figure 103B:
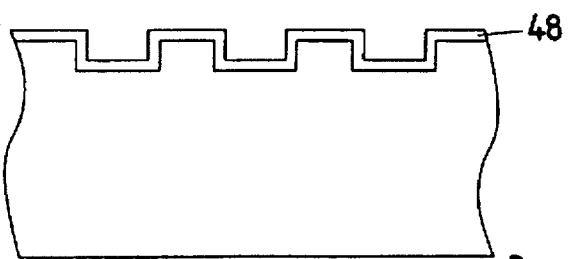
Figure 103C:
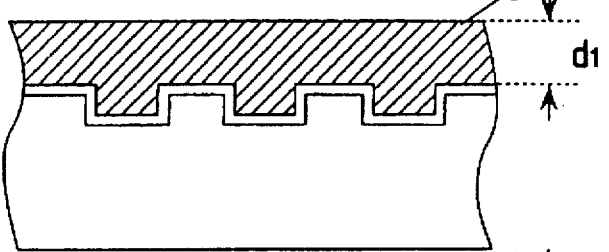
Figure 103D:
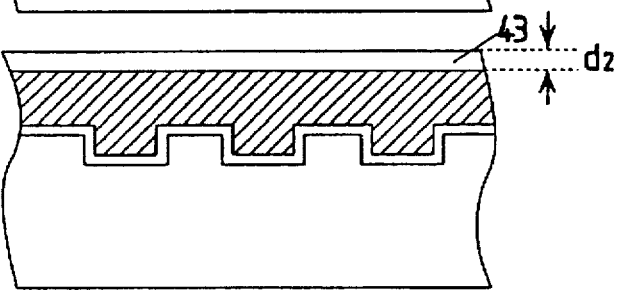
Figure 103E:
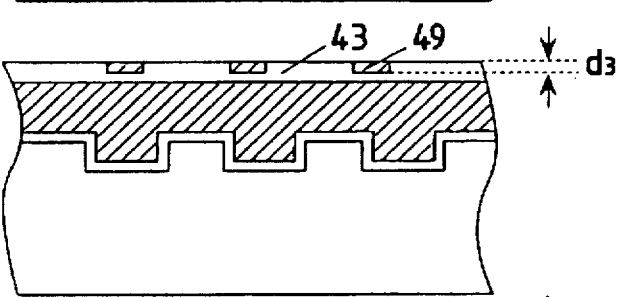
Figure 103F:
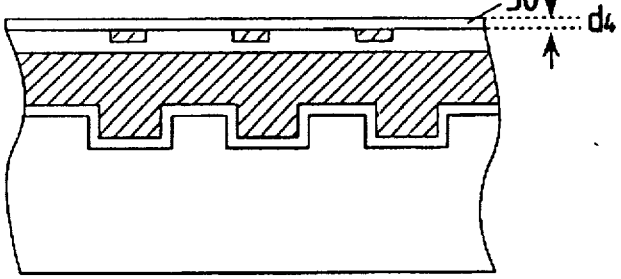
Figure 104A:
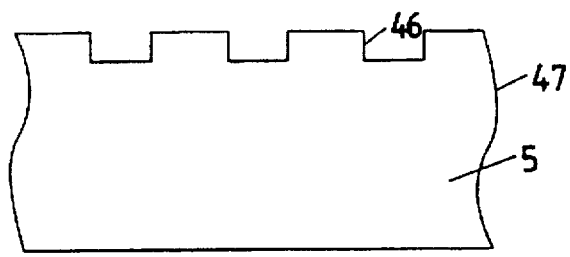
Figure 104B:
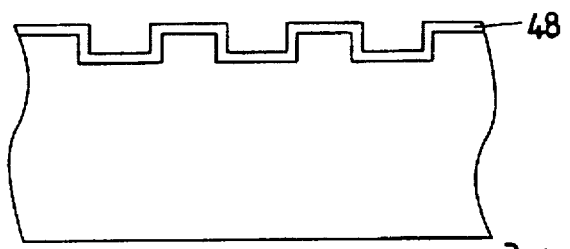
Figure 104C:
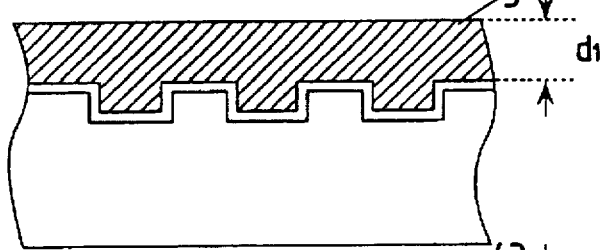
Figure 104D:
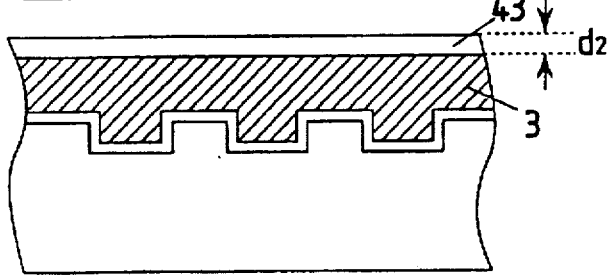
Figure 104E:
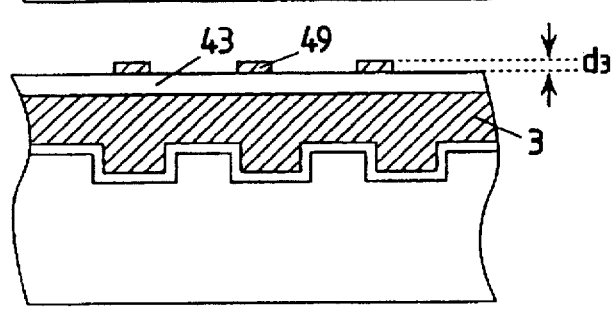
Figure 104F:
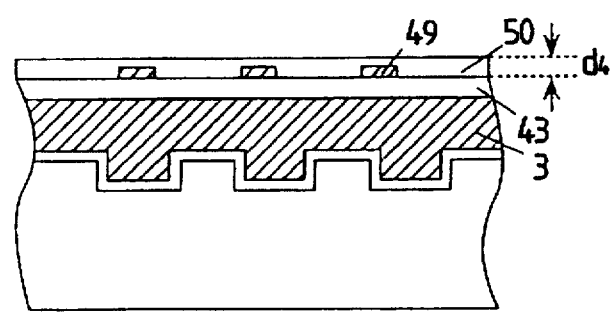

As shown in FIG. 101, the recording layer 2 includes a transparent layer 5, an optical recording layer 4, a magnetic recording layer 3, and a print layer 43 arranged sequentially with respect to an upward direction. The print layer 43 has a print area 44. A label of a CD title or letters 45 are printed on the print area 44. A protective layer 50 may be provided on the print area 44. The protective layer 50 is made of hard material having a Mohs scale of 5 or more. In the case of a recording medium such as a CD or a CD ROM which is not provided with a cartridge and which has a single optical recording surface, the print area 44 can be provided in approximately the whole of the opposite surface. As shown in FIG. 102, in the case of an LD, LD ROM, or others which have two optical recording surfaces, the print area 44 is provided at a central narrow region to prevent an adverse influence on the optical reproduction.

This embodiment will be further described with respect to the case where a CD ROM is used as the recording medium.

The recording medium is designed and fabricated as follows. As shown in FIG. 103, at a step number P=1, a substrate (a base plate) 47 is prepared which has a transparent portion 5 with pits 46. At a step number P=2, an optical reflecting film 48 made of suitable material such as aluminum is formed by vapor deposition or sputtering.

At a step number P3, suitable magnetic material such as barium ferrite having a magnetic coercive force Hc of 1,750 or 2,750 is directly applied, and thereby a magnetic recording layer 3 is formed. It may be good that the magnetic material is applied to a base film and the base film with the magnetic material is transported together with a bonding layer to form a magnetic recording layer 3. The recording medium of this embodiment is not protected by a cartridge. Thus, it is necessary to use magnetic material having a high magnetic coercive force Hc to protect recorded data from an external magnetic field generated by, for example, a magnet. It has been experimentally confirmed through a field test that a damage to recorded data is absent when an exposed recording medium including a magnetic recording material having a magnetic coercive force Hc of 1,750 Oe to 2,750 Oe is used under normal industrial use conditions. As understood from FIG. 121, only a magnetic field of 1,000 to 1,200 Gauss is present in a normal home. Thus, it is good that the magnetic coercive force Hc of magnetic material for the magnetic recording layer 3 is set to 1,200 Oe or more. In this embodiment, by using the material having a magnetic coercive force of 1,200 Oe or more, a damage to data is prevented during normal use. Provided that the magnetic coercive force Hc of the magnetic material is increased to 2,500 Oe or more by using barium ferrite or others, the reliability during the data recording can be enhanced. The material of barium ferrite is inexpensive, and is formed by a cheap application step. In addition, the material of barium ferrite naturally exhibits random orientation so that a randomizing step is unnecessary. Thus, the material of barium ferrite is suited to a partial RAM disk of a CD ROM type which generally requires low-cost mass production. In this case, the magnetic material is processed into a disk. Since recording and reproduction are done along a circumferential direction, recording characteristics are lowered if the magnetic material has magnetic orientation in a given direction such as a magnetic card or a magnetic tape. To prevent the occurrence of such orientation in a given direction, a magnetic film is formed while a randomizer applies magnetic fields in various directions before applied magnetic material hardens. As previously described, in the case of barium ferrite, there is an advantage such that a randomizing step can be omitted. In the case of a CD or a CD ROM, the CD standards require that the title and the contents of a medium should be printed as a label to enable a consumer to visually identify and recognize the contents of the medium. In addition, it is preferable that a color photograph is printed to make the appearance beautiful to increase the product value.

Generally, the magnetic material has a brown color or a black color of a dark tone, and therefore direct printing thereon is difficult.

At a step number P=4, to enable color printing to conceal the dark color of the magnetic recording layer 3, a backing or preliminary layer 43 with a color such as a white color which has a high reflectivity is formed by, for example, application. The thickness of the preliminary layer 43 is equal to several hundreds of nm to several μm. From the standpoint of recording characteristics, a thin preliminary layer 43 is better. On the other hand, if the preliminary layer 43 is excessively thin, the color of the magnetic recording layer can not be concealed. Thus, the thickness d2 of the preliminary layer 43 is required to be a certain thickness. To block the transmission of light, a thickness equal to a half of the light wavelength or more is preferable. When the shortest wavelength $\lambda$ of visible light is defined as $\lambda=0.4$ μm, a thickness of 0.2 μm ($=\lambda/2$) or more is preferable. Thus, the thickness d2 is preferably equal to 0.2 μm or more. When $d2 \geq 0.2$ μm, it is possible to attain the effect of concealing the color of the magnetic material. From the standpoint of recording characteristics, it is preferable that $d2 \leq 10$ μm. Thus, it is desirable that 0.2 μm$\leq d2 \leq 10$ μm. In this case, there is an advantage such that both color concealing characteristics and magnetic recording characteristics can be adequately obtained. According to the results of experiments, it is discovered that a thickness d2 of about 1 μm is most preferable. In the case where magnetic material is mixed with and added to the preliminary layer 43, there is an advantage such that an effective space loss can be decreased.

At a step number P=5, print ink 49 made of dyes is applied so that printed letters 45 such as a label of FIG. 101 are indicated. Full color printing is possible since the printing is done on the white-color preliminary layer 43. As shown in FIG. 103, the print ink 49 of the dyes is applied, and the ink soaks into the preliminary layer 43 by a depth d3 so that roughness is absent from the surface of the preliminary layer 43. Thus, there is an advantage such that, during the magnetic recording and reproduction, a magnetic head touch is good and the travel of the magnetic head is prevented from removing the printed letters. In this way, the recording medium is completed.

The magnetic recording layer 3 at the step number P=3 and the print ink 49 at the step number P=5 are formed by using a gravure application step such as shown in FIG. 105. Specifically, application material including magnetic material of barium ferrite is transferred onto an application material transfer roll 353 from an application material bowl 352, and the application material on the roll 353 is selectively etched into a CD-shaped etching portion 355 which remains on an intaglio drum. Unnecessary application material is removed by a scriber 356. A soft transfer roll 367 is covered with a soft resin portion 361. The CD-shaped application material is transferred onto the soft transfer roll 367 as a CD-shaped application portion 358. The application portion 358 is transferred and applied to the surface of a recording medium 2 such as a CD. Before the execution of a drying process, a random magnetic field generator 362 applies a random magnetic field to the recording medium with the application material so that the application material has random magnetic orientation. Since the transfer roll 367 is soft, accurate application to a stiff object such as a CD can be done thereby. In this way, the applications at the step numbers P=3, P=4, and P=6 are executed. The printing step P=5 may be an offset printing step in consideration of a small film thickness.

As shown in FIG. 103, at a step number P=6, a protective layer 50 may be applied to the recording medium. The protective layer 50 is made of hard and transparent material having a Mohs scale of 5 or more. The protective layer 50 has a given thickness d4. The protective layer 50 prevents the removal of the print ink, and protects the magnetic recording layer 3 from wear by an external injury or the magnetic head. Thus, there is an advantage such that the reliability of data is enhanced.

As shown in FIG. 106, a protective layer 50, a print ink 49, a preliminary layer 43, and a magnetic recording layer 3 may be applied onto a removable film 359 by steps of P=6, 5, 4, and 3 in an order reverse to the order of the steps previously described with reference to FIG. 103. Random magnetic orientation is provided by the random magnetic field generator 362. The resultant application film is accurately located on the surface of a substrate 4 which is provided with pits 46, and transfer is executed and then fixing is executed by a thermal pressing process. Subsequently, the removable film 359 is removed. As a result, a recording medium is completed which has a structure equal to the structure at the step P=6 regarding FIG. 103. In the case of mass production, the transfer method increases the throughput but decreases the cost. Thus, in the case of mass production of CD's, there is an advantage such that the production efficiency is increased.

While the dyes are used during the printing in connection with FIG. 103, print ink 49 of a pigment may be used at a step number P=5 of FIG. 104. In this case, a given thickness d3 is provided. At a step number P=6, there is provided a protective layer 50 made of transparent material containing lubricant such as d4>d3. Thereby, there is an advantage such that roughness on the surface is decreased and a good head touch is enabled by the lubricant. The use of the pigment causes an advantage such that better color printing is enabled. In this case, after the step P=5, thermal pressing may be executed to remove roughness from the surface, and the resultant is used as a final product. In this case, since a step of making the protective layer 50 can be omitted, there is an advantage such that the number of manufacturing steps can be reduced by one.

Next, a description will now be given of a method of making a magnetic shield layer. The magnetic head is present at the side of the recording medium 2 near the magnetic recording layer 3, while the optical head is present at the side of the recording medium 2 near the transparent layer. Thus, there is a chance that electromagnetic noise leaks from the actuator for the optical head into the magnetic head and therefore the error rate increases during the magnetic signal reproduction. As shown in FIG. 116, noise of a level close to 50 dB occurs. A magnetic shield is provided in the recording medium 2 as a countermeasure, and thereby adverse influence of the electromagnetic noise can be reduced. As shown in FIG. 107, at a step number P=2, a magnetic layer 69 made of permalloy which has a high μ (magnetic permeability) and a weak magnetic coercive force Hc is formed by a suitable process such as a sputtering process. The magnetic layer 69 provides a magnetic shielding effect. In the case where a magnetic layer 69 having a weak magnetic coercive force is required to be formed in a short time or a thick magnetic layer 69 is required to be formed during the manufacture, a permalloy foil having a thickness of several μm to several tens of μm may be used. A thick magnetic layer 69 can be formed by plating. A thicker magnetic layer 69 provides an enhanced magnetic shielding effect. While the optical reflecting layer 48 is made of aluminum at the step number P=2 of FIG. 103, a film of permalloy may be formed by sputtering. In this case, a single film provides both an optical reflecting effect and a magnetic shielding effect. A thick permalloy film can be formed by plating with a low cost. Thereby, there is an advantage such that the number of steps of forming a reflecting film and a shielding film can be halved. In addition to the transfer step of FIG. 106 with respect to the recording medium of FIG. 108, a bonding layer 60a and a magnetic layer 69 may be provided in a sandwiched manner. The magnetic layer 69 has a high-μ film such as a permalloy film having a thickness of several μm to several tens of μm. Thus, a recording medium having a magnetic field shielding effect can be fabricated through the transfer step.

In a way such as previously mentioned, a recording medium is fabricated which includes an optical recording layer and a magnetic recording layer with a print surface such as shown in FIG. 101. Thus, there is an advantage such that a label similar to a label of a conventional CD which meets the CD standards is provided and simultaneously a magnetic recording surface is added. As previously described with reference to FIG. 121, most of normally used magnets are ferrite magnets. In general, such magnets are not exposed. Even if a magnet is exposed, only a magnetic field of about 1,000 Oe occurs therearound. Some of magnetic necklaces are made of rare-earth material, and such magnetic necklaces are small in size so that they hardly magnetizes the magnetic recording material of barium ferrite. In the case of use of a magnetic recording layer made of suitable material such as barium ferrite which has a magnetic coercive force Hc of 1,200 Oe, 1,500 Oe or more, there is an advantage such that data on the magnetic recording layer is prevented from being damaged by a normally used magnet. Furthermore, it is possible to add a magnetic shield layer made of high-μ magnetic material, electromagnetic noise from the optical head can be remarkably suppressed during the magnetic reproduction. The above-mentioned manufacturing method uses an inexpensive technique such as a gravure application technique and inexpensive materials. Thus, there is an advantage such that a RAM function and a print surface can be obtained without increasing the cost of a partial RAM disk such as a CD or CD ROM.

DESCRIPTION OF THE THIRTEENTH
PREFERRED EMBODIMENT

A recording and reproducing apparatus according to a thirteenth embodiment of this invention is similar to the recording and reproducing apparatus of FIG. 87 except for design changes indicated later. The thirteenth embodiment uses a recording medium in which magnetic material having a magnetic coercive force Hc greater than that of a normal magnetic disk is used and a protective layer having a thickness of 1 μm or more is provided on an uppermost portion of a magnetic recording layer as previously described with reference to the twelfth embodiment. In addition, the thirteenth embodiment uses a magnetic head suited to the recording medium. Furthermore, the thirteenth embodiment is provided with a countermeasure to the introduction of noise from an optical head through a magnetic field.

First, the structure of the magnetic head will be described. FIG. 110 shows the recording and reproducing apparatus which uses a 3-head arrangement. Specifically, the magnetic head of FIG. 87 is divided into two portions and a magnetic head 8a and a reading magnetic head 8b are made into a single unit, and a noise cancelling magnetic head 8s is additionally provided. Reproduction can be done while recording is being executed. Thus, error check is executed simultaneously.

The magnetic heads 8a and 8b will now be described with reference to FIG. 111. An optical head 6 and the magnetic heads 8a and 8b are located at opposite sides of the recording medium 2, and are opposed to each other. The optical head 6 serves to access a desired track on an optical recording layer 4 of the recording medium 2. The magnetic heads 8a and 8b move together with the optical head 6. Thus, the magnetic head 8a and 8b travel on a magnetic track at the opposite side of the optical track scanned by the optical head 6. The magnetic recording is executed by the magnetic head 8a designed for writing. The reproduction is executed by the magnetic head 8b.

Recording and reproducing conditions will now be described with reference to FIG. 113. The magnetic head 8a has a writing track width La and a head gap 70a with a length Lgap. Thus, a magnetic track 67a having a width equal to La is recorded on the magnetic recording layer 3. Above the magnetic track accessed by the magnetic head 8, there is a disk cleaning portion 376 including a circular plate made of soft material such as felt. The disk cleaning portion 376 removes dust from the disk, and thus there is an advantage such that the error rate can be reduced during the reproduction. The disk cleaning portion 376 is connected to a connection member 380 including a spring. In an OFF state of FIG. 111, both the magnetic head 8 and the disk cleaning portion 376 are out of contact with the recording medium 2. As shown in the part ON-A of FIG. 111, when the magnetic head 8 is moved downward, the disk cleaning portion 376 lands on the recording medium 2. The connection member 380 including the spring holds the magnetic head 8 out of contact with the recording medium 2 for a moment. Then, in an ON-B state, the magnetic head 8 softly lands on the recording medium 2. In this way, the magnetic head 8 makes a soft landing on the recording medium 2 through two steps. Thus, there is an advantage such that even if the magnetic head 8 is moved upward and downward during the rotation of the recording medium 2, a damage to the magnetic head 8 or the recording medium 2 is prevented. As shown in FIG. 113, a portion of a magnetic track 67a which precedes the magnetic head 8 is cleaned, and thus there is an advantage such that the error rate is reduced during the magnetic recording and reproduction. A magnetic head cleaning portion 377 is also provided which moves together with a magnetic head elevator 21. During the insertion of a disk into the apparatus or during the upward or downward movement of the magnetic head 8, a contact part of the magnetic head 8 is cleaned by the magnetic head cleaning portion 377 at least once. At this time, a circular plate of the disk cleaning portion 376 slightly rotates so that a new surface thereof comes operable. During the next insertion of a disk into the apparatus, the disk is cleaned by the new surface of the disk cleaning portion 377. Since the reproducing head gap 70b of the magnetic head 8a has a width Lb, only a part of the magnetic track 67a which corresponds to the width of the reproduced track 67b is subjected to a reproducing process.

In the thirteenth embodiment, the head gap length Lgap of the magnetic head 8a is important for the reason as follows. As previously described with reference to FIG. 103, the recording medium of the twelfth embodiment includes the preliminary layer 43, the print layer 49, and the protective layer 50 which extend between the magnetic recording layer 3 and the magnetic heads 8a and 8b, and which have the thicknesses d2, d3, and d4 respectively. Thus, a space loss corresponding to d=d2+d3+d4 is always present. The space loss S in unit of dB is given as:

$$S=54.6(d/\lambda) \tag{1}$$

where $\lambda$ denotes the recording wavelength. The head gap Lgap and the recording wavelength $\lambda$ has the following relation.

$$\lambda=3\times Lgap \tag{2}$$

According to the results of experiments, the thickness of the preliminary layer 43 is preferably equal to 1 μm or more in view of light blocking characteristics. Generally, it is necessary that the sum of the thicknesses of the print layer 49 and the protective layer 50 is equal to at least 1 μm. Thus, the value d generally needs to be at least 2 μm, and the following relation is present.

$$d \geq 2 \mu m \tag{3}$$

By referring to the equations (1), (2), and (3), a minimum space loss S in unit of dB is given as:

$$S=54.6\times 2/3 \; Lgap \tag{4}$$

The equation (4) determines the relation between the head gap and the space loss which is shown in FIG. 112.

Generally, to attain sufficient recording and reproducing characteristics, it is necessary to limit the space loss to 10 dB or less. Thus, it is found from FIG. 112 that the head gap Lgap needs to be set to 5 μm or more. In a conventional recording and reproducing apparatus for rotating a hard disk or a floppy disk to execute information recording and reproduction, a magnetic head has a slider portion and is provided with a head gap of 0.5 μm or less. If information is recorded and reproduced into and from the recording medium of this invention by using such a conventional magnetic head, sufficient recording and reproducing characteristics can not be obtained due to the presence of the protective layer or the print layer. On the other hand, in the thirteenth embodiment, the magnetic head 8a has a slider portion 41 as shown in FIG. 111 and the head gap of the recording head 8a is equal to 5 μm or more so that the space loss is equal to 10 dB or less as understood from FIG. 112. Thus, there is an advantage such that sufficient recording and reproducing characteristics can be attained during the recording and reproduction.

In the thirteenth embodiment, it is possible to execute full color label printing on the surface of the recording medium. It is possible to adopt the recording medium having the same appearance as that of a conventional CD or CD ROM as shown in FIG. 101. Thus, there is an advantage such that when a CD having the magnetic recording layer of this invention is used, a consumer is prevented from being confused and the basic function of the CD standards is maintained. The magnetic recording layer uses barium ferrite which has a high magnetic coercive force Hc and which does not require the random orientation step. Thus, there is an advantage such that recorded data is not damaged under normal conditions and the recording medium can be manufactured at a low cost. The recording medium of this invention can be handled in the way same as the way of handling a conventional CD as previously described, and thus there is an advantage such that a full compatibility between the recording medium of this invention and the conventional CD can be attained.

Next, a description will be given of countermeasures to magnetic field noise transmitted from the optical head to the magnetic head. Electromagnetic noise generated by an optical head actuator 18 tends to enter the reproducing magnetic head 8b so that the error rate may be increased. According to a first countermeasure, as shown in FIG. 114, a magnetic shield layer 69 previously described with reference to the twelfth embodiment is provided in the recording medium 2. Thereby, electromagnetic noise generated by the actuator of the optical head 6 is prevented from entering the magnetic head 8 so that an increase in the error rate can be prevented. In this case, when the optical head reaches an edge of the disk, electromagnetic noise tends to be transmitted from the optical head actuator to the magnetic head 8 since the magnetic shield is absent from an area outside the disk. Accordingly, as shown in FIG. 110, it is preferable that the recording and reproducing apparatus is provided with a magnetic shield 360 extending around the edge of the disk to block the electromagnetic noise. According to a second countermeasure, as shown in FIG. 111, the optical head actuator 18 is surrounded by a magnetic shield 360 made of high-μ material such as permalloy or iron. The magnetic shield 360 has an opening 362 for a lens. Thus, there is an advantage such that the transmission of electromagnetic noise from the optical head actuator to the magnetic head 8b is suppressed and related noise in the output signal from the magnetic head is remarkably decreased.

Experiments were done under the following conditions. The optical head of the recording and reproducing apparatus was held fixed, and the optical recording portion was subjected to focusing control. On the other hand, the magnetic head was moved on the surface of the recording medium. During the experiments, a relative level of electromagnetic noise entering the magnetic head 8 from the optical head 6 was measured. FIG. 116 shows the relation between the measured relative level of the electromagnetic noise and the distance between the magnetic head and the optical head.

According to another countermeasure to noise, the noise is detected, and the detected noise is added to a reproduced signal at an opposite phase to reduce the noise component from the reproduced signal. As shown in FIG. 111, the magnetic recording and reproducing apparatus is provided with a noise cancel magnetic head 8s and a noise detector such as a magnetic sensor. In a noise canceler portion 378, a reproduced signal from the magnetic head 8b and the detected noise are added with opposite phases respectively and at a given addition ratio A so that the noise component of the reproduced signal can be canceled. By optimizing the addition ratio A, the noise component can be adequately canceled. The optimal addition ratio Ao is determined by scanning a magnetic track free from a recorded signal and varying the addition ratio so as to minimize the level of the reproduced signal. The optimal addition ratio Ao can be calibrated and updated. It is good to execute the calibration when the noise level exceeds an acceptable range.

A description will now be given of the structure which includes the noise cancel magnetic head 8s. As shown in FIG. 129, the noise cancel magnetic head 8s is connected to the magnetic heads 8a and 8b via an attachment portion 8t. When the magnetic head unit contacts the recording medium 2 as shown in FIG. 129(b), a space loss having a height do occurs with respect to the noise cancel magnetic head 8s.

In the case where λ=200 μm and the space loss height do is equal to 200 μm or more, the level of a reproduced signal from the magnetic recording layer is estimated as being equal to about −60 dB and the reproduction is almost difficult. When the magnetic head is moved upward by 0.2 mm, the level of noise is reduced by only −1 dB or less as shown in FIG. 116. In the case where λ=200 μm, provided that the distance between the noise cancel magnetic head 8s and the reproducing magnetic head 8b is set to at least λ/5 equal to 40 μm, the entrance of an original signal from the reproducing head can be prevented. Thus, there is an advantage such that the transmission of electromagnetic noise from the optical head actuator to the reproducing magnetic head can be essentially completely suppressed.

According to another countermeasure to noise, the distance between the optical head and the magnetic head is set to 10 mm or more, and the noise is reduced by 15 dB or more as understood from FIG. 116. Thus, by setting the distance between the optical head and the magnetic head to 10 mm or more, there is provided an advantage such that the noise is remarkably reduced. In this case, it is important to maintain the accuracy of the positional relation between the optical head and the magnetic head.

A description will now be given of a method of maintaining the positional accuracy. As shown in FIG. 117, with respect to the optical head 6 and the magnetic head 8, traverse shafts 363a and 363b are rotated in equal directions in response to rotation of a common traverse actuator 23 via traverse gears 367a 367b, and 367c. The traverse shafts are provided with opposite screws respectively so that the optical head 6 is moved in a leftward direction 51a while the magnetic head 8 is moved in a rightward direction 51b. The respective heads meet positional reference points 364a and 364b, and therefore positions thereof are adjusted. Thus, the optical head 6 is moved to a position above a reference optical track 65a while the magnetic head 8 is moved to a position above a reference magnetic track 67a. In this way, initial setting of the positions of the two heads is executed. Therefore, the accuracy of the positional relation between the two heads is maintained during the movements thereof. The positional setting is done at least once when a new recording medium 2 is inserted into the apparatus or when a power supply switch of the apparatus is turned on. Thereby, during later operation of the apparatus, the two heads are moved by equal distances. Thus, in the case where the optical head 8 accesses a given optical track 65, the magnetic head 6 accurately accesses a given magnetic track 67 on a radius equal to the radius of the currently-accessed optical track 65. In the case where the optical head 6 is moved thereafter, the magnetic head 8 is moved by the same distance. Thus, as shown in FIG. 118, an optical track 67b and a magnetic track 65b on the same radius are accurately accessed. In the case of access to an outermost part of the recording medium, the two heads are positioned above tracks on a circumference having a radius L2. In the case of access to an innermost part of the recording medium, the two heads are moved to positions above tracks on a circumference having a radius L1. In this case, the distance between the optical head 6 and the magnetic head 8 is equal to 2L1. Provided that this distance is set to 10 mm or more, the level of noise transmitted from the optical head to the magnetic head is small. In the case of a CD, L1=23 mm and thus the distance between the two heads is given as 2L1=46 mm, so that the level of noise is equal to 10 dB or less as understood from FIG. 116. Thus, there is an advantage such that an adverse influence of the noise hardly occurs.

As shown in FIG. 117, when a recording medium 2 is required to be inserted into the apparatus, the presence of the magnetic head 8 makes difficult the direct insertion of the recording medium 2. Accordingly, the elevator 21 for the magnetic head lifts the magnetic head 8 and the traverse by a significant distance, and then the recording medium is inserted into the apparatus. At this time, the previously-mentioned positional relation between the two heads tends to be out of order. On the other hand, at this time, as previously described, the magnetic head cleaning portion 377 cleans the contact surface of the magnetic head 8. Then, the magnetic head 8 and the traverse are returned to given positions. When the magnetic head 8 and the traverse are returned to the given positions, the positional relation between the optical head 6 and the magnetic head 8 is still out of order. Thus, if the magnetic head 8 is moved together with the optical head 6 without correcting the positional relation therebetween, the magnetic head 8 can not accurately access a given magnetic track 67 on a radius equal to the radius of a currently-accessed optical track 65. The previously-mentioned positional setting is done at least once when the recording medium is inserted into the apparatus. Thereby, there is provided an advantage such that a simple structure can increase the positional accuracy of access to a given magnetic track 67 by the magnetic head 8. This is an important function in realizing a home-use low-cost apparatus.

FIG. 120 shows another design in which a traverse connecting portion 366 includes a flexible member such as a leaf spring. The traverse connecting portion 366 is guided by a connecting portion guide 375. An optical head 6 and a magnetic head 8 are connected by the traverse connecting portion 366 and the guide 375. Thus, the optical head 6 and the magnetic head 8 can move together in a direction 51. Thus, it is possible to obtain the advantage which results from the linkage between the movements of the two heads as previously described with reference to FIG. 117. Since the traverse connecting portion 366 is flexible, the magnetic head 8 can be easily lifted in a direction 51a. Thus, there is an additional advantage such that the magnetic head elevator can easily lift the magnetic head 8 during the insertion of the recording medium 2 into the apparatus.

The design of FIG. 117 may be modified into a design of FIG. 126 in which the distance between the optical head 6 and the magnetic head 8 is always equal to a given value Lo. In this case, the optical head 6 and the magnetic head 8 are moved in equal directions 51a and 51b. Since the distance between the magnetic head 8 and the optical head 6 can be set large, there is an advantage such that the transmission of noise from the optical head to the magnetic head can be suppressed. This design is effective in noise suppression especially for a small-diameter recording medium such as an MD.

In the previous description of this embodiment, the magnetic head and the optical head are angularly separated by 180° with respect to the center of the disk as shown in FIG. 117. The angular separation between the two heads may be 45°, 60°, 90°, or 120°. In these cases, provided that the shortest distance between the two heads is 10 mm or more, it is possible to obtain an advantage such that the level of noise can be adequately decreased.

It is preferable to adopt one of the previously-mentioned countermeasures to noise or a combination of two or more of the previously-mentioned countermeasures to noise.

In the case where the electromagnetic shield with respect to the optical head 6 is adequately effective, the optical head 6 and the magnetic head 8 can be opposed to each other in a vertical direction as shown in FIG. 119. In this case, by providing positional references 364a and 364b, there is provided an advantage such that the accuracy of positional alignment between the two heads can be increased. The above-mentioned opposed configuration has an advantage such that the apparatus can be miniaturized since all the parts can be located at one side of the disk.

Next, a recording format will be described. With respect to an optical disk for data, a CAV (constant angular velocity) is provided and thus the rotational speed thereof remains the same even when the radius of the optical disk varies. In the application to a CD ROM, the rotation of a disk is controlled at a CLV (constant linear velocity) so that the linear speed remains constant although the rotational speed depends on the radius of a track. In this case, it is difficult to adopt a recording format of a conventional floppy disk or a conventional hard disk. In the application to a CD ROM, to increase a recording capacity, this invention uses the following design. As shown at 370a, 370b, 370c, 370d, and 370e in FIG. 122, the data capacities of respective tracks are larger as they are closer to the outer edge of the disk. A head of data has a sync portion 369 and a track number portion 371 followed by a data portion 372 and a CRC portion 373. The capacity of the data portion 372 depends on the track. The CRC portion 373 is used for error check. A gap portion 374 having no signal is set after the CRC portion 373 so that a sync portion 369b in a next head or others can be prevented from being erroneously erased even when the linear velocity is different during the recording. This design has an advantage such that, in the case of a CD, the recording capacity is equal to about 1.5 times the recording capacity which occurs in the design where respective tracks are set to equal capacities as in a conventional floppy disk. In addition, since the magnetic head executes the magnetic recording and reproduction by directly using the CLV rotation control of the motor in response to the signal of the optical head for the CD, there is an advantage such that a motor control circuit exclusively for the magnetic recording can be omitted.

Next, physical formats on a disk will be described. The physical formats are of two types, a "normal mode" and a "variable track pitch mode". As shown in FIG. 123, magnetic tracks 67a, 67b, 67c, and 67d are located at opposite (back) sides of optical tracks 65a, 65b, 65c, and 65d, and the tracks are arranged at equal track pitches Tpo according to the "normal mode".

This invention adopts a "variable angle" system. As shown in FIG. 117 and FIG. 119, in this invention, the angular separation between the optical head 6 and the magnetic head 8 is equal to one of various values such as 0°, 180°, 45°, and 90°. Generally, in a conventional recording and reproducing apparatus of the rotational magnetic disk type, sync portions 369 of data are located at positions on fixed angles as viewed from the center of the disk. On the other hand, according to the variable angle system of this invention, as shown in FIG. 123, an angle of the position of a sync portion 369 which exists at a data starting point can be arbitrarily chosen. Thereby, there is provided an advantage such that a device or a circuit for detecting the absolute angle of the disk can be omitted. A front part (head) of magnetic recording can be started from a portion of an arbitrary rotation angle. Thus, in the case of a CD, the data recording can be started immediately after given address information is read out from an optical recording portion such as subcodes. Accordingly, during the reproduction, immediately after optical address information is read out from that track, the reproduction of a sync portion at the head of magnetic data is started. Thus, a loss time for waiting rotation during the recording and reproduction of magnetic data is nullified, and there is an advantage such that an effective data access time is shortened. This system provides a large advantage in the case where recording and reproducing apparatus of equal types are used.

Next, the "variable track pitch mode" will be described. As in a game machine, a general ROM disk is inserted into the apparatus. At the start of a program, information is first read out from a track of a TOC region, and information is read out from a given track recording the program and information is read out from a given track recording data. This sequence is the same at every starting.

It is now assumed that, as shown in FIG. 124, access is made with respect to decided tracks such as a first track 65b, a 1004-th track 65c, a 2004-th track 65d, and a 3604-th track 65e. In the case where the hybrid disk of this invention is used, if magnetic information necessary for starting is present in a magnetic track out of alignment with the back side of an optical track accessed during the stating, wasteful access to the magnetic track is executed in addition to access to the optical track. Thus, the completion of the starting is delayed commensurately. In the case of the equal intervals of the "normal mode", there is a small possibility that the center of the magnetic track comes into alignment with the back side of the optical track. Therefore, it is necessary to access another magnetic track, and the speed of the starting is slow also in this case. The "variable track pitch mode" of this invention features that the magnetic tracks 67b, 67c, 67d, and 67e are defined at the back sides of the four optical tracks 65b, 65c, 65d, and 65e which are required to be read out at the starting. The track numbers and the address information of the optical recording portion which corresponds to the track numbers are recorded on the TOC region of the optical recording portion or the TOC region of the magnetic recording portion. In the case of a CD, subcode information is recorded thereon. Data to be read out at the starting is set so as to be recorded on the magnetic track, and the data represents a game gain item number, a progress degree, points, a personal name, and others. Thereby, at the starting, the magnetic track which records the information necessary for the starting is automatically accessed at the same time as access to optical data, and the information is read out from the magnetic track. Thus, a loss time is nullified, and there is an advantage such that the starting time is very short. In this case, as shown In FIG. 124, the track pitches between the respective tracks are equal to random values as Tp1, Tp2, Tp3, and Tp4. Therefore, although the recording capacity is slightly lowered, this design is effective to use which needs high-speed starting.

The "variable pitch mode" and the "variable angle mode" are effective to music use, for example, accompaniment use. In the case where this invention is applied to accompaniment use, personal environment setting data can be recorded and stored which represents musical intervals for respective music numbers desired by persons respectively, desired tempos of respective music numbers, desired amounts of echo, respective desired parameters of DSP, and others. Thereby, there is provided the following advantage. Provided that data setting is done once, only by inserting an accompaniment CD into an accompaniment machine, music is reproduced automatically with the musical intervals, the tempos, and the echoes desired by the respective persons. Thus, it is possible for the respective persons to enjoy the accompaniments under conditions well suited to the abilities and the tastes of the persons. In this case, magnetic tracks at the back sides of the optical tracks 65b, 65c, 65d, and 65e for determining the heads of music numbers are defined, and personal accompaniment data regarding the music numbers are recorded on the magnetic tracks 67b, 67c, 67d, and 67e. In the case where the accompaniment on the optical track 65c is selected, the related personal accompaniment data is recorded on the magnetic track 57 at the back side thereof. During the start of reproduction of a given music number, the musical interval, the tempo, and the echo of the music number are set in a period of one revolution of the disk and the reproduced music starts to be outputted. Thus, also in music use, the "variable pitch mode" provides an advantage such that both optical data and magnetic data can be quickly accessed. In general music use, this design is effective when environment setting about, for example, DSP sound fields for respective music numbers, is used.

In the case where this invention is applied to a CD ROM, when the magnetic coercive force Hc is set to 1,750 Oe, a RAM capacity of about 32 kB can be attained. The optical recording surface of a CD ROM has a ROM capacity of 540 MB. Thus, there is a capacity difference by about one hundred thousand times. In most of actual products using a CD ROM, the 540-MB capacity thereof is not fully used. Generally, a CD ROM has an unused or free capacity of at least several tens of MB. This invention uses the free area of the ROM and records various data compressing reference tables into the ROM to execute the compression of data recorded into the RAM.

The data compressing design will now be described with reference to FIG. 125. In the case of a game machine, the optical recording portion 4 is previously loaded with information closely related to game contents possibly required during the execution of a game program, for example, data compressing reference tables such as a place name reference table 368a and a person's name reference table 368b. The free area in the ROM is large, and various reference tables can be prepared which are of information having a high possible use frequency among words such as person's names and place names and numeral sequences. If the word "Washington" is directly recorded on the magnetic recording layer 3 forming the RAM, an area of 80 bits is consumed. On the other hand, in this invention, the data compressing reference table 368a defines "Washington" as a binary code "10", and thus the 80-bit data is compressed into the 2-bit data "10". The compressed data is recorded on the magnetic recording layer 3, and thereby the information is recorded while the used capacity is reduced by a factor of 1/40. Provided that use is limited, data compression by a factor of 10 or more can be done according to this data compressing design. Thus, the 32-kB magnetic recording capacity of a CD ROM is substantially equivalent to the 320-kB magnetic recording capacity of a magnetic disk. As previously described, in the hybrid disk of this invention, the ROM area of the optical recording portion is used in compressing data to be stored into the RAM, and thus there is an advantage such that the RAM capacity is virtually increased. The data compressing design may use a Huffman optimal coding method or a Ziv-Lempel method.

The overall operation of the recording and reproducing apparatus will be described hereinafter with reference to FIG. 127 and FIG. 128. The system controller 10 operates in accordance with a program, the flowchart of which is shown in FIG. 127 and FIG. 128.

Under conditions where the magnetic head is lifted, a step 410 places a disk into a correct position. Then, a step 411 returns the magnetic head to the normal position. A step 412 moves the optical head to a TOC track, and a step 413 reads out optical data from the TOC track. The readout data contains a flag representing whether or not the optical disk has a magnetic recording portion, address information such as CD subcode numbers corresponding to the positions of magnetic tracks for defaults of magnetic data, and information representing whether or not the variable pitch mode is present. A step 414 checks the presence of the flag of the magnetic recording layer. When the result of the check is Yes, an advance to a step 418 is done. When the result of the check is No, a step 415 reads out an optical mark representing whether or not the magnetic recording layer on the magnetic recording surface or others is present. When a step 416 detects the absence of the optical mark, a jump to a step 417 is done and magnetic recording and reproduction regarding the present disk are not executed.

The program enters a magnetic recording and reproducing mode at the step 418, and advances to a block 402 which executes initial setting of the magnetic track. A step 419 in the block 402 moves the magnetic head downward onto the surface of the recording medium, and a step 420 reads out magnetic data from the TOC area. Then, a step 421 lifts the magnetic head to prevent wear thereof. A step 422 checks whether or not an error flag representing error conditions of the magnetic data is present. When a step 423a detects the presence of the error flag, an advance to a step 427a is done. The step 427a ejects the optical disk, and a step 427b indicates "clean optical disk" on a display of the apparatus. Then, a step 427c stops the program.

On the other hand, a step 424 checks whether or not the default value recorded on the optical recording surface is good with the optical address correspondence table of the respective magnetic tracks. When the result of the check is No, a step 426 updates the contents of a part of the magnetic track-optical address correspondence table in response to the magnetic data information of the TOC track. The updated table is stored into an internal memory of the apparatus. When the result of the check is Yes, an advance to a step 428 is done.

When the step 428 detects the presence of a reading instruction regarding the magnetic track, an advance to a step 440 is done. Otherwise, an advance to a step 429 is done. In cases other than the variable track pitch mode, an advance to the step 440 is done. In the case of the variable track pitch mode, a step 430 sets an optical track group number n to 0. A step 431 increments n by 1. When a step 432 detects that n is equal to a final value, a jump to a step 438 is done. Otherwise, a step 433 accesses a heading optical track in the n-th optical track group. When a step 434 detects that the default magnetic track is good, a step 436 moves the magnetic head downward onto the surface of the recording medium. Then, a step 437 reads out magnetic data and stores the readout data into the internal memory of the apparatus, and a return to the step 431 is done. On the other hand, when the optical address corresponding to the magnetic head is the default value so that bad conditions are detected, a step 435 accesses an optical address other than the default value. Then, steps 436 and 437 read out magnetic data, and a return to the step 431 is done. The step 431 increments n by 1. When n reaches the final value at the step 432, reading out the optical data and the magnetic data is completed at the step 438. Therefore, in the case of a game machine, a game program is started, and the game scene which occurs at the previous end is retrieved on the basis of the data recorded on the magnetic recording portion. A step 439 lifts the magnetic head, and an advance to a step 446 is done.

When the step 429 detects the absence of the variable track pitch mode, a jump to a step 440 is done. When the step 440 detects the absence of the normal track pitch mode, a jump to a step 446 is done. Otherwise, a step 441 receives an instruction of accessing the n-th magnetic track. A step 442 derives the optical address corresponding to the n-th magnetic track by referring to the information in the internal memory of the system controller 10, and a step 443 accesses the optical address. Then, a step 444 reads out magnetic data, and a step 445 stores the readout data into the internal memory and a jump to the step 446 is done.

The step 446 checks whether or not a rewriting instruction is present. When the result of the check is No, a jump to a step 455 is done. When the result of the check is Yes, a step 447 is executed. The step 447 checks whether or not a final storing instruction is present. When the result of the check is Yes, an advance to the step 427a (or the step 455) is done.

When the result of the check is No, an advance to a step 448 is done. The step 448 checks whether or not data desired to be rewritten is present in the internal memory of the apparatus. When the result of the check is Yes, a jump to a step 454 is done so that the magnetic recording is not executed but only rewriting of the internal memory is executed. When the result of the check is No, a step 449 refers to the magnetic track-optical address correspondence table and accesses the given optical track. Then, a step 450 moves the magnetic head downward, and steps 451, 452, and 453 execute reading out the magnetic data, storing the readout data into the internal memory, and lifting the magnetic head. A step 454 rewrites or updates the information transferred into the internal memory, and then an advance to the step 455 is done.

The step 455 checks whether or not a final storing instruction is present. When the result of the check is No, an advance to a step 458 is done. The step 458 detects whether or not the work has been completed. When the work has been completed, an advance to a step 476 is done. Otherwise, a return to the step 428 is done. When the result of the check at the step 455 is Yes, an advance to a step 456 is done. The step 456 extracts only updated data from the magnetic data in the internal memory, and a step 457 detects whether or not updating is present. In the absence of updating, an advance to a step 458 is done. In the presence of updating, a step 459 accesses the optical address of the corresponding magnetic track. Steps 460, 470, and 471 execute moving the magnetic head downward, recording magnetic data immediately after the detection of the optical address, and checking the recorded data. When a step 472 detects that the error rate is large, a jump to a step 481 is done. The step 481 lifts the magnetic head, and a step 482 cleans the magnetic head with the head cleaning portion. A step 483 executes the recording again and checks the error rate. When the error rate is good, an advance to the step 428 is done. When the error rate is bad, a jump to the step 427a is done.

When the step 472 detects that the error rate is small, an advance to a step 473 is done. The step 473 checks whether or not the recording has been completed. When the result of the check is No, a return to the step 470 is done. When the result of the check is Yes, a step 474 lifts the magnetic head. A step 475 checks whether or not all the work has been completed. When all the work has been completed, an advance to a step 476 is done. Otherwise, a return to the step 428 is done.

The step 476 lifts the magnetic head, and a step 477 cleans the magnetic head with the head cleaning portion. Then, a step 478 detects whether or not an ejecting instruction is present. In the presence of the ejecting instruction, a step 479 ejects the optical disk. In the absence of the ejecting instruction, a step 480 stops the program.

A band pass filter tuned to a frequency band equal to a frequency distribution of a reproduced signal from the magnetic head may be provided in the drive circuit for the actuator 18 to remove noise. Electromagnetic noise may be reduced by the following design. After access to a magnetic head, a drive current to the actuator for the optical head 6 is turned off. Then, reproduction is executed by the magnetic head. When the reproduction is completed, driving the actuator is restarted.

In most of conventional CD's, a thick films of print ink are applied to the back sides thereof by screen printing or others, so that there is a roughness of several tens of μm. When the magnetic head is brought into contact with such a CD, print ink is removed or damaged. As shown in the ON state of FIG. 115, the recording medium 2 having a magnetic shield layer 69 is inserted into the apparatus. In this case, the transmission of electromagnetic noise from the actuator for the optical head 6 is remarkably suppressed as compared with the OFF state of FIG. 115 in which the recording medium 2 having no magnetic shield layer 69 is inserted into the apparatus. The noise is outputted from the magnetic head reproducing circuit 30, and can be easily detected. Accordingly, even when the magnetic head 8 is not brought into contact with the magnetic recording layer 3, the recording medium of this invention can be discriminated from a conventional recording medium such as a CD. Only when the recording medium of this invention which has the magnetic recording layer is inserted into the apparatus, the magnetic head 8 is brought into contact with the surface of the recording medium. Thus, the magnetic head is prevented from contacting the back side of a recording medium such as a CD or an LD which has no magnetic recording layer. Therefore, there is an advantage such that the magnetic head is prevented from damaging the optical recording surface of the recording medium and printed matters on the back side of the recording medium.

According to another design, in FIG. 111, a discrimination code signal denoting the presence of a magnetic recording layer in a recording medium is previously recorded on a TOC area of the optical recording portion of a CD. First, optical TOC information is read out from a recording medium while the magnetic head is held out of contact with the recording medium. Only when the discrimination code signal for the presence of the magnetic layer is detected, the magnetic head 8 is moved into contact with the recording medium. In this design, when a conventional CD is inserted into the apparatus, the magnetic head 8 does not contact the recording medium. Thus, there is an advantage such that damage to the conventional CD can be prevented. It may be good that a given optical mark is provided on the print surface of an optical disk, and a magnetic recording layer is decided to be present only when the optical mark is detected.

As previously described, the recording medium 2 has an optical recording surface. The back side of the recording medium 2 is provided with the magnetic recording layer 3. In the recording and reproducing apparatus which executes the RAM type recording and reproduction such as the magneto-optical recording and reproduction, the magnetic head is used in common for the two purposes. Thus, without substantially increasing the number of parts and the cost, it is possible to magnetically record information of independent channels provided on the recording medium. In this case, the slider tracking mechanism for the magnetic head is originally provided so that an increase in the cost of the recording and reproducing apparatus hardly occurs. Thus, there is an advantage such that the magnetic recording and reproducing function which is independent of the optical recording can be added at essentially the same cost.

The recording medium containing the recorded information is applied to a music CD, an HD, a game CD ROM, and an MD ROM, and the back side thereof is provided with the magnetic recording track. This recording medium is subjected to the reproducing process by the ROM type recording and reproducing apparatus of FIG. 17. Thereby, there is provided an advantage such that the conditions which have been previously used can be retrieved upon the reproduction. As described with respect to the first embodiment, in the case where the recording is limited to only one track of the TOC area, information of several hundreds of bits can be recorded when the gap width is set to 200 µm. This capacity meets the requirements for use of a game IC ROM with a nonvolatile memory. In the case of limitation to the TOC, a device for accessing the magnetic track can be omitted so that the structure of the system can be simple.

In the recording and reproducing apparatus which is exclusive for the reproduction regarding the optical recorded information, it is necessary to provide the magnetic head and others at the opposite side of the optical head with respect to the recording medium. The related parts can be common to the magnetic field modulating head for the magneto-optical recording, so that the cost of the apparatus can be lowered by mass production. The parts are originally very cheaper than optical recording parts and magnetic recording parts for a low density, and thus an increase in the cost is small. Since the optical head is mechanically linked with the magnetic head located at the opposite side thereof, it is unnecessary to add a related tracking mechanism. Thus, in this regard, an increase in the cost is small.

The time information or the address information is recorded on the optical recording layer at the surface of the recording medium of the RAM type or the ROM type. The tracking with respect to the optical head is executed in response to the time information or the address information. Thereby, the tracking control is done so that the magnetic head can move to an arbitrary position on the disk. Thus, there is an advantage such that it is unnecessary to use expensive parts such as a linear sensor and a linear actuator.

The protective layer on the back side of a conventional magneto-optic recording medium of the magnetic field modulation type is formed from binder and lubricant by spin coat. In this invention, it is sufficient that the magnetic material is added to the combination of the binder and the lubricant, and the spin coat is executed at the same step. Thus, the number of manufacture steps does not increase. A related increase in the cost is in a negligible order relative to the entire cost. Therefore, the new value being the magnetic recording function is added without significantly increasing the cost.

As previously described, in this invention, the magnetic channel can be added without significantly increasing the cost. In addition, the RAM function can be added to a conventional disk of the ROM type and a player exclusively for a ROM.

What is claimed is:

1. A recording and reproducing apparatus for use with a disk-shaped recording medium which includes a transparent substrate, and an optical recording layer and a magnetic recording layer formed at one side of the transparent substrate, the apparatus comprising:

a light source for emitting light;

an optical head for applying the light to the optical recording layer from the light source via the transparent substrate, for focusing the light on the optical recording layer; and for reproducing information from the optical recording layer;

a magnetic head, located at a side of the recording medium opposite the side thereof where the optical head is located, for recording information on the magnetic recording layer or reproducing information from the magnetic recording layer;

a first means for activating the magnetic head to reproduce data from a specified magnetic track on the magnetic recording layer after the recording medium is placed in a given operable position;

a memory;

a second means for storing the reproduced data obtained by the first means into the memory;

a third means for reproducing or updating information in the memory when reproducing or updating information on the specified magnetic track is required during a period after said storing the reproduced data into the memory by the second means; and a fourth means for activating the magnetic head to record only a part of information in the memory, which is required for updating, into the magnetic recording layer when saving information in the memory to the recording medium is required during or at an end of an information processing work.

2. A recording and reproducing apparatus for use with a disk-shaped recording medium which includes a transparent substrate, and an optical recording layer and a magnetic recording layer form at one side of the transparent substrate and being independent of each other, the apparatus comprising:

means for rotating the recording medium;

a light source for emitting light;

an optical head for applying the light to the optical recording layer from the light source via the transparent substrate, for focusing the light on the topical recording layer, and for reproducing information from the topical recording layer; and a magnetic head for recording information on the magnetic recording layer or reproducing information from the magnetic recording layer;

wherein the magnetic head has a head gap equal to or greater than 5 μm, further comprising:

an optical head moving means for moving the optical head so as to focus the light on an optical track on the optical recording layer which has specified address information; and a magnetic head moving means for moving the magnetic head to a magnetic track on the magnetic recording layer in accordance with said moving the optical head by the optical head moving means, the magnetic track being located at substantially a back side of the optical track having the specified address information.

3. A recording and reproducing apparatus for use with a disk-shaped recording medium which includes a transparent substrate, and an optical recording layer and a magnetic recording layer formed on the transparent substrate and being independent of each other, the apparatus comprising:

a light source for emitting light;

an optical head for applying the light to the optical recording layer from the light source via the transparent substrate, for focusing the light on the optical recording layer, for reproducing information from the optical recording layer;

a first correcting means for correcting an error in the information reproduced by the optical head;

a magnetic head for recording information on the magnetic recording layer or reproducing information from the magnetic recording layer;

an optical head moving means for moving the optical head so as to focus the light on an optical track on the optical recording layer which has specified address information;

a magnetic head moving means for moving the magnetic head into contact with a specified magnetic track on the magnetic recording layer so as to enable the magnetic head to record information on the magnetic recording layer or reproduce information from the magnetic recording layer; and a second correcting means for correcting an error in the information reproduced by the magnetic head, further comprising:

a detecting means for detecting noise which enters a magnetic reproduced signal from the optical head, the magnetic reproduced signal being generated by the magnetic head and representing the information reproduced by the magnetic head; and a noise canceling means for generating a noise cancel signal which equals an inversion of the noise detected by the detecting means, and for adding the noise cancel signal and the magnetic reproduced signal.

4. The recording and reproducing apparatus of claim 3 wherein the detecting means comprises a magnetic head located near the reproducing magnetic head.

5. A recording and reproducing apparatus for use with a disk-shaped recording medium which includes a transparent substrate, and an optical recording layer and a magnetic recording layer formed on the transparent substrate and being independent of each other, the apparatus comprising:

a light source for emitting light;

an optical head for applying the light to the optical recording layer from the light source via the transparent substrate, for focusing the light on the optical recording layer, for reproducing information from the optical recording layer;

a first correcting means for correcting an error in the information reproduced by the optical head;

a magnetic head for recording information on the magnetic recording layer or reproducing information from the magnetic recording layer;

an optical head moving means for moving the optical head so as to focus the light on an optical track on the optical recording layer which has specified address information;

a magnetic head moving means for moving the magnetic head into contact with a specified magnetic track on the magnetic recording layer so as to enable the magnetic head to record information on the magnetic recording layer or reproduce information from the magnetic recording layer; and a second correcting means for correcting an error in the information reproduced by the magnetic head, further comprising an optical head reference portion provided in the optical head moving means, a magnetic head reference portion provided in the magnetic head moving means, and means for, in cases where the recording medium is newly placed in a given operable position, fixing the optical head and the magnetic head to the optical head reference portion and the magnetic head reference portion respectively to execute positional adjustments of the optical head and the magnetic head, and then starting movements of the optical head and the magnetic head by the optical head moving means and the magnetic head moving means.

6. The recording and reproducing apparatus of claim 5, further comprising means for increasing a distance between the magnetic head moving means and the optical head moving means when the recording medium is placed in the operable position.

7. The recording and reproducing apparatus of claim 2, wherein the optical head moving means and the magnetic head moving means comprise a common drive means, and a mechanical connection between the optical head and the magnetic head to enable the optical head and the magnetic head to be moved together by the common drive means.

8. The recording and reproducing apparatus of claim 7, wherein the mechanical connection comprises a flexible member.

9. The recording and reproducing apparatus for use with a disk-shaped recording medium which includes a transparent substrate, and an optical recording layer and a magnetic recording layer formed at one side of the transparent substrate, the apparatus comprising:

a light source for emitting light;

an optical head for applying the light to the optical recording layer from the light source via the transparent substrate, for focusing the light on the optical recording layer, and for reproducing information from the optical recording layer;

a magnetic head for recording information on the magnetic recording layer for reproducing information from the magnetic recording layer;

a correcting means for correcting an error in the information reproduced by the magnetic head;

a deciding means for deciding whether a magnetic recording layer is present in or absent from a currently-mounted recording medium;

a magnetic head elevator for, only in cases where a magnetic recording layer is decided to be present in the currently-mounted recording medium by the deciding means, moving the magnetic head into contact with the recording medium before the magnetic head is activated, and for moving the magnetic head out of contact with the recording medium after the magnetic head is deactivated, further comprising:

a first means for activating the magnetic head to reproduce data from a specified magnetic track on the magnetic recording layer after the recording medium is placed in a given operable position;

a memory;

a second means for storing initial reproduced information of the data reproduced by the first means into the memory;

a third means for reproducing or updating information in the memory when reproducing or updating information on the specified magnetic track is required during a period after said storing the reproduced data into the memory by the second means; and a fourth means for, in cases where the information in the memory is different from the initial reproduced information, activating the magnetic head to record at least a part of updated information in the memory, which relates to the initial reproduced information, into the magnetic recording layer when an information processing work ends.

10. A recording and reproducing apparatus for use with a disk-shaped recording medium which includes a transparent substrate, and an optical recording layer and a magnetic recording layer formed at one side of the transparent substrate and being independent of each other, the apparatus comprising:

means for rotating the recording medium;

a light source for emitting light;

an optical head for applying the light to the optical recording layer from the light source via the transparent substrate, for focusing the light on the topical recording layer, and for reproducing information from the topical recording layer; and a magnetic head for recording information on the magnetic recording layer or reproducing information from the magnetic recording layer;

wherein the magnetic head has a head gap equal to or greater than 5 μm, wherein data head portions containing sync signals on respective magnetic tracks are present in an unspecified angular region of the recording medium, further comprising means for starting recording of an amount of the data head portions, which corresponds to one track of a magnetic signal recording format, on the magnetic tracks immediately after specified address information is reproduced from an optical track on the optical recording layer.

11. A recording and reproducing apparatus for use with a disk-shaped recording medium which includes a transparent substrate, and an optical recording layer and a magnetic recording layer formed on the transparent substrate and being independent of each other, the apparatus comprising:

a light source for emitting light;

an optical head for applying the light to the optical recording layer from the light source via the transparent substrate, for focusing the light on the optical recording layer, for reproducing information from the optical recording layer;

a first correcting means for correcting an error in the information reproduced by the optical head;

a magnetic head for recording information on the magnetic recording layer or reproducing information from the magnetic recording layer;

an optical head moving means for moving the optical head so as to focus the light on an optical track on the optical recording layer which has specified address information;

a magnetic head moving means for moving the magnetic head into contact with a specified magnetic track on the magnetic recording layer so as to enable the magnetic head to record information on the magnetic recording layer or reproduce information from the magnetic recording layer; and a second correcting means for correcting an error in the information reproduced by the magnetic head, wherein the magnetic recording layer has magnetic tracks which are arranged at substantially unequal intervals in a radial direction with respect to the recording medium, further comprising means for separating optical tracks on the optical recording layer into groups storing information to start a program, and means for setting a center of a magnetic track at a back side of an innermost optical track in each of the optical track groups and executing recording and reproducing.

12. A recording and reproducing apparatus for use with a disk-shaped recording medium which includes a transparent substrate, and an optical recording layer and a magnetic recording layer formed on the transparent substrate and being independent of each other, the apparatus comprising:

a light source for emitting light;

an optical head for applying the light to the optical recording layer from the light source via the transparent substrate, for focusing the light on the optical recording layer, for reproducing information from the optical recording layer;

a first correcting means for correcting an error in the information reproduced by the optical head;

a magnetic head for recording information on the magnetic recording layer or reproducing information from the magnetic recording layer;

an optical head moving means for moving the optical head so as to focus the light on an optical track on the optical recording layer which has specified address information;

a magnetic head moving means for moving the magnetic head into contact with a specified magnetic track on the magnetic recording layer so as to enable the magnetic head to record information on the magnetic recording layer or reproduce information from the magnetic recording layer; and a second correcting means for correcting an error in the information reproduced by the magnetic head, wherein the magnetic head has a gap of 5 µm or more, further comprising a deciding means for deciding whether a magnetic recording layer is present in or absent from a currently-mounted recording medium, the magnetic head moving means being operative for moving the magnetic head into contact with the magnetic recording layer only in cases where a magnetic recording layer is decided to be present in the currently-mounted recording medium by the deciding means.

13. A recording and reproducing apparatus for use with a disk-shaped recording medium which includes a transparent substrate, and an optical recording layer and a magnetic recording layer formed on the transparent substrate and being independent of each other, the apparatus comprising:

a light source for emitting light;

an optical head for applying the light to the optical recording layer from the light source via the transparent substrate, for focusing the light on the optical recording layer, for reproducing information from the optical recording layer;

a first correcting means for correcting an error in the information reproduced by the optical head;

a magnetic head for recording information on the magnetic recording layer or reproducing information from the magnetic recording layer;

an optical head moving means for moving the optical head so as to focus the light on an optical track on the optical recording layer which has specified address information;

a magnetic head moving means for moving the magnetic head into contact with a specified magnetic track on the magnetic recording layer so as to enable the magnetic head to record information on the magnetic recording layer or reproduce information from the magnetic recording layer; and a second correcting means for correcting an error in the information reproduced by the magnetic head, further comprising a deciding means for deciding whether a magnetic recording layer is present in or absent from a currently-mounted recording medium, the magnetic head moving means being operative for moving the magnetic head into contact with the magnetic recording layer only in cases where a magnetic recording layer is decided to be present in the currently-mounted recording medium by the deciding means.

14. The recording and reproducing apparatus of claim 13, wherein the magnetic head has a gap of 5 µm or more.

15. The recording and reproducing apparatus of claim 13, wherein the deciding means comprises an optical mark provided on the recording medium, and a detecting means for detecting the optical mark.

16. The recording and reproducing apparatus of claim 13, wherein the deciding means comprises means for detecting an identification signal from the information reproduced by the optical head, the identification signal representing whether a magnetic recording layer is present in or absent from a currently-mounted recording medium.

17. The recording and reproducing apparatus of claim 16, wherein the identification signal is recorded on a TOC region of the optical recording layer.

18. The recording and reproducing apparatus of claim 13, wherein the deciding means comprises a cartridge containing the recording medium and having an outer surface with an uneven portion representing whether a magnetic recording layer is present in or absent from the recording medium, and means for detecting the uneven portion of the outer surface of the cartridge.

19. A recording and reproducing apparatus for use with a disk-shaped recording medium which includes a transparent substrate, and an optical recording layer and a magnetic recording layer formed on the transparent substrate and being independent of each other, the apparatus comprising:

a light source for emitting light;

an optical head for applying the light to the optical recording layer from the light source via the transparent substrate, for focusing the light on the optical recording layer, for reproducing information from the optical recording layer;

a first correcting means for correcting an error in the information reproduced by the optical head;

a magnetic head for recording information on the magnetic recording layer or reproducing information from the magnetic recording layer;

an optical head moving means for moving the optical head so as to focus the light on an optical track on the optical recording layer which has specified address information;.

a magnetic head moving means for moving the magnetic head into contact with a specified magnetic track on the magnetic recording layer so as to enable the magnetic head to record information on the magnetic recording layer or reproduce information from the magnetic recording layer; and a second correcting means for correcting an error in the information reproduced by the magnetic head, wherein the second correcting means comprises means for detecting a rate of occurrence of errors in the information reproduced by the magnetic head, and means for outputting a resultant of the error correction of the information reproduced by the magnetic head only when the detected rate of occurrence of errors is lower than a predetermined reference rate.

20. A recording and reproducing apparatus for use with a disk-shaped recording medium which includes a transparent substrate, and an optical recording layer and a magnetic recording layer formed at one side of the transparent substrate and being independent of each other, the apparatus comprising:

means for rotating the recording medium;

a light source for emitting light;

an optical head for applying the light to the optical recording layer from the light source via the transparent substrate, for focusing the light on the topical recording layer, and for reproducing information from the topical recording layer; and a magnetic head for recording information on the magnetic recording layer or reproducing information from the magnetic recording layer, the magnetic head having a head gap equal to or greater than 5 µm; and a first correcting means for correcting an error in the information reproduced by the optical head, and a second correcting means for correcting an error in the information reproduced by the magnetic head, further comprising a deciding means for deciding whether a magnetic recording layer is present in or absent from a currently-mounted recording medium, the magnetic head moving means being operative for moving the magnetic head into contact with the magnetic recording layer only in cases where a magnetic recording layer is decided to be present in the currently-mounted recording medium by the deciding means.

21. The recording and reproducing apparatus of claim 20, wherein the identification signal is recorded on a TOC region of the optical recording layer.

22. The recording and reproducing apparatus of claim 20, wherein the deciding means comprises an optical mark provided on the recording medium, and a detecting means for detecting the optical mark.

23. A recording and reproducing apparatus for use with a disk-shaped recording medium which includes a transparent substrate, and an optical recording layer and a magnetic recording layer formed at one side of the transparent substrate and being independent of each other, the apparatus comprising:

means for rotating the recording medium;
a light source for emitting light;
an optical head for applying the light to the optical recording layer from the light source via the transparent substrate, for focusing the light on the topical recording layer, and for reproducing information from the topical recording layer; and
a magnetic head for recording information on the magnetic recording layer or reproducing information from the magnetic recording layer;.
wherein the magnetic head has a head gap equal to or greater than 5 μm, further comprising a deciding means for deciding whether a magnetic recording layer is present in or absent from a currently-mounted recording medium, the magnetic head moving means being operative for moving the magnetic head into contact with the magnetic recording layer only in cases where a magnetic recording layer is decided to be present in the currently-mounted recording medium by the deciding means.

24. The recording and reproducing apparatus of claim 23, further comprising a first correcting means for correcting an error in the information reproduced by the optical head, and a second correcting means for correcting an error in the information reproduced by the magnetic head.

25. Recording and reproducing apparatus for use with a disk-shaped recording medium which includes a transparent substrate, and an optical recording layer and a magnetic recording layer formed at one side of the transparent substrate, the apparatus comprising:

a light source for emitting light;
an optical head for applying the light to the optical recording layer from the light source via the transparent substrate, for focusing the light on the optical recording layer, and for reproducing information from the optical recording layer;
a magnetic head for recording information on the magnetic recording layer for reproducing information from the magnetic recording layer;
a correcting means for correcting an error in the information reproduced by the magnetic head;
a deciding means for deciding whether a magnetic recording layer is present in or absent from a currently-mounted recording medium;

a magnetic head elevator for, only in cases where a magnetic recording layer is decided to be present in the currently-mounted recording medium by the deciding means, moving the magnetic head into contact with the recording medium before the magnetic head is activated, and for moving the magnetic head out of contact with the recording medium after the magnetic head is deactivated,
wherein the deciding means uses light,
wherein the deciding means comprises means for detecting an identification signal from the information reproduced by the optical head, the identification signal representing whether a magnetic recording layer is present in or absent from a currently-mounted recording medium.

26. The recording and reproducing apparatus of claim 25, wherein the identification signal is recorded on a TOC region of the optical recording layer.

27. A recording and reproducing apparatus for use with a disk-shaped recording medium which includes a transparent substrate, and an optical recording layer and a magnetic recording layer formed at one side of the transparent substrate, the apparatus comprising:

a light source for emitting light;
an optical head for applying the light to the optical recording layer from the light source via the transparent substrate, for focusing the light on the optical recording layer, and for reproducing information from the optical recording layer;
a magnetic head for recording information on the magnetic recording layer for reproducing information from the magnetic recording layer;
a correcting means for correcting an error in the information reproduced by the magnetic head;
a deciding means for deciding whether a magnetic recording layer is present in or absent from a currently-mounted recording medium;
a magnetic head elevator for, only in cases where a magnetic recording layer is decided to be present in the currently-mounted recording medium by the deciding means, moving the magnetic head into contact with the recording medium before the magnetic head is activated, and for moving the magnetic head out of contact with the recording medium after the magnetic head is deactivated, wherein the deciding means uses light, wherein the deciding means comprises an optical mark provided on the recording medium, and a detecting means for detecting the optical mark.

28. A recording and reproducing apparatus for use with a disk-shaped recording medium which includes a transparent substrate, and an optical recording layer and a magnetic recording layer formed at one side of the transparent substrate, the apparatus comprising:

a light source for emitting light;
an optical head for applying the light to the optical recording layer from the light source via the transparent substrate, for focusing the light on the optical recording layer, and for reproducing information from the optical recording layer;
a magnetic head for recording information on the magnetic recording layer for reproducing information from the magnetic recording layer;
a correcting means for correcting an error in the information reproduced by the magnetic head;
a deciding means for deciding whether a magnetic recording layer is present in or absent from a currently-mounted recording medium;

a magnetic head elevator for, only in cases where a magnetic recording layer is decided to be present in the currently-mounted recording medium by the deciding means, moving the magnetic head into contact with the recording medium before the magnetic head is activated, and for moving the magnetic head out of contact with the recording medium after the magnetic head is deactivated, wherein the deciding means comprises a cartridge containing the recording medium and having an outer surface with an uneven portion representing whether a magnetic recording layer is present in or absent from the recording medium, and means for detecting the uneven portion of the outer surface of the cartridge.

29. A recording and reproducing apparatus for use with a disk-shaped recording medium which includes a transparent substrate, and an optical recording layer and a magnetic recording layer formed at one side of the transparent substrate, the apparatus comprising:

a light source for emitting light;

an optical head for applying the light to the optical recording layer from the light source via the transparent substrate, for focusing the light on the optical recording layer, and for reproducing information from the optical recording layer;

a magnetic head for recording information on the magnetic recording layer for reproducing information from the magnetic recording layer;

a correcting means for correcting an error in the information reproduced by the magnetic head;

a deciding means for deciding whether a magnetic recording layer is present in or absent from a currently-mounted recording medium;

a magnetic head elevator for, only in cases where a magnetic recording layer is decided to be present in the currently-mounted recording medium by the deciding means, moving the magnetic head into contact with the recording medium before the magnetic head is activated, and for moving the magnetic head out of contact with the recording medium after the magnetic head is deactivated, wherein the deciding means is out of contact with the magnetic recording layer of the recording medium, wherein the deciding means comprises means for detecting an amount of magnetic flux via the magnetic head, means for comparing the detected amount of magnetic flux with a predetermined reference amount, and means for deciding whether a magnetic recording layer is present in or absent from a currently-mounted recording medium in response to a result of the comparison between the detected amount of magnetic flux and the predetermined reference amount.

* * * * *